United States Patent [19]
Withgott et al.

[11] Patent Number: 5,491,760
[45] Date of Patent: Feb. 13, 1996

[54] METHOD AND APPARATUS FOR SUMMARIZING A DOCUMENT WITHOUT DOCUMENT IMAGE DECODING

[75] Inventors: M. Margaret Withgott, Los Altos; Steven C. Bagley; Dan S. Bloomberg, both of Palo Alto; Per-Kristian Halvorsen, Los Altos, all of Calif.; Daniel P. Huttenlocher, Ithaca, N.Y.; Todd A. Cass, Cambridge, Mass.; Ronald M. Kaplan, Palo Alto; Ramana R. Rao, San Francisco, both of Calif.

[73] Assignee: Xerox Corporation, Stamford, Conn.

[21] Appl. No.: 240,284

[22] Filed: May 9, 1994

Related U.S. Application Data

[63] Continuation of Ser. No. 794,543, Nov. 19, 1991, abandoned.

[51] Int. Cl.⁶ .................................................. G06K 9/46
[52] U.S. Cl. ......................... 382/203; 382/177; 382/229
[58] Field of Search ........................... 382/9, 55, 1, 28, 382/30, 25, 40, 177, 190, 114, 198, 199, 200, 203, 209, 206, 229, 257, 308; 364/419.03, 419.19

[56] References Cited

U.S. PATENT DOCUMENTS

| | | | |
|---|---|---|---|
| 3,659,354 | 5/1972 | Sutherland | 35/35 A |
| 4,654,873 | 3/1987 | Fujisawa et al. | 382/9 |
| 4,685,135 | 8/1987 | Lin et al. | 382/1 |
| 4,752,772 | 6/1988 | Litt et al. | 340/712 |
| 4,972,349 | 11/1990 | Kleinberger | 364/900 |
| 4,994,987 | 2/1991 | Baldwin | 364/518 |
| 5,048,109 | 9/1991 | Bloomberg et al. | 382/9 |
| 5,077,668 | 12/1991 | Doi | 364/419 |
| 5,131,049 | 7/1992 | Bloomberg et al. | 382/55 |
| 5,181,255 | 1/1993 | Bloomberg et al. | 382/55 |
| 5,202,933 | 4/1993 | Bloomberg et al. | 382/55 |
| 5,216,725 | 6/1993 | McCubbrey | 382/9 |
| 5,325,444 | 6/1994 | Cass et al. | 382/40 |
| 5,384,863 | 1/1995 | Huttenlocher et al. | 382/40 |

FOREIGN PATENT DOCUMENTS

| | | | |
|---|---|---|---|
| 0361464 | 4/1990 | European Pat. Off. | 15/401 |
| 59-135576 | 8/1984 | Japan | |
| 02093866 | 4/1990 | Japan | |

OTHER PUBLICATIONS

"A Business Intelligence System" by H. P. Luhn, IBM Journal, Oct. 1958.

D. S. Bloomberg "Multiresolution morphological approach to document image analysis" First International Conference on Document Analysis and Recognition ICDAR 91, 30 Sep.–2 Oct. 1991, St. Malo, France pp. 963–971.

M. Hase et al. "A method for extracting marked regions from document images" Proc. 8th International Conference On Pattern Recognition, 27–31 Oct. 1986, Paris France, pp. 780–782.

*Primary Examiner*—Leo Boudreau
*Assistant Examiner*—Phuoc Tran
*Attorney, Agent, or Firm*—Oliff & Berridge

[57] ABSTRACT

A method and apparatus for excerpting and summarizing an undecoded document image, without first converting the document image to optical character codes such as ASCII text, identifies significant words, phrases and graphics in the document image using automatic or interactive morphological image recognition techniques, document summaries or indices are produced based on the identified significant portions of the document image. The disclosed method is particularly adept for improvement of reading machines for the blind.

20 Claims, 39 Drawing Sheets

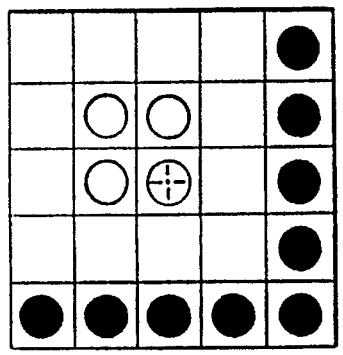
FIG. 4E
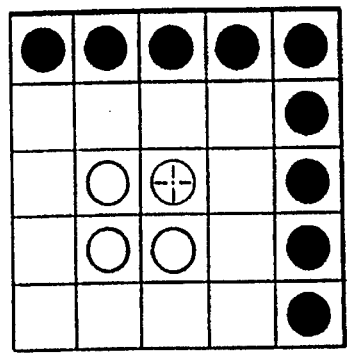
FIG. 4F
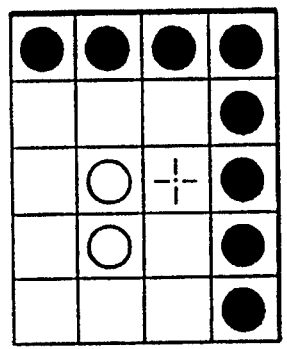
FIG. 4C
FIG. 4D
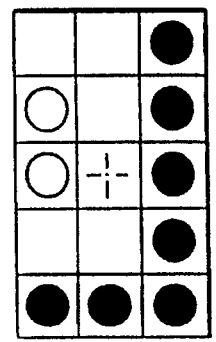
FIG. 4A
FIG. 4B

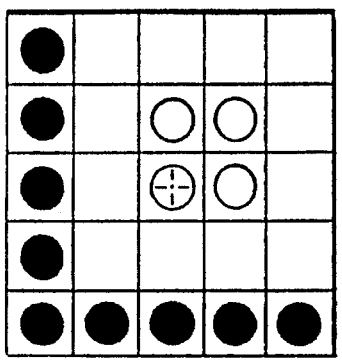
FIG. 5E
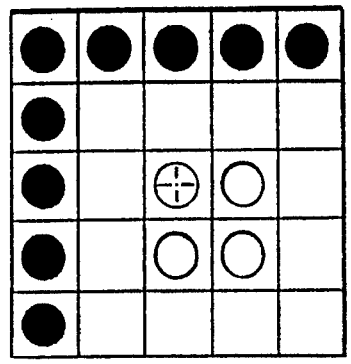
FIG. 5F
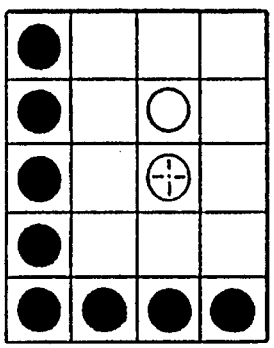
FIG. 5C
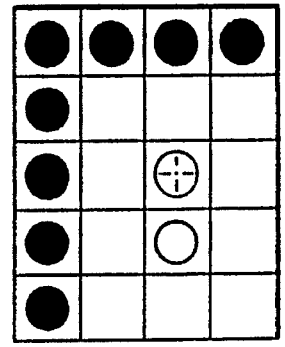
FIG. 5D
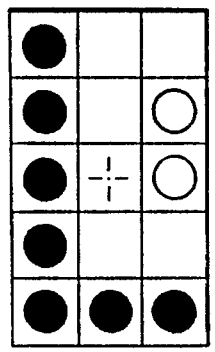
FIG. 5A
FIG. 5B A practitioner may not solicit professional employment from a prospective client with whom the practitioner has no family or prior professional relationship, by mail, in-person or otherwise, when a significant motive for the practitioner's doing so is the practitioner's pecuniary gain under circumstances evidencing undue influence, in-

FIG. 10

A practitioner may not solicit professional employment from a prospective client with whom the practitioner has no family or prior professional relationship, by mail, in-person or otherwise, when a significant motive for the practitioner's doing so is the practitioner's pecuniary gain under circumstances evidencing undue influence, in-

FIG.11

A practitioner may not solicit professional employment from a prospective client with whom the practitioner has no family or prior professional relationship, by mail, in-person or otherwise, when a significant motive for the practitioner's doing so is the practitioner's pecuniary gain under circumstances evidencing undue influence, in-

FIG. 12C

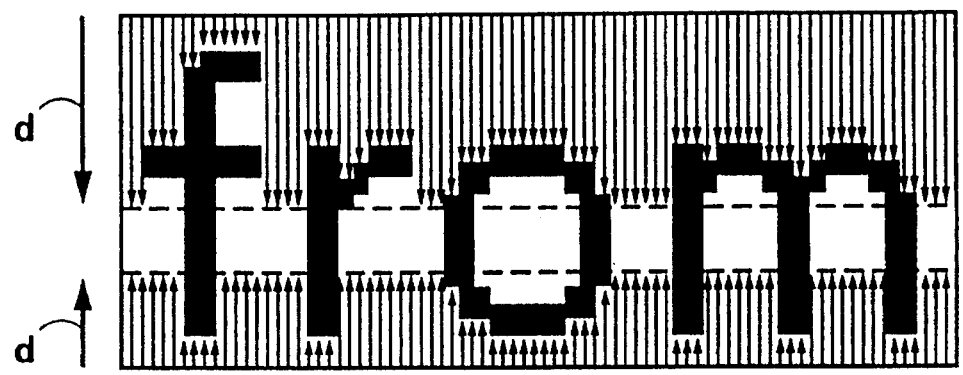
FIG. 26A
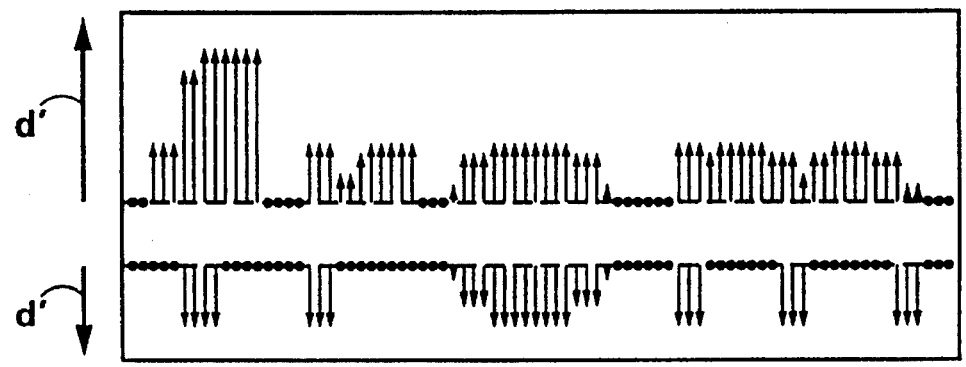
FIG. 26B
FIG. 26C
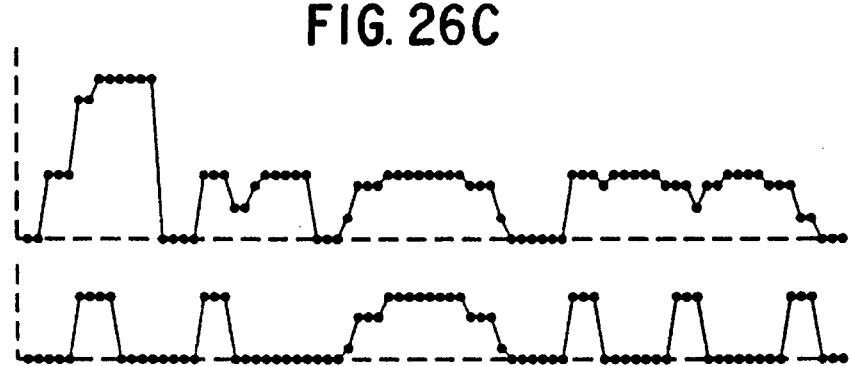
FIG. 26D

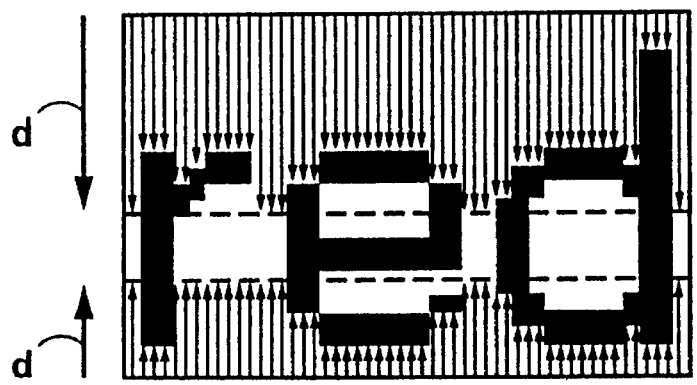
FIG. 27A
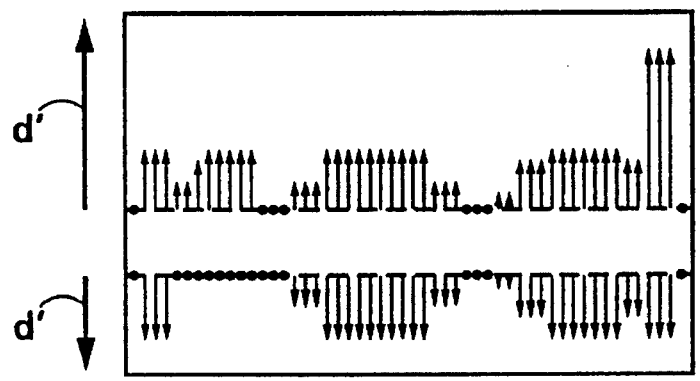
FIG. 27B
FIG. 27C
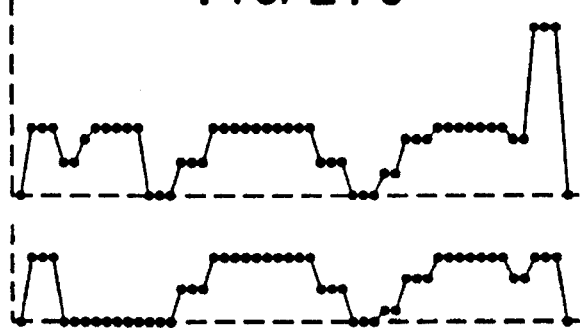
FIG. 27D

METHOD AND APPARATUS FOR SUMMARIZING A DOCUMENT WITHOUT DOCUMENT IMAGE DECODING

This is a continuation of application Ser. No. 07/794,543 filed Nov. 19, 1991, now abandoned.

BACKGROUND OF THE INVENTION

A portion of the disclosure of this patent document contains material that is subject to copyright protection. The copyright owner has no objection to the facsimile reproduction by anyone of the patent document or the patent disclosure, as it appears in the U.S. Patent and Trademark Office records, but otherwise reserves all copyright rights whatsoever.

1. Cross-References to Related Applications

The following concurrently filed and related U.S. applications are hereby cross referenced and incorporated by reference in their entirety.

"Method for Determining Boundaries of Words in Text" to Huttenlocher et al., U.S. patent application Ser. No. 07/794,392.

"Detecting Function Words Without Converting a Document to Character Codes" to Bloomberg et al., U.S. patent application Ser. No. 07/794,190.

"A Method of Deriving Wordshapes for Subsequent Comparison" to Huttenlocher et al., U.S. patent application Ser. No. 07/794,391.

"Method and Apparatus for Determining the Frequency of Words in a Document Without Document Image Decoding" to Cass et al., U.S. patent application Ser. No. 07/795,173.

"Optical Word Recognition by Examination of Word Shape" to Huttenlocher et al., U.S. patent application Ser. No. 07/796,119, Published European Application No. 0543592, published May 26, 1993.

"A Method and Apparatus for Automatic Modification of Selected Semantically Significant Image Segments Within a Document Without Document Image Decoding" to Huttenlocher et al., U.S. patent application Ser. No. 07/795,174.

"Method for Comparing Word Shapes" to Huttenlocher et al., U.S. patent application Ser. No. 07/795,169.

"Method and Apparatus for Determining the Frequency of Phrase in a Document Without Document Image Decoding" to Withgott et al., U.S. patent application Ser. No. 07/794,555 now U.S. Pat. No. 5,369,714.

2. Field of the Invention

This invention relates to improvements in methods and apparatuses for automatic document processing, and more particularly to improvements in methods and apparatuses for recognizing semantically significant words, characters, images, or image segments in a document image without first decoding the document image and automatically creating a summary version of the document contents.

3. Background

It has long been the goal in computer based electronic document processing to be able, easily and reliably, to identify, access and extract information contained in electronically encoded data representing documents; and to summarize and characterize the information contained in a document or corpus of documents which has been electronically stored. For example, to facilitate review and evaluation of the information content of a document or corpus of documents to determine the relevance of same for a particular user's needs, it is desirable to be able to identify the semantically most significant portions of a document, in terms of the information they contain; and to be able to present those portions in a manner which facilitates the user's recognition and appreciation of the document contents. However, the problem of identifying the significant portions within a document is particularly difficult when dealing with images of the documents (bitmap image data), rather than with code representations thereof (e.g., coded representations of text such as ASCII). As opposed to ASCII text files, which permit users to perform operations such as Boolean algebraic key word searches in order to locate text of interest, electronic documents which have been produced by scanning an original without decoding to produce document images are difficult to evaluate without exhaustive viewing of each document image, or without hand-crafting a summary of the document for search purposes. Of course, document viewing or creation of a document summary require extensive human effort.

On the other hand, current image recognition methods, particularly involving textual material, generally involve dividing an image segment to be analyzed into individual characters which are then deciphered or decoded and matched to characters in a character library. One general class of such methods includes optical character recognition (OCR) techniques. Typically, OCR techniques enable a word to be recognized only after each of the individual characters of the word have been decoded, and a corresponding word image retrieved from a library.

Moreover, optical character recognition decoding operations generally require extensive computational effort, generally have a non-trivial degree of recognition error, and often require significant amounts of time for image processing, especially with regard to word recognition. Each bitmap of a character must be distinguished from its neighbors, its appearance analyzed, and identified in a decision making process as a distinct character in a predetermined set of characters. Further, the image quality of the original document and noise inherent in the generation of a scanned image contribute to uncertainty regarding the actual appearance of the bitmap for a character. Most character identifying processes assume that a character is an independent set of connected pixels. When this assumption fails due to the quality of the image, identification also fails.

4. References

European patent application number 0-361-464 by Doi describes a method and apparatus for producing an abstract of a document with correct meaning precisely indicative of the content of the document. The method includes listing hint words which are preselected words indicative of the presence of significant phrases that can reflect content of the document, searching all the hint words in the document, extracting sentences of the document in which any one of the listed hint words is found by the search, and producing an abstract of the document by juxtaposing the extracted sentences. Where the number of hint words produces a lengthy excerpt, a morphological language analysis of the abstracted sentences is performed to delete unnecessary phrases and focus on the phrases using the hint words as the right part of speech according to a dictionary containing the hint words.

"A Business Intelligence System" by Luhn, IBM Journal, October 1958 describes a system which in part, auto-abstracts a document, by ascertaining the most frequently occurring words (significant words) and analyzes all sentences in the text containing such words. A relative value of the sentence significance is then established by a formula which reflects the number of significant words contained in a sentence and the proximity of these words to each other within the sentence. Several sentences which rank highest in value of significance are then extracted from the text to constitute the auto-abstract.

SUMMARY OF THE INVENTION

Accordingly, it is an object of the invention to provide a method and apparatus for automatically excerpting and summarizing a document image without decoding or otherwise understanding the contents thereof.

It is another object of the invention to provide a method and apparatus for automatically generating ancillary document images reflective of the contents of an entire primary document image.

It is another object of the invention to provide a method and apparatus of the type described for automatically extracting summaries of material and providing links from the summary back to the original document.

It is another object of the invention to provide a method and apparatus of the type described for producing Braille document summaries or speech synthesized summaries of a document.

It is another object of the invention to provide a method and apparatus of the type described which is useful for enabling document browsing through the development of image gists, or for document categorization through the use of lexical gists.

It is another object of the invention to provide a method and apparatus of the type described that does not depend upon statistical properties of large, pre-analyzed document corpora.

The invention provides a method and apparatus for segmenting an undecoded document image into undecoded image units, identifying semantically significant image units based on an evaluation of predetermined image characteristics of the image units, without decoding the document image or reference to decoded image data, and utilizing the identified significant image units to create an ancillary document image of abbreviated information content which is reflective of the subject matter content of the original document image. In accordance with one aspect of the invention, the ancillary document image is a condensation or summarization of the original document image which facilitates browsing. In accordance with another aspect of the invention, the identified significant image units are presented as an index of key words, which may be in decoded form, to permit document categorization.

Thus, in accordance with one aspect of the invention, a method is presented for excerpting information from a document image containing word image units. According to the invention, the document image is segmented into word image units (word units), and the word units are evaluated in accordance with morphological image properties of the word units, such as word shape. Significant word units are then identified, in accordance with one or more predetermined or user selected significance criteria, and the identified significant word units are outputted.

In accordance with another aspect of the invention, an apparatus is provided for excerpting information from a document containing a word unit text. The apparatus includes an input means for inputting the document and producing a document image electronic representation of the document, and a data processing system for performing data driven processing and which comprises execution processing means for performing functions by executing program instructions in a predetermined manner contained in a memory means. The program instructions operate the execution processing means to identify significant word units in accordance with a predetermined significance criteria from morphological properties of the word units, and to output selected ones of the identified significant word units. The output of the selected significant word units can be to an electrostatographic reproduction machine, a speech synthesizer means, a Braille printer, a bitmap display, or other appropriate output means.

These and other objects, features and advantages of the invention will be apparent to those skilled in the art from the following detailed description of the invention, when read in conjunction with the accompanying drawings and appended claims.

BRIEF DESCRIPTION OF THE DRAWINGS

A preferred embodiment of the invention is illustrated in the accompanying drawing, in which:

FIGS. 4A–4F show three sets of character ascender structuring elements where: FIGS. 4A–4B show a set of character ascender structuring elements of height 3 and length 5, where the solid dots are ON pixels along the bottom row and along one side column and there are one or more OFF pixels in a remaining location preferably separated from the ON pixels; FIGS. 4C–4D show a set of character ascender structuring elements of height 4 and length 5; and FIGS. 4E–4F show a set of character ascender structuring elements of height 5 and length 5.

FIGS. 5A–5F show three sets of character descender structuring elements where: FIGS. 5A–5B show a set of character descender structuring elements of height 3 and length 5; FIGS. 5C–5D show a set of character descender structuring elements of height 4 and length 5; and FIGS. 5E–5F show a set of character descender structuring elements of height 5 and length 5;

FIG. 10 shows an image sample of example text over which the inventive process will be demonstrated;

FIG. 11 is a copy of a scanned image of the example text;

FIGS. 12A, 12B and 12C graphically illustrate the process used to determine the angle at which the example text is oriented in the image sample prior for further processing, while

FIGS. 26A, 26B, 26C and 26D illustrate derivation of a single independent value signal, using the example word "from";

FIGS. 27A, 27B, 27C and 27D illustrate derivation of a single independent value signal, using the example word "red", which does not appear in the sample image of example text;

Figure 1:
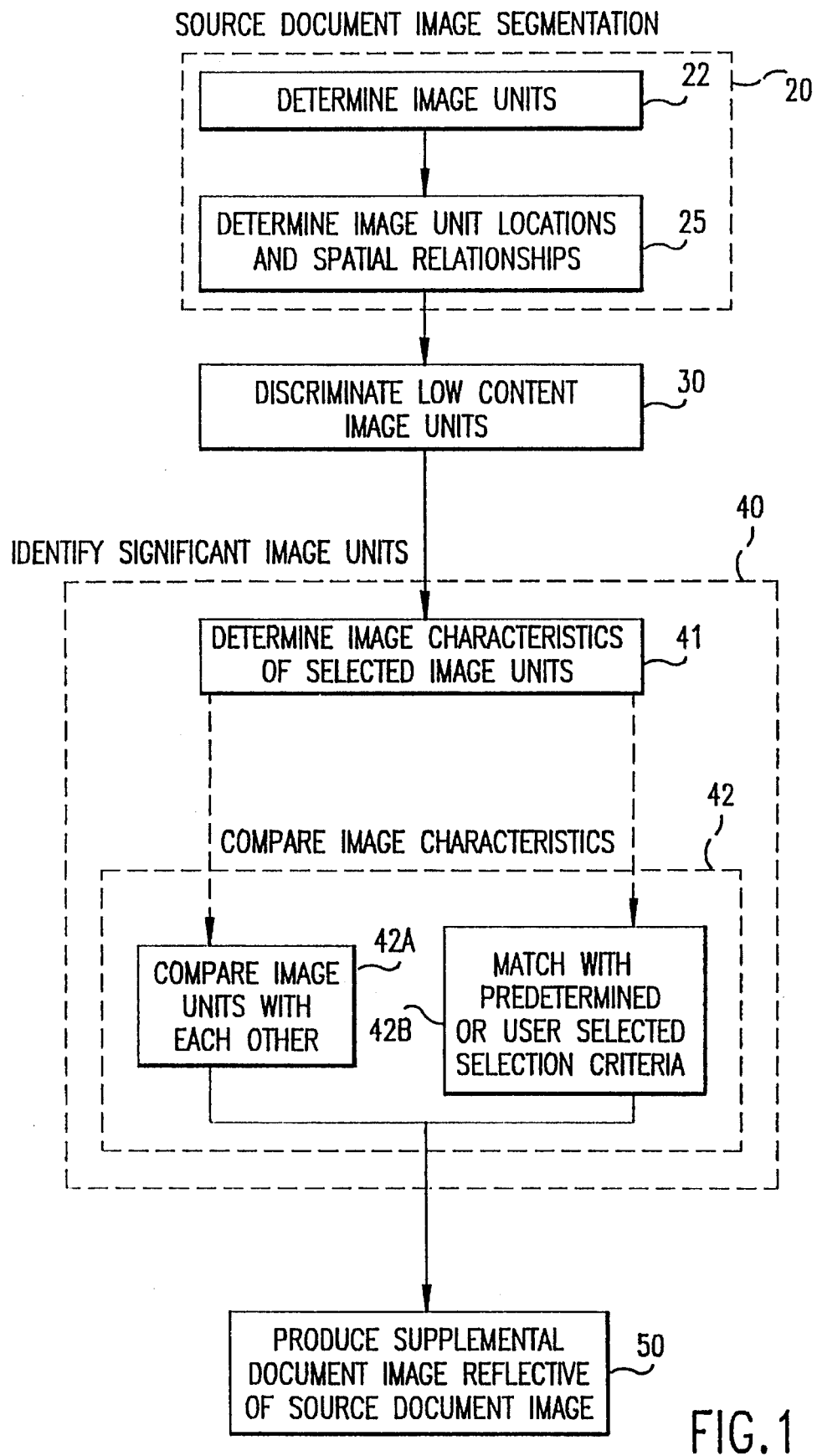
FIG. 1 is a flow chart of a method of the invention.

The Appendix contains source code listings for a series of image manipulation and signal processing routines which have been implemented to demonstrate the functionality of the present invention. Included in the Appendix are four sections which are organized as follows:

Section A, beginning at page 1, comprises the declarative or "include" files which are commonly shared among the functional code modules;

Section B, beginning at page 26, includes the listings for a series of library type functions used for management of the images, error reporting, argument parsing, etc.;

Section C, beginning at page 42, comprises numerous variations of the word shape comparison code, and further includes code illustrating alternative comparison techniques than those specifically cited in the following description;

Section D, beginning at page 145, comprises various functions for the word shape extraction operations that are further described in the following description.

DETAILED DESCRIPTION OF THE PREFERRED EMBODIMENT

In contrast to prior techniques, such as those described above, the invention is based upon the recognition that scanned image files and character code files exhibit important differences for image processing, especially in data retrieval. The method of a preferred embodiment of the invention capitalizes on the visual properties of text contained in paper documents, such as the presence or frequency of linguistic terms (such as words of importance like "important", "significant", "crucial", or the like) used by the author of the text to draw attention to a particular phrase or a region of the text; the structural placement within the document image of section titles and page headers, and the placement of graphics; and so on. A preferred embodiment of the method of the invention is illustrated in the flow chart of FIG. 1, and an apparatus for performing the method is shown in FIG. 2. For the sake of clarity, the invention will be described with reference to the processing of a single document. However, it will be appreciated that the invention is applicable to the processing of a corpus of documents containing a plurality of documents. M o r e particularly, the invention provides a method and apparatus for automatically excerpting semantically significant information from the data or text of a document based on certain morphological (structural) image characteristics of image units corresponding to units of understanding contained within the document image. The excerpted information can be used, among other things, to automatically create a document index or summary. The selection of image units for summarization can be based on frequency of occurrence, or predetermined or user selected selection criteria, depending upon the particular application in which the method and apparatus of the invention is employed.

The invention is not limited to systems utilizing document scanning. Rather, other systems such as a bitmap workstation (i.e., a workstation with a bitmap display) or a system using both bitmapping and scanning would work equally well for the implementation of the methods and apparatus described herein.

Figure 8:
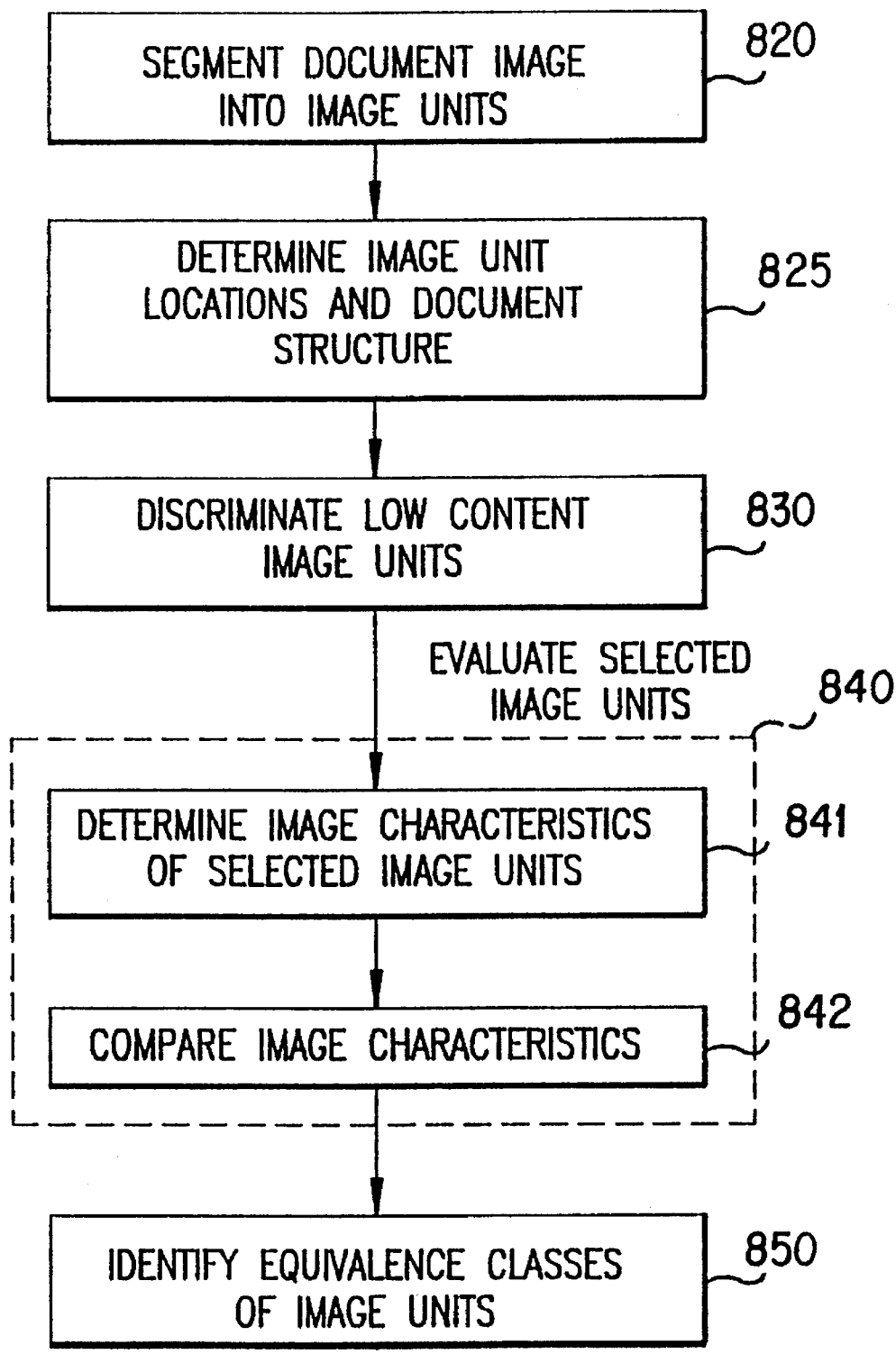
FIG. 8 shows a block system diagram for identifying equivalence classes of image units.

With reference first to FIG. 2, the method is performed on an electronic image of an original document 5, which may include lines of text 7, titles, drawings, figures 8, or the like, contained in one or more sheets or pages of paper 10 or other tangible form. The electronic document image to be processed is created in any conventional manner, for example, by a conventional scanning means such as those incorporated within a document copier or facsimile machine, a Braille reading machine, or by an electronic beam scanner or the like. Such scanning means are well known in the art, and thus are not described in detail herein. An output derived from the scanning is digitized to produce undecoded bit mapped image data representing the document image for each page of the document, which data is stored, for example, in a memory 15 of a special or general purpose digital computer data processing system 13. The data processing system 13 can be a data driven processing system which comprises sequential execution processing means 16 for performing functions by executing program instructions in a predetermined sequence contained in a memory, such as the memory 15. The output from the data processing system 13 is delivered to an output device 17, such as, for example, a memory or other form of storage unit; an output display 17A as shown, which may be, for instance, a CRT display; a printer device 17B as shown, which may be incorporated in a document copier machine or a Braille or standard form printer; a facsimile machine, speech synthesizer or the like.

Through use of equipment such as illustrated in FIG. 2, the identified word units are detected based on significant morphological image characteristics inherent in the image units, without first converting the scanned document image to character codes.

The method by which such image unit identification may be performed is described with reference now to FIG. 1. The first phase of the image processing technique of the invention involves a low level document image analysis in which the document image for each page is segmented into undecoded information containing image units (step 20) using conventional image analysis techniques; or, in the case of text documents, preferably using the bounding box method described in copending U.S. patent application Ser. No. 07/794,392 filed concurrently herewith by Huttenlocher and Hopcroft, and entitled "Method for Determining Boundaries of Words in Text." The locations of and spatial relationships between the image units on a page are then determined (step 25). For example, an English language document image can be segmented into word image units based on the relative difference in spacing between characters within a word and the spacing between words. Sentence and paragraph boundaries can be similarly ascertained. Additional region segmentation image analysis can be performed to generate a physical document structure description that divides page images into labelled regions corresponding to auxiliary document elements like figures, tables, footnotes and the like. Figure regions can be distinguished from text regions based on the relative lack of image units arranged in a line within the region, for example. Using this segmentation, knowledge of how the documents being processed are arranged (e.g., left-to-right, top-to-bottom), and, optionally, other inputted information such as document style, a "reading order" sequence for word images can also be generated. The term "image unit" is thus used herein to denote an identifiable segment of an image such as a number, character, glyph, symbol, word, phrase or other unit that can be reliably extracted. Advantageously, for purposes of document review and evaluation, the document image is segmented into sets of signs, symbols or other elements, such as words, which together form a single unit of understanding. Such single units of understanding are generally characterized in an image as being separated by a spacing greater than that which separates the elements forming a unit, or by some predetermined graphical emphasis, such as, for example, a surrounding box image or other graphical separator, which distinguishes one or more image units from other image units in the scanned document image. Such image units representing single units of understanding will be referred to hereinafter as "word units."

Advantageously, a discrimination step 30 is next performed to identify the image units which have insufficient information content to be useful in evaluating the subject matter content of the document being processed. One preferred method is to use the morphological function or stop word detection techniques disclosed in the copending U.S. patent application Ser. No. 07/794,190 filed concurrently herewith by D. Bloomberg et al., and entitled "Detecting Function Words Without Converting a Document to Character Codes".

Figure 3:
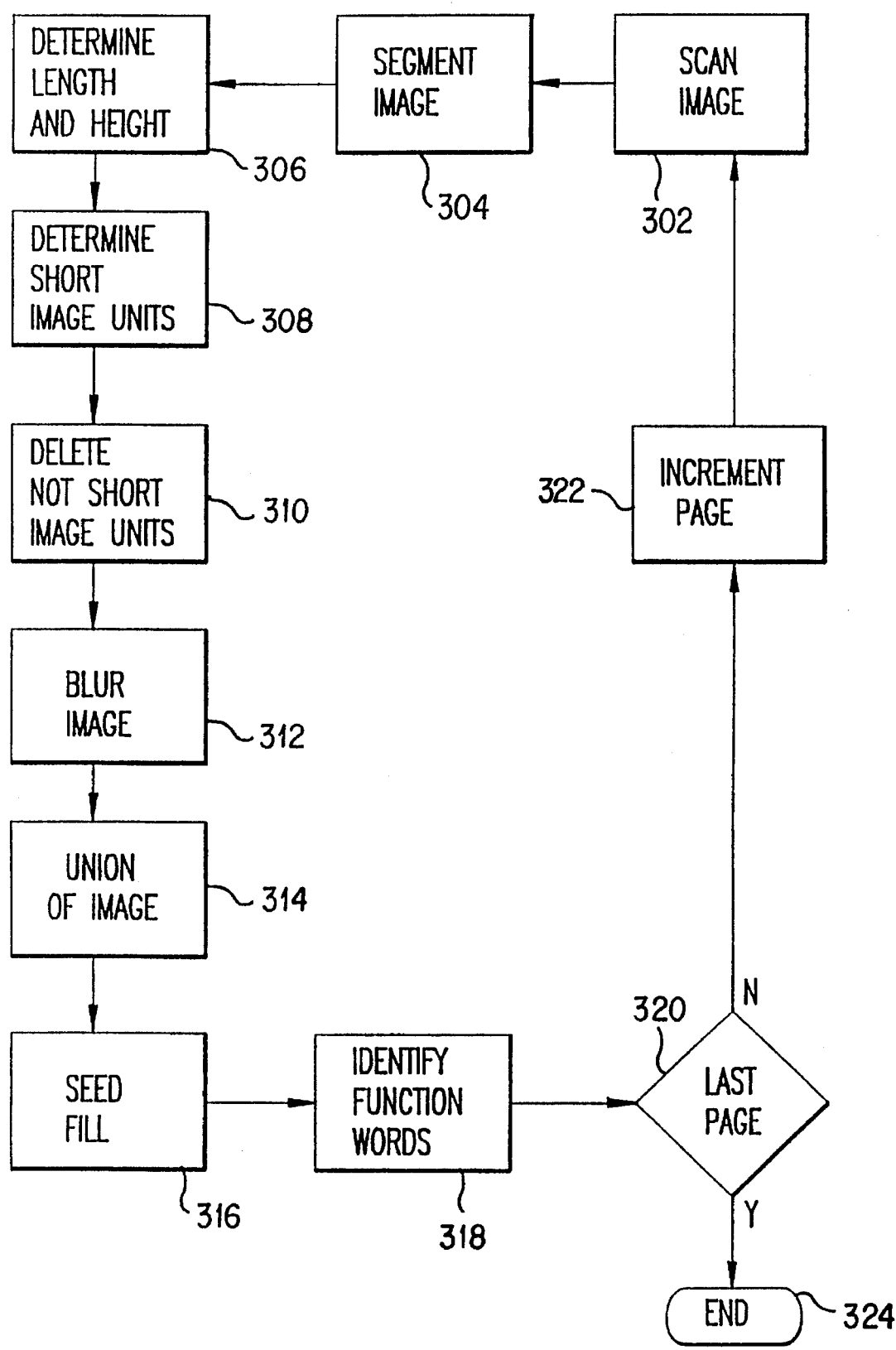
FIG. 3 is a flow chart of a preferred embodiment of a method according to the invention for detecting function words in a scanned document image without first converting the document image to character codes.

The method of identification of image units which have insufficient information content by determining function words without converting the document to character codes is shown in FIG. 3. The following definitions are used to describe this method:

A binary image contains pixels that are either ON or OFF. Binary images are manipulated according to a number of operations wherein one or more source images are mapped onto a destination image. The results of such operations are generally referred to as images.

A morphological operation refers to an operation on a pixelmap image (a source image), that uses a local rule at each pixel to create another pixelmap image, the destination image. This rule depends both on the type of the desired operation to perform as well as on the chosen structuring element.

A structuring element (SE) refers to an image object of typically (but not necessarily) small size and simple shape that probes the source image and extracts various types of information from it via the chosen morphological operation. FIGS. 4 and 5 show SEs where a solid circle is a hit, and an open circle is a miss. The center position is denoted by a cross. Squares that have neither solid nor open circles are "don't cares"; their value in the image (ON or OFF) is not probed. A binary SE is used to probe binary images in a binary morphological operation that operates on binary input images and creates an output binary image. The SE is defined by a center location and a number of pixel locations, each normally having a defined value (ON or OFF). The pixels defining the SE do not have to be adjacent each other. The center location need not be at the geometrical center of the pattern; indeed it need not even be inside the pattern. A solid SE refers to an SE having a periphery within which all pixels are ON. For example, a solid 2×2 SE is a 2×2 square of ON pixels. A solid SE need not be rectangular. A horizontal SE is generally one row of ON pixels and a vertical SE is generally one column of ON pixels of selected size. A hit-miss SE refers to an SE that specifies at least one ON pixel and at least one OFF pixel.

AND, OR and XOR are logical operations carried out between two images on a pixel-by-pixel basis.

NOT is a logical operation carried out on a single image on a pixel-by-pixel basis.

EXPANSION is scale operation characterized by a scale factor N, wherein each pixel in a source image becomes an N×N square of pixels, all having the same value as the original pixel.

REDUCTION is a scale operation characterized by a scale factor N in a threshold level M. REDUCTION with scale=N entails dividing the source image into N×N squares of pixels, mapping each such square in the source image to a single pixel on the destination image. The value for the pixel in the destination image is determined by the threshold level M, which is a number between I and $N^2$. If the number of ON pixels in the pixel square is greater or equal to M, the destination pixel is ON, otherwise it is OFF.

EROSION is a morphological operation wherein a given pixel in the destination image is turned ON if and only if the result of superimposing the SE center on the corresponding pixel location in the source image results in a match between all ON and OFF pixels in the SE and the underlying pixels in the source image. An EROSION will give one pixel in the destination image for every match. That is, at each pixel, it outputs 1 if the SE (shifted and centered at that pixel) is totally contained inside the original image foreground, and outputs 0 otherwise. Note that EROSION usually refers to operations using a SE with only hits and more generally matching operations with both hits and misses (often called a hit-miss transform). The term EROSION is used herein to include matching operations with both hits and misses, thus the hit-miss transform is the particular type of EROSION used herein.

DILATION is a morphological operation wherein a given pixel in the source image being ON causes the SE to be written into the destination image with the SE center at the corresponding location in the destination image. The SEs used for DILATION typically have no OFF pixels. The DILATION draws the SE as a set of pixels in the destination image for each pixel in the source image. Thus, the output image is the union of all shifted versions of the SE translated at all 1-pixels of the original image.

FillClip is a morphological operation where one image is used as a seed and is grown morphologically, clipping it at each growth step to the second image. For example, a fillClip could include a DILATION followed by logically ANDing the DILATION result with another image.

OPENING is a morphological operation that uses an image and a structuring element and consists of an EROSION followed by a DILATION. The result is to replicate the structuring element in the destination image for each match in the source image.

CLOSING is a morphological operation using an image and a structuring element. It includes a DILATION followed by an EROSION of the image by a structuring element. A CLOSE of an image is equivalent to the bit inverse of an OPEN on the (bit inverse) background.

UNION is a bitwise OR between two images. An intersection is a bitwise AND between two images.

Blurring is a DILATION of an image by a structuring element(s) consisting of two or more hits.

A mask refers to an image, normally derived from an original or source image, that contains substantially solid regions of ON pixels corresponding to regions of interest in the original image. The mask may also contain regions of ON pixels that do not correspond to regions of interest.

The various operations defined above are sometimes referred to in noun, adjective, and verb forms. For example, references to DILATION (noun form) may be in terms of DILATING the image or the image being DILATED (verb forms) or the image being subjected to a DILATION operation (adjective form). No difference in meaning is intended.

Morphological operations have several specific properties that simplify their use in the design of appropriate procedures. First, they are translationally invariant. A sideway shift of the image before transforming does not change the result, except to shift the result as well. Operations that are translationally invariant can be implemented with a high degree of parallelism, in that each point in the image is treated using the same rule. In addition, morphological operations satisfy two properties that make it easy to visualize their geometrical behavior. First, EROSION, DILATION, OPEN and CLOSE are increasing, which means that if image 1 is contained in image 2, then any of these morphological operations on image 1 will also be contained in the morphological operation on image 2. Second, a CLOSE is extensive and OPEN is antiextensive. This means that the original image is contained in the image transformed by CLOSE and the image transformed by OPEN is contained in the original image. The DILATION and EROSION operations are also extensive and anti-extensive, respectively, if the center of the structuring element is located on a hit.

The OPEN and CLOSE operations also satisfy two more morphological properties:

(1) The result of the operation is independent of the position of the center of the structuring element.

(2) The operation is idempotent, which means that reapplying the OPEN or CLOSE to the resulting image will not change it.

An image unit means an identifiable segment of an image such as a word, number, character, glyph or other units that can be extracted reliably and have an underlying linguistic structure.

The term significant and its derivatives are used in this description to indicate the importance of particular characteristics of an image unit. An image unit with significant characteristics becomes a significant image unit in that it contains high value information which can be used for further processing of the document image. Significant characteristics of image units include a variety of classifiers such as length, width, location on a page of the document image, font, typeface and measurement by other parameters including, but not limited to: one or more cross-sections of a box (a cross-section being a sequence of ON or OFF pixels); a number of ascenders associated with an image unit; a number of descenders associated with an image unit; average pixel density in an image unit; a length of a topline contour of an image unit, including peaks and troughs; a length of a base contouring of the image units, including peaks and troughs; and the location of image units with respect to neighboring image units, e.g., vertical position and horizontal inter-image unit spacing.

Referring to FIG. 3, the method for detecting function words in a scanned document image without first converting the document image to character codes will be described. An image of a page of a document is scanned in step 302 and the image is segmented into image units in step 304 by using either a conventional image analysis techniques or by using first a technique to determine baselines of image units and then second a technique for providing bounding boxes around image units (see U.S. patent application Ser. No. 07/794,391 entitled "A Method of Deriving Wordshapes for Subsequent Comparison" by Huttenlocher et al.)

Figure 6:
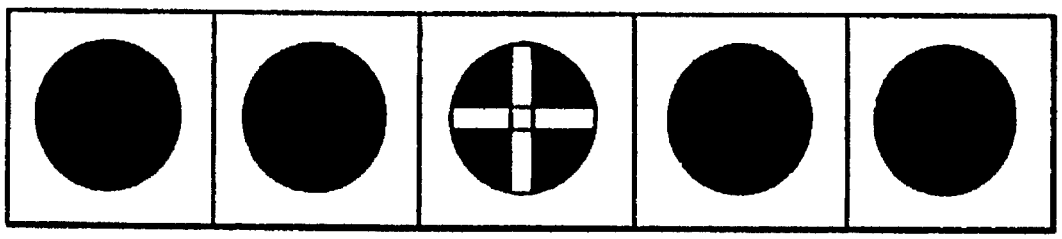
FIG. 6 shows a horizontal structuring element of length 5.

In step 306, a length and height of each image unit in the image is determined. Short image units are determined in step 308 as image units of no more than a predetermined number of characters, preferably three characters or less in length. In step 310, image units which are not short image units are deleted from the image. In step 312, the image is blurred or smeared in a horizontal direction although the image units are not smeared together. This can be accomplished for example by CLOSING the image with a horizontal structuring element such as the structuring element of length 5 (i.e., 5 pixels) shown in FIG. 6. The length of the horizontal structuring element used to blur the x-height characters in the image is dependent upon the width of the character type being used. Furthermore, other configurations of structuring elements may be used in the CLOSING operation to obtain the same smearing effect. However, the most efficient and effective way to smear characters of x-height is to use a horizontal structuring element as described above.

A UNION of erosions is taken in step 314 of the image by using a set of ascender matching structuring elements such as those shown in FIGS. 4A–4F, and a set of descender matching structuring elements such as those shown in FIGS. 5A–5F. The UNION taken in step 314 provides optional noise elimination filtering, and the UNION will provide a seed from which to fill short image unit masks in a subsequent seed filling operation such as the fillClip operation of step 316. The UNION of step 314 acts on all image units remaining in the image (i.e., only short image units in this case) and since the UNION of erosions was taken using a set of ascender matching structuring elements and a set of descender matching structuring elements, the image units that will be filled are those containing ascender and/or descender characters, i.e., function words. The function words are identified in step 318 as those image units which are filled short image unit masks.

In step 320, a test occurs to determine whether a last page of the document has been scanned. If the last page has been scanned, then the method terminates at step 324, otherwise the page is incremented in step 322 and the incremented (next) page is scanned in step 302 whereupon the image (next page) is scanned and the previously described steps of the method are reiterated. Of course, all pages could be scanned and stored as bit map images in a memory prior to performing the function word identification procedures described above. Moreover, the image segmentation step can also be performed prior to performing this method and the segmented image stored in memory.

Figure 2:
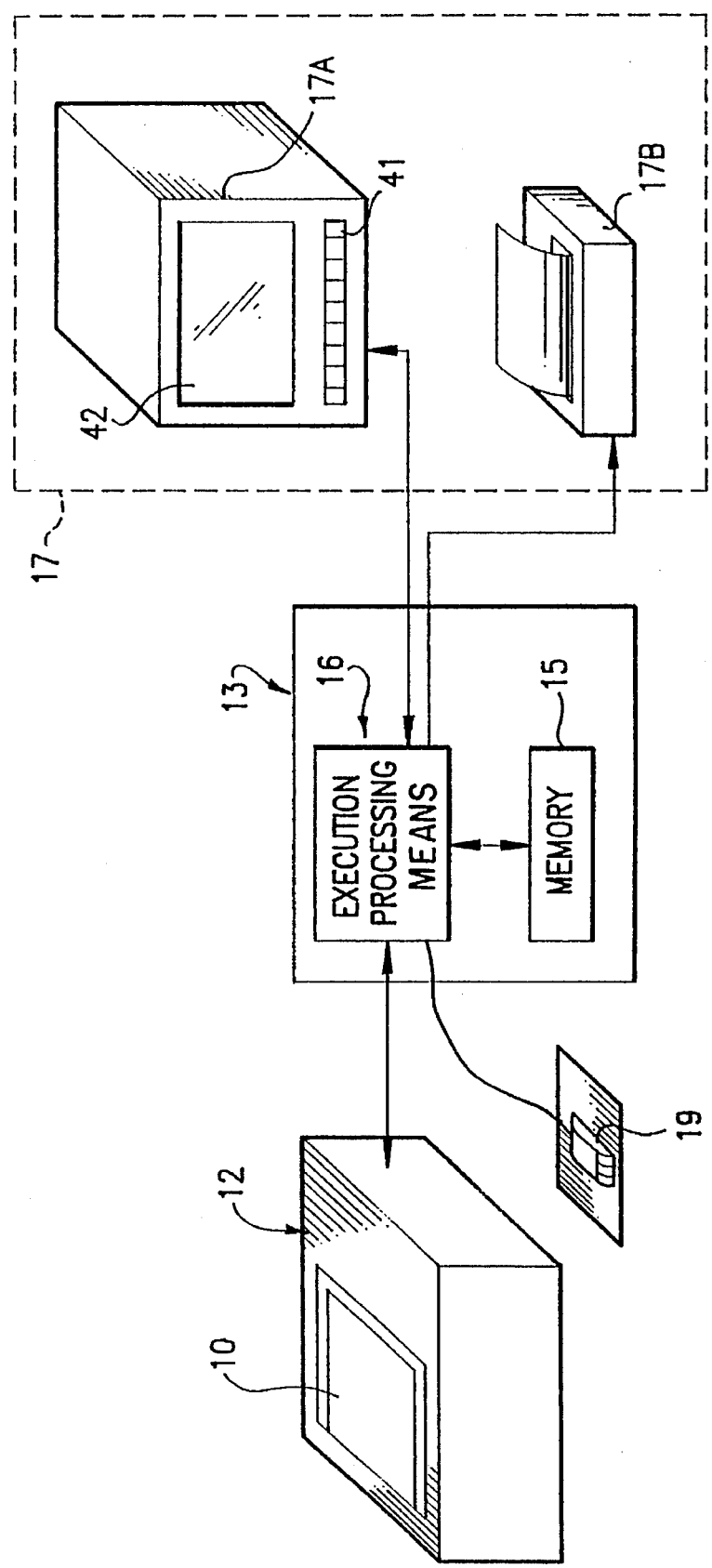
FIG. 2 is a block diagram of an apparatus according to the invention for carrying out the method of FIG. 1.

This is only one preferred method to perform the discrimination step 30 of FIG. 1. Using this method, the image units which have insufficient information content to be useful in evaluating the subject matter content of the document being processed are identified.

Next, in step 40, selected image units, e.g., the image units not discriminated in step 30, are evaluated, without decoding the image units being classified or reference to decoded image data, based on an evaluation of predetermined morphological (structural) image characteristics of the image units. The evaluation entails a determination (step 41) of the image characteristics and a comparison (step 42) of the determined image characteristics for each image unit with the determined image characteristics of the other image units.

One preferred method for defining the image unit image characteristics to be evaluated is to use the word shape derivation techniques disclosed in the copending U.S. patent application Ser. No. 07/794,391 filed concurrently herewith by D. Huttenlocher and M. Hopcroft, and entitled "A Method of Deriving Wordshapes for Subsequent Comparison," Published European Application No. 0543594, published May 26, 1993. As described in the aforesaid application, at least one, one-dimensional signal characterizing the shape of a word unit is derived; or an image function is derived defining a boundary enclosing the word unit, and the image function is augmented so that an edge function representing edges of the character string detected within the boundary is defined over its entire domain by a single independent variable within the closed boundary, without individually detecting and/or identifying the character or characters making up the word unit.

More specifically, the above reference discloses a method for deriving, defining, and comparing words in terms of their shapes. It will, of course, be recognized that each element of the system may be many devices, or may simply be a program operated within a single device. The method will be described with reference to FIG. 7. Beginning with an input bitmap 710, a bitmap of an image is initially directed to a segmentation system 712, in which words, or character strings, or other multi-character units of understanding, will be derived. Initially, the image bitmap passes through skew detector 714, which determines the angle of orientation of text in the image. Using information about the orientation of the image, and the image itself, at text baseline processor 716, toplines and baselines of the text are determined, so that upper and lower boundaries of lines of text within the image are identified.

At median filter 718, the function referred to as "blobify" is performed, which operates on the image so that each word group in a line may be treated as a single unit. As used herein, "word", "symbol string" or "character string" refers to a set of connected alphanumeric or punctuation elements, or more broadly, signs or symbols which together form a single unit of semantic understanding. It will be appreciated that these terms may also be used to refer to the images thereof. Such single units of understanding are characterized in an image as separated by a spacing greater than that which separates the elements, signs or symbols forming the unit. To the blobified image, a set of white lines are added at block 720, to clearly separate adjacent lines of text. The white lines are based on baseline determinations provided by processor 716. Using this information, i.e., the blobified words, which are clearly separated from adjacent words and words in adjacent lines, a bounding box is defined about the word at block 722, thereby identifying and enclosing the word.

Thereafter word shape signal computer 724 derives a word shape signal representing the individual words in the image, based on the original image and the bounding box determinations. This information is then available for use at a word shape comparator 726, for comparing word shape signals representative of known words from a word shape dictionary 728, with the as yet unidentified word shape signals. In an alternative embodiment word shape comparator 726 may be used to compare two or more word shapes determined from image 710. More importantly, word shape comparator 726 is not limited to the comparison of word shapes from unrecognized strings of characters to known word shapes. In a simplified context, comparator 726 is merely an apparatus for comparing one word shape against another to produce a relative indication of the degree of similarity between the two shapes.

In general, a method accomplishing this technique includes the following steps. Once orientation of the image is established and line spacing and word group spacing is established, each word can be surrounded by a bounding box. A reference line is then created extending through the character string image. The reference line may be a block having a finite thickness ranging from two-thirds of the x height to one-third of the x height, or in fact it may have a zero width. At the resolution of the image, the distance from the reference line to the upper edge of the text contour or bounding box is measured in a direction perpendicular to the reference line. Similarly, measurements may be made from the reference line to the lower bounding box edge or to the text contour along the lower portion of the word, whichever is closer. Because the set of values derived computationally can be expressed in terms of position along the horizontal axis versus length, the signal can be considered a single independent variable or one dimensional signal. Either or both of these sets of values may be used to describe the word shape. Additionally, although possibly less desirable, it is well within the scope of this method to measure the distance of a perpendicular line drawn from the top of the bounding box or the bottom of the bounding box, to the first contact with the word or the reference line, as desired.

With a system and process for word shape derivation given, the method may also be considered mathematically. Considering image data i(x,y), which in one common case could be an array of image data in the form of a bitmap, a character set is identified in one of many methods, perhaps as described above, which defines a boundary enclosing the selected symbol string within a subset of the array of image data. From i(x,y), an edge signal e(x,y), which represents the edges of i(x,y) detected within the closed boundary, is derived. The edge signal is augmented by adding additional data to i(x,y) so that e(x,y) is a signal e'(x,y) defined over its entire domain with respect to a single dimension or variable within the closed boundary. One, two, or more signals may be derived from e'(x,y) which are each one dimensional signals g'(t), where g is a function of parameter t which is a reference frame dependent parameter.

It is important to realize that the mathematical process used for the derivation of the one dimensional signal is essentially reversible up to the information it contains, e.g., a bitmap may be reconstructed from the upper and lower bitmap contours. It will be noted that if the reference has a finite thickness and is therefore taken out of the image, that portion of the image is not identifiable, however, if it has a zero width the information still remains.

A recognition dictionary, or look up table of word shapes, can clearly be created through use of the described process. The process can be operated on using either scanned words as the source of the information, or in fact, they can be computer generated for a more "perfect" dictionary.

A detailed example using this method is disclosed in the U.S. patent application Ser. No. 07/794,391.

To demonstrate the process of the invention, at FIG. 10, a sample image, taken from a public domain source is shown, having several lines of text contained therein. FIG. 10 demonstrates approximately how the image would appear on the page of text, while FIG. 11, shows a scanned image of the page, which demonstrates an enlargement of the image of a bitmap that would present problems to known OCR methods. Looking at, for example, the image of the word 50*a* "practitioner" in the first line of the text image, it may be seen that several of the letters run together. Also, at the lower right hand portion of the image, circled and numbered 52, noise is present. Looking at the word "practitioner's", circled and numbered 54, the running together of a punctuation mark and a letter is further noted.

Figure 12A:
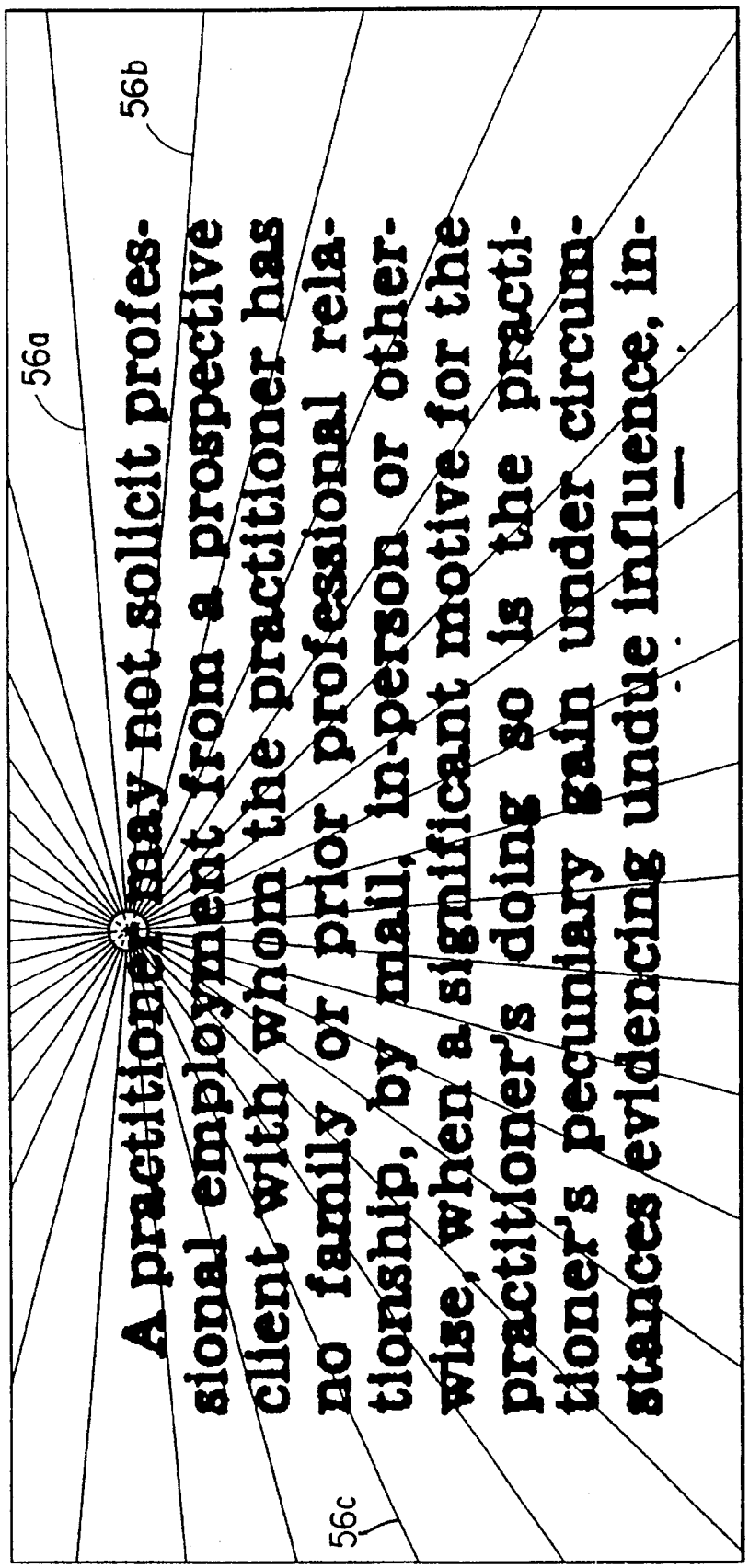

With reference again to FIG. 7, in one possible embodiment of the invention, skew detector 714, may be implemented using a general method for determining the orientation of the text lines in the image. This method looks at a small number of randomly selected edge pixels (defined as a black pixel adjacent to at least one white pixel), and for each edge pixel considers, at FIG. 12A, a number of lines, 56*a*, 56*b*, 56*c* being examples, extending from the pixel at evenly spaced angular increments over a specified range of angles. The edge pixels are selected randomly from the set of all image pixels by the function RandomEdgePixel() (Appendix, page 243). FIGS. 12A (see lines 56*a*, 56*b*, 56*c*), 12B (see lines 58*a*, 58*b*, 58*c*) and 12C (see lines 60*a*, 60*b*, 60*c*) represent a series of increasingly smaller angular ranges over which the above mentioned technique is applied to illustrative edge pixels to accurately determine the angular orientation of the text within the image. Subsequent to finding edge pixels and defining the lines, skew detector 714 traces the path of each line, determining the lengths, in pixels, of strings of successive black pixels which are intersected by the line. Upon reaching the image boundary, an average black pixel string length is calculated by summing the lengths of the individual strings, and dividing the sum by the total number of distinct strings which were found. This operation is carried out for all the lines, thereby arriving at an average black pixel string length for each line extending from the selected edge pixel. These lengths are plotted on FIG. 12D as curve A, showing minima at approximately 0 and 3.14 radians. Curve A is a graphical representation of the summation/averaging function over each of a series of angled lines extending from the edge pixel, and spread over a range from 0 to $2\pi$ radians. Once a first minimum has been located, verification of the minimum (in the example, approximately 0 radians) is achieved by determining whether a second minimum exists at approximately $\pi$ radians from the first minimum. Upon verifying the existence of a second minima (in the example, approximately 3.14 or $\pi$ radians), a coarse skew angle is identified. Subsequently, it is necessary to more closely determine the skew angle of the text. This is accomplished by utilizing a number of lines which extend from a randomly selected edge pixel, where the lines differ by smaller angular increments, and the angular range is centered about the coarse skew angle. However, the fine skew angle may be determined by analyzing the total number of black pixels contained along a predetermined length of the lines. More specifically, the number of pixels over a unit distance are plotted as curve B on FIG. 12D, and the fine skew angle is determined by identifying the maxima of the curve. In other words, the point of the curve where the highest concentration of black pixels per unit line length exists, more accurately represents the angle of the text lines in the image. As shown by curve B, this results in a fine skew angle of approximately 0 radians, where the line intersects with the most black pixels along its length, and therefore is representative of the closest angle of orientation that needs to be determined.

Figure 12B:
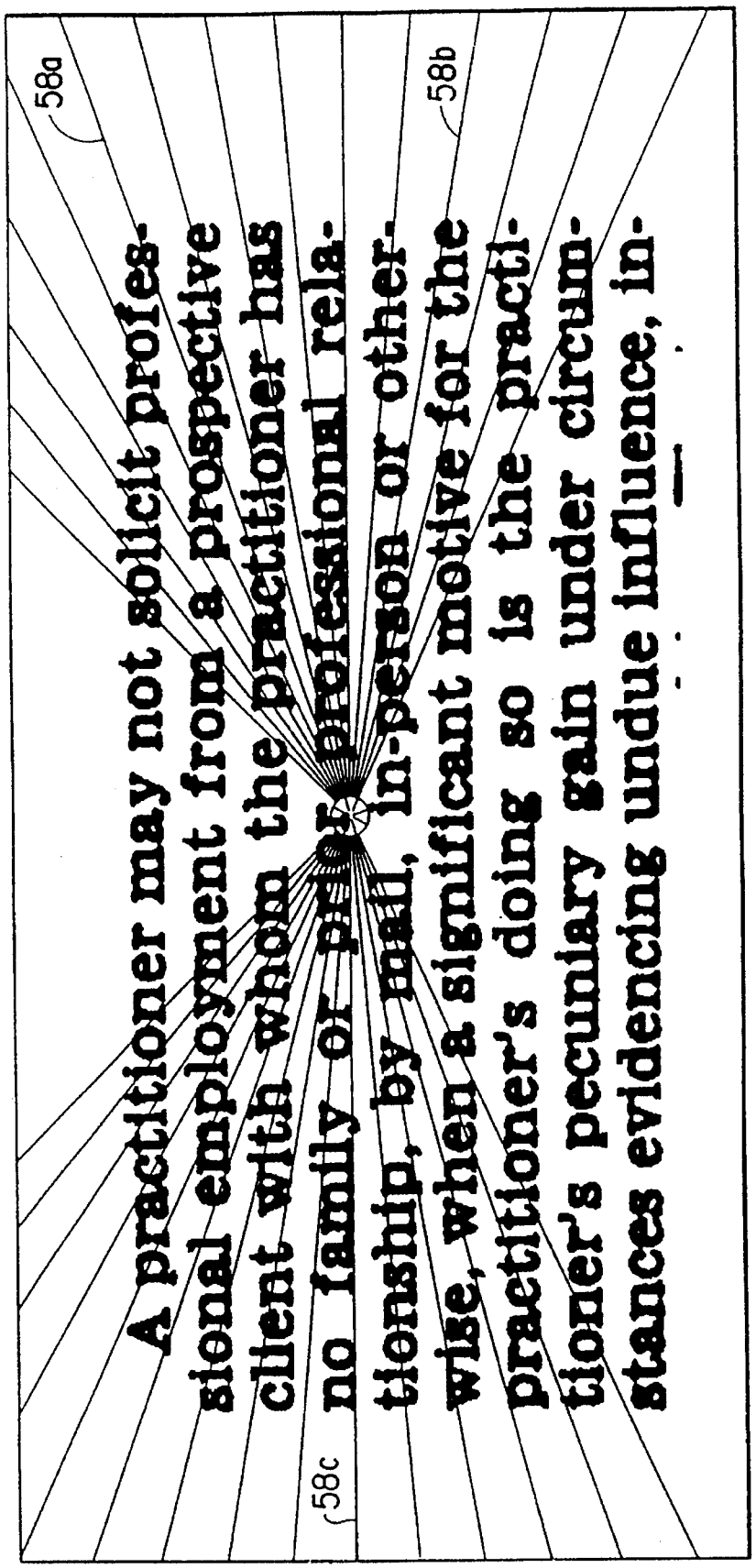
Figure 12D:
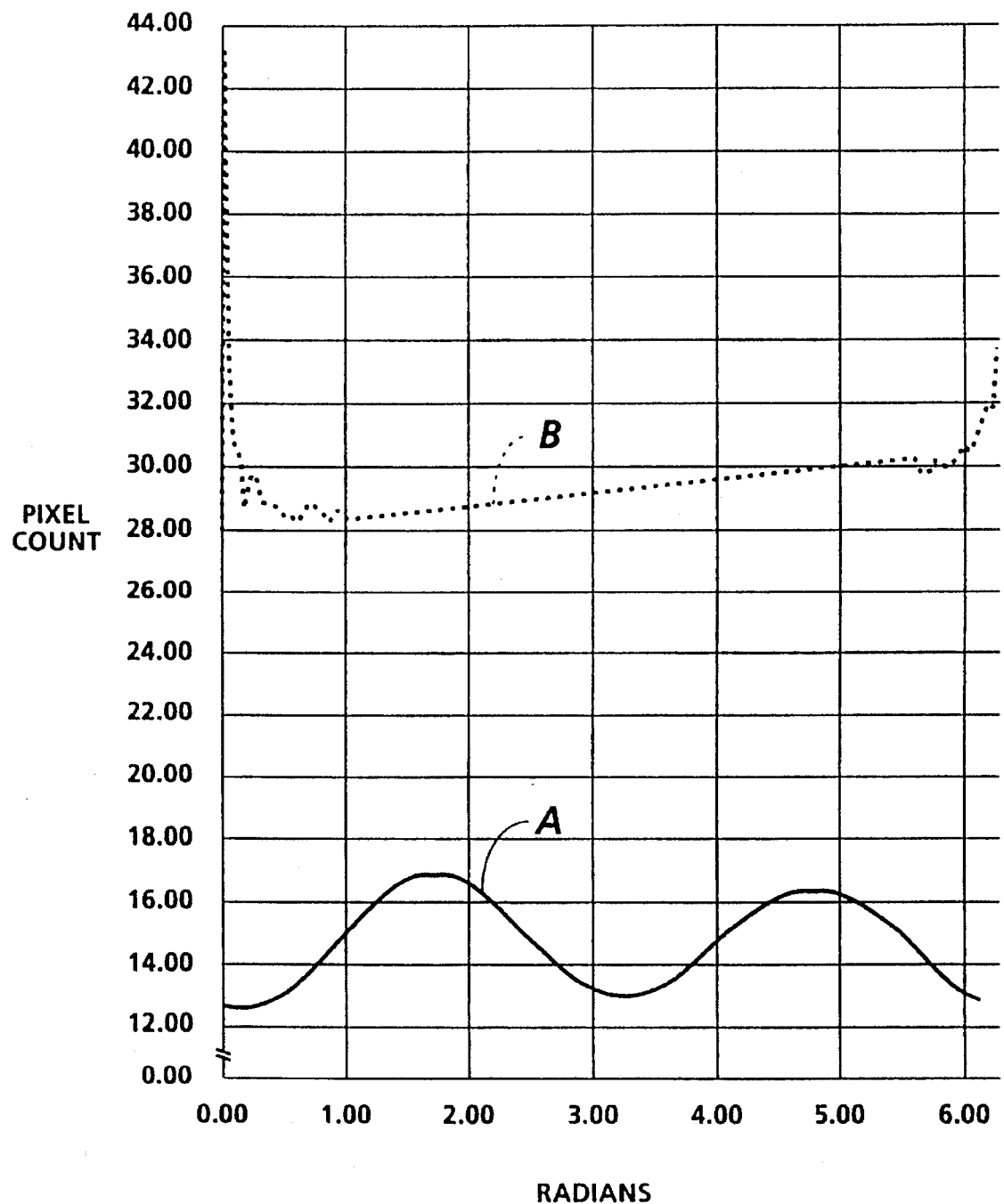
FIG. 12D shows graphs of the responses taken from the example text, which are used to determine the angle at which the example text is oriented in the image sample prior to further processing.

Alternatively, the skew angle may be determined as indicated by the NewFine() function (Appendix, page 245), which determines the skew angle using multiple iterations of the procedure described with respect to the fine angle determination. As indicated by FIGS. 12A, 12B, and 12C, each iteration would also use lines covering an increasingly smaller angular range, until a desired skew angle accuracy is reached. In the implementation illustrated by FIGS. 12A, 12B, and 12C, the desired accuracy is achieved by a series of three iterations, each using a series of 180 distinct angles about the selected edge pixel.

Figure 13A:
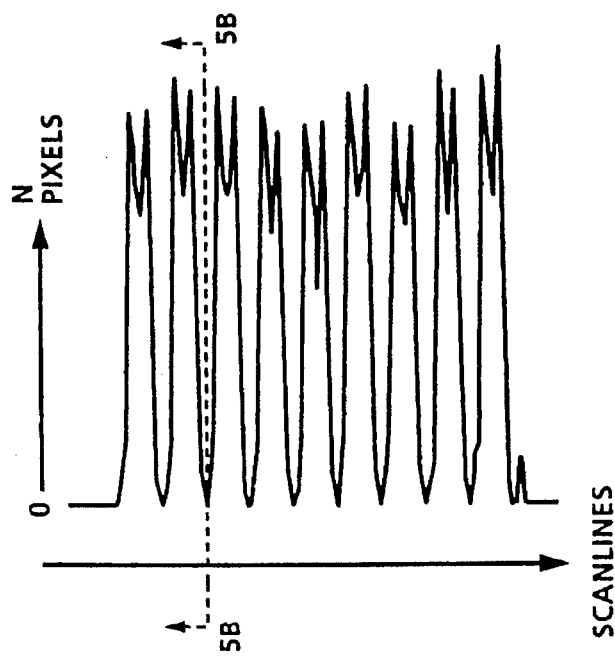
FIGS. 13A and 13B respectively show the derivation and use of a graph examining the sample image of the example text to determine baselines of text within the image.
Figure 13:
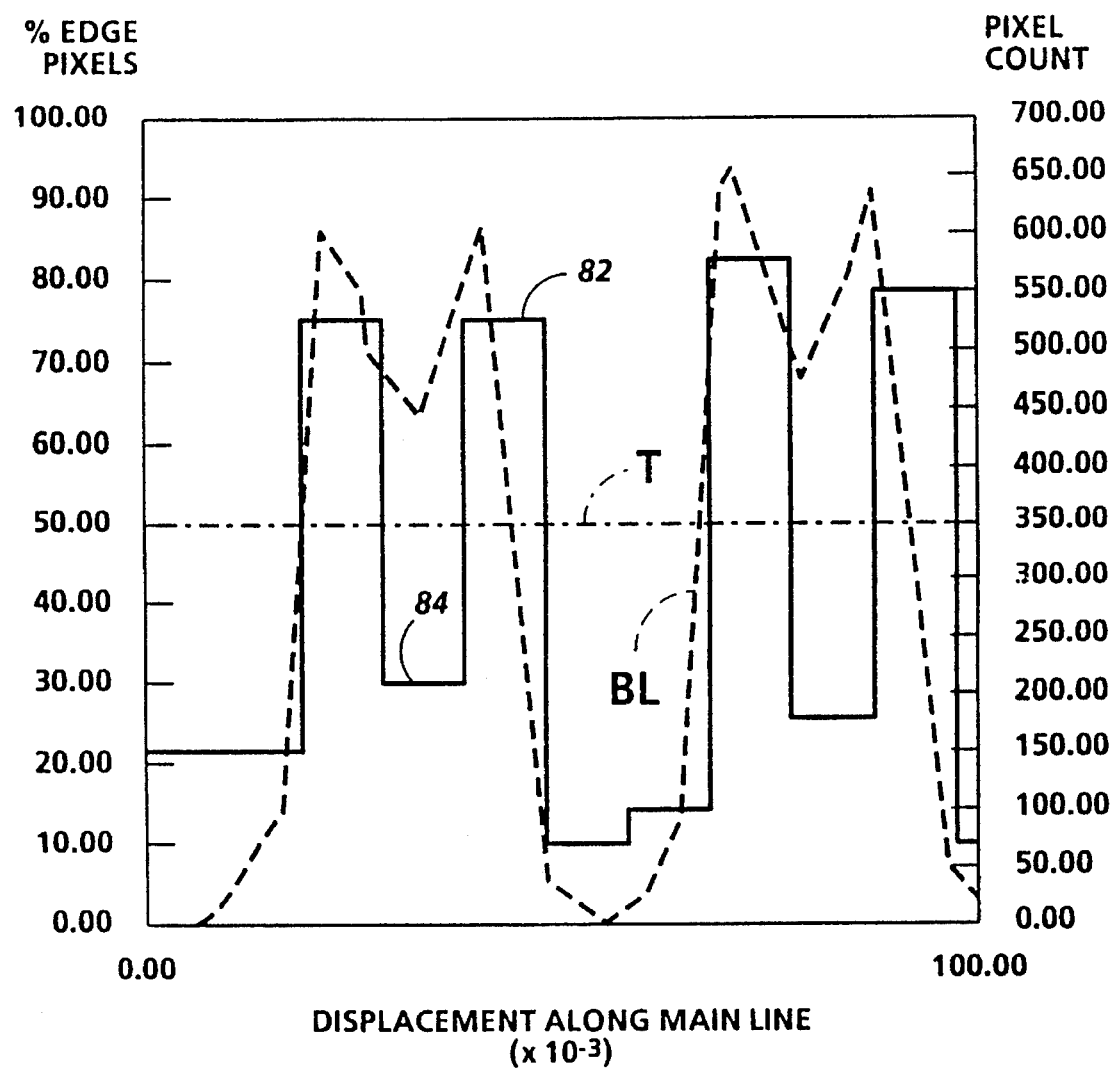
Figure 14A:
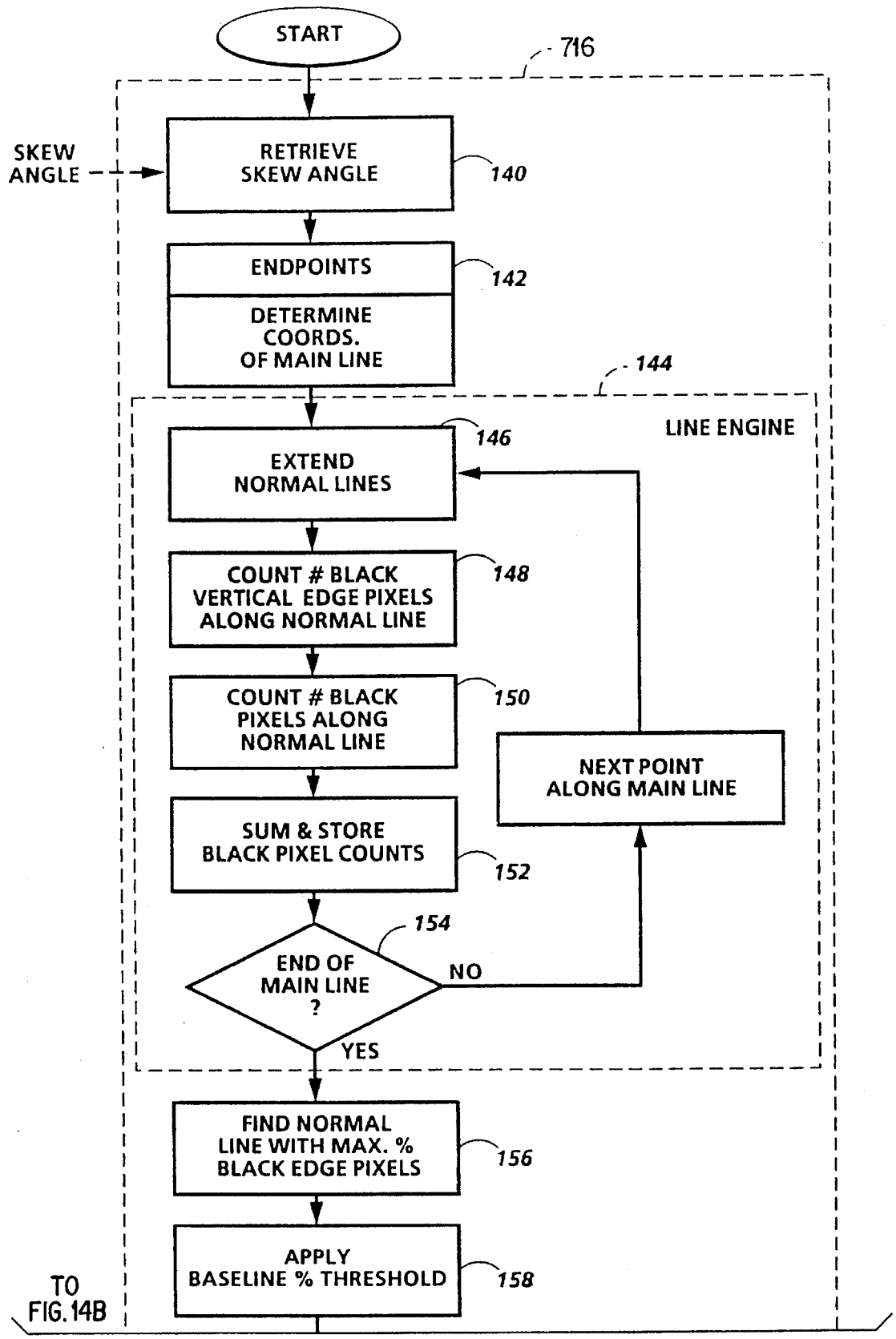
FIGS. 14A and 14B are flowcharts illustrating the procedures executed to determine the baselines shown in FIG. 13A.
Figure 14B:
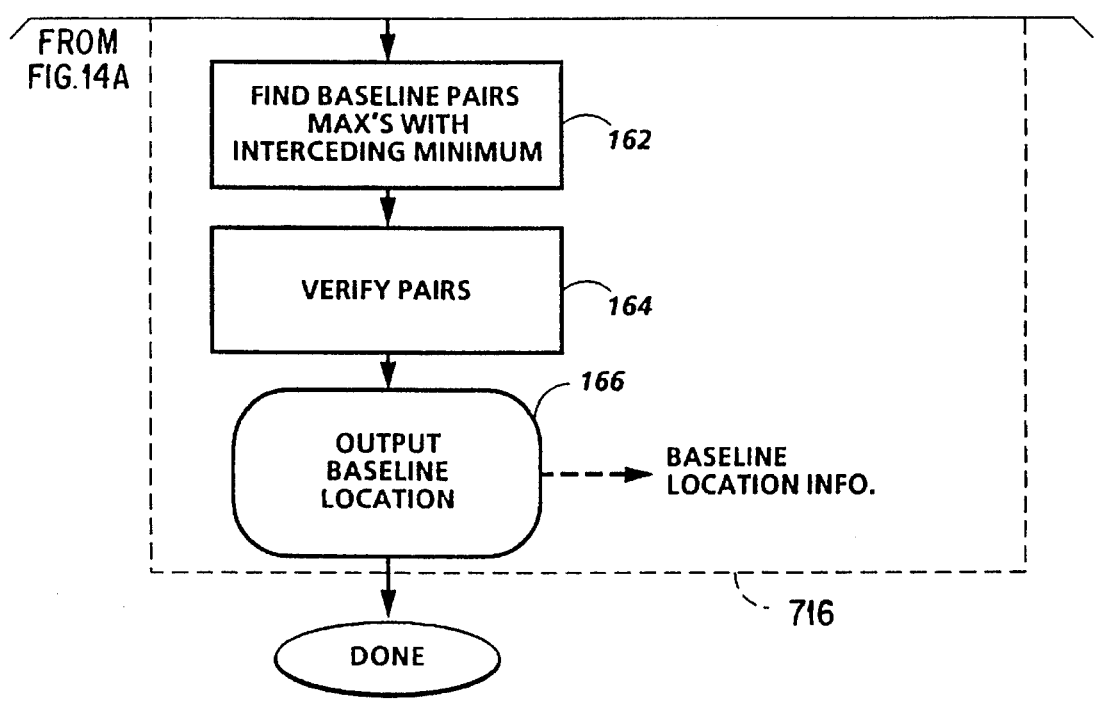

In the next process step, illustrated in the graphs of FIG. 13A and FIG. 13B, text baseline processor 716 identifies the characteristic lines, upper topline and lower baseline, of each line of text. The process steps executed by text baseline processor 716 are illustrated in detail in FIGS. 14A and 14B. The histogram of FIG. 13A, shown to the left along the image, is derived by examining lines, at the resolution of the image, and oriented parallel to the skew orientation of the image, as defined by the previously determined skew angle. These parallel lines spanning the image are used to determine the number of black pixels intersected by each of the lines. Along lines passing through inter text line spaces, no black pixels should be intercepted, while along lines through the text, large numbers of black pixels should be intercepted.

More specifically, the function BaseLines(), (Appendix page 160), first finds the coordinates of a "main" line, block 142, constructed through the center of the image and perpendicular to the text lines, as determined by the skew angle passed to the function as shown by block 140. Next, Line Engine Procedure 144 is executed, where by proceeding along the main line from one end to the other, at a series of points along the main line, perpendicular branch lines are constructed which extend outwardly from the main line for a fixed distance, block 146. Along the branch lines, the number of black vertical edge pixels are counted, block 148, and the number of black pixels intersected by the lines are counted, block 150, and summed for the opposing pairs of lines, block 152. Black vertical edge pixels, as counted by block 148, are defined as black pixels having a white neighboring pixel at either the upper or lower neighboring pixel position. LineEngine()procedure 144 is repeated until all points, and associated branch lines, along the main line have been processed, as determined by decision block 154. An x-height value may be returned from this procedure, which will subsequently be used by the word shape computer 724.

Subsequently, the counts for all the branch lines are analyzed to determine the branch line pairs having the highest ratio of black vertical edge pixels to black pixels. In general, those lines having the highest percentages would correspond to lines passing along the upper and lower edges of the characters which form the text lines. As illustrated in the enlarged view of FIG. 13B, a definite distinction exists between those branch lines having a high vertical edge pixel ratio, line 82, and those having a low ratio, line 84. Application of a filter mask and comparison of the maximum peaks within the mask enables the identification of those lines which represent the text toplines and baselines, for example, line 82. The process is implemented in the maxFilter.c module, beginning at line 57, the code for which is also incorporated in the newBaselines.c module at line 274, page 214. Baseline determination is described in further detail in a copending U.S. patent application, for a "Method for Determining Boundaries of Words in Text", Huttenlocher et al., U.S. patent application Ser. No. 07/794,392, which has been previously incorporated herein by reference. An additional test may also be applied to the histogram operation of step 150. This added test, a boolean test, may be used to assure that a minimum run of black pixels was detected during the analysis of the line. For example, a flag, which is cleared at the start of each branch line analysis, may be set whenever a series of five sequential black pixels are detected along the line. This test would assure that small noise or image artifacts are not recognized as baselines due to a high vertical edge pixel ratio.

As an alternative method, it is possible to utilize the total number of black pixels lying along the branch lines to determine the locations of the baselines. Using histogram curve BL, which represents the number of black pixels counted along the branch lines, it is possible to determine which branch lines have the most black pixel intersections. Applying a threshold of the maximum allows the determination of the upper and lower characteristic line pairs for each text line. Hence, the rising and falling portions of the histogram curve BL, constitute the characteristic lines of the text, and the threshold would be used to specifically identify the localized maxima surrounding an intervening minima, thereby enabling identification of the baseline positions which would be used for further processing. More importantly, this alternative approach, illustrated as step 162, may be utilized to identify the upper and lower baselines of a baseline pair, based upon the slope of the BL histogram curve. It is important to note that there is little additional processing associated with the identification step as the histogram information was collected previously during step 150. Once the preliminary characteristic line or baseline pairs are identified, block 162, a verification step, block 164, is executed to verify that the baseline pairs are separated by more than a minimum distance, the minimum distance being established by calculating the average line pair separation for all line pairs in the image. After verification, the valid baseline information is stored by output block 166 for later use by the white line addition and segmentation blocks, 18 and 720, respectively.

Figure 15:
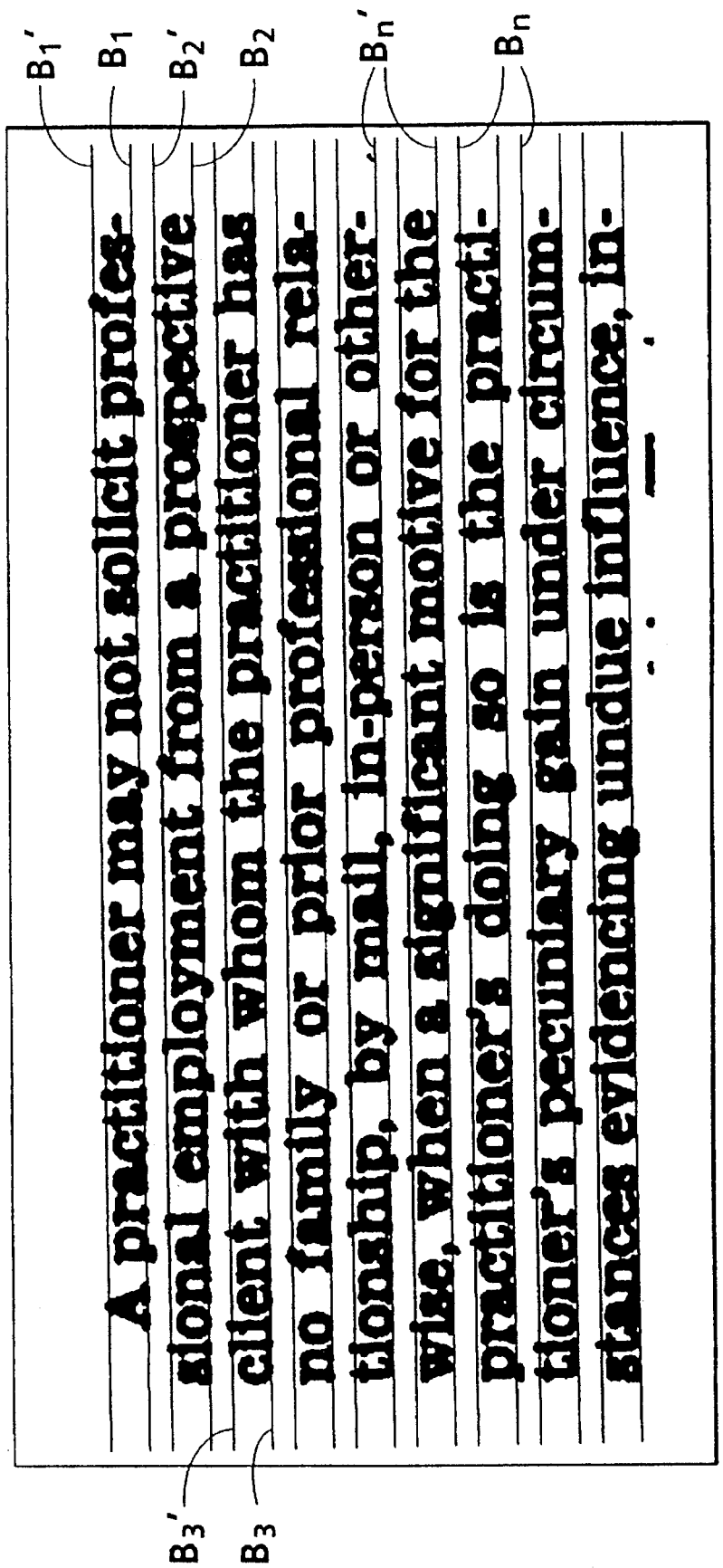
FIG. 15 shows the scanned image of the example text with baselines indicated thereon after derivation from the data shown in FIGS. 13A and 13B.

An important advantage of these baseline determination methods, are that they are highly insensitive to noise or extraneous marks in the interline space. FIG. 15 shows the result of the baseline determination on the example image of the sample text, showing that baseline pair, baseline and topline $B_n$ and $B_n'$, respectively, have been located on the image, indicating those portions of the image in which a predominant portion of the text occurs. While some portions of the character ascender strokes are outside the baselines, no detriment to the remainder of the process is noted. Of course, a smaller threshold value might enable the system to capture more of the ascending strokes.

Figure 16:
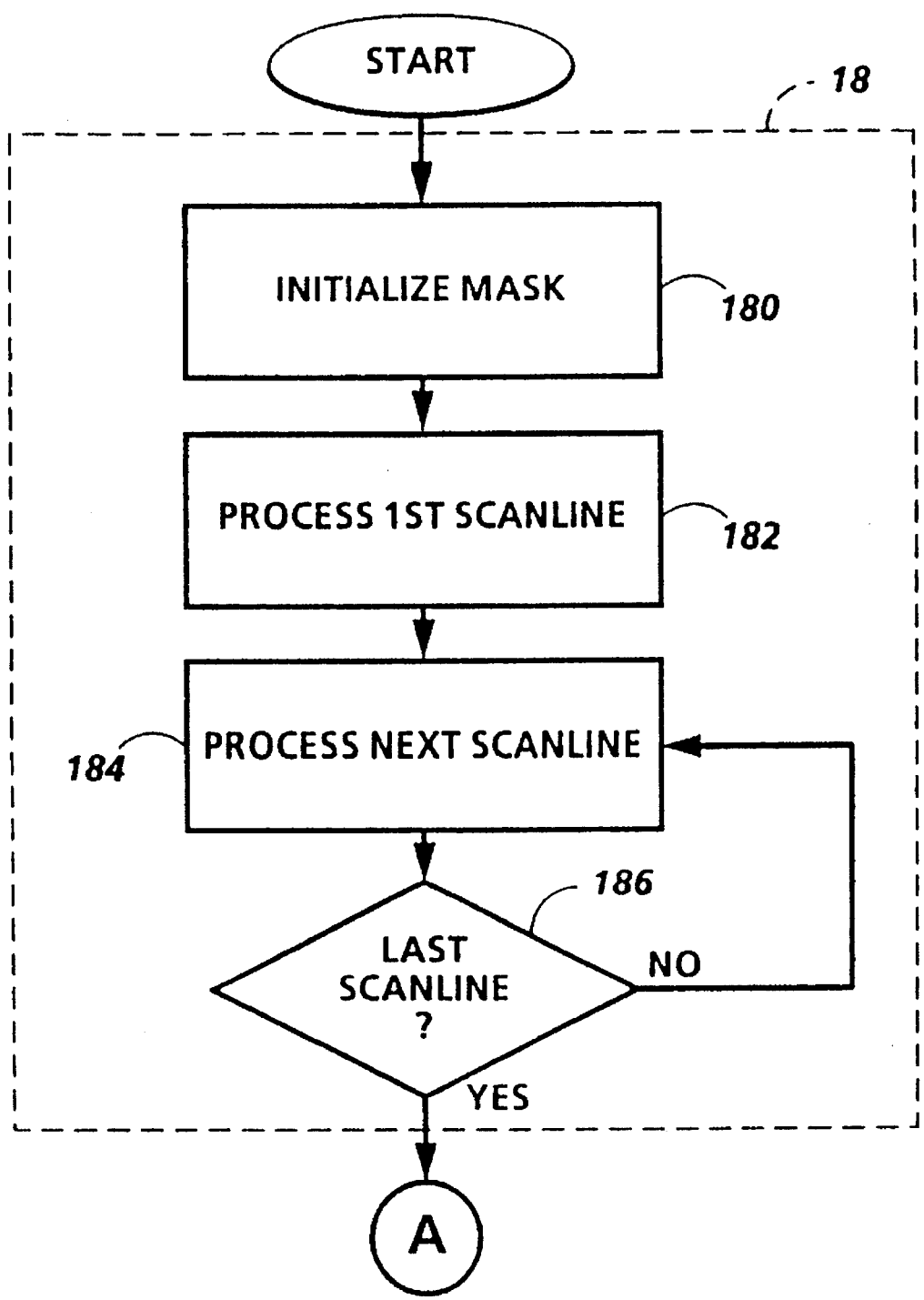
FIG. 16 is a flowchart illustrating the steps used in the application of a median filter to the image of FIG. 10.
Figure 17:
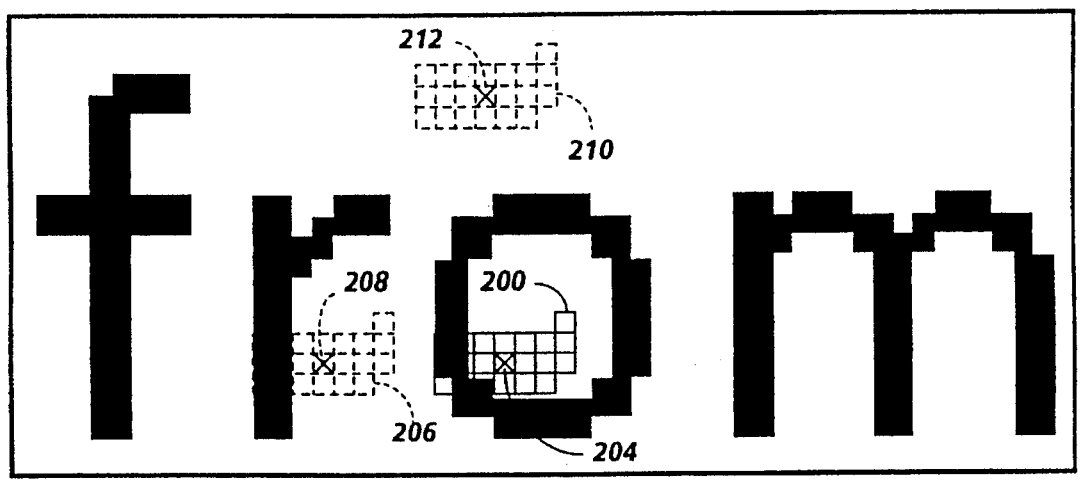
FIG. 17 is an enlarged pictorial representation of a portion of the image of FIG. 10, illustrating the application of the median filter.

With reference again to FIG. 7 in conjunction with FIGS. 16 and 17, the next process step is a word group isolation step. A filter 718 is applied to a copy of the image which results in an image that tends to render the word into blobs distinguishable from one another. The filter is applied with a small window, to each area, to render as black those areas that are partly black. As shown in FIG. 16, the blobify function (Appendix page 165) first initializes mask variables which establish the mask size and angle, block 180, and then processes the upper scanline to initialize the data array, block 182. Median filtering is accomplished by sequentially moving the mask window through the image, blocks 184 and 186, and whenever the number of black pixels appearing in the window exceeds a threshold value, the target pixel, about which the window is located, is set to black. FIG. 17, which illustrates some examples of the filter process, has a mask window 200 placed over a portion of the image. For example, with a twenty percent threshold and a generally rectangular mask having twenty-one pixels, arranged at an angel approximately equal to the skew determined for the text, the result of filtering in window 200 would be the setting of pixel 204 to black. Similarly, window 206, which primarily lies within the intercharacter spacing between the pixel representations of the letters "r" and "o", would cause pixel 208 to be set to black. On the other hand, window 210, which lies in the region between word groups, would not have a sufficient number of black pixels present within the window to cause pixel 212 to be set to black. The size, shape and orientation of mask window 200 is optimized to reduce the filling in between text lines, while maximizing the fill between letters common to a single word.

Figure 18:
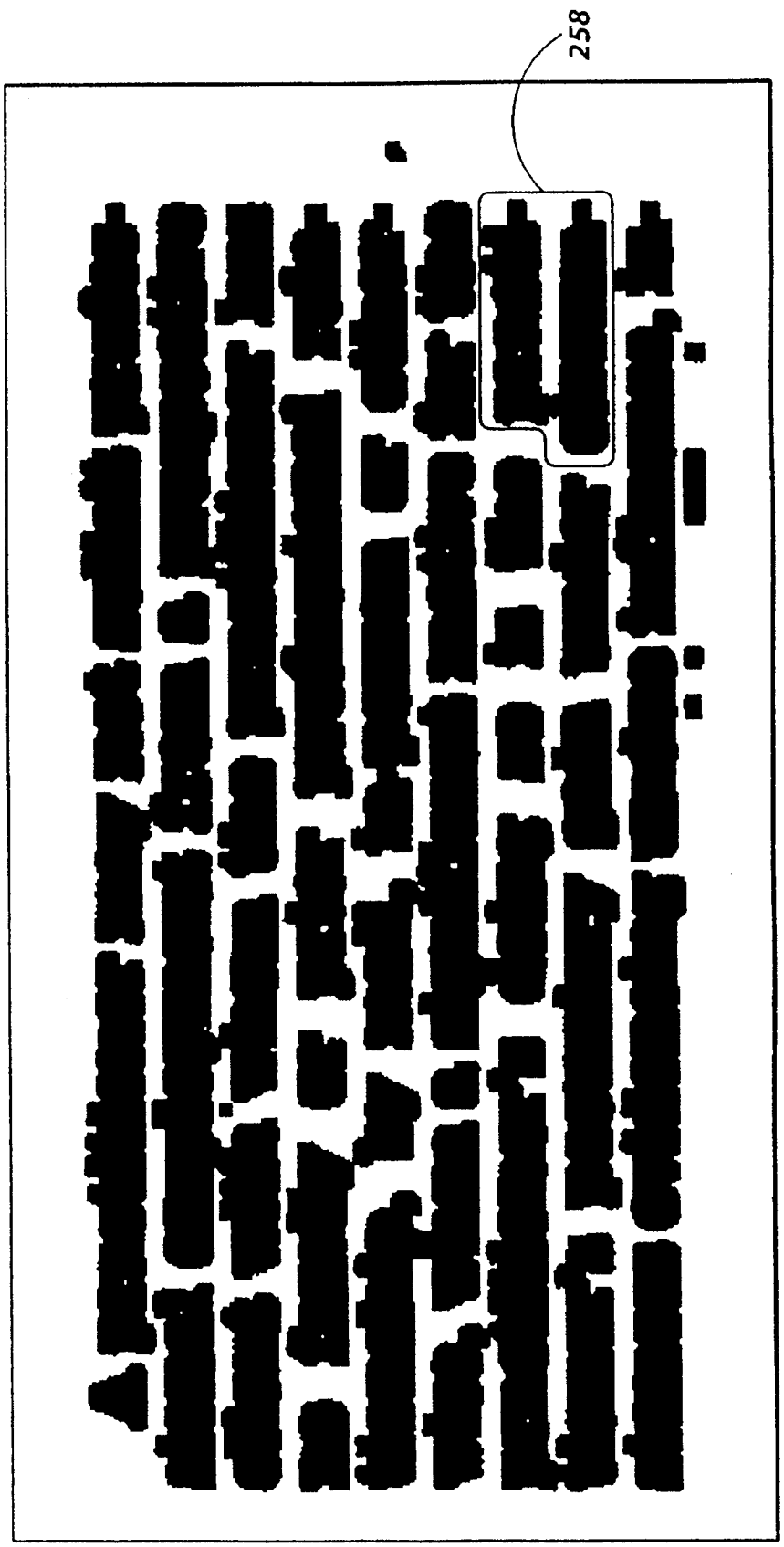
FIG. 18 demonstrates the resulting image after application of a median filter, a process known herein as blobifying, to the scanned image of the example text, which tends to render character strings as a single set of connected pixels.

As illustrated by FIG. 18, the result of the median filtering is that the relatively small spacing between characters in a word generally becomes inconsequential, and is filled with black pixels. Words become a single connected set of pixels, i.e., no white spaces completely separate characters in a single word. However, the relatively large spacing between character strings or between words, is a larger space outside of the ability of the filter to turn into black, and therefore serves to distinguish adjacent symbol strings. With reference now to FIGS. 15 and 18, it can be seen that the first two words of the sample text, "A" and "practitioner" have been "blobified", as this process is referred to, so that, for example, the "p" of "practitioner" is no longer separated from the "r" of that word. (Compare, FIG. 11). Once again, despite the blobifying or blurring of characters, "A" and "practitioner" remain as discrete blobs of connected symbols, or words.

Figure 19:
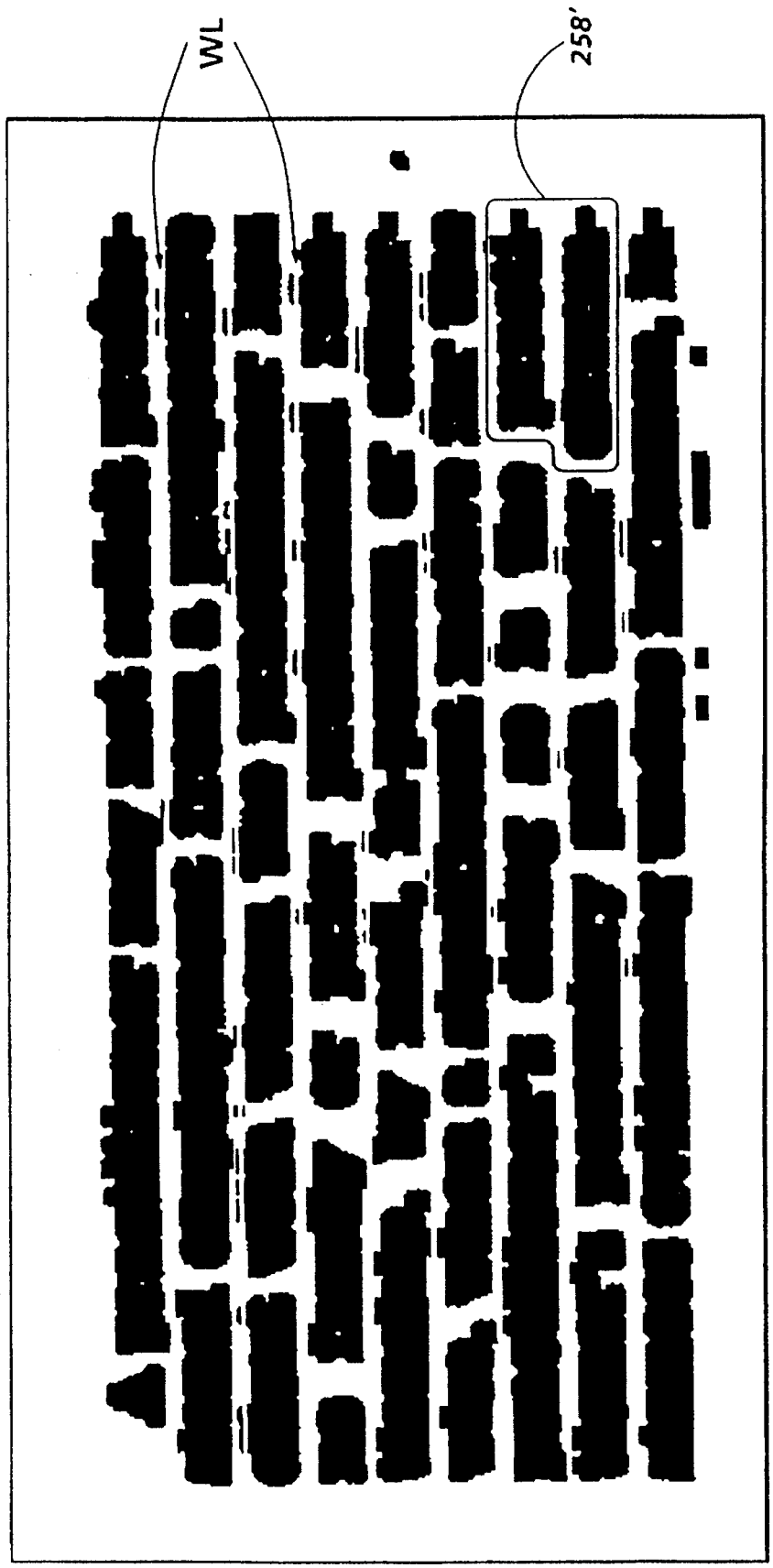
FIG. 19 shows a subsequent step in the process, in which lines of white pixels are added to the blurred image to clearly delineate a line of character strings from adjacent lines of character strings.

With reference again to FIG. 7, as an adjunct to this step, white line addition 720, superimposes upon the blobified image of FIG. 12 a series of white pixel lines to make certain that lines of text are maintained separately from adjacent lines of text (i.e., no overlapping of the filtered text lines). With reference to FIGS. 18 and 19, noting the circled areas 258 and 258', a combination of an ascender and descender has resulted in an interline merging of two words. The text line overlap illustrated in area 258 of FIG. 18 is exactly what is eliminated by superimposing the white lines on the blobified or filtered image.

Figure 20:
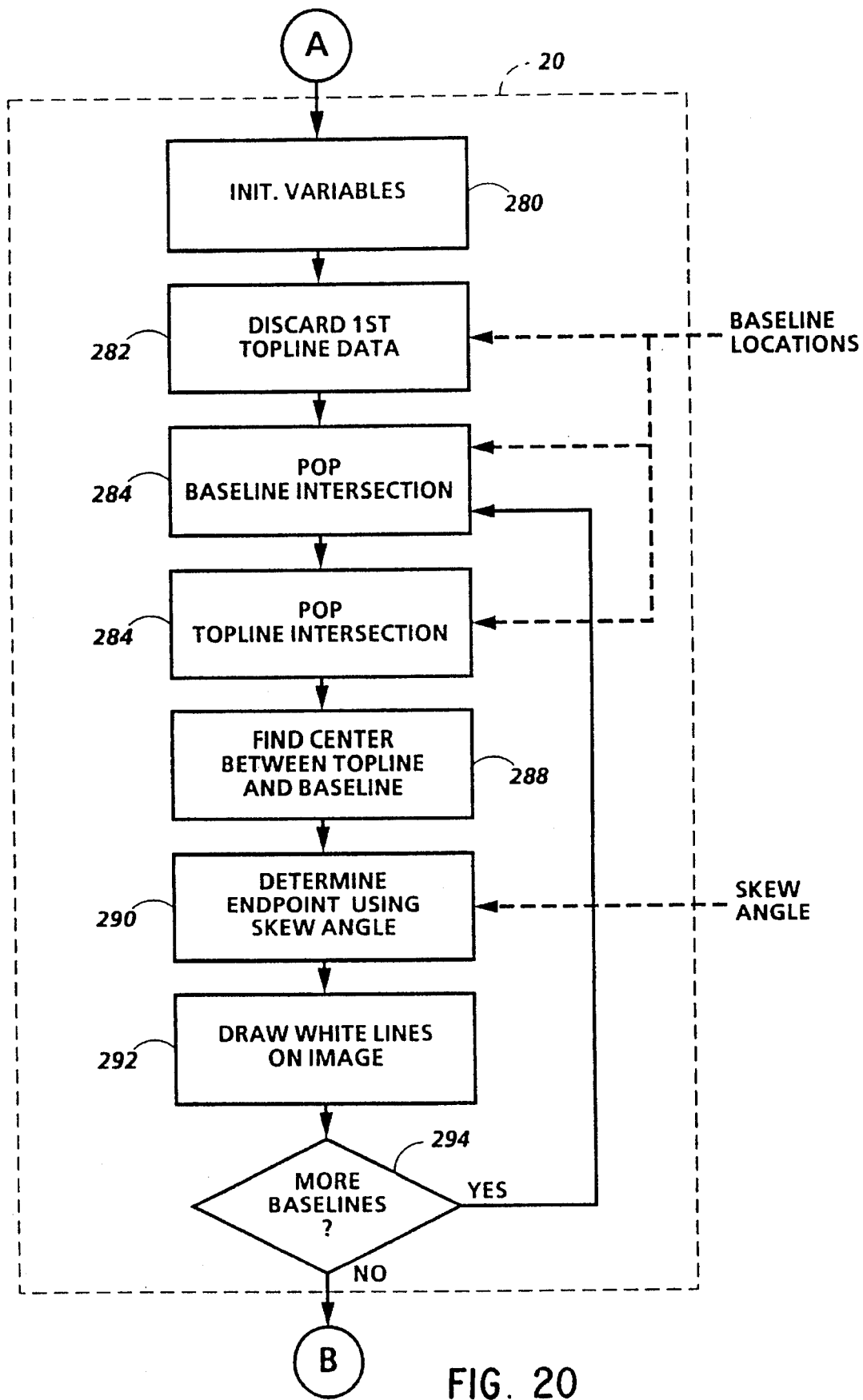
FIG. 20 is a flowchart illustrating the steps required to add the white lines of FIG. 19.

This superposition of white lines operation, the outcome of which is illustrated by FIG. 19, is carried out by the process illustrated in FIG. 20 as executed in the DrawMiddleLines() function (Appendix page 233). Generally, white lines WL are added to the image, approximately halfway between adjacent baseline and topline pairs, to assure that there is no cross-text line blobifying. Once again, FIG. 19 shows the result of white line addition to the blobified image of FIG. 18.

Referring now to FIG. 20, white line addition block 720 begins by initializing variables in step 280 and subsequently reads in the topline location from the baseline information of the first text line. The topline information is discarded, block 282, and the next baseline and topline locations are popped from the storage stack or list, blocks 284 and 286, respectively. With respect to the image, this baseline-topline pair respectively represents the bottom and top of adjacent text lines. Next, at step 288, the point lying at the center of the pair is located to provide a starting point for the white lines which are drawn from the center of the image in an outward direction. The endpoints of the white lines are calculated in step 290, using the skew angle determined by skew detector 714 of FIG. 7. White lines are drawn or superimposed on the blobified image at step 292, and the process is continued until all text lines have been effectively separated, as controlled by test block 294.

With reference again to FIG. 7, as a result of the blobify or median filtering, the position of bounding boxes about each connected set of pixels formed in the blobify step may be determined. Bounding boxes are placed only about those connected components or words that are in a text line lying between the superimposed white lines. The bounding boxes are placed at the orientation of the text line, by identifying the extreme points of each group of connected pixels in the direction of the text line, and in the direction orthogonal to the text line, as opposed to the image coordinate system. This operation is performed by the function FindBorders(), (Appendix, page 172). Generally, the FindBorders function steps through all pixels within the image to find the bounding boxes of the connected characters (Paint Component), to determine the coordinates of the upper left corner of each box, as well as the length and width of the box.

Figure 21A:
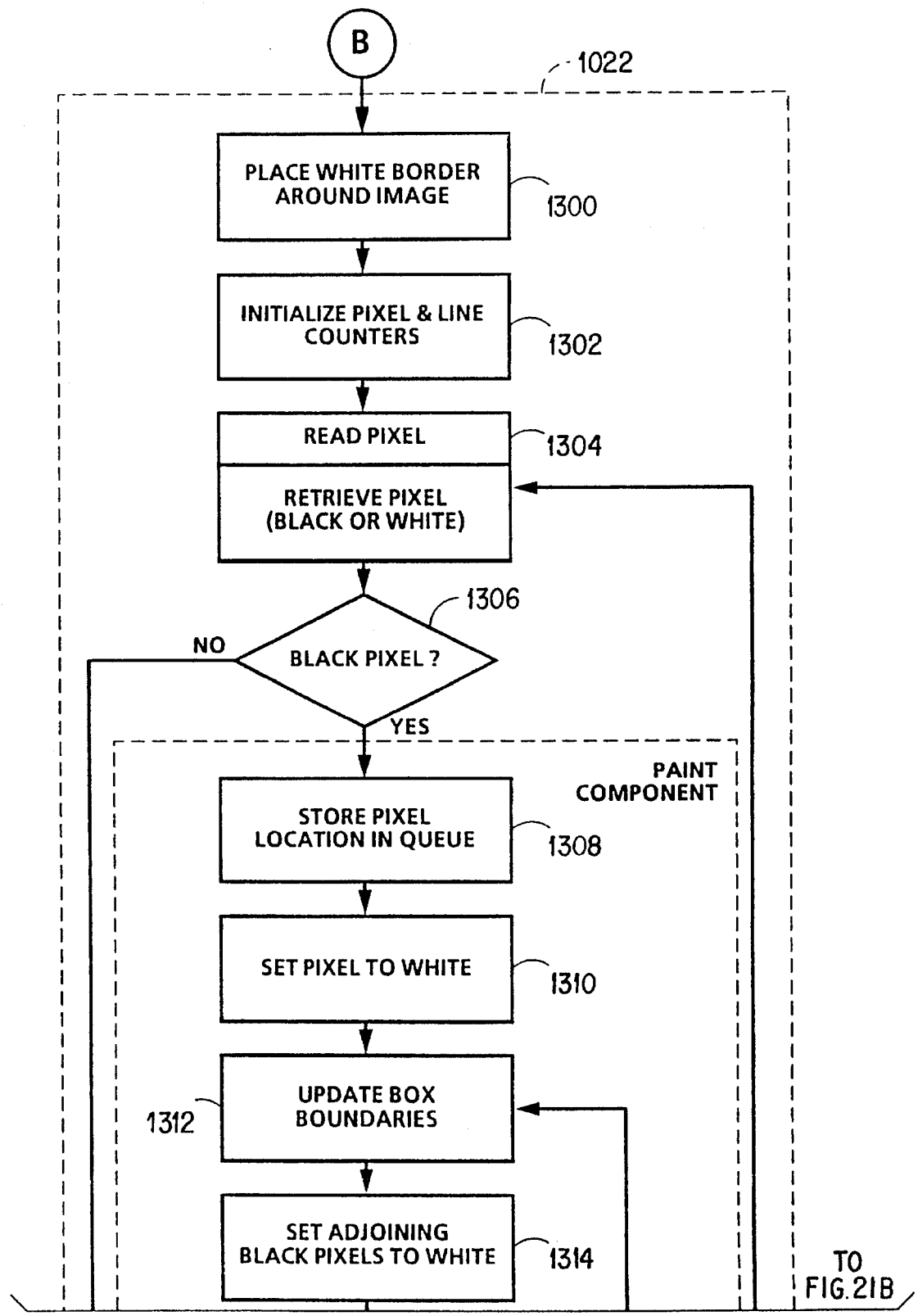
FIGS. 21A and 21B are flowcharts representing the procedure which is followed to segment the image data in accordance with the blurred image of FIG. 18.
Figure 21B:
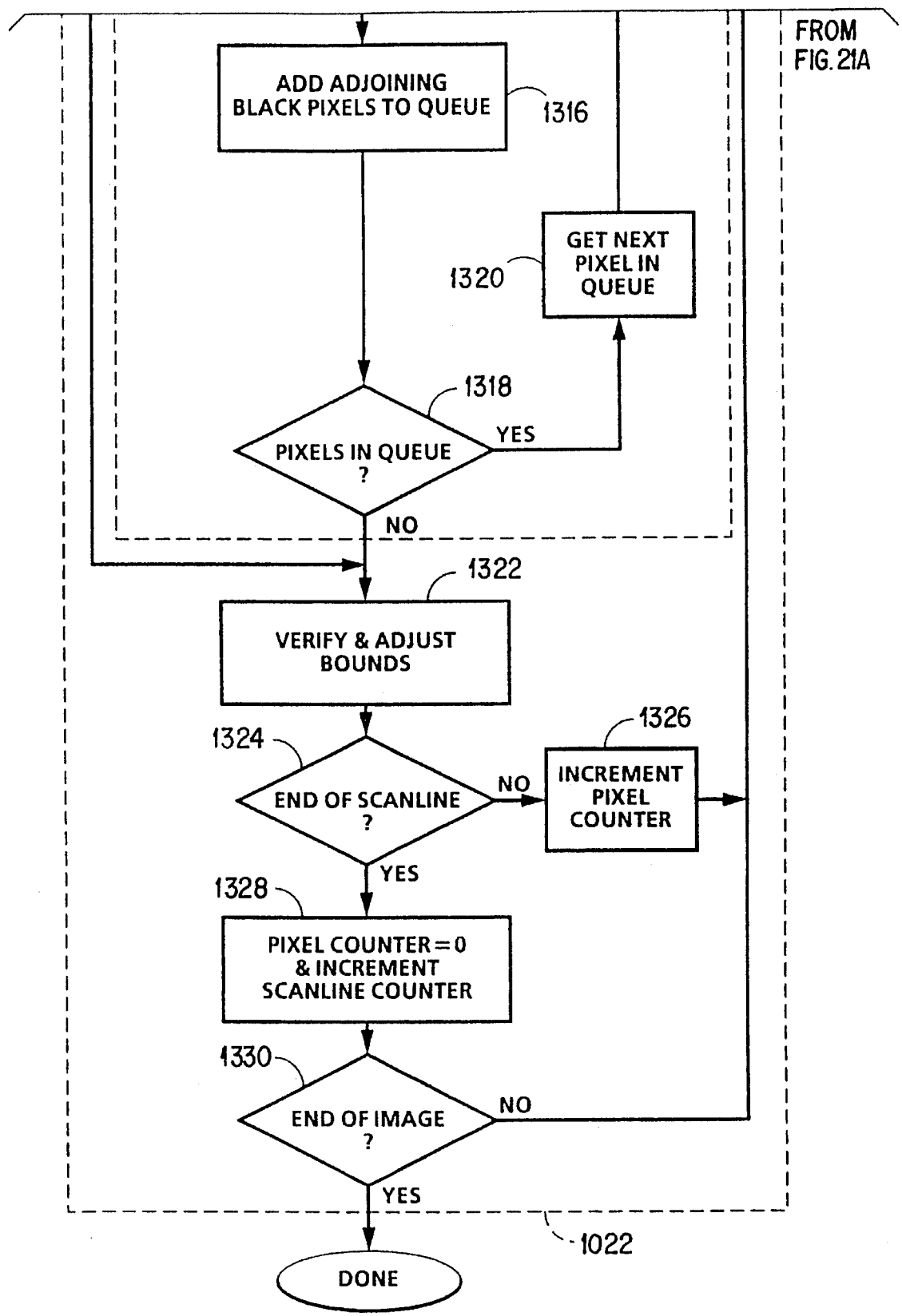

Referring now to FIGS. 21A and 21B, which detail the FindBorders() procedure, segmentation step 1022 begins by placing a white border completely around the filtered image, step 1300. This is done to avoid running outside the edge of the array of image pixels. Next, pixel and line counters, x and y, respectively, are initialized to the first pixel location inside the border. Calling the ReadPixel procedure, block 1304, the pixel color (black or white) is returned and tested in block 1306. If the pixel is white, no further processing is necessary and processing would continue at block 1322. Otherwise, the PaintComponent() procedure (Appendix, page 171) is called and begins by storing the location of the black pixel in a queue, block 1308. Subsequently, in a copy of the image, the pixel is set to white and the boundaries of the box, surrounding the connected pixels or components, are updated, blocks 1310 and 1312, respectively. Next, adjoining black pixels are set to white, block 1314, and the locations of the black pixels are added to the end of the queue, block 1316. At block 1318 the queue pointers are tested to determine if the queue is empty. If not empty, the next pixel in the queue is retrieved, block 1320, and processing continues at block 1312. Otherwise, if the queue is empty, all of the connected black pixels will have been set to white and the box boundaries will reflect a box which encompasses the connected components. Subsequently, the boundaries of the box which encompasses the word segment are verified and may be adjusted to an orthogonal coordinate system oriented with respect to the skew of the text lines, block 1322.

It will no doubt be apparent here that while finding each text line is an integral part of the described method, and serves to make the present embodiment more robust, other methods of deriving the information acquired by that step are possible. The primary use of the text line finding function is a) to determine x-height, and b) define the white line addition for separating interline blobs. Certainly this step may be removed, with a sacrifice in robustness, or other means of deriving the necessary information may be available.

The looping process continues at block 1324 which checks pixel counter x to determine if the end of the scanline has been reached, and if not, increments the counter at block 1326 before continuing the process at block 1304. If the end of the scanline has been reached, pixel counter x is reset and scanline counter y is incremented at block 1328. Subsequently, block 1330 checks the value of scanline counter y to determine if the entire image has been processed. If so, processing is completed. Otherwise, processing continues at block 1304 for the first pixel in the new scanline.

Figure 22:
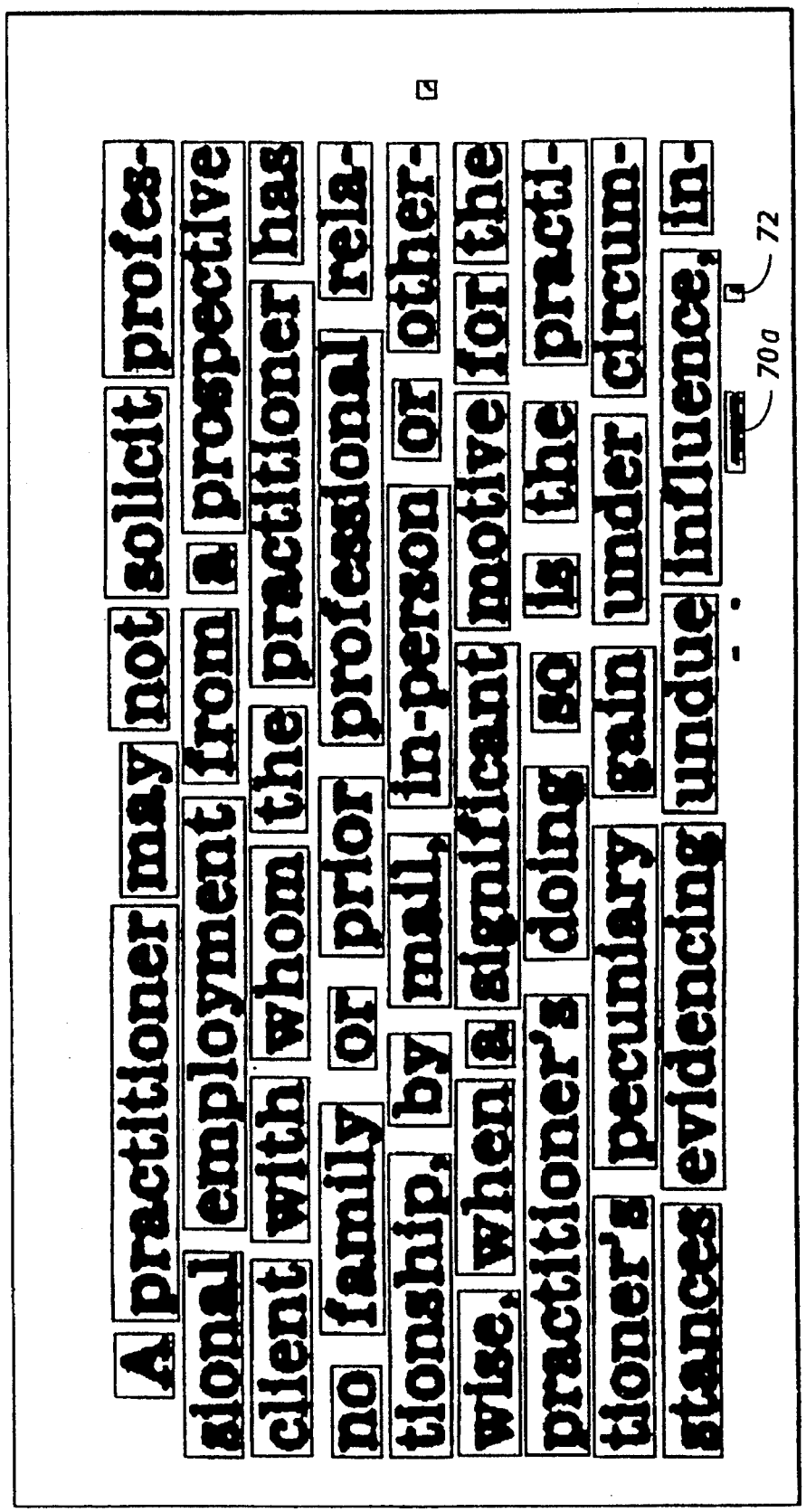
FIG. 22 shows the sample text with bounding boxes placed around each word group in a manner which uniquely identifies a subset of image pixels containing each character string.

Thus, as shown in FIG. 22, for the word "practitioner" the extremities of the connected character image define the bounding box. Once bounding boxes have been established, it is then possible at this step, to eliminate noise marks from further consideration. Noise marks are determined: 1) if a bounding box corner is outside the array of image pixels (Appendix, page 171); 2) if a box spans multiple text lines in the array (Appendix 229), or lies completely outside a text line; 3) if boxes are too small compared to a reference ϵ, in either or both longitudinal or latitudinal directions, and accordingly are discarded. Noise marks 70a and 72 and others will not be considered words. The OnABaseline() function (Appendix, page 229) is an example of a function used to eliminate those boxes lying outside of the baseline boundaries.

Figure 7:
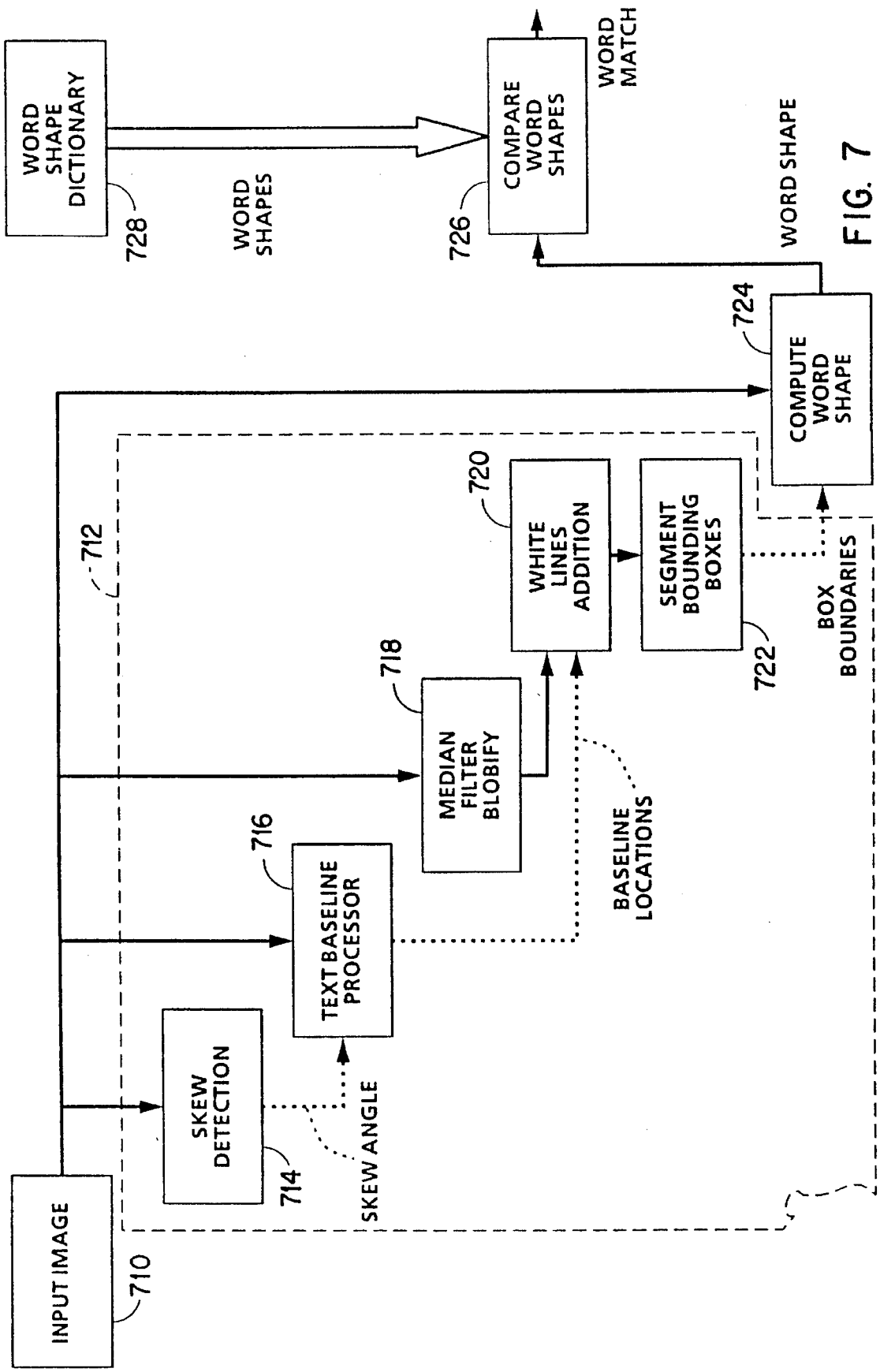
FIG. 7 shows a block system diagram of the arrangement of system components forming a word shape recognition system.
Figure 23A:
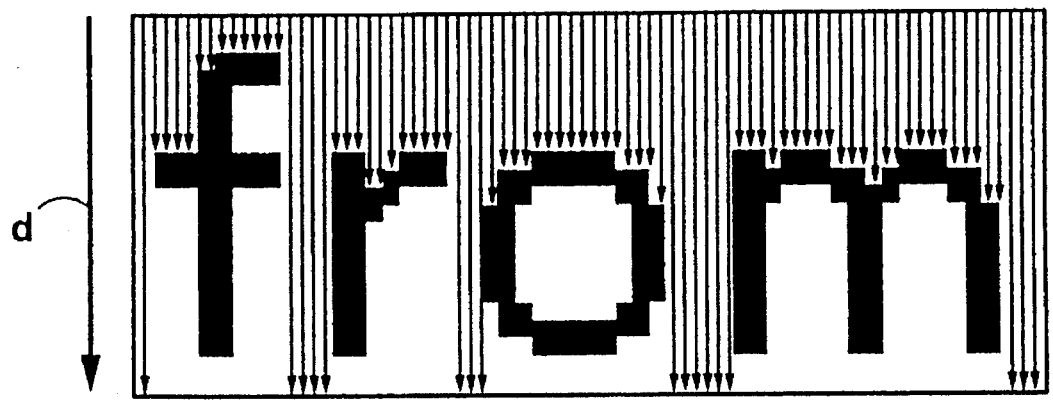
FIGS. 23A and 23B illustrate derivation of a single independent value signal, using the example word "from", which appears in the sample image of example text.
Figure 23B:
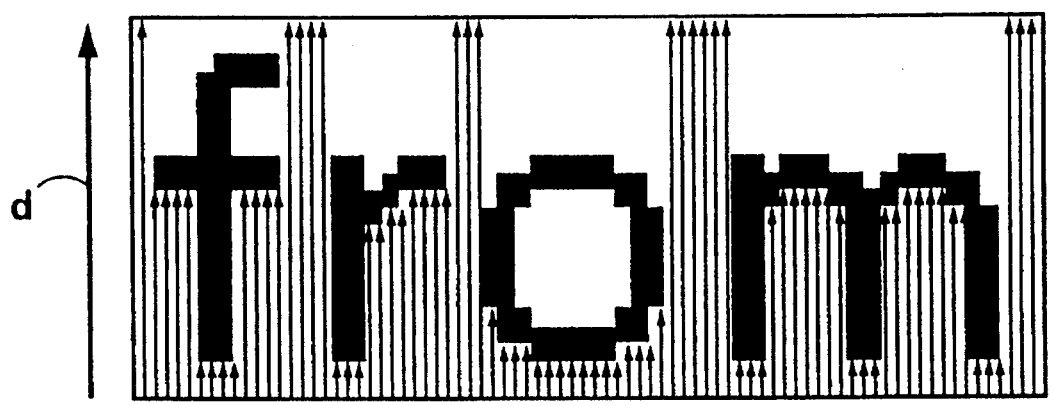

With reference to FIG. 7, at word shape computer 724, a signal representing the image of a word, or at least a portion thereof, now isolated from its neighbors, is derived. The derived signal is referred to as a word shape contour. The shape contour for each word is determined using the MakeShell() function (Appendix, page 228). As illustrated in FIG. 23A, this function first moves along the top of each bounding box, and starting with each pixel location along the top of the box, scans downward relative to the page orientation, until either a black pixel, or the bottom of the box, is reached. A record of the set of distances d between the top of the box and the black pixel or box bottom is maintained. The set of distances d, accumulated over the length of the box, constitutes the top raw contour of the word shape. Subsequently, a bottom raw contour is produced in a similar manner as illustrated in FIG. 23B, for the same word depicted in FIG. 23A, by sequentially moving across the bottom of the box, and looking in an upwards direction, for either the first black pixel or the top of the bounding box.

Figure 24:
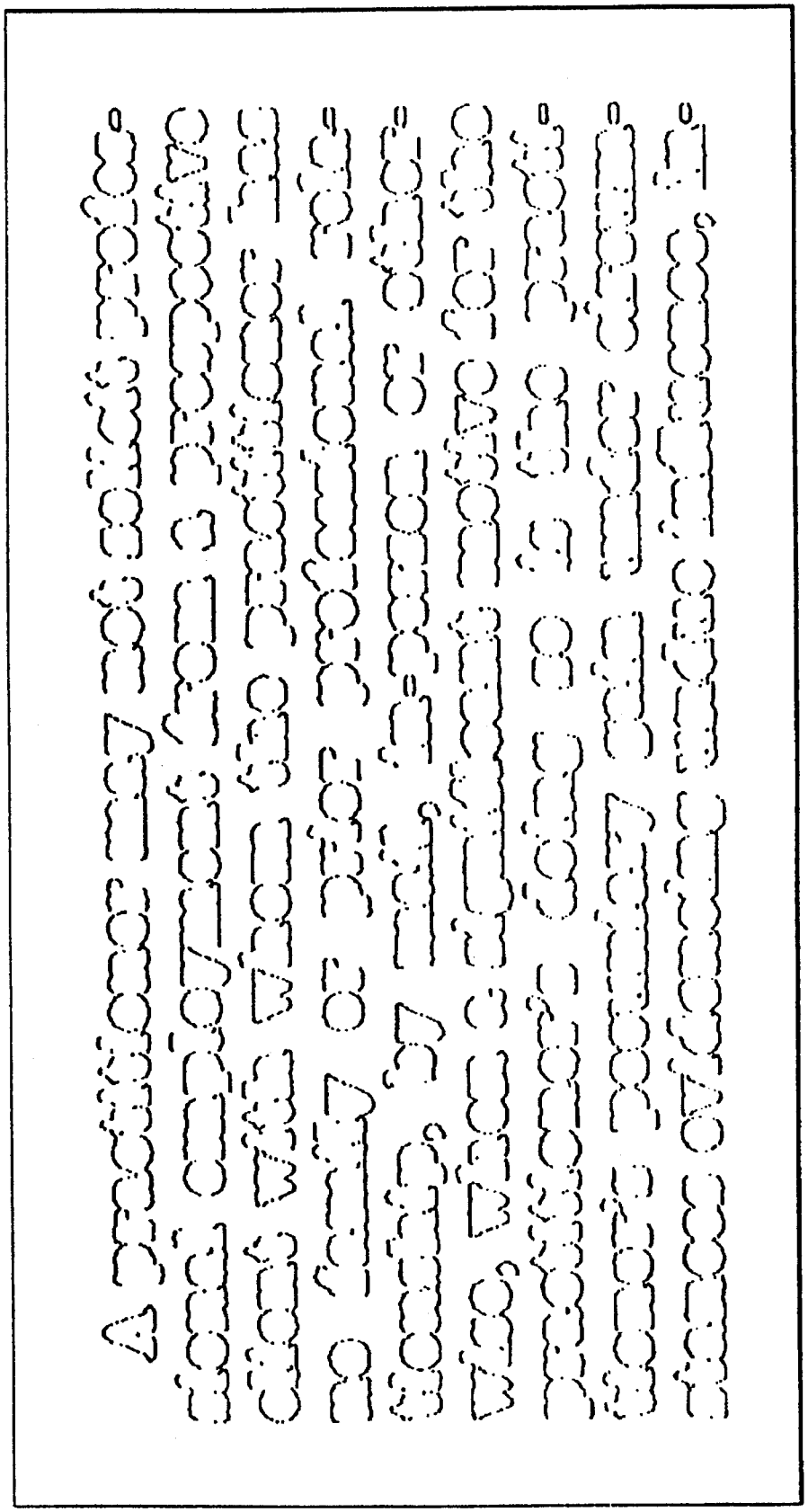
FIG. 24 illustrates the resulting contours formed by the derivation process illustrated in FIGS. 23A and 23B.
Figure 25:
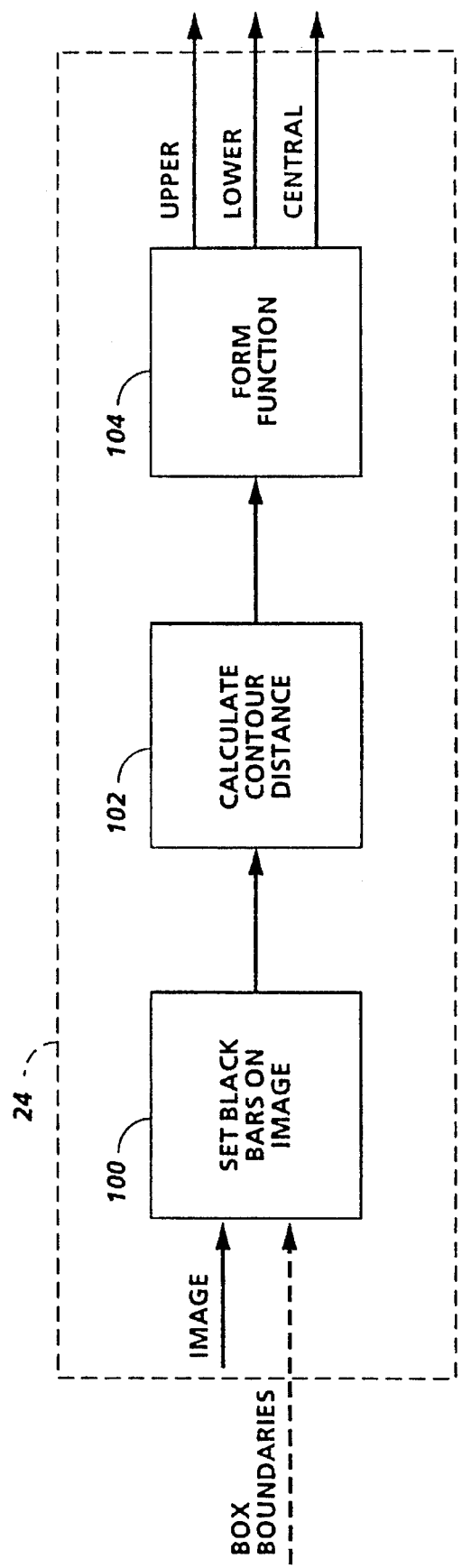
FIG. 25 illustrates the steps associated with deriving the word shape signals.

With reference now to FIG. 25, at block 100 which preferably operates on the actual image as opposed to the filtered image, which could be used in this step, one or more reference lines are established through each word. In other terms, the data representing the symbol string is augmented, so that it is defined over the range of the symbol string. In one embodiment, a blackout bar, which may have a finite thickness or a zero thickness is constructed through the word, preferably having an upper limit or reference line at approximately two thirds of the x height, and a lower limit or reference line at approximately one-third of the x height (which was determined at the baseline determination step). At contour calculation 102, a set of measurements is derived, for the distance d between the upper or lower edge of the bounding box, and the word, or the nearer of the reference line's closer edge of the black out bar. The calculation's measurements are made at the resolution of the image. With reference to FIG. 26A, where the calculation's measurements are illustrated pictorially, it can be seen that the reference lines serve to allow the signal that will ultimately be derived from this step to be defined at every sampling position over the length of the word. In a preferred embodiment, the calculation's measurements of d are actually generated from the contour data derived in accordance with FIGS. 23A, 23B previously collected, and are adjusted to limit the distance d with either the upper or lower edge of the blackout bar as indicated. In the embodiment shown in FIG. 26A, measurements are made from the upper line of the bounding box to the upper reference line of the word, although this is not a requirement. Thus, for example, the measurement could alternatively be made from the reference line to either the upper or lower bounding line, or the character. FIG. 26B better shows how the set of measurements is used to form the signal output from block 104. The contour is represented as a set of measurements distance d', relative to the reference line. Measurement d' is therefore derived from the measurements shown in FIG. 26A, which designate the stopping point of line d, and the known position of the black out bar. Calculating the distance relative to the reference line enables scaling of the word shape contours to a common x height, thereby facilitating any subsequent comparison of the shapes. Accordingly, the distances d' represent a measurement from the reference line or blackout bar to the outer limits of the letter, and in the absence of a letter, provide a zero measurement. These measurement might be derived directly, but the proposed indirect methods appear easier to implement. FIGS. 26C and 26D show that the sets of d' values can be plotted on a graph to form a one dimensional signal or curve representing the word shape. Details of the contour determination are contained in the function StoreOutlinePair() beginning in the Appendix at page 255. FIG. 24 is an image of the contour locations as established for the text sample of FIG. 10. It is important to note the informational content of FIG. 24, where, for the most part, it is relatively easy to recognize the words within the passage by their contours alone.

In studies of the information delivered by the appearance of English language words, it has been determined that in a majority of cases, words can be identified by viewing only approximately the top third of the image of the word. In other words, the upper portion of the word carries with it much of the information needed for identification thereof. In a significant portion of the remainder of cases, words that are unidentifiable by only the upper third of the image of the word, become identifiable when the identification effort includes the information carried by the lower third of the image of the word. A relatively small class of words requires information about the middle third of the word before identification can be made. It can thus be seen that a stepwise process might be used, which first will derive the upper word shape signal or contour, second will derive the lower word shape signal or contour, and thirdly derive a word shape signal central contour (from the reference line towards the word or bounding box), in a prioritized examination of word shape, as required. In the examples of FIG. 26A, 26B, and 26C, the word "from" is fairly uniquely identifiable from its upper portion only. In the examples of FIG. 27A, 27B, 27C and 27D, the word "red" is less uniquely identifiable from its upper portion, since it may be easily confused with the word "rod", and perhaps the word "rad". While the lower portion of the letter "a" may distinguish "red" and "tad", it is doubtful that the lower portion of the letter "o" will distinguish the words "red" from "rod". However, the central portions of "red", "rad", and "rod" are quite distinct.

The determined morphological image characteristic(s) or derived image unit shape representations of each selected image unit are compared, as noted above (step 42), either with the determined morphological image characteristic(s) or derived image unit shape representations of the other selected image units (step 42A), or with predetermined/user-selected image characteristics to locate specific types of image units (step 42B). The determined morphological image characteristics of the selected image units are advantageously compared with each other for the purpose of identifying equivalence classes of image units such that each equivalence class contains most or all of the instances of a given image unit in the document, and the relative frequencies with which image units occur in a document can be determined, as is set forth more fully in the copending U.S. patent application Ser. No. 07/795,173 filed concurrently herewith by Cass et al., and entitled "Method and Apparatus for Determining the Frequency of Words in a Document without Document Image Decoding." Image units can then be classified or identified as significant according the frequency of their occurrence, as well as other characteristics of the image units, such as their length. For example, it has been recognized that a useful combination of selection criteria for business communications written in English is to select the medium frequency word units.

The method for determining the frequency of words without decoding the document is shown in FIG. 8. The image is segmented into undecoded information containing image units (step 820) by using the method described above or by finding word boxes. Word boxes are found by closing the image with a horizontal SE that joins characters but not words, followed by an operation that labels the bounding boxes of the connected image components (which in this case are words). The process can be greatly accelerated by using 1 or more threshold reductions (with threshold value 1), that have the effect both of reducing the image and of closing the spacing between the characters. The threshold reduction(s) are typically followed by a closing with a small horizontal SE. The connected component labeling operation is also done at the reduced scale, and the results are scaled up to full size. The disadvantage of operating at reduced scale is that the word bounding boxes are only approximate; however, for many applications the accuracy is sufficient. The described method works fairly well for arbitrary text fonts, but in extreme cases, such as large fixed width fonts that have large inter-character separation or small variable width fonts that have small inter-word separation, mistakes can occur. The most robust method chooses a SE for closing based on a measurement of specific image characteristics. This requires adding the following two steps:

(1) Order the image components in the original or reduced (but not closed) image in line order, left to right and top to bottom.

(2) Build a histogram of the horizontal inter-component spacing. This histogram should naturally divide into the small inter-character spacing and the larger inter-word spacings. Then use the valley between these peaks to determine the size of SE to use for closing the image to merge characters but not join words.

After the bounding boxes or word boxes have been determined, locations of and spatial relationships between the image units on a page are determined (step 825). For example, an English language document image can be segmented into word image units based on the relative difference in spacing between characters within a word and the spacing between words. Sentence and paragraph boundaries can be similarly ascertained. Additional region segmentation image analysis can be performed to generate a physical document structure description that divides page images into labelled regions corresponding to auxiliary document elements like figures, tables, footnotes and the like. Figure regions can be distinguished from text regions based on the relative lack of image units arranged in a line within the region, for example. Using this segmentation, knowledge of how the documents being processed are arranged (e.g., left-to-right, top-to-bottom), and, optionally, other inputted information such as document style, a "reading order" sequence for word images can also be generated. The term "image unit" is thus used herein to denote an identifiable segment of an image such as a number, character, glyph, symbol, word, phrase or other unit that can be reliably extracted.

Advantageously, for purposes of document review and evaluation, the document image is segmented into sets of signs, symbols or other elements, such as words, which together form a single unit of understanding. Such single units of understanding are generally characterized in an image as being separated by a spacing greater than that which separates the elements forming a unit, or by some predetermined graphical emphasis, such as, for example, a surrounding box image or other graphical separator, which distinguishes one or more image units from other image units in the document image. Such image units representing single units of understanding will be referred to hereinafter as "word units."

A discrimination step 830 is next performed to identify the image units which have insufficient information content to be useful in evaluating the subject matter content of the document being processed by using the technique described above.

Next, in step 840, selected image units, e.g., the image units not discriminated in step 830, are evaluated, without decoding the image units being classified or reference to decoded image data, based on an evaluation of predetermined image characteristics of the image units. The evaluation entails a determination (step 841) of the image characteristics and a comparison (step 842) of the determined image characteristics for each image unit with the determined image characteristics of the other image units.

One preferred method for defining the image unit morphological image characteristics to be evaluated is to use the word shape derivation techniques previously discussed. At least one, one-dimensional signal characterizing the shape of a word unit is derived; or an image function is derived defining a boundary enclosing the word unit, and the image function is augmented so that an edge function representing edges of the character string detected within the boundary is defined over its entire domain by a single independent variable within the closed boundary, without individually detecting and/or identifying the character or characters making up the word unit.

The determined image characteristic(s), e.g., the derived image unit shape representations of each selected image unit are compared, as noted above (step 841), with the determined image characteristic(s)/derived image unit shape representations of the other selected image units for the purpose of identifying equivalence classes of image units (step 850), such that each equivalence class contains most or all of the instances of a given word in the document. The equivalence classes are thus formed by clustering the image units in the document based on the similarity of image unit classifiers, without actually decoding the contents of the image units, such as by conversion of the word images to character codes or other higher-level interpretation. Any of a number of different methods of comparison can be used. One technique that can be used, for example, is by correlating the raster images of the extracted image units using decision networks, such technique being described for characters in a Research Report entitled "Unsupervised Construction of Decision networks for Pattern Classification" by Casey et al., IBM Research Report, 1984, herein incorporated in its entirety.

Depending on the particular application, and the relative importance of processing speed versus accuracy, for example, comparisons of different degrees of precision can be performed. For example, useful comparisons can be based on length, width or some other measurement dimension of the image unit (or derived image unit shape representation e.g., the largest figure in a document image); the location of the image unit in the document (including any selected figure or paragraph of a document image, e.g., headings, initial figures, one or more paragraphs or figures), font, typeface, cross-section (a cross-section being a sequence of pixels of similar state in an image unit); the number of ascenders; the number of descenders; the average pixel density; the length of a top line contour, including peaks and troughs; the length of a base contour, including peaks and troughs; and combinations of such classifiers.

One way in which the image units can be conveniently compared and classified into equivalence classes is by comparing each image unit or image unit shape representation when it is formed with previously processed image units/shape representations, and if a match is obtained, the associated image unit is identified with the matching equivalence class. This can be done, for example, by providing a signal indicating a match and incrementing a counter or a register associated with the matching equivalence class. If the present image unit does not match with any previously processed image unit, then a new equivalence class is created for the present image unit.

Alternatively, as shown (step 50) the image units in each equivalence class can be linked together, and mapped to an equivalence class label that is determined for each equivalence class. The number of entries for each equivalence class can then be merely counted.

Thus, after the entire document image, or a portion of interest, has been processed, a number of equivalence classes will have been identified, each having an associated number indicting the number of times a image unit was identified having similar morphological characteristics, or classifiers, thus determining the image unit frequency.

It will also be appreciated that the selection process can be extended to phrases comprising identified significant image units and adjacent image units linked together in reading order sequence. The frequency of occurrence of such phrases can also be determined such that the portions of the source document which are selected for summarization correspond with phrases exceeding a predetermined frequency threshold, e.g., five occurrences. A preferred method for determining phrase frequency through image analysis without document decoding is disclosed in copending U.S. patent application Ser. No. 07/774,555 filed concurrently herewith by Withgott et al., and entitled "Method and Apparatus for Determining the Frequency of Phrases in a Document Without Document Image Decoding."

It will be appreciated that the specification of the image characteristics for titles, headings, captions, linguistic criteria or other significance indicating features of a document image can be predetermined and selected by the user to determine the selection criteria defining a "significant" image unit. For example, titles are usually set off above names or paragraphs in boldface or italic typeface, or are in larger font than the main text. A related convention for titles is the use of a special location on the page for information such as the main title or headers. Comparing the image characteristics of the selected image units of the document image for matches with the image characteristics associated with the selection criteria, or otherwise recognizing those image units having the specified image characteristics permits the significant image units to be readily identified without any document decoding.

Any of a number of different methods of comparison can be used. One technique that can be used, for example, is by correlating the raster images of the extracted image units using decision networks, such technique being described in a Research Report entitled "Unsupervised Construction of Decision networks for Pattern Classification" by Casey et al., IBM Research Report, 1984, herein incorporated in its entirety.

Preferred techniques that can be used to identify equivalence classes of word units are the word shape comparison techniques disclosed in U.S. patent application Ser. Nos. 07/796,119 and 07/795,169, filed concurrently herewith by Huttenlocher and Hopcroft, and by Huttenlocher, Hopcroft and Wayner, respectively, and entitled, respectively, "Optical Word Recognition By Examination of Word Shape," Published European Application No. 0543592, published May 26, 1993, and "Method for Comparing Word Shapes."

Figure 28:
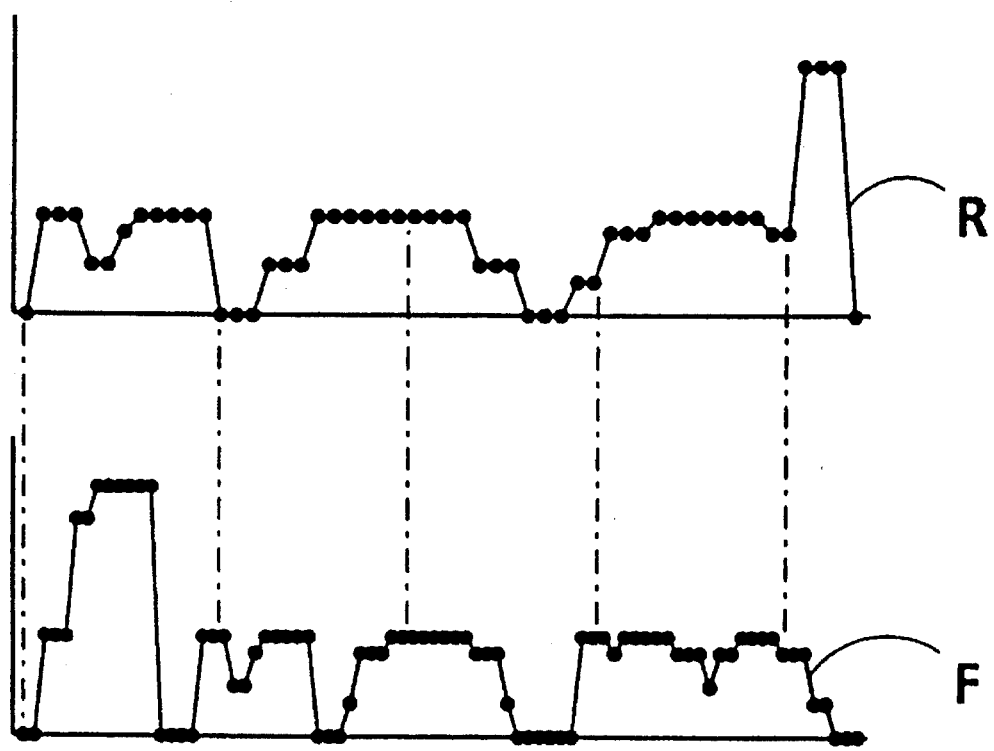
FIG. 28 shows a simple comparison of the signals derived for the words "red" and "from" using a signal normalization method.

For example, U.S. patent application Ser. No. 07/795,169 discloses, with reference to FIG. 7, one manner in which a comparison is performed at word shape comparator 726. In one embodiment, the comparison is actually several small steps, each of which will be described. With reference to FIG. 28, generally, the two word shape signals, one a known word, the other for an unknown string of characters are compared to find out whether they are similar. However, in this case, signal R is the upper contour of the word "red", while signal F is the upper contour of the word "from". Actually, relatively few signals could be expected to be exactly identical, given typical distinctions between character fonts, reproduction methods, and scanned image quality. However, the word shape signals to be compared may be scaled with respect to one another, so that they have the same x-heights. This is achieved by determining the x-height of the pair of word shape contours to be compared. Once determined, the ratios of the x-heights are used to determine a scale factor to be applied to one of the contours. As the x-height is a characteristic measurement for fonts, it is used to determine the scaling factor in both the horizontal and vertical directions. An example of the scaling operation is found in the fontNorm.c file beginning at line 172, where the StoreOutlinePair() function carries out the scaling operation in both the x and y, horizontal and vertical, directions. Alternatively, the shape signals may be compared without normalization and a weighing factor imposed upon the portion of the measured difference due to the unequal lengths. Furthermore, the amplitude or height of the signals has been normalized to further reduce the impact of the font size on the word shape comparison.

Figure 29A:
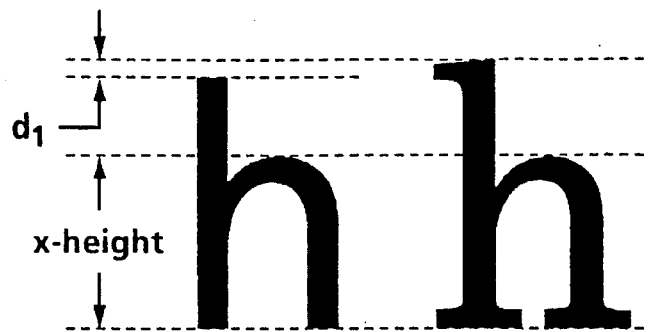
FIGS. 29A, 29B, and 29C illustrate the details of the discrepancy in font height, and the method for normalization of such discrepancies.
Figure 29B:
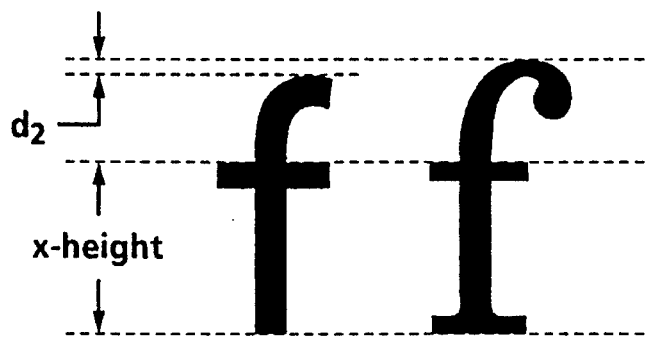
Figure 29C:

Referring next to FIGS. 29A–29C, which illustrate details of the ascender/descender normalization operation, each of the shape signals are normalized based upon a common relationship between the ascender and descender heights and the x-height of the text characters. As illustrated, the actual ascender heights of characters printed with supposedly similar font size, or what is now an appropriately scaled font size, may be slightly different. This occurs as a result of type faces or fonts which are small on body or large on body, implying that similar characters exhibit variations in height across fonts that are the same size, for example 24 point fonts. As an illustration, distance $d_1$ in FIG. 29A represents the difference in ascender height for two occurrences of the letter "h." Likewise, distance $d_2$ illustrates a similar difference between the heights of the letter "f" in FIG. 29B. As illustrated in FIG. 29C, the typical character may be broken into three sections, ascender portion 390, x-height portion 392, and descender portion 394. In addition, the relative heights of these sections are illustrated as c, a, and b, respectively. Again, the normalization operation applied to the shape contours is found in the fontNorm.c module, beginning at page 183 of the Appendix. Applying the operations described with respect to StoreOutlinePair() function, page 255 of the Appendix, the areas of the contour lying above the x-height are scaled as follows:

$$f(t) = \frac{1.5}{a+c} \cdot f(t)$$

Similarly, the descenders are scaled by the following equation:

$$f(t) = \frac{1.5}{a+b} \cdot f(t)$$

where, in both cases, the value used in the numerator (1.5) is arrived at based upon observation of the relationship between ascender or descender heights and the x-height. Also included within the StoreOutlinePair() function is an operation to remove the portions of the contours which do not represent portions of the text string. These regions lie at the ends of the bounding boxes illustrated in FIG. 22. For example, the box surrounding the word "practitioner" in FIG. 22 can be seen to extend beyond the actual word image. As further illustrated at the ends of the word "from" in FIGS. 26A–26D, the contour does not contain useful information. By removing these regions from the contour shape, less error will be introduced into the comparison operations.

Subsequent to the normalization operation, standard signal processing steps can be used to determine the similarity or dissimilarity of the two signals being compared. Alternatively, the following equation may be used:

$$\Delta_{string} = \sqrt{\int_0^1 (f(x) - g'(x))^2 dx}$$

where $\Delta_{string}$ is the difference value between the two signals;

f(x) is the known signal; and g'(x) is the unknown signal.

In a simple determination, the difference could be examined and if it is close to zero, such would be indicated that there would be almost no difference between the two signals. However, the greater the amount of difference, the more likely that the word was not the same as the word to which it was being compared.

It is important to note that the embodiments described herein, as supported by the code listings of the Appendix, compare the word shape contours using the upper and lower contours for each word in conjunction with one another. This is an implementation specific decision, and is not intended to limit the invention to comparisons using only the top and bottom contours in conjunction with one another. In fact, sufficient information may be contained within the upper contours alone so as to significantly reduce the requirements for a comparison of the lower contours, thereby saving considerable processing effort.

Figure 30:
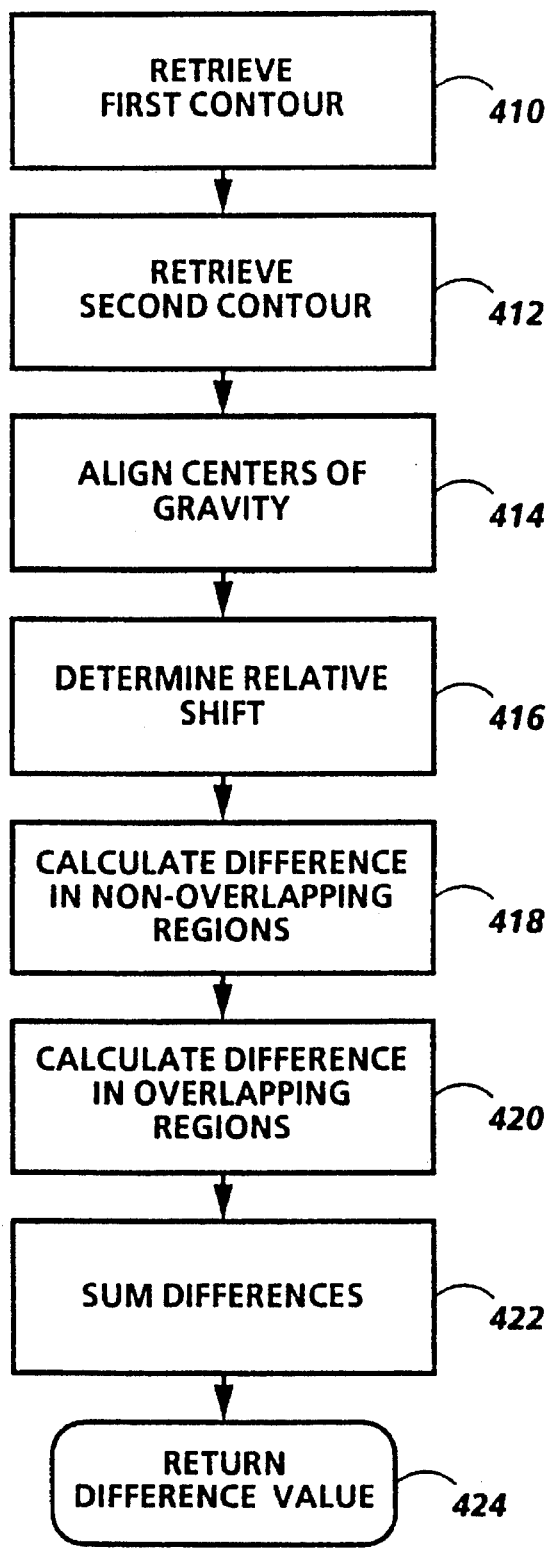
FIG. 30 is a flowchart detailing the steps used for one method of determining the relative difference between word shape contours.

The steps of this simplified comparison method, as first contemplated, are illustrated in FIG. 30. Beginning at step 410, the contour for the first word shape is retrieved from memory, and subsequently, the second word shape is retrieved by step 412. Next, the centers of gravity of the word shapes, defined by the upper and lower contours, are determined and aligned, step 414. The purpose of this step is to align the centers of the word contours to reduce the contour differences that would be attributable solely to any relative shift between the two sets of contours being compared. The center of gravity is determined by summing the areas under the curves (mass) and the distances between the contours (moments) which are then divided to give an indication of the center of gravity for the upper and lower contour pair. Once determined for both sets of contour pairs, the relative shift between the pairs is determined, step 416, and the contours are shifted prior to calculating the difference between the contours. The shifting of the contours is necessary to reduce any error associated with the establishment of the word shape boundaries and computation of the word shapes at block 724 of FIG. 7. Step 418 handles those regions lying outside the overlapping range of the shifted contour pairs, determining the difference against a zero amplitude signal in the non-overlapping regions. This is done by summing the squared values of the upper and lower contours at the non-overlapping ends of the contours. Subsequently, the overlapping region of the contours are compared, step 420. The difference in this region is determined as the sum of the squared differences between the upper curves and the lower curves, as shown in the function L2Norm() on page 100 of the Appendix. Next, the values returned from steps 418 and 420 are added to determine a sum of the differences over the complete range defined by the shifted contours. This value may then be used as a relative indication of the similarity between the contour pairs for the two word shapes being compared.

An alternative to the center-of-gravity comparison method, uses a signal processing function known as time warping, as described in the article "Performance Tradeoffs in Dynamic Time Warping Algorithms for Isolated Word Recognition", by Myers, Rabiner, and Rosenberg, IEEE Transactions on Acoustics, Speech, and Signal Processing, Vol. ASSP-28, No. 6, December 1980, and the book, "Time Warps, String Edits, and Macromolecules: The Theory and Practice of Sequence Comparison", by Sankoff and Kruskal, Addison-Wesley Publishing Company, Inc., Reading, Mass., 1983, Chapters 1 and 4, and may be used to provide for compression and expansion of points along the contours until the best match is made. Then a score is derived based on the amount of difference between the contours being compared and the stretching required to make the contours match. Once again, the score provides a relative indication of the match between the two signals being compared.

Figure 31:
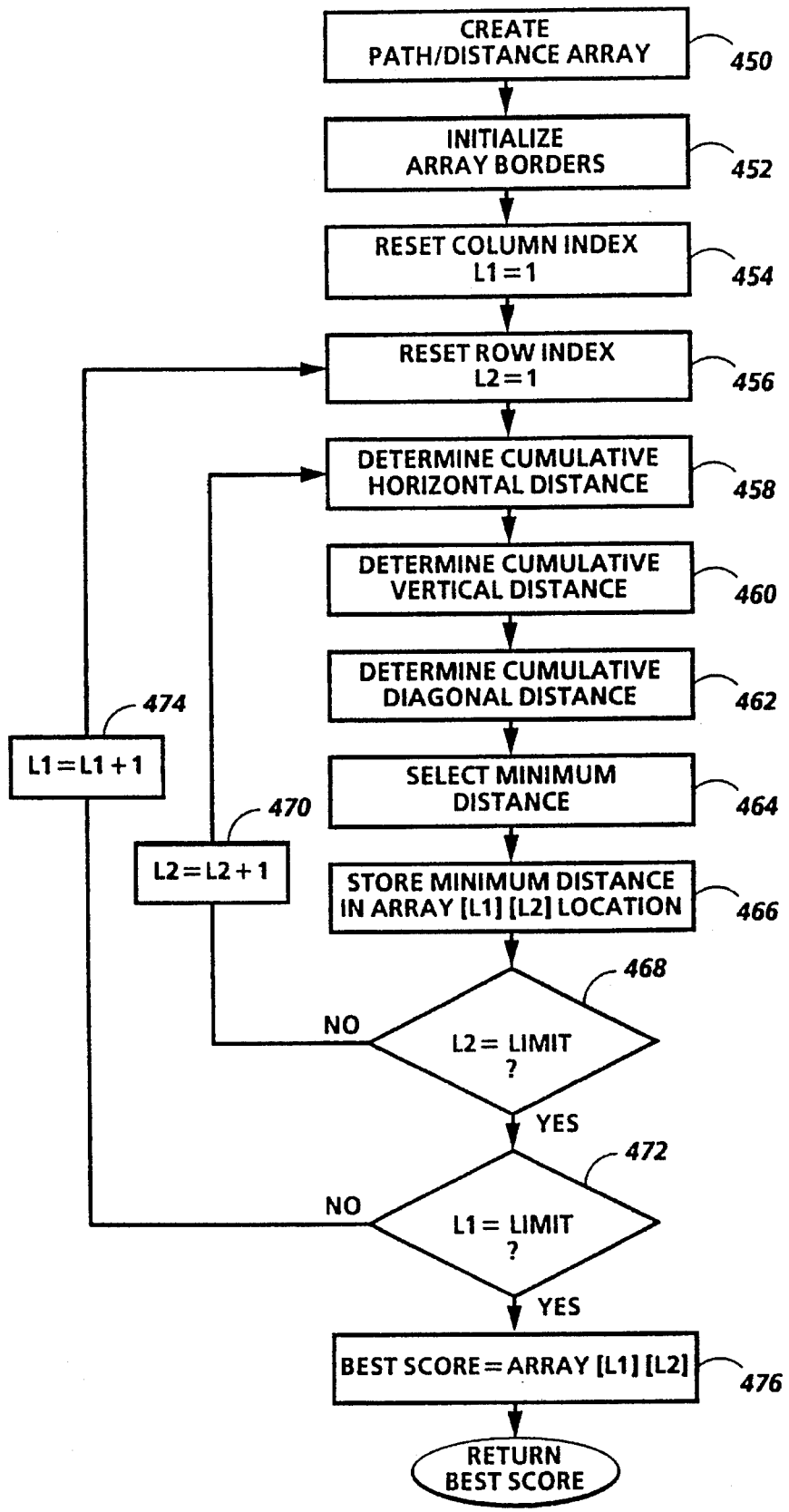
FIG. 31 is a flowchart detailing the steps of a second method for determining the relative difference between word shape contours.

Referring now to FIG. 31, which depicts the general steps of the dynamic warping method, the method relies on the use of a difference array or matrix to record the distances between each point of the first contour and points of the contour to which it is being compared. As illustrated in the figure, and detailed in the code listings contained in the Appendix, the process is similar for all of the measures which may be applied in the comparison.

First, the organization of the code is such that a data structure is used to dynamically control the operation of the various comparison functions. The structure DiffDescriptor, the declaration for which is found on page 9 of the Appendix (see diff.h), contains variables which define the measure to be applied to the contours, as well as, other factors that will be used to control the comparison. These factors include: normalization of the contour lengths before comparison; separate comparisons for the upper and lower contours; a centerWeight factor to direct the warping path; a bandwidth to constrain the warp path; a topToBottom ratio which enables the top contour comparison to be weighted more or less with respect to the bottom contour comparison; and a hillToValley ratio to selectively control weighing the contour differences when an unknown contour is being compared to a known or model word shape contour. Interpretation of the various factors is actually completed in the diff2.c module at page 56 of the Appendix, although descMain.c at page 49 provides an illustration of the interpretation of the factors.

In general, each measure implements a comparison technique, however, each is optimized for a specific type of dynamic comparison, for example, a slope limited dynamic warp having a non-unitary centerweight and a topToBottom weight greater than one. The first level of selection enables the use of a slope-constrained warping function for comparison, an unconstrained warp, or a simple, non-warped, comparison. Within both of the warp comparison methods, there are both separate comparison functions, where the top and bottom contours are warped independently, and parallel comparison functions, where the warp is applied to both the top and bottom contours simultaneously. Specific details of the comparison functions are generally contained within the newMatch.c file beginning at page 101 of the Appendix.

In the general embodiment, the dynamic warping process starts by allocating space for the path/distance array, step 450, which will hold the distance values generated during the comparison and warping of one word shape contour with respect to another. After allocating space, the border regions of the array must be initialized as the process used by all the warping measures is an iterative process using data previously stored in the array for the determination of the cumulative difference between the contours. At step 452, the array borders are initialized. Initialization of the first row of the array entails the determination of the square of the difference between a first point on the first contour and each point on the second contour. Subsequent to border initialization, the column and row index values, L1 and L2, respectively, are reset to 1 to begin processing the individual, non-border, points along the contours.

Figure 32A:
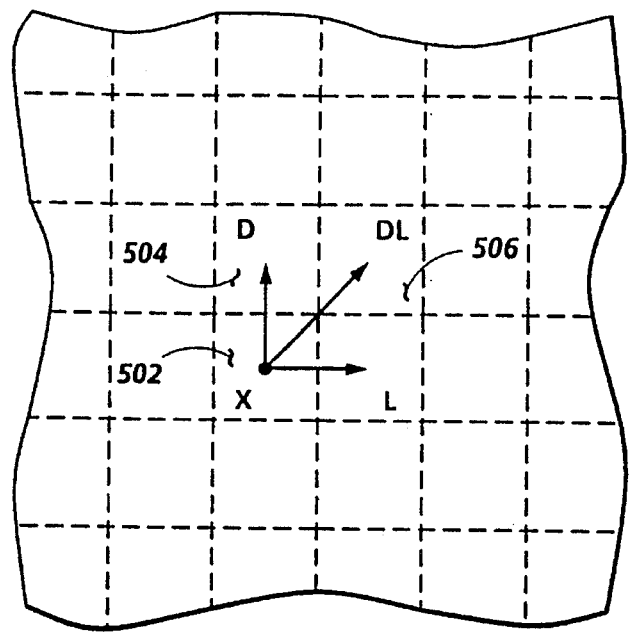
FIGS. 32A and 32B are respective illustrations of the relationship between the relative difference values calculated and stored in an array, for both a non-slope-constrained and a slope-constrained comparison.

Processing of the contours proceeds at steps 458 through 464, where the difference in distance between each point along the second contour, with respect to a point on the first contour is calculated. Moreover, this difference, or distance, is calculated and then summed with a previously determined difference value. In addition, some of the previously determined difference values may be weighted differently, for example, in one embodiment weights of the difference values along the array diagonal may be modified by a centerWeight weighing factor. As an illustration, the operation of the NewMatch() function, beginning at line 106 on page 103, at first, the distance (rest) is calculated as the sum of the squares of the differences between a point on the first contour and a point on the second contour, over the upper and lower contours, where the top contour difference is weighted by the topToBottom variable. This distance (rest) is used in subsequent iterations to determine the horizontal, vertical and diagonal difference values in the loop beginning at line 137 on page 103. To determine each of these values, the current distance value, represented by rest, would be added to the previous values in the down, left, and down-left array positions, the down-left position value being the diagonal position which is weighted by the centerWeight factor as previously described. Referring to FIG. 32A, which illustrates the positional relationship between a previously determined value X, at array location 502, and subsequent array locations, the value X might be added to the difference values of subsequent locations to accumulate the total difference. calculations is shown. When calculating the difference value for array location 504, the value in location 502 would be used as the down value. Similarly, when calculating the value in location 506, the value of location 502 would be used as the center-weighted down-left, or diagonal, value. After calculating the three difference values, steps 458, 460, and 462, the process continues by selecting the smallest of the three values, step 464, for insertion into the current array position, step 466. As illustrated in the Appendix at line 144 of page 103, the FMin() function from page 101 returns the minimum of the three values previously calculated, the value being inserted into the storage array pointed to by pointer dc.

Subsequently, the process illustrated in FIG. 31 continues by determining the differences between the point on the first contour, represented by L1, to points on the second contour, represented by L2. Decision step 468 controls the iterative processing of the points along the second contour by testing for the end of the contour, or swath. In the implementation shown in the Appendix, the index variables i and j are used in place of L1 and L2 to control the difference calculation loops. As indicated in the code for the NewMatch function beginning on page 102 of the Appendix, the swath is referred to as the bandwidth, and is determined by a desired bandwidth which is adjusted for the slope defined by the contour lengths (see page 102, lines 83–89). If no limit has been reached, processing for the next point would continue at step 458 after the value of L2 was incremented at step 470. Similarly, decision step 472 controls the processing of each point along the first contour, in conjunction with incrementing step 474. Once all the points have been processed with respect to one another, as evidenced by an affirmative response in step 472, the relative difference score, best score, is contained in the farthest diagonal position of the array (L1, L2). Subsequently, the value determined at step 476 is returned as an indication of the dynamically warped difference between the contours being compared.

The code implementation found in the NewMatch() function on page 103 of the Appendix has optimized the execution of the aforedescribed warping process by reducing the large two-dimensional array to a pair of linear arrays which are updated as necessary. Due to this modification, the minimum difference, or best score, for the warp comparison value is found in the last location of the one-dimensional array. Furthermore, the final difference value, dc, may be subsequently normalized to account for the length differences between the two sets of contours being compared. Finally, such a value might subsequently be compared against a threshold or a set of similarly obtained difference values to determine whether the contours are close enough to declare a match between the words, or to determine the best match from a series of word shape comparisons.

In yet another embodiment, the dynamic time warping process previously described may be altered to compare the difference values contained in the difference array to a threshold value on a periodic basis. Upon comparison, the process may be discontinued when it is determined that sufficient difference exists to determine that the contours being compared do not match one another, possibly saving valuable processing time. Moreover, the sequential operation of word shape comparator 726 might be done in conjunction with sequential output from word shape computer 724, thereby enabling the parallel processing of a textual image when searching for a keyword.

Having described a basic implementation of the dynamic warping comparison measures, the distinctions of the other dynamic warp comparison methods included in the Appendix and the application of the control factors previously mentioned will be briefly described to illustrate the numerous possible embodiments of the present invention. First, the method previously described may also be implemented with the slope of the warp path being constrained as it moves across the array. Details of the implementation are found in the SlopeCMatch() function beginning on page 111 of the Appendix. This measure is further illustrated graphically in FIG. 32B, where the value of array location 512, X, may be added to only the three subsequent array locations shown. For example, X may be added to array location 514, when considered as the d2L1 value for location 514. The nomenclature used for the variable names, and followed in the figure, is as follows: d2L1 refers to the array location which is down 2 rows and left one column, d1L1, refers to the lower left diagonal array location, and d1L2 refers to the array location that is down one column on left 2 rows from the current array location. In a similar manner, X may be added as the d1L2 value for the calculation of the cumulative difference value for array location 516.

Figure 32B:
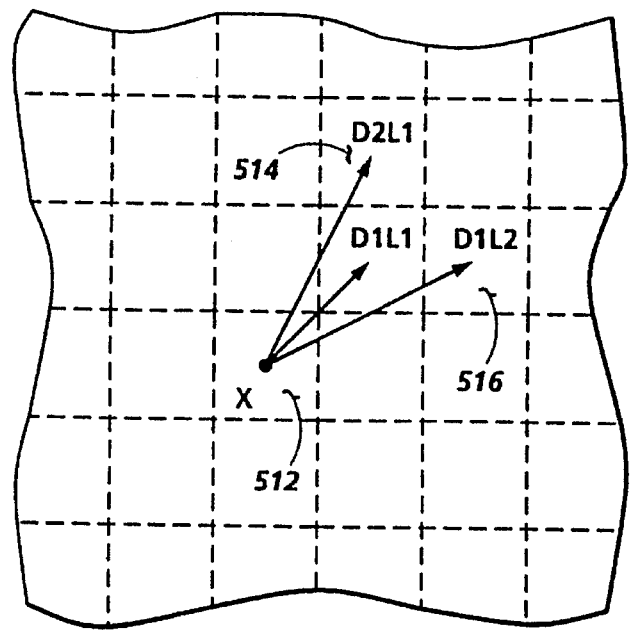
Figure 33:
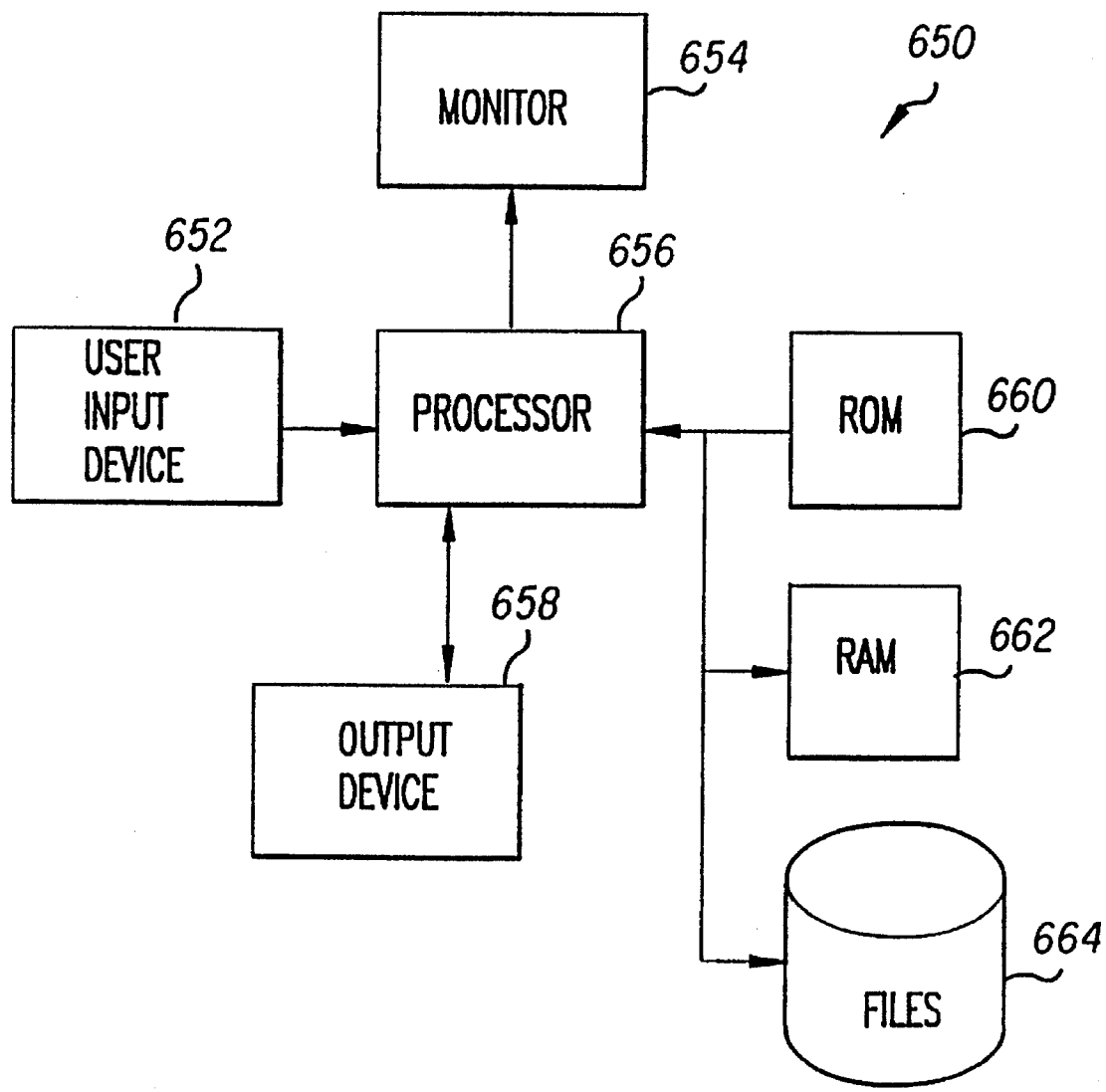
FIG. 33 is a block diagram of a preferred embodiment of an apparatus according to the invention for detecting function words in a scanned document image without first converting the document image to character codes.

As is apparent from a comparison of FIGS. 32A and 32B, the slope constrained warping measure limits the warping path which can be followed during the generation of the cumulative difference value. The reason for implementing such a constraint is to prevent the warping process from removing, or compressing, a large area of one of the two contours being compared, without imposing a significant "cost" to such a compression.

Next, the method previously described with respect to the parallel warping process may also be implemented on only one pair of contours at a time, for example, the upper contours of two word shapes. The functions SepMatch() and SepCMatch(), as found in the Appendix on pages 104 and 113, respectively, implement the separate matching measure in both the non-slope-constrained and slope-constrained fashions previously described. In general, these measures separately calculate the difference between the top or bottom contours of a pair of wordshapes. The general implementation indicated for the measures in the code shows that these measures are typically used sequentially, first determining the warped difference for the top contours, and then adding to it the warped difference from the bottom contour comparison, resulting in a total difference for the wordshapes.

By carrying out the comparison methods described in a "piece-wise" cascaded fashion, further processing benefits may also be derived. More specifically, cascaded comparison would entail, first, utilizing the upper contours of the words being compared to identify a word, or at least narrow the set of possible alternatives and, second, using the lower contour comparison to provide complete identification. It is believed that such an approach to word shape comparison operation 726 would considerably reduce processing time spent on identifying unknown word shapes by comparison to a dictionary of known word shapes, 728, as illustrated in FIG. 7. Important to the cascaded comparison, is the constraint that the top and bottom warps applied to the contours must be relatively equivalent. This requirement arises from the fact that the upper and lower curves have a relationship to a common word, and if this relationship is not maintained during the warp analysis, the accuracy of the comparison will be compromised.

Alternatively, the dynamic warping technique may be applied as described, with the addition of a function suitable for accumulating the relative warp applied to the upper and lower curves in achieving the best match. For example, when a known, non-italicized word shape is compared to an unknown word shape, a shift in the warp applied to the upper curve relative to the lower curve could be indicative of an italicized word, however, the length of the warped region will remain the same for the top and bottom warps. Such a technique may prove useful in the identification of important words within a larger body of text, as these words are occasionally italicized for emphasis.

One of the control factors which has not been previously described is the bandwidth factor. As implemented, the bandwidth factor controls the relative width of the signal band in which the warping signal will be constrained. More specifically, the band width limitation is implemented by defining a region about the array diagonal in which the warp path which traverses the array is constrained. The constraint is implemented by assigning large values to those areas outside of the band width, so as to make it highly unlikely that the path would exceed the constraint.

Another factor which was briefly mentioned is the topToBottom factor. When applied, the value of this variable is used to weight the difference value determined for the top contour warping process. Therefore, use of a number greater than one, will cause the upper contour difference to be weighted more heavily than the lower contour difference. A very large number would effectively eliminate the lower contour difference completely and, likewise, a zero value would eliminate the upper contour difference completely. This factor is generally considered important to enable the upper contour to be weighted in proportion to its information content, as it generally carries more information regarding the word than does the lower contour.

The hillToValley ratio is a variable which is usually applied in situations when a known, or model, set of word shape contours is being compared against a set of word shape contours from an unknown image. In exercising this option, the model set of contours is passed as the comparison measure functions, for example, NewMatch() on page 102 of the Appendix. When determining the difference between points on the contours, the comparison functions commonly call the function SquareDifference() on page 101 of the Appendix to determine the sum of the squared difference. SquareDifference() applies the hillToValley ratio to the squared difference whenever it determines that the value of the model contour is less than the contour being compared. The result of applying a hillToValley value greater than one is that the relative "cost" of the difference when the model contour is less than the target contour is smaller than the same difference when the model contour is greater than the target contour. The basis for this type of weighing is that when comparing against a model contour, the comparison should treat those areas of the target contour that are subject to being "filled in" during a scanning or similar digitizing operation with less weight than regions not likely to be filled in, as evidenced by contour positions below the model contour. For instance, the regions where ascenders and descenders meet the body of the character are likely to be filled in during scanning, thereby causing the target contour to have a gradual contour in those regions, whereas the model contour would most likely have a defined peak or valley in these regions. Hence, the contour value of the model would be less than the contour value of the target, even though the characters may have been identical. Therefore, the hillToValley variable attempts to minimize the impact to the calculated difference value over these regions.

It is important to note that the aforedescribed measures and control factors allow the comparison measures to be conducted in numerous permutations. However, the flexibility which these measures permit is intended to enhance the applicability of the comparison process, so that when information is known about a particular word shape contour, for example, a model contour generated from a computer generated character font, the measures may place reliance on that information to make the comparisons more robust.

The mathematical explanation of the word shape derivation process suggests that alternative methods of deriving the word shape signal exist. Some possible alternatives are the establishment of the one dimensional signal using an alternative coordinate scheme, for example polar coordinates. Another possibility is generation of signal g(t), where g(t) represents the direction from each contour point to the succeeding contour point, where t would represent the point number.

Depending on the particular application, and the relative importance of processing speed versus accuracy, for example, comparisons of different degrees of precision can be performed. For example, useful comparisons can be based on length, width or some other measurement dimension of the image unit (or derived image unit shape representation, e.g., the largest figure in a document image); the location or region of the image unit in the document (including any selected figure or paragraph of a document image, e.g., headings, initial figures, one or more paragraphs or figures), font, typeface, cross-section (a cross-section being a sequence of pixels of similar state in an image unit); the number of ascenders; the number of descenders; the average pixel density; the length of a top line contour, including peaks and troughs; the length of a base contour, including peaks and troughs; the location of image units with respect to neighboring image units; vertical position; horizontal inter-image unit spacing; and combinations of such classifiers. Thus, for example, if a selection criteria is chosen to produce a document summary from titles in the document, only title information in the document need be retrieved by the image analysis processes described above. On the other hand, if a more comprehensive evaluation of the document contents is desired, then more comprehensive identification techniques would need to be employed.

In addition, morphological image recognition techniques such as those disclosed in concurrently filed U.S. patent application Ser. No. 07/775,174, to Bloomberg et al., and entitled "Methods and Apparatus for Automatic Modification of Selected Semantically Significant Portions of a Document Without Document Image Decoding", can be used to recognize specialized fonts and typefaces within the document image.

Figure 9:
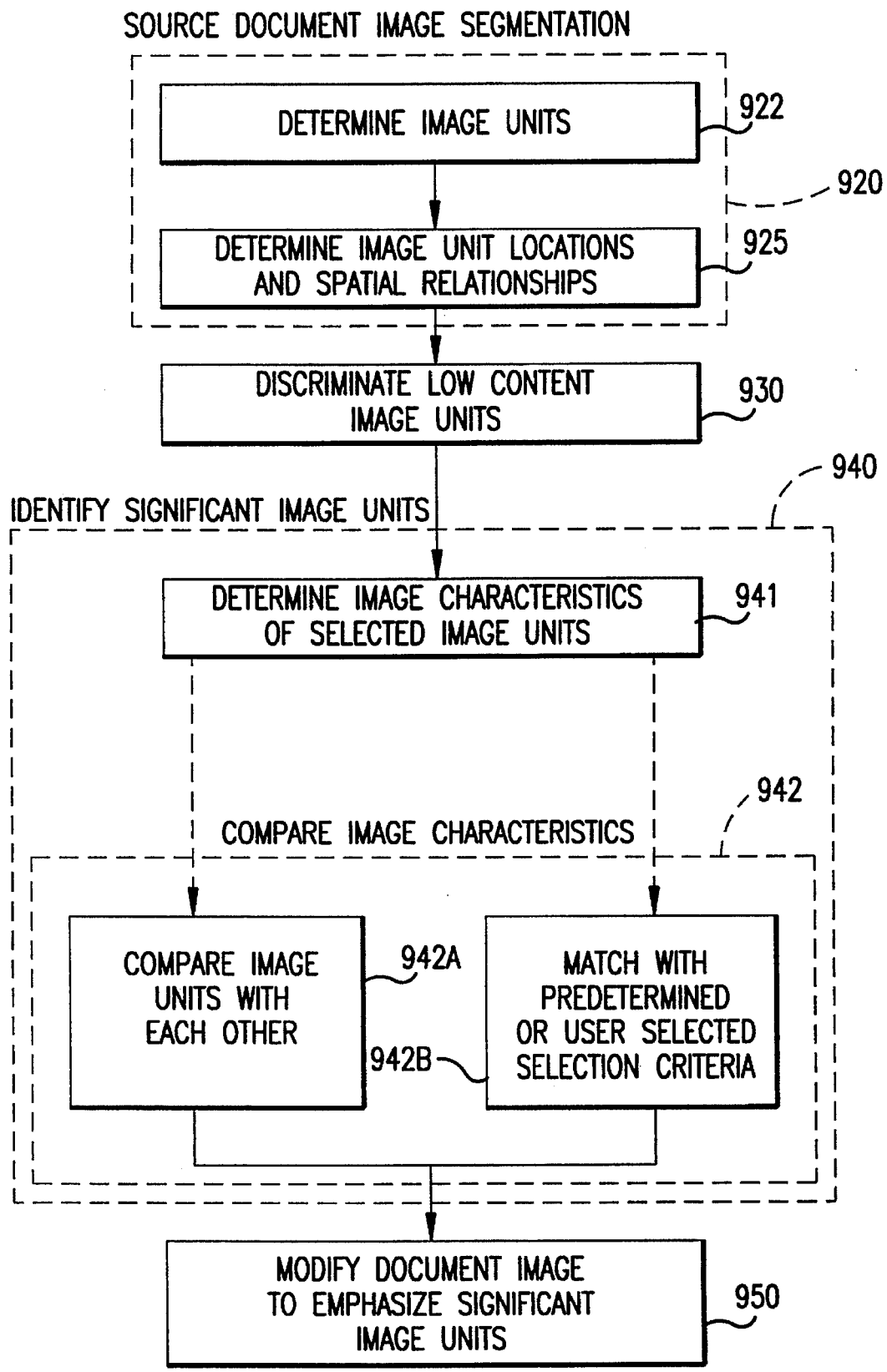
FIG. 9 shows a block system diagram for identifying significant image units.

More particularly, the above reference provides a method for automatically emphasizing selected information within the data or text of a document image. Referring to FIG. 9, the first phase of the image processing technique of the method involves the segmentation of the image into undecoded information containing image units (step 920) using techniques described above. Then the locations of and spatial relationships between the image units on a page is determined (step 925), which was previously described.

The discrimination step 930, which was previously described, is next performed to identify the image units which have insufficient information content to be useful in evaluating the subject matter content of the document being processed. Such image units include stop or function words, i.e., prepositions, articles and other words that play a largely grammatical role, as opposed to nouns and verbs that convey topic information.

Next, in step 940, selected image units, e.g., the image units not discriminated in step 930, are evaluated, without decoding the image units being classified or reference to decoded image data, based on an evaluation of predetermined morphological (structural) image characteristics of the image units. The evaluation entails a determination (step 941) of the morphological image characteristics and a comparison (step 942) of the determined morphological image characteristics for each image unit. The determined morphological image characteristic(s), e.g., the derived image unit shape representations, of each selected image unit are compared, either with the determined morphological image characteristic(s)/derived image unit shape representations of the other selected image units (step 942A), or with predetermined/user-selected morphological image characteristics to locate specific types of image units (step 942B). The determined morphological image characteristics of the selected image units are advantageously compared with each other for the purpose of identifying equivalence classes of image units such that each equivalence class contains most or all of the instances of a given image unit in the document, and the relative frequencies with which image units occur in a document can be determined.

It will be appreciated that the specification of the morphological image characteristics for titles, headings, captions, linguistic criteria or other significance indicating features of a document image can be predetermined and selected by the user to determine the selection criteria defining a "significant" image unit. Comparing the image characteristics of the selected image units of the document image for matches with the image characteristics associated with the selection criteria permits the significant image units to be readily identified without any document decoding.

Any of a number of different methods of comparison can be used. One technique that can be used, for example, is by correlating the raster images of the extracted image units using decision networks, such technique being described for characters in a Research Report entitled "Unsupervised Construction of Decision Networks for Pattern Classification" by Casey et al., IBM Research Report, 1984, incorporated herein in its entirety.

Another techniques that can be used to identify equivalence classes of word units are the word shape comparison techniques disclosed in U.S. patent application Ser. Nos. 07/796,119 and 07/795,169, filed concurrently herewith by Huttenlocher and Hopcroft, and by Huttenlocher, Hopcroft and Wayner, respectively, and entitled, respectively, "Optical Word Recognition By Examination of Word Shape," and "Method for Comparing Word Shapes." This method provides an adequate comparison for purposes of determining phrase frequency is to compare only the length and height of the derived image unit shape representations. Such a comparison is particularly fast, resulting in a highly efficient phrase frequency analysis which has proven to be sufficiently robust to reliably extract significant phrases in many text document applications.

In instances in which multiple page documents are processed, each page is processed and the data held in the memory 15 (see FIG. 1), as described above. The entirety of the data can then be processed.

The second phase of the document analysis according to this method involves further processing (step 950) of the scanned document image to emphasize the identified image units. The emphasis can be provided in numerous ways. One exemplary way is to augment the document image so that the identified significant image units are underscored, highlighted with color, or presented as margin notations.

Another exemplary way is to modify the shape and/or other appearance attributes of the significant image units themselves in a manner which emphasizes them relative to the other image units in the document image. The appearance modification can be accomplished using any conventional image modification techniques, or, advantageously, the following morphological bitmap modification techniques.

In accordance with this method, one or more selected morphological operations are performed uniformly on the entire bitmap for a selected image unit to modify at least one shape characteristic thereof. It will be appreciated that the selection of bitmap operations may be performed automatically or interactively.

Examples of ways in which the appearance changes described above can be accomplished are as follows. The type style text can be "boldened" by either "dilation" or using a connectivity-preserving (CP) thickening operation. It can be "lightened" by either "erosion" or a CP thinning operation. (As will be appreciated by those skilled in the art, dilation and erosion are morphological operations which map a source image onto an equally sized destination image according to a rule defined by a pixel pattern called a structuring element (SE). A SE is defined by a center location and a number of pixel locations, each having a defined value (ON or OFF). The pixels defining the SE do not have to be adjacent each other. The center location need not be at the geometrical center of the pattern; indeed it need not even be inside the pattern. In a dilation, a given pixel in the source image being ON causes the SE to be written into the destination image with the SE center at the corresponding location in the destination image. The SEs used for dilation typically have no OFF pixels. In an erosion, a given pixel in the destination image is turned ON if and only if the result of superimposing the SE center on the corresponding pixel location in the source image results in a match between all ON and OFF pixels in the SE and the underlying pixels in the source image.)

Such dilation/thickening and erosion/thinning operations can be either isotropic (the same horizontally for vertically) or anisotropic (e.g., different in horizontal and vertical directions).

Although optical character recognition (OCR) techniques are required, for example, in order to convert the typestyle of a selected word unit to italic, a similar type of emphasis can be achieved through the morphological operation of horizontal shearing to achieve the slant typestyle. Slant is a variant of roman type style that is created from roman using a horizontal shear of about 12 degrees (this is the approximate slant angle of italic style characters). The sheared images can slant forwards, backwards, or even upwards, if desired. Text can also be bit inverted (black for white and vice versa) for emphasis, or words can be emphasized or de-emphasized by scaling up or down, respectively. In the case of scaling, it may also be desirable to change the thickness of the lines in the image unit in addition to simple scaling.

Thus, using such morphological bitmap alteration processes, hand marks such as underlining, side lining, circling, highlighting, and so forth, can be extracted from the image, and removed from the original bitmap by XOR operations. Removal of color highlight marks requires capture of a gray scale (or color) scanned image. Once captured, removal is relatively easy using the appropriate thresholding. The resulting image is similar in quality to that of un-highlighted marks. Words that are high-lighted can be identified from the highlight mask and word boxes, using known seed-growing methods. The appearance of these words can be altered at will.

A salient feature provided by the method of the invention is that the initial processing and identification of significant image units is accomplished without an accompanying requirement that the content of the image units be decoded, or that the information content of the document image otherwise be understood. More particularly, to this stage in the process, the actual content of the word units is not required to be specifically determined. Thus, for example, in such applications as copier machines or electronic printers that can print or reproduce images directly from one document to another without regard to ASCII or other encoding/decoding requirements, image units can be identified and processed using one or more morphological image characteristics or properties of the image units. The image units of unknown content can then be further optically or electronically processed. One of the advantages that results from the ability to perform such image unit processing without having to decode the image unit contents at this stage of the process is that the overall speed of image handling and manipulation can be significantly increased.

The second phase of the document analysis of the invention involves processing (step 50) the identified significant image units to produce an auxiliary or supplemental document image reflective of the contents of the source document image. It will be appreciated that the format in which the identified significant image units are presented can be varied as desired. Thus, the identified significant image units could be presented in reading order to form one or more phrases, or presented in a listing in order of relative frequency of occurrence. Likewise, the supplemental document image need not be limited to just the identified significant image units. If desired, the identified significant image units can be presented in the form of phrases including adjacent image units presented in reading order sequence, as determined from the document location information derived during the document segmentation and structure determination steps 20 and 25 described above. Alternatively, a phrase frequency analysis as described above can be conducted to limit the presented phrases to only the most frequently occurring phrases.

The present invention is similarly not limited with respect to the form of the supplemental document image. One application for which the information retrieval technique of the invention is particularly suited is for use in reading machines for the blind. One embodiment supports the designation by a user of key words, for example, on a key word list, to designate likely points of interest in a document. Using the user designated key words, occurrences of the word can be found in the document of interest, and regions of text forward and behind the key word can be retrieved and processed using the techniques described above. Or, as mentioned above, significant key words can be automatically selected according to prescribed criteria, such as frequency of occurrence, or other similar criteria, using the morphological image recognition techniques described above; and a document automatically summarized using the determined words.

Another embodiment supports an automatic location of significant segments of a document according to other predefined criteria, for example, document segments that are likely to have high informational value such as titles, regions containing special font information such as italics and boldface, or phrases that receive linguistic emphasis. The location of significant words or segments of a document may be accomplished using the morphological image recognition techniques described above. The words thus identified as significant words or word units can then be decoded using optical character recognition techniques, for example, for communication to the blind user in a Braille or other form which the blind user can comprehend. For example, the words which have been identified or selected by the techniques described above can either be printed in Braille form using an appropriate Braille format printer, such as a printer using plastic-based ink; or communicated orally to the user using a speech synthesizer output device.

Once a condensed document is communicated, the user may wish to return to the original source to have printed or hear a full text rendition. This may be achieved in a number of ways. One method is for the associated synthesizer or Braille printer to provide source information, for example, "on top of page 2 is an article entitled . . . " The user would then return to point of interest.

Two classes of apparatus extend this capability through providing the possibility of user interaction while the condensed document is being communicated. One type of apparatus is a simple index marker. This can be, for instance, a hand held device with a button that the user depresses whenever he or she hears a title of interest, or, for instance, an N-way motion detector in a mouse 19 (FIG. 2) for registering a greater variety of commands. The reading machine records such marks of interest and returns to the original article after a complete summarization is communicated.

Another type of apparatus makes use of the technology of touch-sensitive screens. Such an apparatus operates by requiring the user to lay down a Braille summarization sheet 41 on a horizontal display. The user then touches the region of interest on the screen 42 in order to trigger either a full printout or synthesized reading. The user would then indicate to the monitor when a new page was to be processed.

It will be appreciated that the method of the invention as applied to a reading machine for the blind reduces the amount of material presented to the user for evaluation, and thus is capable of circumventing many problems inherent in the use of current reading technology for the blind and others, such as the problems associated with efficient browsing of a document corpus, using synthesized speech, and the problems created by the bulk and expense of producing Braille paper translations, and the time and effort required by the user to read such copies.

The present invention is useful for forming abbreviated document images for browsing (image gists). A reduced representation of a document is created using a bitmap image of important terms in the document. This enables a user to quickly browse through a scanned document library, either electronically, or manually if summary cards are printed out on a medium such as paper. The invention can also be useful for document categorization (lexical gists). In this instance, key terms can be automatically associated with a document. The user may then browse through the key terms, or the terms may be further processed, such as by decoding using optical character recognition.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

APPENDIX

Jul 26 19:28 1991 args.h

```
1      /* Support for command line argument scanning.
2       *
3       * When a program is run from the shell, its name is followed by a number of
4       * required command line ARGUMENTS and then some optional command line OPTIONS.
5       * Each argument consists of a list of required PARAMETERS, each of which can
6       * be either an int, string, or float. Options are like arguments with the
7       * exception that their required parameters are predeced by a keyword denoting
8       * which option is being invoked.
9       *
10      * Required arguments are defined using the DefArg function. The format string
11      * consists of a list of data format specifiers (%d, %f, and %s for integer, float, and
12      * string, respectively) that specify the types of the parameters to the arguement.
13      * The documentation string should contain a one line description of the argument.
14      * It will be printed if the argument list cannot be scanned.
15      * The remaining arguments to DefArg are pointers to locations where the values of the
16      * command line arguments will be stored.
17      *
18      * Optional arguments are defined with the DefOption function. The format string
19      * is similar to the DefArg format string, but has a keyword before the format
20      * specifiers. The exists parameter is a pointer to BOOLEAN that is set to true
21      * iff an occurance of this option was successfully parsed from the command line.
22      * The remaining arguments are pointers to the locations where the values of the
23      * command line arguments will be stored.
24      *
25      * Short example:
26      * The following program expects one required command line argument that is a string
27      * and will be stored in s. In addition, it will accept three different optional
28      * keyword arguments. They are the keyword -int followed by an integer, with result
29      * stored in i; -float followed by a float stored in f; and -pair followed by a float
30      * and then an int, stored in f and i, respectively.
31      *
32      * Suppose the program is called foo. Here are some legal invocations:
33      * % foo hello
34      * % foo hello -int 1
35      * % foo hello -int 5 -float 10
36      * % foo hello -pair 1 2
37      *
38      * Here are some error invocations and responses
39      * % foo
40      * Usage:
41      *   scanArgs
42      *    filename
43      *    [-int <int>]
44      *    [-float <float>]
45      *    [-pair <float> <int>]
46      * % foo hello -int
47      * Option -int expects 1 parameters:
48      * -int <int>
49      *
50      *
51      *void main (int argc,char **argv)
```

Section A                                                              APPENDIX / Page 2

```
52       *{
53       * int i;
54       * float f;
55       * char *s;
56       * BOOLEAN haveAString,haveAnInt,haveAFloat,haveAPair;
57       *
58       * DefArg("%s","filename",&s);
59       * DefOption("-int %d","-int <int> ",&haveAnInt,&i);
60       * DefOption("-float %f","-float <float> ",&haveAFloat,&f);
61       * DefOption("-pair %f %d","-pair <float> <int> ",&haveAPair,&f,&i);
62       *
63       * ScanArgs(argc,argv);
64       *
65       * printf("%s\n",s);
66       * if (haveAPair)
67       *   printf("%f %d\n",f,i);
68       * if (haveAnInt)
69       *   printf("%d\n",i);
70       * if (haveAFloat)
71       *   printf("%f\n",f);
72       * if (haveAString)
73       *   printf("%s\n",s);
74       *}
75       *
76       */
77
78       /* Possible additions:
79       *  1) Passing NULL pointers as exists variables.
80       *  2) Predicate calculus for error checking.
81       *  3) Only need one DefArg call.
82       *  4) Combine with error.c to save program name info.
83       */
84       void DefArg(char *format,char *documentation,...);
85       void DefOption(char *format,char *documentation,BOOLEAN *exists,...);
86       void ScanArgs(int argc,char **argv);
87
88
```

Section A                        APPENDIX / Page 3

Jan 11 17:00 1991 baselines.h

```
1       List BaseLines(Picture pict,double angle,char *plotFile);
2       #ifdef foo
3       int *count,
4               int **returnCoordx, int **returnCoordy);
5       #endif
6       void DrawBaseLines(Picture pict, List pointList, double angle);
```

Section A                                                          APPENDIX / Page 4

Aug 23 13:03 1991  blobify.h

1   Picture Blobify(Picture old,int half_mask_size,double threshold);
2   Picture NewBlobify(Picture old,int halfMaskWidth,double threshold,double angle);

Section A  APPENDIX / Page 5

Aug 1 02:59 1991 boolean.h

```
1    typedef int BOOLEAN;
2    #define FALSE 0
3    #define TRUE (!FALSE)
```

Section A

APPENDIX / Page 6

Jan 11 17:00 1991 boxes.h

```
1      List FindBorders(Picture pict,double theta);
2      void DrawBox(Picture pict,Box box);
3      void DrawColorBox(Picture pict,Box box,int color);
```

Section A                                   APPENDIX / Page 7

Jul 26 13:42 1991  descriptors.h

```
1       typedef unsigned char *Descriptor,DescriptorElement;
2
3       void PrintField(char *s,int w);
4       void PrintDescriptor(Descriptor d,int *starCount,int *correctCount);
5       void PrintWords(char **words,int numberOfWords);
6       Descriptor ComputeDescriptor(int modelIndex,Dictionary models,
7                       Dictionary thisFont,int numberOfWords,
8                       DiffDescriptor dd);
9
10      #define MAX_FONTS (20)
11      #define MAX_WORDS (100)
12
13
```

Section A                                                          APPENDIX / Page 8

Jan 16 12:55 1991  dict.h

```
1     /* Dictionary file have the following format:
2      *   int magic number = 1234567
3      *   int numberOfEntries
4      *   int infoStringLength (includes the \0 at the end)
5      *   char infoString[infoStringLength]
6      *   OutlinePairBody[numberOfEntries]
7      */
8
9     typedef struct {
10      Box box;
11      float blackoutHeight;
12      int numberOfLegs;
13      int offset;
14      int width;
15      float *x;
16      float *top;
17      float *bottom;
18    } *OutlinePair,OutlinePairBody;
19
20    typedef struct {
21      Box box;
22      int numberOfLegs;
23      int *x;
24      int *top;
25      int *bottom;
26    } *RawOutlinePair,RawOutlinePairBody;
27
28    typedef struct {
29      int numberOfEntries;
30      char *infoString;
31      RawOutlinePair *rawOutlines;
32      OutlinePair *outlines;
33    } *Dictionary,DictionaryBody;
34
35    void WriteDictionary(Dictionary dict, char *filename);
36    Dictionary ReadDictionary(char *filename);
37    Dictionary NewDict(int numberOfEntries);
38    char *ArgListToString(int argc, char **argv);
```

Section A                           APPENDIX / Page 9

Jul 30 23:04 1991  diff.h

```
1       typedef enum {L2,CONSTRAINED,WARP} DiffType;
2
3       typedef struct {
4         DiffType diffType;
5         BOOLEAN lengthNormalize;
6         BOOLEAN separate;
7         float centerWeight;
8         int bandWidth;
9         float topToBottom;
10        float hillToValley;
11        FILE *pathFP;
12      } *DiffDescriptor,DiffDescriptorBody;
13
14      Picture CompareDictionaries(Dictionary dict1, Dictionary dict2,DiffDescriptor dd);
15      void WritePictureAsAscii(Picture pict, char *filename,
16                      char *info1, char *info2);
17      float DiffPair(OutlinePair one, OutlinePair two,DiffDescriptor dd);
18      #ifdef foo
19      float DiffPairAndPath(OutlinePair one, OutlinePair two,DiffDescriptor dd);
20      #endif
21
22
23
```

Section A                                                              APPENDIX / Page 10

Jan 15 18:56 1991 diff2.h

```
1     #ifdef OWNER
2     #define EXTERN
3     #else
4     #define EXTERN extern
5     #endif OWNER
6
7     EXTERN int FileCountX;
8     EXTERN int FileCountY;
9
10    float DiffPair(OutlinePair one, OutlinePair two, char *matchtype,
11            char *pathFile);
12
```

Section A  APPENDIX / Page 11

Jul 26 19:29 1991 error.h

```
1    /* Possible additions:
2     * 1) Variable numbers of parameters to DoError().
3     * 2) Error recovery language.
4     */
5    void DoError(char *string1,char *string2);
```

Section A                                                                APPENDIX / Page 12

Aug 15 06:37 1991 fontNorm.h

```
1       void StoreRawOutlinePair(Dictionary dict, int dictEntry,
2                       Box box,int *bothX,int *topY, int *baseY,
3                       int numberOfLegs);
4
5       #define HIT_THE_BOX (10000)
6
```

Section A  APPENDIX / Page 13

Jan 11 17:00 1991 lines.h

```
1      typedef BOOLEAN pistFunc(Picture pict, int x, int y, BOOLEAN test,
2                      UCHAR color);
3
4      pistFunc DrawPiston, CountPiston, DistancePiston, BaseLinePiston;
5
6      void LineEngine(Picture pict, int x1, int y1, int x2, int y2, UCHAR color,
7                      pistFunc PerPixel);
8      void DrawLine(Picture pict, int x1, int y1, int x2, int y2, UCHAR color);
9      float CountLine(Picture pict, int x1, int y1, int x2, int y2);
10     int DistanceLine(Picture pict, int x1, int y1, int x2, int y2);
```

Section A                                                          APPENDIX / Page 14

Jan 11 17:00 1991 lists.h

```
1       typedef struct {
2         void *car;
3         void *cdr;
4       } cellBody,*cell;
5
6       typedef cell List;
7       typedef void *mapFun(void *);
8       typedef void collectFun(void *);
9
10      List cdr(List);
11      void *car(List);
12      void *popIntern(List *);
13      BOOLEAN endp(List);
14      List cons(void *,List);
15      void map(List,mapFun);
16      List collect(List,collectFun);
17      int ListLength(List l);
18
19      #define push(a,l) ((l) = cons((a),(l)))
20      #define pop(l) (popIntern(&(l)))
21      #define nil ((List)NULL)
```

Section A                       APPENDIX / Page 15

Jan 15 18:39 1991 match.h

```
1     #ifdef OWNER
2     #define EXTERN
3     #else
4     #define EXTERN extern
5     #endif OWNER
6
7     EXTERN int debug;
8
9     typedef struct {
10      float cost;
11      int xptr;
12      int yptr;
13    } elt;
14
15    #define MAXSEQLENGTH 800
16
17    float DPDiffPair(OutlinePair one, OutlinePair two);
18    float matchvecs(float *Vec1, int lenVec1, float *Vec2, int lenVec2);
19    float sq_distance(float x1, float x2);
20    float best_score (elt *array[][MAXSEQLENGTH], int lenVec1, int lenVec2);
21    void print_best_path(elt *array[][MAXSEQLENGTH], int lenVec1, int lenVec2,
22                 char *pathFile);
23    void print_array_costs(elt *array[][MAXSEQLENGTH], int lenVec1, int lenVec2);
24    void print_array_dirs(elt *array[][MAXSEQLENGTH], int lenVec1, int lenVec2);
25
26    /*
27    #ifndef debug
28    #define debug FALSE
29    #endif
30    */
31    #ifndef horweight
32    #define horweight 1.5
33    #endif
34
35    #ifndef verweight
36    #define verweight 1.5
37    #endif
38
39    #ifndef diagweight
40    #define diagweight 1.0
41    #endif
```

Section A  APPENDIX / Page 16

Jan 15 18:47 1991 matchparallel.h

```
1       float pl_DPDiffPair(OutlinePair one, OutlinePair two, char *pathFile);
2       float pl_matchvecs(float *Vec1t, float *Vec1b, int lenVec1, float *Vec2t, float *Vec2b, int
lenVec2, char *pathFile);
3
4       float faster_pl_DPDiffPair(OutlinePair one, OutlinePair two, char *pathFile);
5       float faster_pl_matchvecs(float *Vec1t, float *Vec1b, int lenVec1, float *Vec2t, float *Vec2b,
int lenVec2, char *pathFile);
6
7       float simple_pl_DPDiffPair(OutlinePair one, OutlinePair two);
8       float simple_pl_matchvecs(float *Vec1t, float *Vec1b, int lenVec1, float *Vec2t, float
*Vec2b, int lenVec2);
```

Jul 9 16:01 1991 misc.h

```
1       /*
2        *
3        * misc.h - miscellaneous types and declarations
4        *
5        */
6
7       /* Some library routines that never seem to get declared */
8
9       /* Memory allocation functions */
10      extern void *malloc(unsigned size);
11      extern void *calloc(unsigned nelem, unsigned elsize);
12      extern void *realloc(void *p, unsigned size);
13      extern void free(void *p);
14
15      /* I don't feel like including setjmp.h */
16      /*
17      extern int _setjmp(jmp_buf env);
18      extern volatile void _longjmp(jmp_buf env, int val);
19      */
20
21      /* String-to-X functions */
22      extern int atoi(char *s);
23      extern double atof(char *s);
24
25      /* String functions */
26      extern int strcmp(char *s1, char *s2);
27      extern int strncmp(char *s1, char *s2, int n);
28      extern char *strcpy(char *d, char *s);
29      extern char *strncpy(char *d, char *s, int n);
30      int strlen(char *s);
31      extern char *strdup(char *);
32      extern char *strchr(char *s,char c);
33
34      /* stdio functions */
35      extern int fclose(FILE *stream);
36      extern int fread(char *ptr, int size, int nitems, FILE *stream);
37      extern int fwrite(char *ptr, int size, int nitems, FILE *stream);
38      /* these are necessary to avoid implicit declarations */
39      extern int _flsbuf();
40      extern int _filbuf();
41
42      /* Formatted I/O functions */
43      extern int printf(char *format, ...);
44      extern int scanf(char *format, ...);
45      extern int fprintf(FILE *stream, char *format, ...);
46      extern int fscanf(FILE *stream, char *format, ...);
47
48      /* and misc stuff */
49      extern volatile void exit(int val);
50
51      extern void perror(char *s);
52
```

Section A                                           APPENDIX / Page 18

Aug 1 02:59 1991 mylib.h

```
1       #include "error.h"
2       #include "boolean.h"
3       #include "lists.h"
4       #include "args.h"
5       #include "pict.h"
6       #include "read.h"
```

Section A   APPENDIX / Page 19

Aug 15 06:36 1991 newContour.h

```
1       void BoxToShell(Picture pict,Box box,List baseLinePoints,
2                   Dictionary dict,int dictEntry,NormalizationDescriptor *nd);
3       void BarBoxList(Picture pict,List boxList,List baseLinePoints,
4                   char *filename, char *infoString, NormalizationDescriptor *nd);
5
6
7
```

Section A                                                       APPENDIX / Page 20

Jul 31 17:11 1991 newMatch.h

```
1    extern float hillToValley;
2    extern float L2Compare(OutlinePair o1,OutlinePair o2,float topToBottom);
3    extern float NewMatch(float *a1,float *a2,int aLength,float *b1,float *b2,int bLength,
4       float centerWeight,BOOLEAN lengthNormalize,int normalBandWidth,
5       float topToBottom);
6    extern float SepMatch(float *a1,int aLength,float *b1,int bLength,
7       float centerWeight,BOOLEAN lengthNormalize,int normalBandWidth);
8    extern float NewMatchAndPath(float *a1,float *a2,int aLength,float *b1,float *b2,
9       int bLength,float centerWeight,BOOLEAN lengthNormalize,int normalBandWidth,
10      float topToBottom,FILE *fp);
11   extern float SlopeCMatch(float *a1,float *a2,int aLength,float *b1,float *b2,int bLength,
12      float centerWeight,BOOLEAN lengthNormalize,float topToBottom);
13   extern float SepSlopeCMatch(float *a1,int aLength,float *b1,int bLength,
14      float centerWeight,BOOLEAN lengthNormalize);
15   extern float SlopeCMatchAndPath(float *a1,float *a2,int aLength,float *b1,float *b2,
16      int bLength,float centerWeight,BOOLEAN lengthNormalize,float topToBottom,
17      FILE *pathFP);
```

Section A  APPENDIX / Page 21

Jan 11 17:00 1991 numbers.h

```
1    void DrawNumber(Picture pict, int x, int y, int color, float scale, int n);
2
```

Section A

APPENDIX / Page 22

Jan 14 16:52 1991 orient.h

```
1       BOOLEAN Coarse(Picture pict, int coarseSamples, int coarseDirections,
2               float *orientation, char *plotFile);
3
4       float Fine(Picture pict,int fineSamples, int fineDirections,
5               int coarseDirections, float coarseAngle, char *plotFile);
6
7       float NewFine(Picture pict,int fineSamples, int fineDirections,
8               float angleStart,float angleEnd, char *plotFile);
```

Section A   APPENDIX / Page 23

Aug 23 19:19 1991 pict.h

```
1    typedef unsigned char UCHAR;
2
3    #define ROUND8(x) ((x%8)?(x+8-x%8):x)
4    #define ROUND16(x) ((x%16)?(x+16-x%16):x)
5    #define ROUND2(x) ((x%2)?(x+1):x)
6
7    typedef int Color;
8    #define COLOR_RED 0
9    #define COLOR_GREEN 1
10   #define COLOR_BLUE 2
11
12   typedef struct cmapstruct {
13     int numberOfEntries;
14     UCHAR *red;
15     UCHAR *green;
16     UCHAR *blue;
17   } ColorMapBody, *ColorMap;
18
19   typedef struct pstruct {
20     int width;
21     int height;
22     int depth;
23     int uchar_width;
24     ColorMap cmap;
25     UCHAR *data;
26   } PictureBody, *Picture;
27
28   void doerror(char *string1,char *string2);
29
30
31   ColorMap NewColorMap(int size);
32   void FreeColorMap(ColorMap cmap);
33   UCHAR ReadColorValue(ColorMap cmap, Color primary,int index);
34   UCHAR WriteColorValue(ColorMap cmap, int index, UCHAR red, UCHAR green,
35                UCHAR blue);
36   Picture new_pict(int width,int height,int depth);
37   void free_pict(Picture pict);
38   Picture load_pict(char *filename);
39   Picture load_header(FILE *fp);
40   void write_pict(char *filename,Picture pict);
41   void write_header(FILE *fp, Picture pict);
42   /*int BytesPerScanline(Picture pict); */
43   #define BytesPerScanline(pict) (pict->uchar_width)
44
45   UCHAR ReadPixel(Picture pict,int x,int y);
46   void WritePixel(Picture pict,int x,int y,int color);
47   void WriteClippedPixel(Picture pict,int x,int y,int color);
48   void CopyPicture(Picture dest, Picture src);
49
```

Section A

APPENDIX / Page 24

Jul 26 13:09 1991 read.h

```
1    int ReadInt(FILE *fp);
2    int ReadFloat(FILE *fp);
3    char *ReadString(FILE *fp);
4
```

Section A  APPENDIX / Page 25

Aug 15 00:19 1991 types.h

```
1     typedef struct {
2       BOOLEAN noAscenderNormalize;
3       BOOLEAN noXHeightNormalize;
4     } NormalizationDescriptor;
5
6     typedef struct {
7       int x;
8       int y;
9       int width;
10      int height;
11      int pageX;
12      int pageY;
13      double angle;
14    } BoxBody, *Box;
15
16    typedef struct {
17      int x;
18      int y;
19    } PointBody,*Point;
20
21    Box MakeBox(int x,int y,int width,int height,double angle);
22    Point MakePoint(int x,int y);
```

Section B                                                                  APPENDIX / Page 26

Jul 26 13:25 1991  Makefile

```
1     CCFLAGS = -g -c -I/net/piglet/piglet-1c/hopcroft/new/include
2
3     INCLUDE = /net/piglet/piglet-1c/hopcroft/new/include/
4
5     ARGS = $(INCLUDE)args.h
6     BOOLEAN = $(INCLUDE)boolean.h
7     ERROR = $(INCLUDE)error.h
8     LISTS = $(INCLUDE)lists.h
9     MISC = $(INCLUDE)misc.h
10    PICT = $(INCLUDE)pict.h
11    READ = $(INCLUDE)read.h
12
13    OFUNS = args.o error.o pict.o lists.o read.o
14
15    mylib.a: $(OFUNS)
16         ld -r $(OFUNS) -o mylib.a
17
18    args.o:    args.c $(BOOLEAN) $(ERROR) $(MISC) $(ARGS)
19         gcc $(CCFLAGS) args.c
20
21    error.o:   error.c $(ERROR)
22         gcc $(CCFLAGS) error.c
23
24    pict.o:         pict.c $(BOOLEAN) $(ERROR) $(PICT)
25         gcc $(CCFLAGS) pict.c
26
27    lists.o:   lists.c $(BOOLEAN) $(LISTS)
28         gcc $(CCFLAGS) lists.c
29
30    read.o:         read.c $(MISC) $(READ)
31         gcc $(CCFLAGS) read.c
32
33
```

Section B

Jul 26 13:23 1991 args.c

```
1       #include <stdio.h>
2       #include <stdarg.h>
3       #include "error.h"
4       #include "boolean.h"
5       #include "misc.h"
6       #include "args.h"
7
8       #define MAX_NAME_LENGTH (50)
9       #define MAX_PARAMETERS (6)
10      #define MAX_OPTIONS (20)
11      #define MAX_ARGS (20)
12
13      typedef enum {INTEGER,FLOAT,STRING} ParamType;
14
15      typedef struct {
16        char *documentation;
17        int numberOfParameters;
18        ParamType types[MAX_PARAMETERS];
19        void *values[MAX_PARAMETERS];
20      } *Arg,ArgBody;
21
22      typedef struct {
23        char optionName[MAX_NAME_LENGTH+1];
24        char *documentation;
25        BOOLEAN *exists;
26        int numberOfParameters;
27        ParamType types[MAX_PARAMETERS];
28        void *values[MAX_PARAMETERS];
29      } *Option,OptionBody;
30
31      static BOOLEAN optionsRequired = TRUE;
32      static int numberOfArguments = 0;
33      static ArgBody args[MAX_ARGS];
34      static int numberOfOptions = 0;
35      static OptionBody options[MAX_OPTIONS];
36
37      void DefArg(char *format,char *documentation,...)
38      {
39        va_list ap;
40        char *p;
41        int i;
42        int parameterCounter;
43
44        if (numberOfArguments==MAX_ARGS)
45          DoError("Def Arg: too many command line options now:\"%s\".\n",format);
46
47        args[numberOfArguments].documentation = documentation;
48
49        /* now parse the format string */
50        /* get option parameters */
51        va_start(ap,documentation);
52        for (p=format,parameterCounter=0;*p;p++) {
```

Section B

APPENDIX / Page 28

```
53        if (*p= ='%') {
54          if (parameterCounter = = MAX_PARAMETERS)
55             DoError("Def Arg: too many parameters in \"%s\".\n",format);
56          p++;
57          switch (*p) {
58          case 'd':
59             args[numberOfArguments].types[parameterCounter] = INTEGER;
60             args[numberOfArguments].values[parameterCounter] = va_arg(ap, void *);
61             parameterCounter++;
62             break;
63          case 'f':
64             args[numberOfArguments].types[parameterCounter] = FLOAT;
65             args[numberOfArguments].values[parameterCounter] = va_arg(ap, void *);
66             parameterCounter++;
67             break;
68          case 's':
69             args[numberOfArguments].types[parameterCounter] = STRING;
70             args[numberOfArguments].values[parameterCounter] = va_arg(ap, void *);
71             parameterCounter++;
72             break;
73          default:
74             DoError("DefArg: bad option in \"%s\".\n",format);
75          }
76        }
77      }
78      args[numberOfArguments].numberOfParameters = parameterCounter;
79      ++numberOfArguments;
80      va_end(ap);
81    }
82
83    void DefOption(char *format,char *documentation,BOOLEAN *exists,...)
84    {
85      va_list ap;
86      char *optionName;
87      char *p;
88      int i;
89      int parameterCounter;
90
91      if (numberOfOptions= =MAX_OPTIONS)
92         DoError("DefOption: too many command line options now:\"%s\".\n",format);
93
94      /* record exists so that *exists will be TRUE if this option is scanned */
95      options[numberOfOptions].exists = exists;
96
97      options[numberOfOptions].documentation = documentation;
98
99      /* now parse the format string */
100     p=format;
101     /* skip leading spaces */
102     while (*p= ='' && *p! ='\0')
103        p++;
104
105     /* get the option name */
106     optionName = options[numberOfOptions].optionName;
107     i=0;
```

```
108      while (*p != '\0' && *p != ' ' && *p != '\t') {
109       if (i<MAX_NAME_LENGTH)
110         optionName[i++] = *p;
111       else
112         DoError("DefOptions: option name too long in \"%s\".\n",format);
113       p++;
114      }
115      optionName[i] = '\0';
116
117      /* get option parameters */
118      va_start(ap,exists);
119      for (parameterCounter=0;*p;p++) {
120       if (*p=='%') {
121        if (parameterCounter == MAX_PARAMETERS)
122           DoError("DefOptions: too many parameters in \"%s\".\n",format);
123        p++;
124        switch (*p) {
125        case 'd':
126           options[numberOfOptions].types[parameterCounter] = INTEGER;
127          options[numberOfOptions].values[parameterCounter] = va_arg(ap, void *);
128           parameterCounter++;
129           break;
130        case 'f':
131           options[numberOfOptions].types[parameterCounter] = FLOAT;
132          options[numberOfOptions].values[parameterCounter] = va_arg(ap, void *);
133           parameterCounter++;
134           break;
135        case 's':
136           options[numberOfOptions].types[parameterCounter] = STRING;
137          options[numberOfOptions].values[parameterCounter] = va_arg(ap, void *);
138           parameterCounter++;
139           break;
140        default:
141           DoError("DefOptions: bad option in \"%s\".\n",format);
142        }
143       }
144      }
145      options[numberOfOptions].numberOfParameters = parameterCounter;
146      ++numberOfOptions;
147      va_end(ap);
148     }
149
150     void PrintHelp(char *name)
151     {
152      int i;
153      fprintf(stderr,"Usage:\n %s\n",name);
154      for (i=0;i<numberOfArguments;++i)
155       fprintf(stderr,"  %s\n",args[i].documentation);
156      for (i=0;i<numberOfOptions;++i)
157       fprintf(stderr,"  [%s]\n",options[i].documentation);
158      DoError("\n",NULL);
159     }
160
161     void ScanArgs(int argc,char **argv)
162     {
```

Section B

```
163     int i,j,k;
164
165     for (j=0;j<numberOfOptions;++j)
166      *(options[j].exists) = FALSE;
167
168     if (argc == 1 && optionsRequired)
169      PrintHelp(argv[0]);
170
171     i=1;
172     for (j=0;j<numberOfArguments;++j) {
173      if (i+args[j].numberOfParameters > argc) {
174       fprintf(stderr,"Required argument expects %d parameters:\n %s\n",
175               args[j].numberOfParameters,
176               args[j].documentation);
177      DoError("\n",NULL);
178      }
179      for (k=0;k<args[j].numberOfParameters;++k)
180       switch (args[j].types[k]) {
181       case INTEGER:
182          *(int *)(args[j].values[k]) = atoi(argv[i++]);
183          break;
184       case FLOAT:
185          *(float *)(args[j].values[k]) = atof(argv[i++]);
186          break;
187       case STRING:
188          *(char **)(args[j].values[k]) = argv[i++];
189          break;
190       default:
191          DoError("ScanArgs: internal error - bad type.\n",NULL);
192      }
193     }
194
195     while (i<argc) {
196      for (j=0;j<numberOfOptions;++j)
197       if (!strcmp(options[j].optionName,argv[i])) {
198          if (i+options[j].numberOfParameters >= argc) {
199           fprintf(stderr,"Option %s expects %d parameters:\n %s\n",
200                   options[j].optionName,
201                   options[j].numberOfParameters,
202                   options[j].documentation);
203          DoError("\n",NULL);
204          }
205          *(options[j].exists) = TRUE;
206          ++i;
207          for (k=0;k<options[j].numberOfParameters;++k)
208           switch (options[j].types[k]) {
209           case INTEGER:
210             *(int *)(options[j].values[k]) = atoi(argv[i++]);
211             break;
212           case FLOAT:
213             *(float *)(options[j].values[k]) = atof(argv[i++]);
214             break;
215           case STRING:
216             *(char **)(options[j].values[k]) = argv[i++];
217             break;
```

Section B                                APPENDIX / Page 31

```
218            default:
219              DoError("ScanArgs: internal error - bad type.\n",NULL);
220            }
221            break;
222        }
223        if (j = = numberOfOptions) {
224          fprintf(stderr,"Bad command line argument.\n");
225          PrintHelp(argv[0]);
226        }
227      }
228    }
229    #ifdef foo
230    void main (int argc,char **argv)
231    {
232      int i;
233      float f;
234      char *s;
235      BOOLEAN haveAString,haveAnInt,haveAFloat,haveAPair;
236
237      DefArg("%s","filename",&s);
238      DefOption("-int %d","-int <int> ",&haveAnInt,&i);
239      DefOption("-float %f","-float <float> ",&haveAFloat,&f);
240      DefOption("-pair %f %d","-pair <float> <int> ",&haveAPair,&f,&i);
241
242      ScanArgs(argc,argv);
243
244      printf("%s\n",s);
245      if (haveAPair)
246        printf("%f %d\n",f,i);
247      if (haveAnInt)
248        printf("%d\n",i);
249      if (haveAFloat)
250        printf("%f\n",f);
251      if (haveAString)
252        printf("%s\n",s);
253    }
254    #endif
```

Section B

APPENDIX / Page 32

Jul 26 12:57 1991 error.c

```
1    #include <stdio.h>
2    #include "error.h"
3
4    void DoError(char *string1,char *string2)
5    {
6     if (string2 == NULL)
7       printf(string1);
8     else
9       printf(string1,string2);
10    exit(-1);
11   }
12
```

Section B

APPENDIX / Page 33

Jul 26 12:57 1991 lists.c

```
1      #include "stdio.h"
2      #include "boolean.h"
3      #include "lists.h"
4
5      List cdr(List l)
6      {
7       if (l == NULL)
8         return l;
9       else
10        return l->cdr;
11     }
12
13     void *car(List l)
14     {
15      if (l == NULL)
16        return l;
17      else
18        return l->car;
19     }
20
21     void *popIntern(List *l)
22     {
23      List temp;
24      if (*l == NULL)
25        return *l;
26      else {
27       temp = (*l)->car;
28       *l = (*l)->cdr;
29       return temp;
30      }
31     }
32
33     BOOLEAN endp(List l)
34     {
35      return (l == NULL);
36     }
37
38     List cons(void *theCar,List theCdr)
39     {
40      cell temp;
41      temp = (cell)calloc(1,sizeof(cellBody));
42      if (temp == NULL) {
43        printf("Cons: out of memory\n");
44        exit(-1);
45      }
46      temp->car = theCar;
47      temp->cdr = theCdr;
48      return temp;
49     }
50
51     void map(List l,mapFun f)
52     {
```

Section B

APPENDIX / Page 34

```
53      while (l != NULL) {
54       (*f)(l->car);
55       l = l->cdr;
56      }
57     }
58
59     List collect(List l,collectFun c)
60     {
61      List temp;
62      while (l!=NULL) {
63       (*c)(l->car);
64       temp = l;
65       l = l->cdr;
66       free(temp);
67      }
68     }
69
70     int ListLength(List l)
71     {
72      int count=0;
73      while (l != NULL) {
74       ++count;
75       l = l->cdr;
76      }
77      return count;
78     }
```

Section B

Aug 23 19:20 1991 pict.c

```c
1       #include <stdio.h>
2       #include <math.h>
3       #include <rasterfile.h>
4       #include "boolean.h"
5       #include "error.h"
6       #include "pict.h"
7
8       static UCHAR bitmasks[] = { 0x80,0x40,0x20,0x10,0x8,0x4,0x2,0x1 };
9
10      ColorMap NewColorMap(int size)
11      {
12       ColorMap cmap;
13       if (size > 256)
14         DoError("NewColorMap: size greater than 256.",NULL);
15       if (size < 1)
16         DoError("NewColorMap: size less than 1.",NULL);
17       if ((cmap = (ColorMap)calloc(1,sizeof(ColorMapBody))) == NULL)
18         DoError("NewColorMap: cannot allocate space.",NULL);
19       cmap->numberOfEntries = size;
20       cmap->red = (UCHAR *)calloc(size,sizeof(UCHAR));
21       cmap->green = (UCHAR *)calloc(size,sizeof(UCHAR));
22       cmap->blue = (UCHAR *)calloc(size,sizeof(UCHAR));
23       if ((cmap->red == NULL)||(cmap->green == NULL)||(cmap->blue == NULL))
24         DoError("NewColorMap: cannot allocate space.",NULL);
25       return cmap;
26      }
27
28      void FreeColorMap(ColorMap cmap)
29      {
30       if (cmap != NULL) {
31        if (cmap->red != NULL)
32          free(cmap->red);
33        if (cmap->green != NULL)
34          free(cmap->green);
35        if (cmap->blue != NULL)
36          free(cmap->blue);
37        free(cmap);
38       }
39      }
40
41      UCHAR ReadColorValue(ColorMap cmap, Color primary, int index)
42      {
43       if (index > cmap->numberOfEntries)
44         DoError("ReadColorValue: index too big.",NULL);
45       if (primary = COLOR_RED)
46         return *(cmap->red+index);
47       if (primary = COLOR_GREEN)
48         return *(cmap->green+index);
49       if (primary = COLOR_BLUE)
50         return *(cmap->blue+index);
51       DoError("ReadColorValue: bad primary color.",NULL);
52      }
```

Section B

APPENDIX / Page 36

```
53
54      UCHAR WriteColorValue(ColorMap cmap, int index, UCHAR red, UCHAR green,
55                  UCHAR blue)
56      {
57       if (index > cmap->numberOfEntries)
58         DoError("WriteColorValue: index too big.",NULL);
59       *(cmap->red+index)=red;
60       *(cmap->green+index)=green;
61       *(cmap->blue+index)=blue;
62      }
63
64      Picture new_pict(width,height,depth)
65      int width,height,depth;
66      {
67       Picture pict;
68       int uchar_width;
69
70       if ((pict = (Picture)calloc(1,sizeof(PictureBody))) == NULL)
71         DoError("new_pict: cannot allocate space",NULL);
72       pict->width = width;
73       pict->height = height;
74       pict->depth = depth;
75       pict->cmap = NULL;
76       if (pict->depth == 32)
77        uchar_width = pict->width*4;
78       else if (pict->depth == 8)
79        uchar_width = ROUND2(pict->width);
80       else if (pict->depth == 1)
81        uchar_width = ROUND16(pict->width) >> 3;
82       else
83         DoError("new_pict: only depths of 1 and 8 are supported\n",NULL);
84       pict->uchar_width = uchar_width;
85
86       pict->data = (UCHAR *) calloc(uchar_width * pict->height , sizeof(UCHAR));
87       if (pict->data == NULL)
88         DoError("new_pict: cannot allocate space\n",NULL);
89       return pict;
90      }
91
92      void free_pict(pict)
93      Picture pict;
94      {
95       if (pict->data != NULL)
96         free(pict->data);
97       FreeColorMap(pict->cmap);
98       free(pict);
99      }
100
101     Picture load_pict(fn)
102     char *fn;
103     {
104      FILE *fp;
105      Picture pict;
106      int uchar_width;
107      struct rasterfile header;
```

Section B  APPENDIX / Page 37

```
108
109        if ((pict = (Picture)calloc(1,sizeof(PictureBody))) = = NULL)
110          DoError("load_pict: cannot allocate space",NULL);
111
112        if ((fp = fopen(fn, "r")) = = NULL)
113          DoError("load_pict: error opening input file %s\n",fn);
114
115       /* WARNING - this fread is VERY unsafe!  If assumes that the C compiler
116        * puts all fields of a structure adjacent. This is not always the case.
117        * It appears that it works with gcc on a sparcstation, but may not work
118        * on other systems. */
119        fread(&header,sizeof(struct rasterfile),1,fp);
120        if (header.ras_magic != RAS_MAGIC)
121          DoError("load_pict: only supports rasterfile format\n",NULL);
122        if ((header.ras_type != RT_STANDARD)||
123           (header.ras_maptype != RMT_NONE) ||
124           (header.ras_maplength != 0))
125          DoError("load_pict: unsupported rasterfile format\n",NULL);
126
127        pict->width = header.ras_width;
128        pict->height = header.ras_height;
129        pict->depth = header.ras_depth;
130
131        if (pict->depth = = 32)
132          uchar_width = pict->width * 4;
133        else if (pict->depth = = 8)
134          uchar_width = ROUND2(pict->width);
135        else if (pict->depth = = 1)
136          uchar_width = ROUND16(pict->width) >> 3;
137        else
138          DoError("load_pict: only depths of 1, 8, and 32 are supported\n",NULL);
139        pict->uchar_width = uchar_width;
140
141        pict->data = (UCHAR *) calloc(uchar_width * pict->height , sizeof(UCHAR));
142        if (pict->data = = NULL)
143          DoError("load_pict: cannot allocate space\n",NULL);
144
145        fread(pict->data, sizeof(UCHAR), uchar_width*pict->height, fp);
146        fclose(fp);
147        return pict;
148        }
149
150      Picture load_header(FILE *fp)
151      {
152        Picture pict;
153        int uchar_width;
154        struct rasterfile header;
155
156        if ((pict = (Picture)calloc(1,sizeof(PictureBody))) = = NULL)
157          DoError("load_header: cannot allocate space",NULL);
158
159       /* WARNING - this fread is VERY unsafe!  If assumes that the C compiler
160        * puts all fields of a structure adjacent. This is not always the case.
161        * It appears that it works with gcc on a sparcstation, but may not work
162        * on other systems. */
```

Section B

APPENDIX / Page 38

```
163        if (fread(&header,sizeof(struct rasterfile),1,fp) != 1)
164          DoError("load_header: error reading header",NULL);
165        if (header.ras_magic != RAS_MAGIC)
166          DoError("load_pict: only supports rasterfile format\n",NULL);
167        if ((header.ras_type != RT_STANDARD)||
168           (header.ras_maptype != RMT_NONE) ||
169           (header.ras_maplength != 0))
170          DoError("load_pict: unsupported rasterfile format\n",NULL);
171
172        pict->width = header.ras_width;
173        pict->height = header.ras_height;
174        pict->depth = header.ras_depth;
175
176        if (pict->depth == 32)
177          uchar_width = pict->width * 4;
178        else if (pict->depth == 8)
179          uchar_width = ROUND2(pict->width);
180        else if (pict->depth == 1)
181          uchar_width = ROUND16(pict->width) >> 3;
182        else
183          DoError("load_header: only depths of 1, 8, and 32 are supported\n",NULL);
184        pict->uchar_width = uchar_width;
185        pict->data = NULL;
186
187        return pict;
188      }
189
190      void write_pict(fn, pict)
191      char *fn;
192      Picture pict;
193      {
194        FILE *fp;
195        int uchar_width;
196        struct rasterfile header;
197
198        if ((fp = fopen(fn, "w")) == NULL)
199          DoError("write_pict: error opening output file %s\n",fn);
200
201        header.ras_magic = RAS_MAGIC;
202        header.ras_width = pict->width;
203        header.ras_height = pict->height;
204        header.ras_depth = pict->depth;
205        header.ras_length = pict->uchar_width*pict->height;
206        header.ras_type = RT_STANDARD;
207        if (pict->cmap == NULL) {
208          header.ras_maptype = RMT_NONE;
209          header.ras_maplength = 0;
210      /* WARNING - this fwrite is VERY unsafe! If assumes that the C compiler
211       * puts all fields of a structure adjacent. This is not always the case.
212       * It appears that it works with gcc on a sparcstation, but may not work
213       * on other systems. */
214          if (fwrite(&header,sizeof(struct rasterfile),1,fp) != 1)
215            DoError("write_pict: error writing header",NULL);
216        }
217        else {
```

Section B                                        APPENDIX / Page 39

```
218       header.ras_maptype = RMT_EQUAL_RGB;
219       header.ras_maplength = pict->cmap->numberOfEntries*3;
220    /* WARNING - this fwrite is VERY unsafe! If assumes that the C compiler
221     * puts all fields of a structure adjacent. This is not always the case.
222     * It appears that it works with gcc on a sparcstation, but may not work
223     * on other systems. */
224       if (fwrite(&header,sizeof(struct rasterfile),1,fp) != 1)
225         DoError("write_pict: error writing header",NULL);
226       fwrite(pict->cmap->red,sizeof(UCHAR),pict->cmap->numberOfEntries,fp);
227       fwrite(pict->cmap->green,sizeof(UCHAR),pict->cmap->numberOfEntries,fp);
228       fwrite(pict->cmap->blue,sizeof(UCHAR),pict->cmap->numberOfEntries,fp);
229     }
230
231    uchar_width = pict->uchar_width;
232    fwrite(pict->data, sizeof(UCHAR), uchar_width*pict->height, fp);
233    fclose(fp);
234   }
235
236   void write_header(FILE *fp, Picture pict)
237   {
238    struct rasterfile header;
239
240    header.ras_magic = RAS_MAGIC;
241    header.ras_width = pict->width;
242    header.ras_height = pict->height;
243    header.ras_depth = pict->depth;
244    header.ras_length = pict->uchar_width*pict->height;
245    header.ras_type = RT_STANDARD;
246    header.ras_maptype = RMT_NONE;
247    header.ras_maplength = 0;
248    /* WARNING - this fwrite is VERY unsafe! If assumes that the C compiler
249     * puts all fields of a structure adjacent. This is not always the case.
250     * It appears that it works with gcc on a sparcstation, but may not work
251     * on other systems. */
252    fwrite(&header,sizeof(struct rasterfile),1,fp);
253   }
254
255   #define BytesPerScanline(pict) (pict->uchar_width)
256
257   UCHAR ReadPixel(pict,x,y)
258   Picture pict;
259   int x,y;
260   {
261    if (pict->depth == 8)
262      return *(pict->data+y*BytesPerScanline(pict)+x);
263    else if (pict->depth == 1)
264      return ((*(pict->data+y*BytesPerScanline(pict)+(x>>3))) &
265             bitmasks[x%8])?1:0;
266    else
267      DoError("ReadPixel: only depths of 1 and 8 are supported\n",NULL);
268   }
269
270   void WritePixel(pict,x,y,color)
271   Picture pict;
272   int x,y;
```

Section B                                                           APPENDIX / Page 40

```
273    UCHAR color;
274    {
275     if (x<0||x>=pict->width||y<0||y>=pict->height) {
276      char s[256];
277      sprintf(s,"%d %d",x,y);
278      DoError("WritePixel: Out of bounds: ",s);
279     }
280     if (pict->depth == 8)
281      *(pict->data+y*pict->uchar_width+x) = color;
282     else if (pict->depth == 1)
283      if (color)
284       *(pict->data+y*BytesPerScanline(pict)+(x>>3)) |= bitmasks[x%8];
285      else
286       *(pict->data+y*BytesPerScanline(pict)+(x>>3)) &= ~bitmasks[x%8];
287     else
288      DoError("WritePixel: only depths of 1 and 8 are supported\n",NULL);
289    }
290
291    void WriteClippedPixel(pict,x,y,color)
292    Picture pict;
293    int x,y;
294    UCHAR color;
295    {
296     if (x<0||x>=pict->width||y<0||y>=pict->height) {
297      return;
298     }
299     if (pict->depth == 8)
300      *(pict->data+y*pict->uchar_width+x) = color;
301     else if (pict->depth == 1)
302      if (color)
303       *(pict->data+y*BytesPerScanline(pict)+(x>>3)) |= bitmasks[x%8];
304      else
305       *(pict->data+y*BytesPerScanline(pict)+(x>>3)) &= ~bitmasks[x%8];
306     else
307      DoError("WritePixel: only depths of 1 and 8 are supported\n",NULL);
308    }
309
310    void CopyPicture(Picture dest, Picture src)
311    {
312     int uchar_width;
313     dest->width = src->width;
314     dest->height = src->height;
315     dest->depth = src->depth;
316     dest->uchar_width = BytesPerScanline(src);
317     uchar_width = BytesPerScanline(src);
318     memcpy(dest->data,src->data,uchar_width*src->height);
319    }
```

Section B                             APPENDIX / Page 41

Jul 26 13:15 1991 read.c

```
1       #include <stdio.h>
2       #include "misc.h"
3       #include "read.h"
4
5       #define MAX_STRING_LEN (255)
6
7       int ReadInt(FILE *fp)
8       {
9        char s[MAX_STRING_LEN];
10       int x;
11
12       fgets(s,MAX_STRING_LEN,fp);
13       while (sscanf(s,"%d",&x)!=1)
14        fprintf(stderr,"ReadInt: integer expected - reenter.\n");
15       return x;
16      }
17
18      int ReadFloat(FILE *fp)
19      {
20       char s[MAX_STRING_LEN];
21       float x;
22
23       fgets(s,MAX_STRING_LEN,fp);
24       while (sscanf(s,"%f",&x)!=1)
25        fprintf(stderr,"ReadFloat: integer expected - reenter.\n");
26       return x;
27      }
28
29      char *ReadString(FILE *fp)
30      {
31       char s[MAX_STRING_LEN];
32       char *endPtr;
33
34       fgets(s,MAX_STRING_LEN,fp);
35       endPtr = strchr(s,'\n');
36       if (endPtr != NULL)
37        *endPtr = '\0';
38       return strdup(s);
39      }
40
```

Section C

Aug 13 00:13 1991 Makefile

```
1    CCFLAGS = -g -c -I/net/piglet/piglet-1c/hopcroft/new/include
2
3    EXTRNS = /net/piglet/piglet-1c/hopcroft/error/error.o\
4    /net/piglet/piglet-1c/hopcroft/new/pict/pict.o \
5    /net/piglet/piglet-1c/hopcroft/lists/lists.o
6
7    ARGS_MODULE = /net/piglet/piglet-1c/hopcroft/new/ScanArgs/args.o
8
9    SOURCES = Makefile diff2.c dmain.c l2Norm2.c match.c matchparallel.c single.c
10   EXTRNSOURCES = /net/piglet/piglet-1c/hopcroft/error/error.c \
11   /net/piglet/piglet-1c/hopcroft/new/pict/pict.c \
12   /net/piglet/piglet-1c/hopcroft/lists/lists.c
13
14
15   INCLUDE = /net/piglet/piglet-1c/hopcroft/new/include/
16   ARGS = $(INCLUDE)args.h
17   BASELINES = $(INCLUDE)baselines.h
18   BLOBIFY = $(INCLUDE)blobify.h
19   BOOLEAN = $(INCLUDE)boolean.h
20   BOXES = $(INCLUDE)boxes.h
21   CONTOUR = $(INCLUDE)newContour.h
22   DESCRIPTORS = $(INCLUDE)descriptors.h
23   DICT = $(INCLUDE)dict.h
24   DIFF = $(INCLUDE)diff.h
25   DIFF2 = $(INCLUDE)diff2.h
26   ERROR = $(INCLUDE)error.h
27   LINES = $(INCLUDE)lines.h
28   LISTS = $(INCLUDE)lists.h
29   MATCH = $(INCLUDE)match.h
30   MATCHPARALLEL = $(INCLUDE)matchparallel.h
31   MISC = $(INCLUDE)misc.h
32   MYLIB = $(INCLUDE)mylib.h
33   NEWMATCH = $(INCLUDE)newMatch.h
34   ORIENT = $(INCLUDE)orient.h
35   PICT = $(INCLUDE)pict.h
36   READ = $(INCLUDE)read.h
37   TYPES = $(INCLUDE)types.h
38
39   INCSOURCES = $(BASELINES) $(BLOBIFY) $(BOOLEAN) $(BOXES) $(CONTOUR) \
40   $(DICT) $(DIFF) $(DIFF2) $(LINES) $(LISTS) $(MATCH) $(MATCHPARALLEL) \
41   $(ORIENT) $(PICT) $(TYPES)
42
43   anomalies:  anomalies.o diff2.o newMatch.o ../main/dict.o
44        gcc anomalies.o diff2.o newMatch.o ../main/dict.o $(EXTRNS) -lm -o $@
45
46   descriptors:  descMain.o descriptors.o diff2.o newMatch.o newL2.o ../main/dict.o
47        gcc descMain.o descriptors.o diff2.o newMatch.o newL2.o ../main/dict.o ../lib/mylib.a -lm -o $@
48
49   drawBlobs:  drawBlobs.o ../main/dict.o
50        gcc drawBlobs.o ../main/dict.o ../lib/mylib.a -lm -o $@
```

Section C APPENDIX / Page 43

```
51
52      compare:    diff2.o dmain.o newMatch.o ../main/dict.o
53              gcc dmain.o diff2.o newMatch.o ../main/dict.o \
54      $(EXTRNS) -lm -o $@
55
56      equiv: equiv.o descriptors.o diff2.o newMatch.o newL2.o ../main/dict.o
57              gcc equiv.o descriptors.o diff2.o newMatch.o newL2.o ../main/dict.o ../lib/mylib.a -lm
                -o $@
58
59      extract:    extract.o ../main/dict.o
60              gcc extract.o ../main/dict.o $(EXTRNS) -o $@
61
62      l2Norm:         l2Norm2.o ../main/dict.o
63              gcc l2Norm2.o ../main/dict.o $(EXTRNS) -lm -o $@
64
65      recogDesc:  recogDesc.o ../main/dict.o diff2.o newMatch.o newL2.o
66              gcc recogDesc.o ../main/dict.o diff2.o newMatch.o newL2.o ../lib/mylib.a -lm -o $@
67
68      resample:   resample.o ../main/dict.o
69              gcc resample.o ../main/dict.o $(EXTRNS) -lm -o $@
70
71      single:         single.o newMatch.o diff2.o newL2.o ../main/dict.o
72              gcc single.o newMatch.o diff2.o newL2.o ../main/dict.o ../lib/mylib.a -lm -o $@
73
74      sortMatrix: sortMatrix.o
75              gcc sortMatrix.o $(EXTRNS) -o $@
76
77      printAll:   printIncludes printExtrns printCode
78
79      printCode:  $(SOURCES)
80              /usr/5bin/pr -n3 $(SOURCES) | lpr -PWeeklyWorldNews
81
82      printExtrns: $(EXTRNSOURCES)
83              /usr/5bin/pr -n3 $(EXTRNSOURCES) | lpr -PWeeklyWorldNews
84
85      printIncludes:  $(INCSOURCES)
86              /usr/5bin/pr -n3 $(INCSOURCES) | lpr -PWeeklyWorldNews
87
88      anomalies.o:    anomalies.c $(ERROR) $(TYPES) $(PICT) $(DICT) $(DIFF) $(MISC)
89              gcc $(CCFLAGS) anomalies.c
90
91      descriptors.o:  descriptors.c $(MYLIB) $(TYPES) $(DICT) $(DIFF) $(MISC) $(DESCRIPTORS)
92              gcc $(CCFLAGS) descriptors.c
93
94      descMain.o: descMain.c $(MYLIB) $(TYPES) $(DICT) $(DIFF) $(DESCRIPTORS)
95              gcc $(CCFLAGS) descMain.c
96
97      diff2.o: diff2.c $(BOOLEAN) $(TYPES) $(PICT) $(DIFF2) $(NEWMATCH)
98              gcc $(CCFLAGS) diff2.c
99
100     dmain.o: dmain.c $(BOOLEAN) $(PICT) $(DIFF)
101             gcc $(CCFLAGS) dmain.c
102
103     drawBlobs.o:    drawBlobs.c $(MYLIB) $(TYPES) $(DICT)
104             gcc $(CCFLAGS) drawBlobs.c
```

Section C                                                               APPENDIX / Page 44

```
105
106     equiv.o:    equiv.c $(MYLIB) $(TYPES) $(DICT) $(DIFF) $(DESCRIPTORS)
107         gcc $(CCFLAGS) equiv.c
108
109     extract.o:  extract.c $(BOOLEAN) $(TYPES) $(DICT)
110         gcc $(CCFLAGS) extract.c
111
112     l2Norm2.o:  l2Norm2.c $(BOOLEAN) $(TYPES) $(ERROR) $(DICT)
113         gcc $(CCFLAGS) l2Norm2.c
114
115     match.o: match.c $(BOOLEAN) $(TYPES) $(PICT) $(DIFF2) $(MATCH) $(MATCHPARALLEL)
116         gcc $(CCFLAGS) match.c
117
118     matchparallel.o: matchparallel.c $(BOOLEAN) $(TYPES) $(PICT) $(DIFF2) \
119         $(MATCH) $(MATCHPARALLEL)
120         gcc $(CCFLAGS) matchparallel.c
121
122     newL2.o:    newL2.c $(BOOLEAN) $(ERROR) $(TYPES) $(DICT)
123         gcc $(CCFLAGS) newL2.c
124
125     newMatch.o: newMatch.c $(ERROR) $(MISC) $(NEWMATCH) $(DICT) $(TYPES)
126         gcc $(CCFLAGS) newMatch.c
127
128     recogDesc.o:    recogDesc.c $(MYLIB) $(TYPES) $(DICT) $(DIFF)
129         gcc $(CCFLAGS) recogDesc.c
130
131     resample.o: resample.c $(BOOLEAN) $(TYPES) $(ERROR) $(DICT)
132         gcc $(CCFLAGS) resample.c
133
134     single.o:   single.c $(MYLIB) $(TYPES) $(DICT) $(DIFF) $(DIFF2) $(MATCH)
                    $(MATCHPARALLEL)
135         gcc $(CCFLAGS) single.c
136
137     sortMatrix.o:   sortMatrix.c $(ERROR) $(PICT)
138         gcc $(CCFLAGS) sortMatrix.c
```

Section C

Jul 9 19:36 1991 anomalies.c

```c
1       #include <stdio.h>
2       #include "error.h"
3       #include "types.h"
4       #include "pict.h"
5       #include "dict.h"
6       #include "diff.h"
7       #include "misc.h"
8
9       #define MAX_STRING_LEN (100)
10      #define MAX_DICTIONARIES (15)
11      #define MAX_WORDS (100)
12      #define MAX_ENTRIES (MAX_WORDS*MAX_WORDS)
13
14      typedef struct {
15       float score;
16       int x;
17       int y;
18      } *CompareTuple,CompareTupleBody;
19
20
21      int ReadInt(FILE *fp)
22      {
23       char s[MAX_STRING_LEN];
24       int x;
25
26       fgets(s,MAX_STRING_LEN,fp);
27       while (sscanf(s,"%d",&x)!=1)
28        fprintf(stderr,"ReadInt: integer expected - reenter.\n");
29       return x;
30      }
31
32      char *ReadString(FILE *fp)
33      {
34       char s[MAX_STRING_LEN];
35       char *endPtr;
36
37       fgets(s,MAX_STRING_LEN,fp);
38       endPtr = strchr(s,'\n');
39       if (endPtr != NULL)
40        *endPtr = '\0';
41       return strdup(s);
42      }
43
44      int TupleLessThan(CompareTuple *x,CompareTuple *y)
45      {
46       if ((*x)->score == (*y)->score)
47        return 0;
48       else if ((*x)->score < (*y)->score)
49        return -1;
50       else
51        return 1;
52      }
```

Section C

```
53
54    int CountAnomalies(Dictionary d1, Dictionary d2,char *dName1,char *dName2,char
      **words,FILE *outfp)
55    {
56      CompareTupleBody scoreBodies[MAX_ENTRIES];
57      CompareTuple scores[MAX_ENTRIES];
58      Picture pict;
59      int x,y,i,j;
60      int anomalies;
61
62      pict = CompareDictionaries(d1,d2);
63
64      for (y=0,i=0;y<pict->height;++y)
65       for (x=0;x<pict->width;++x) {
66         CompareTuple temp;
67   /*    temp = (CompareTuple)calloc(1,sizeof(CompareTupleBody));
68         if (temp==NULL)
69            DoError("%s: cannot allocate space.\n",argv[0]);
70   */
71         temp = scoreBodies+i;
72         temp->score = *((float *)(pict->data)+x+y*pict->width);
73         temp->x = x;
74         temp->y = y;
75         scores[i] = temp;
76         ++i;
77       }
78      qsort(scores,i,sizeof(CompareTuple),TupleLessThan);
79      for (j=0,anomalies=0;j<d1->numberOfEntries;++j)
80       if (scores[j]->x != scores[j]->y) {
81         fprintf(outfp,"%s:%s  %s:%s\n",dName1,words[scores[j]->x],
82                    dName2,words[scores[j]->y]);
83         ++anomalies;
84       }
85
86      free_pict(pict);
87      return anomalies;
88    }
89
90    void main(int argc,char **argv)
91    {
92      char *outFile, *listFile;
93      int numberOfDictionaries;
94      Dictionary dictionaries[MAX_DICTIONARIES];
95      char *names[MAX_DICTIONARIES];
96      char *words[MAX_WORDS];
97      int numberOfWords;
98      FILE *listfp,*outfp;
99      int anomalies[MAX_DICTIONARIES][MAX_DICTIONARIES];
100     int i,x,y;
101
102     if (argc != 3)
103       DoError("Usage: %s listfile outfile.\n",argv[0]);
104     listFile = argv[1];
105     outFile = argv[2];
106
```

Section C

```
107       if ((listfp = fopen(listFile,"r")) = = NULL)
108         DoError("Error opening file %s.\n",listFile);
109
110       /* Read in the number of words in each dictionary */
111        numberOfWords = ReadInt(listfp);
112        if (numberOfWords > MAX_WORDS)
113          DoError("%s: too many words.\n",argv[0]);
114
115       /* Read in the words */
116        for (i=0;i<numberOfWords; + + i) {
117          words[i] = ReadString(listfp);
118        }
119
120       /* Read in the number of dictionaries */
121        numberOfDictionaries = ReadInt(listfp);
122        if (numberOfDictionaries > MAX_DICTIONARIES)
123          DoError("%s: too many dicitionaries.\n",argv[0]);
124
125       /* Read in the dictionaries and their names */
126        for (i=0;i<numberOfDictionaries; + + i) {
127          names[i] = ReadString(listfp);
128          dictionaries[i] = ReadDictionary(names[i]);
129        }
130
131       /* Check to see that all dictionaries have the same number of shapes as the specified number
          of words. */
132        for (i=1;i<numberOfDictionaries; + + i)
133          if (dictionaries[i]->numberOfEntries != numberOfWords)
134            DoError("Dictionary %s has wrong number of entries.\n",names[i]);
135
136       /* Write the results */
137        if ((outfp = fopen(outFile,"w")) = = NULL)
138          DoError("Error opening %s for output.\n",outFile);
139        fprintf(outfp,"Words:\n");
140        for (i=0;i<numberOfWords; + + i)
141         fprintf(outfp,"%d: %s\n",i,words[i]);
142        fprintf(outfp,"\n");
143        fprintf(outfp,"Dictionaries:\n");
144        for (i=0;i<numberOfDictionaries; + + i)
145         fprintf(outfp,"%d: %s\n",i,names[i]);
146        fprintf(outfp,"\n");
147
148       /* Fill in the anomaly counts */
149        for (y=0;y<numberOfDictionaries; + + y)
150         for (x=0;x<numberOfDictionaries; + + x) {
151           anomalies[y][x] =
          CountAnomalies(dictionaries[y],dictionaries[x],names[y],names[x],words,outfp);
152            printf("(%d,%d): %d\n",x,y,anomalies[y][x]);
153         }
154
155        fprintf(outfp,"\n\n");
156        fprintf(outfp,"     ");
157        for (x = 0; x < numberOfDictionaries; x++)
158         fprintf(outfp,"%7d ", x);
159        fprintf(outfp, "\n");
```

Section C

APPENDIX / Page 48

```
160      for (y=0;y<numberOfDictionaries;++y) {
161        fprintf(outfp, " %3d ",y);
162        for (x=0;x<numberOfDictionaries;++x)
163          fprintf(outfp,"%7d ",anomalies[y][x]);
164        fprintf(outfp, "\n");
165      }
166      fclose(outfp);
167
168    }
```

Section C

APPENDIX / Page 49

Jul 31 17:14 1991 descMain.c

```c
1     #include <stdio.h>
2     #include "mylib.h"
3     #include "types.h"
4     #include "dict.h"
5     #include "diff.h"
6     #include "descriptors.h"
7
8     void PrintDescriptors(Dictionary models,char *modelName,char **wordNames,
9                  int numberOfFonts,Dictionary fonts[],
10                 char **fontNames,int numberOfWords,
11                 DiffDescriptor dd)
12    {
13      int modelIndex,fontIndex;
14      int starCount,correctCount;
15      Descriptor thisDescriptor;
16      int lineCount;
17
18      printf("\f\n");
19      PrintWords(wordNames,numberOfWords);
20      lineCount = 0;
21      starCount = 0;
22      correctCount = 0;
23      for (modelIndex=0;modelIndex<numberOfWords;++modelIndex) {
24       printf("%s %s\n",modelName,wordNames[modelIndex]);
25       ++lineCount;
26       for (fontIndex=0;fontIndex<numberOfFonts;++fontIndex) {
27         thisDescriptor =
    ComputeDescriptor(modelIndex,models,fonts[fontIndex],numberOfWords,dd);
28        printf(" ");
29        PrintField(fontNames[fontIndex],20);
30        PrintDescriptor(thisDescriptor,&starCount,&correctCount);
31        printf("\n");
32        ++lineCount;
33       }
34       if (lineCount>30) {
35        printf("\f\n");
36        PrintWords(wordNames,numberOfWords);
37        lineCount = 0;
38       }
39      }
40      fprintf(stdout,"There were %d mismatches ",starCount-
    numberOfWords*numberOfFonts);
41      fprintf(stdout,"better than %d correct matches. (%6.2f%)\n",
42             numberOfWords*numberOfFonts,
43             (float)(numberOfWords*numberOfFonts)/(float)starCount);
44      fprintf(stdout,"There were %d correctly matched words out of %d. (%6.2f%)\n",
45             correctCount,numberOfWords*numberOfFonts,
46             (float)correctCount/(float)numberOfWords/numberOfFonts);
47    }
48
49    void main(int argc,char **argv)
50    {
```

Section C

```
51      char *listFile;
52      Dictionary models;
53      char *modelName;
54      int numberOfFonts;
55      Dictionary fonts[MAX_FONTS];
56      char *fontNames[MAX_FONTS];
57      char *wordNames[MAX_WORDS];
58      int numberOfWords;
59      float centerWeight;
60      int normalBandWidth;
61      BOOLEAN
        lengthNormalize,useL2,slopeConstrain,warp,topToBottomOption,hillToValleyOption;
62      BOOLEAN separate;
63      float topToBottom,hillToValleyLocal;
64      FILE *listfp;
65      int i,x,y;
66      DiffDescriptorBody dd;
67
68      centerWeight = 1.0;
69      normalBandWidth = 20;
70      topToBottom = 1.0;
71      hillToValleyLocal = 1.0;
72      DefArg("%s","listFile",&listFile);
73      DefOption("-L2","-L2",&useL2);
74      DefOption("-slopeConstrain %f","-slopeConstrain <center weight>",
75              &slopeConstrain,&centerWeight);
76      DefOption("-warp %f %d","-warp <center weight> <band width>",
77              &warp,&centerWeight,&normalBandWidth);
78      DefOption("-separate","-separate",&separate);
79      DefOption("-normalize","-normalize",&lengthNormalize);
80      DefOption("-topToBottom %f","-topToBottom
        <ratio>",&topToBottomOption,&topToBottom);
81      DefOption("-hillToValley %f","-hillToValley
        <ratio>",&hillToValleyOption,&hillToValleyLocal);
82      ScanArgs(argc,argv);
83
84      if ((listfp = fopen(listFile,"r")) == NULL)
85        DoError("Error opening file %s.\n",listFile);
86
87      /* Read in the number of words in each dictionary */
88      numberOfWords = ReadInt(listfp);
89      if (numberOfWords > MAX_WORDS)
90        DoError("%s: too many words.\n",argv[0]);
91
92      /* Read in the words */
93      for (i=0;i<numberOfWords;++i) {
94        wordNames[i] = ReadString(listfp);
95      }
96
97      /* Read in the model dictionary */
98      modelName = ReadString(listfp);
99      models = ReadDictionary(modelName);
100
101     /* Read in the number of dictionaries */
102     numberOfFonts = ReadInt(listfp);
```

```
103        if (numberOfFonts > MAX_FONTS)
104          DoError("%s: too many dictionaries.\n",argv[0]);
105
106        /* Read in the dictionaries and their names */
107        for (i=0;i<numberOfFonts;++i) {
108          fontNames[i] = ReadString(listfp);
109          fonts[i] = ReadDictionary(fontNames[i]);
110        }
111
112        /* Check to see that all dictionaries have the same number of shapes as the specified number
           of words. */
113        for (i=1;i<numberOfFonts;++i)
114          if (fonts[i]->numberOfEntries < numberOfWords)
115            DoError("Dictionary %s has too few entries.\n",fontNames[i]);
116        if (models->numberOfEntries < numberOfWords)
117          DoError("Model dictionary has too few of entries.\n",NULL);
118
119
120        if (useL2) {
121          fprintf(stdout,"Using L2 on length normalized shapes.\n");
122          dd.diffType = L2;
123        }
124        else if (slopeConstrain) {
125          fprintf(stdout,"Using dynamic time warping with slope contrained to [0.5,2].\n");
126          dd.diffType = CONSTRAINED;
127          dd.separate = separate;
128          if (separate)
129            fprintf(stdout,"Top and bottom warped separately.\n");
130          else
131            fprintf(stdout,"Top and bottom warped together.\n");
132        }
133        else {
134          fprintf(stdout,"Using dynamic time warping with bandwidth %d.\n",normalBandWidth);
135          dd.diffType = WARP;
136          dd.bandWidth = normalBandWidth;
137          dd.separate = separate;
138          if (separate)
139            fprintf(stdout,"Top and bottom warped separately.\n");
140          else
141            fprintf(stdout,"Top and bottom warped together.\n");
142        }
143        if (!useL2) {
144          fprintf(stdout,"Center weight = %f.\n",centerWeight);
145          dd.centerWeight = centerWeight;
146          if (lengthNormalize) {
147            dd.lengthNormalize = TRUE;
148            fprintf(stdout,"Scores normalized by signal length.\n");
149          }
150          else
151            dd.lengthNormalize = FALSE;
152        }
153        dd.hillToValley = hillToValleyLocal;
154        dd.topToBottom = topToBottom;
155        dd.pathFP = NULL;
156
```

Section C                                              APPENDIX / Page 52

```
157     fprintf(stdout,"Words:\n");
158     for (i=0;i<numberOfWords;++i)
159      fprintf(stdout,"%d: %s\n",i,wordNames[i]);
160     fprintf(stdout,"\n");
161     fprintf(stdout,"Model font is %s.\n",modelName);
162     fprintf(stdout,"Fonts:\n");
163     for (i=0;i<numberOfFonts;++i)
164      fprintf(stdout,"%d: %s\n",i,fontNames[i]);
165     fprintf(stdout,"\n");
166
167
        PrintDescriptors(models,modelName,wordNames,numberOfFonts,fonts,fontNames,numberOfWords,&dd);
168     }
```

Section C

APPENDIX / Page 53

Jul 26 13:48 1991 descriptors.c

```
1       #include <stdio.h>
2       #include "mylib.h"
3       #include "types.h"
4       #include "dict.h"
5       #include "diff.h"
6       #include "misc.h"
7       #include "descriptors.h"
8
9       typedef struct {
10        float score;
11        int word;
12      } *CompareTuple,CompareTupleBody;
13
14      int TupleLessThan(CompareTuple x,CompareTuple y)
15      {
16        if (x->score == y->score)
17          return 0;
18        else if (x->score < y->score)
19          return -1;
20        else
21          return 1;
22      }
23
24      int CompareDescriptorElements(Descriptor x,Descriptor y)
25      {
26        if (*x == *y)
27          return 0;
28        else if (*x < *y)
29          return -1;
30        else
31          return 1;
32      }
33
34      Descriptor ComputeDescriptor(int modelIndex,Dictionary models,Dictionary thisFont,int numberOfWords,
35                       DiffDescriptor dd)
36      {
37        DescriptorElement descriptor[MAX_WORDS+1];
38        CompareTupleBody results[MAX_WORDS];
39        int i;
40
41        for (i=0;i<numberOfWords; ++i) {
42          results[i].score = DiffPair(*(models->outlines+modelIndex),*(thisFont->outlines+i),dd);
43          results[i].word = i;
44        }
45        qsort(results,thisFont->numberOfEntries,sizeof(CompareTupleBody),TupleLessThan);
46        for (i=0;i<numberOfWords; ++i) {
47          descriptor[i] = results[i].word+1;  /* Descriptor values are one greater than word indices */
48          if (results[i].word == modelIndex) {
49            ++i;
```

Section C

APPENDIX / Page 54

```
50        break;
51      }
52    }
53    descriptor[i] = '\0';
54    qsort(descriptor,i,sizeof(DescriptorElement),CompareDescriptorElements);
55    return (Descriptor)strdup((char *)descriptor);
56  }
57
58  void PrintField(char *s,int w)
59  {
60    int i,l;
61    printf("%s",s);
62    l = w-strlen(s);
63    for (i=0;i<l;++i)
64      printf(" ");
65  }
66
67  void PrintDescriptor(Descriptor d,int *starCount,int *correctCount)
68  {
69    int i=1;      /* Descriptor values are one greater than word indices */
70    int temp;
71    temp = *starCount;
72    if (*d == '\0') {
73      printf("*");
74      ++*starCount;
75    }
76    while (*d != '\0') {
77      while (i++ < *d)
78        printf(" ");
79      printf("*");
80      ++*starCount;
81      d++;
82    }
83    if (*starCount-temp == 1)
84      ++*correctCount;
85  }
86
87  void PrintWords(char **words,int numberOfWords)
88  {
89    int lengths[MAX_WORDS];
90    int i,j;
91    int maxLength = 0;
92
93    maxLength = 0;
94    for (i=0;i<numberOfWords;++i) {
95      lengths[i] = strlen(words[i]);
96      if (lengths[i] > maxLength)
97        maxLength = lengths[i];
98    }
99
100   for (j=0;j<maxLength;++j) {
101     printf("          ");
102     for (i=0;i<numberOfWords;++i)
103       if (j<lengths[i])
104         printf("%c",*(words[i]+j));
```

Section C APPENDIX / Page 55

```
105      else
106          printf(" ");
107      printf("\n");
108    }
109  }
110
111
```

Section C

APPENDIX / Page 56

Jul 31 17:11 1991 diff2.c

```
1       #include <stdio.h>
2       #include "boolean.h"
3       #include "types.h"
4       #include "error.h"
5       #include "pict.h"
6       #include "dict.h"
7       #include "diff.h"
8       #include "newMatch.h"
9
10
11      extern double fabs(double);
12
13      /* Dynamic programming version of DiffPair */
14      inline float DiffPair(OutlinePair one, OutlinePair two,
15                   DiffDescriptor dd)
16      {
17        hillToValley = dd->hillToValley;
18        if ((dd->separate)&&(dd->pathFP!=NULL))
19          DoError("DiffPair: separate cannot be used with pathfile option.\n",NULL);
20        switch (dd->diffType) {
21        case CONSTRAINED:
22          if (dd->pathFP != NULL)
23            return SlopeCMatchAndPath(one->top,one->bottom,one->numberOfLegs,
24                            two->top,two->bottom,two->numberOfLegs,
25                            dd->centerWeight,dd->lengthNormalize,dd->topToBottom,
26                            dd->pathFP);
27          else
28            if (dd->separate)
29              return
                  SepSlopeCMatch(one->top,one->numberOfLegs,two->top,two->numberOfLegs,
30                            dd->centerWeight,dd->lengthNormalize)*dd->topToBottom +
31
                  SepSlopeCMatch(one->bottom,one->numberOfLegs,two->bottom,two->numberOfLegs,
32                            dd->centerWeight,dd->lengthNormalize);
33            else
34              return SlopeCMatch(one->top,one->bottom,one->numberOfLegs,
35                            two->top,two->bottom,two->numberOfLegs,
36                            dd->centerWeight,dd->lengthNormalize,dd->topToBottom);
37          break;
38        case L2:
39          if (dd->pathFP != NULL)
40            DoError("DiffPair: L2 does not support path computation.\n",NULL);
41          else
42            return L2Compare(one,two,dd->topToBottom);
43          break;
44        case WARP:
45          if (dd->pathFP != NULL)
46            return NewMatchAndPath(one->top,one->bottom,one->numberOfLegs,
47                            two->top,two->bottom,two->numberOfLegs,
48                            dd->centerWeight,dd->lengthNormalize,dd->bandWidth,
49                            dd->topToBottom,
```

Section C

```
50                          dd->pathFP);
51       else
52        if (dd->separate)
53          return SepMatch(one->top,one->numberOfLegs,two->top,two->numberOfLegs,
54
                  dd->centerWeight,dd->lengthNormalize,dd->bandWidth)*dd->topToBotto
                  m +
55
            SepMatch(one->bottom,one->numberOfLegs,two->bottom,two->numberOfLegs,
56                    dd->centerWeight,dd->lengthNormalize,dd->bandWidth);
57        else
58          return
            NewMatch(one->top,one->bottom,one->numberOfLegs,two->top,two->bottom,
            two->numberOfLegs,
59                    dd->centerWeight,dd->lengthNormalize,dd->bandWidth,
60                    dd->topToBottom);
61      break;
62     default:
63      DoError("DiffPair: internal error.\n",NULL);
64     }
65    }
66
67    #ifdef foo
68    inline float DiffPairAndPath(OutlinePair one, OutlinePair two,
69                      float centerWeight,BOOLEAN lengthNormalize,int
                      normalBandWidth,
70                      char *filename,BOOLEAN doPath)
71    {
72     FILE *fp;
73     float score;
74     if ((fp=fopen(filename,"w"))==NULL)
75      DoError("DiffPairAndMatch: error opening output file %s.\n",filename);
76     score = NewMatchAndPath(one->top,one->bottom,one->numberOfLegs,
77                     two->top,two->bottom,two->numberOfLegs,
78                     centerWeight,lengthNormalize,normalBandWidth,
79                     fp,doPath);
80     fclose(fp);
81     return score;
82    }
83    #endif
84
85    BOOLEAN IsSymmetric(Picture pict)
86    {
87     int x,y;
88     float maxDiff = 0;
89     for (y=0;y<pict->height;++y)
90      for (x=0;x<pict->width;++x) {
91       float temp = fabs(*((float *)(pict->data)+pict->width*y+x) -
92                    *((float *)(pict->data)+pict->width*x+y));
93       if (temp > maxDiff)
94           maxDiff = temp;
95      }
96     fprintf(stderr,"maxDiff = %f.\n",maxDiff);
97     if (maxDiff > 0.01)
98      return FALSE;
```

Section C

```
99      return TRUE;
100    }
101
102    /* Given the names of two dictionary files, compute the squared difference
103     * between every pair of shapes in the cross product of the dictionaries.
104     * The result is a matrix printed to stdout. The width and height are
105     * followed by the matrix entries in row major order. The output is in
106     * ascii to facilitate reading by a Symbolics. */
107    Picture CompareDictionaries(Dictionary dict1, Dictionary dict2,DiffDescriptor dd)
108    {
109     Picture pict;
110     int x,y;
111     pict = new_pict(dict2->numberOfEntries,
112                 dict1->numberOfEntries,
113                 32);
114
115     for (y=0;y<pict->height;++y)
116      for (x=0;x<pict->width;++x) {
117       /* for output files when printing and match */
118       printf("---> (%d,%d) <---\n",y,x);
119       *((float *)(pict->data)+pict->width*y+x) =
120           DiffPair(*(dict1->outlines+y),
121               *(dict2->outlines+x),
122               dd);
123      }
124     if (!IsSymmetric(pict))
125      fprintf(stderr,"Matrix is not symmetric.\n");
126     return pict;
127    }
128
129    void WritePictureAsAscii(Picture pict,char *filename,
130                    char *info1, char *info2)
131    {
132     FILE *fp;
133     int x,y;
134     int count;
135
136     if ((fp = fopen(filename,"w"))==NULL)
137      DoError("WritePictureAsAscii: error opening output file\n",NULL);
138     fprintf(fp,"%s\n",info1);
139     fprintf(fp,"%s\n",info2);
140     fprintf(fp,"#\n");
141     fprintf(fp,"%d\n%d\n",pict->width,pict->height);
142     fprintf(fp, "%3s ", "");
143     for (x = 0; x < pict->width; x++)
144      fprintf(fp,"%7d ", x);
145     fprintf(fp, "\n");
146     for (y=0;y<pict->height;++y) {
147      fprintf(fp, " %3d ", y);
148      count = 1;
149      for (x=0;x<pict->width;++x) {
150       fprintf(fp,"%7.3f ",*(((float *)pict->data)++));
151    /*   if ((pict->width > 10) && (!((count++)%10)))
152          fprintf(fp,"\n");
153    */  }
```

Section C  APPENDIX / Page 59

```
154     fprintf(fp, "\n");
155   }
156   fclose(fp);
157 }
```

Section C                                                          APPENDIX / Page 60

Jul 22 15:21 1991 dmain.c

```
1       #include <stdio.h>
2       #include <math.h>
3       #include <values.h>
4       #include "boolean.h"
5       #include "types.h"
6       #include "pict.h"
7       #include "dict.h"
8       #include "diff.h"
9       #include "match.h"
10      #include "matchparallel.h"
11
12
13      void main(int argc,char **argv)
14      {
15        Picture pict;
16        char *infile1,*infile2,*outfile,*format;
17        Dictionary dict1,dict2;
18
19        if (argc != 5) {
20         printf("Usage:\n");
21         printf(" %s infile1 infile2 outfile format\n",argv[0]);
22         printf(" where format is either ascii or pict.\n");
23         exit(-1);
24        }
25
26        infile1 = argv[1];
27        infile2 = argv[2];
28        outfile = argv[3];
29        format = argv[4];
30
31        dict1 = ReadDictionary(infile1);
32        dict2 = ReadDictionary(infile2);
33        pict = CompareDictionaries(dict1,dict2,1,TRUE,20,FALSE);
34        if (!strcmp(format,"pict"))
35         write_pict(outfile,pict);
36        else
37         WritePictureAsAscii(pict,outfile,dict1->infoString,dict2->infoString);
38      }
```

Section C

Aug 15 20:20 1991 drawBlobs.c

```
1     #include <stdio.h>
2     #include "mylib.h"
3     #include "types.h"
4     #include "dict.h"
5
6     #define WIDTH (800)
7     #define H_MARGIN (20)
8     #define V_MARGIN (60)
9     #define H_SPACING (20)
10    #define V_SPACING (150) /* Must be greater than 2*X_HEIGHT */
11    #define X_HEIGHT (17)
12
13    extern int irint(double);
14
15    void DrawVLine(Picture pict,int x,int yt,int yb)
16    {
17     int i;
18     for (i=yt;i<yb;++i)
19       WritePixel(pict,x,i,1);
20    }
21
22    void DrawOutline(Picture pict,OutlinePair o,int x,int y)
23    {
24     int i,top,bottom;
25     for (i=0;i<o->numberOfLegs;++i) {
26      top = irint(-*(o->top+i)*X_HEIGHT);
27      bottom = irint(*(o->bottom+i)*X_HEIGHT+X_HEIGHT);
28      DrawVLine(pict,i+x,top+y,bottom+y);
29     }
30    }
31
32    int main(int argc,char **argv)
33    {
34     char *infile,*outfile;
35     Dictionary dict;
36     Picture pict;
37     int i,totalLegs,totalLines;
38     int x,y,newX;
39
40     DefArg("%s %s","infile outfile",&infile,&outfile);
41     ScanArgs(argc,argv);
42
43     dict = ReadDictionary(infile);
44
45     for (i=0,totalLegs=H_MARGIN,totalLines=V_MARGIN;i<dict->numberOfEntries;++i) {
46      OutlinePair thisOutline = *(dict->outlines+i);
47      totalLegs += thisOutline->numberOfLegs + H_SPACING;
48      if (totalLegs > WIDTH) {
49       totalLines += V_SPACING;
50       totalLegs = H_MARGIN + thisOutline->numberOfLegs + H_SPACING;
51       if (totalLegs > WIDTH)
```

Section C                                                              APPENDIX / Page 62

```
52           DoError("%s: Shape is too wide.\n",argv[0]);
53      }
54    }
55
56    pict = new_pict(WIDTH,totalLines+V_MARGIN*2,1);
57
58    for (i=0,x=H_MARGIN,y=V_MARGIN;i<dict->numberOfEntries;++i) {
59     OutlinePair thisOutline = *(dict->outlines+i);
60
61     newX = x + thisOutline->numberOfLegs + H_SPACING;
62     if (newX > WIDTH) {
63      newX = H_MARGIN+thisOutline->numberOfLegs+H_SPACING;
64      x = H_MARGIN;
65      y += V_SPACING;
66     }
67
68     DrawOutline(pict,*(dict->outlines+i),x,y);
69
70     x = newX;
71    }
72
73    write_pict(outfile,pict);
74   }
```

Section C

Jul 26 16:47 1991 equiv.c

```
1    #include <stdio.h>
2    #include "mylib.h"
3    #include "types.h"
4    #include "dict.h"
5    #include "diff.h"
6    #include "descriptors.h"
7
8    void PrintEquivalenceClasses(int numberOfWords,char **wordNames,
9                     int numberOfFonts,Dictionary fonts[],char **fontNames,
10                    DiffDescriptor dd)
11   {
12    Descriptor descriptors[MAX_FONTS*MAX_FONTS];
13    int matchesWord[MAX_WORDS];
14    int word,font1,font2,i;
15    int totalDifferent,totalWords;
16    int numberOfPairs;
17
18    for (word=0;word<numberOfWords;++word) {
19     for (font1=0,numberOfPairs=0;font1<numberOfFonts;++font1)
20      for (font2=0;font2<font1;++font2)
21        descriptors[numberOfPairs++] = ComputeDescriptor(word,fonts[font1],
22                                  fonts[font2],numberOfWords,dd);
23     for (i=0;i<numberOfWords;++i)
24      matchesWord[i] = 0;
25     for (i=0;i<numberOfPairs;++i) {
26      Descriptor p;
27      p = descriptors[i];
28      while (*p!='\0')
29         matchesWord[*p++ - 1]++;
30     }
31     for (i=0,totalDifferent=0,totalWords=0;i<numberOfWords;++i) {
32      if (matchesWord[i])
33         ++totalDifferent;
34      totalWords += matchesWord[i];
35     }
36     printf("%20s:\t\t%6d %6.2f %6d %6.2f\n",wordNames[word],totalWords,
37         (float)totalWords/numberOfPairs,totalDifferent,
38         (float)totalDifferent/(float)totalWords*numberOfPairs);
39     fprintf(stderr,"%20s:\t\t%6d %6.2f %6d %6.2f\n",wordNames[word],totalWords,
40         (float)totalWords/numberOfPairs,totalDifferent,
41         (float)totalDifferent/(float)totalWords*numberOfPairs);
42    }
43   }
44
45
46   void main(int argc,char **argv)
47   {
48    char *listFile;
49    int numberOfFonts;
50    Dictionary fonts[MAX_FONTS];
51    char *fontNames[MAX_FONTS];
52    char *wordNames[MAX_WORDS];
```

Section C

APPENDIX / Page 64

```
53      int numberOfWords;
54      float centerWeight;
55      int normalBandWidth;
56      BOOLEAN
        lengthNormalize,useL2,slopeConstrain,warp,topToBottomOption,hillToValleyOption;
57      float topToBottom,hillToValleyLocal;
58      FILE *listfp;
59      int i,x,y;
60      DiffDescriptorBody dd;
61
62      centerWeight = 1.0;
63      normalBandWidth = 20;
64      topToBottom = 1.0;
65      hillToValleyLocal = 1.0;
66      DefArg("%s","listFile",&listFile);
67      DefOption("-L2","-L2",&useL2);
68      DefOption("-slopeConstrain %f","-slopeConstrain <center weight>",
69              &slopeConstrain,&centerWeight);
70      DefOption("-warp %f %d","-warp <center weight> <band width>",
71              &warp,&centerWeight,&normalBandWidth);
72      DefOption("-normalize","-normalize",&lengthNormalize);
73      DefOption("-topToBottom %f","-topToBottom
        <ratio>",&topToBottomOption,&topToBottom);
74      DefOption("-hillToValley %f","-hillToValley
        <ratio>",&hillToValleyOption,&hillToValleyLocal);
75      ScanArgs(argc,argv);
76
77      if ((listfp = fopen(listFile,"r"))==NULL)
78        DoError("Error opening file %s.\n",listFile);
79
80      /* Read in the number of words in each dictionary */
81      numberOfWords = ReadInt(listfp);
82      if (numberOfWords > MAX_WORDS)
83        DoError("%s: too many words.\n",argv[0]);
84
85      /* Read in the words */
86      for (i=0;i<numberOfWords;++i) {
87        wordNames[i] = ReadString(listfp);
88      }
89
90      /* Read in the number of dictionaries */
91      numberOfFonts = ReadInt(listfp);
92      if (numberOfFonts > MAX_FONTS)
93        DoError("%s: too many dictionaries.\n",argv[0]);
94
95      /* Read in the dictionaries and their names */
96      for (i=0;i<numberOfFonts;++i) {
97        fontNames[i] = ReadString(listfp);
98        fonts[i] = ReadDictionary(fontNames[i]);
99      }
100
101     /* Check to see that all dictionaries have the same number of shapes as the specified number
        of words. */
102     for (i=1;i<numberOfFonts;++i)
103       if (fonts[i]->numberOfEntries < numberOfWords)
```

Section C  APPENDIX / Page 65

```
104         DoError("Dictionary %s has too few entries.\n",fontNames[i]);
105
106       if (useL2) {
107         printf("Using L2 on length normalized shapes.\n");
108         dd.diffType = L2;
109       }
110       else if (slopeConstrain) {
111         printf("Using dynamic time warping with slope contrained to [0.5,2].\n");
112         dd.diffType = CONSTRAINED;
113       }
114       else {
115         printf("Using dynamic time warping with bandwidth %d.\n",normalBandWidth);
116         dd.diffType = WARP;
117         dd.bandWidth = normalBandWidth;
118       }
119       if (!useL2) {
120         printf("Center weight = %f.\n",centerWeight);
121         dd.centerWeight = centerWeight;
122         if (lengthNormalize) {
123           dd.lengthNormalize = TRUE;
124           printf("Scores normalized by signal length.\n");
125         }
126         else
127           dd.lengthNormalize = FALSE;
128       }
129       dd.hillToValley = hillToValleyLocal;
130       dd.topToBottom = topToBottom;
131       dd.pathFP = NULL;
132
133       printf("Fonts:\n");
134       for (i=0;i<numberOfFonts;++i)
135         printf("%d: %s\n",i,fontNames[i]);
136       printf("\n");
137
138
          PrintEquivalenceClasses(numberOfWords,wordNames,numberOfFonts,fonts,fontNames,&dd);
139       }
140
141
142
143
144
145
146
```

Section C

Jul 3 14:31 1991 extract.c

```c
1    #include <stdio.h>
2    #include <math.h>
3    #include <values.h>
4    #include "boolean.h"
5    #include "types.h"
6    #include "dict.h"
7
8    #define MAX_STRING_LEN 100
9    int ReadInt(FILE *fp)
10   {
11    char s[MAX_STRING_LEN];
12    int x;
13
14    fgets(s,MAX_STRING_LEN,fp);
15    while (sscanf(s,"%d",&x)!=1)
16      fprintf(stderr,"ReadInt: integer expected - reenter.\n");
17    return x;
18   }
19
20   void main(int argc,char **argv)
21   {
22    char *infile,*listFile,*outfile;
23    Dictionary dict1,dict2;
24    int i;
25    int numberOfEntries;
26    FILE *fp;
27
28    if (argc != 4) {
29      printf("Usage:\n");
30      printf("  %s infile listfile outfile\n",argv[0]);
31      exit(-1);
32    }
33
34    infile = argv[1];
35    listFile = argv[2];
36    outfile = argv[3];
37
38    dict1 = ReadDictionary(infile);
39
40    if ((fp=fopen(listFile,"r"))==NULL)
41      DoError("%s: error reading list file.\n",argv[0]);
42
43    numberOfEntries = ReadInt(fp);
44    if (numberOfEntries < 0)
45      DoError("%s: list file must have a positive number of elements.\n",argv[0]);
46    printf("Copying %d shapes.\n",numberOfEntries);
47
48    dict2 = NewDict(numberOfEntries);
49
50    dict2->infoString = dict1->infoString;
51    for (i=0;i<numberOfEntries;++i) {
52      int shape;
```

Section C                    APPENDIX / Page 67

```
53      shape = ReadInt(fp);
54      if ((shape<0)||(shape> =dict1->numberOfEntries))
55        DoError("%s: bad shape index.\n",argv[0]);
56      *(dict2->outlines+i) = *(dict1->outlines+shape);
57      *(dict2->rawOutlines+i) = *(dict1->rawOutlines+shape);
58    }
59    fclose(fp);
60    WriteDictionary(dict2,outfile);
61
62  }
```

Section C

APPENDIX / Page 68

Jun 14 16:12 1991 l2Norm.c

```
1    #include <stdio.h>
2    #include <values.h>
3    #include <string.h>
4    #include "boolean.h"
5    #include "types.h"
6    #include "error.h"
7    #include "dict.h"
8
9    float L2Norm(OutlinePair signal, int startOffset,
10              OutlinePair model)
11   {
12     float *top1,*top2,*bottom1,*bottom2;
13     int i,overlap;
14     float sum;
15     float temp;
16
17     if ((startOffset < 0) ||
18       (startOffset + model->numberOfLegs > signal->numberOfLegs))
19       DoError("L2Norm: the model must overlap the signal.\n",NULL);
20
21     top1 = signal->top+startOffset;
22     top2 = model->top;
23     bottom1 = signal->bottom+startOffset;
24     bottom2 = model->bottom;
25
26     overlap = signal->numberOfLegs - startOffset;
27     if (overlap > model->numberOfLegs)
28       overlap = model->numberOfLegs;
29
30     for (i=0,sum=0;i<overlap;++i){
31       temp = *top1++ - *top2++;
32       sum += temp * temp;
33       temp = *bottom1++ - *bottom2++;
34       sum += temp * temp;
35     }
36
37     return sum;
38   }
39
40   OutlinePair LookupShape(char c, Dictionary models)
41   {
42   /* dictionary file has the following order:
43     ABCDEFGHIJKLMNOPQRSTUVWXYZ
44     abcdefghijklmnopqrstuvwxyz
45     0123456789
46     ,.
47   */
48     int shapeIndex;
49     if ((c>='a'&&c<='z'))
50       shapeIndex = c-'a';
51     else if (c == ',')
52       shapeIndex = 26;
```

Section C                                                  APPENDIX / Page 69

```
53          else if (c == '.')
54           shapeIndex = 27;
55          else
56           DoError("LookupShape: have no shape one of the characters.\n",NULL);
57          return *(models->outlines+shapeIndex);
58         }
59
60
61   #define MAX_STRING_LENGTH 30
62   #define MAX_SHIFT 10
63   #define MAX_OVERLAP 5
64   float L2CompareWithString(OutlinePair signal, char *string,
65                             Dictionary models)
66   {
67     float *costMatrix;
68     int *pathMatrix;
69     int numberOfChars;
70     int letterIndex, startOffset;
71     float *cursor;
72     int left;
73     int right;
74     OutlinePair modelShapes[MAX_STRING_LENGTH];
75     char *charCursor;
76     float minValue;
77     float temp;
78     int i,oldLeft,oldRight,minIndex;;
79
80     /* Make sure input string is not too long. */
81     numberOfChars = strlen(string);
82     if (numberOfChars >= MAX_STRING_LENGTH)
83       DoError("L2CompareWithString: string is too long.\n",NULL);
84
85     /* Allocate space for dynamic programming array. */
86     /* For now, be a space hog. */
87     costMatrix = (float *)calloc(signal->numberOfLegs*numberOfChars,
88                          sizeof(float));
89     pathMatrix = (int *)calloc(signal->numberOfLegs*numberOfChars,
90                          sizeof(int));
91     if ((costMatrix == NULL)||(pathMatrix == NULL))
92       DoError("L2CompareWithString: cannot allocate space.\n",NULL);
93
94     /* Lookup the shapes corresponding to the characters in the string. */
95     charCursor = string;
96     for (i=0;i<numberOfChars;++i)
97       modelShapes[i]=LookupShape(*charCursor++,models);
98
99     /* Since the cost matrix is larger than the region containing valid
100     * alignments, first fill in the array with large costs. Later, some
101     * of these will be overwritten. */
102    cursor = costMatrix;
103    for (i=0;i<signal->numberOfLegs*numberOfChars; ++i)
104      *cursor++ = MAXFLOAT;
105
106    /* Fill in leftmost column */
107    left = 0;
```

Section C

APPENDIX / Page 70

```
108     right = MAX_SHIFT;
109     for (startOffset=left;startOffset<right; ++startOffset)
110      if (startOffset + modelShapes[0]->numberOfLegs <=
111          signal->numberOfLegs)
112       *(costMatrix+startOffset*numberOfChars) =
113          L2Norm(signal, startOffset, modelShapes[0]);
114
115    /* Now do the rest of the columns */
116     for (letterIndex = 1; letterIndex < numberOfChars; ++letterIndex) {
117      oldLeft = left;
118      oldRight = right;
119      left += modelShapes[letterIndex-1]->numberOfLegs;
120      right += modelShapes[letterIndex-1]->numberOfLegs + MAX_SHIFT;
121      for (startOffset=left;startOffset<right; ++startOffset) {
122       if (startOffset + modelShapes[letterIndex]->numberOfLegs <=
123           signal->numberOfLegs) {
124        temp = L2Norm(signal, startOffset, modelShapes[letterIndex]);
125
126    /* This could be made quite a bit faster since for each start offset,
127     * we just add an element to the set we are minimizing over. */
128         minValue = MAXFLOAT;
129    /* *(costMatrix+oldLeft*numberOfChars+letterIndex-1); */
130         minIndex = oldLeft;
131         for (i=oldLeft;(i<oldRight)&&(i<startOffset); ++i) {
132          float temp2;
133          temp2 = *(costMatrix+i*numberOfChars+letterIndex-1);
134          if (temp2 < minValue) {
135         minIndex = i;
136           minValue = temp2;
137          }
138         }
139      *(costMatrix+startOffset*numberOfChars+letterIndex) =
140         minValue + temp;
141      *(pathMatrix+startOffset*numberOfChars+letterIndex) =
142         minIndex;
143      } /* End of if */
144
145     } /* for startOffset */
146    } /* for letterIndex */
147
148    /* Now that all the costs have been filled in, find the cheapest */
149     if (right-1+modelShapes[numberOfChars-1]->numberOfLegs+MAX_SHIFT <
150       signal->numberOfLegs)
151    /* In this case, the chain of letter shapes does not span the signal. */
152      minValue = MAXFLOAT;
153     else {
154      minValue = MAXFLOAT;
155      minIndex = left;
156      for (i=left;(i<right)&&(i<signal->numberOfLegs); ++i) {
157       float temp2;
158       temp2 = *(costMatrix+i*numberOfChars+numberOfChars-1);
159       if (temp2 < minValue) {
160           minIndex = i;
161           minValue = temp2;
162       }
```

Section C

```
163      }
164     }
165
166     free(costMatrix);
167     free(pathMatrix);
168     return minValue;
169    }
170
171    void PrintPath(int *pm, int width, int height, int index)
172    {
173     int i;
174     for (i=width-1;i>=0;--i) {
175      printf("%d ",index);
176      index = *(pm+index*width+i);
177     }
178     printf("\n");
179    }
180
181    void PrintMatrix(float *m,int width, int height)
182    {
183     int i;
184     int j;
185     for (i=0;i<height; ++i) {
186      printf("%d: ",i);
187      for (j=0;j<width; ++j)
188       printf("%6.2e ",*m++);
189      printf("\n");
190     }
191    }
192
193    typedef struct CTuple {
194     int index;
195     float value;
196    } CompareTuple;
197
198    int TupleLessThan(CompareTuple *t1, CompareTuple *t2)
199    {
200     return t1->value > t2->value;
201    }
202
203    void L2CompareDictToString(Dictionary unknownDict,
204                    char *string,
205                    Dictionary modelDict,
206                    BOOLEAN isBatch)
207    {
208     CompareTuple *results;
209     int i;
210
211     if ((results = (CompareTuple *)calloc(unknownDict->numberOfEntries,
212                         sizeof(CompareTuple))) ==
213      NULL)
214      DoError("L2CompareDictToString: cannot allocate space.\n",NULL);
215
216     for (i=0;i<unknownDict->numberOfEntries; ++i) {
217      (*(results+i)).index = i;
```

Section C

```
218        (*(results+i)).value = L2CompareWithString(*(unknownDict->outlines+i),
219                                                  string,
220                                                  modelDict);
221      }
222
223      qsort(results,
224            unknownDict->numberOfEntries,
225            sizeof(CompareTuple),
226            TupleLessThan);
227
228      if (isBatch) {
229        printf("%d(%f)\n",(*results).index,(*results).value);
230      }
231      else {
232        printf("\n");
233        for (i=0;(i<5)&&(i<unknownDict->numberOfEntries);++i)
234          printf("%d: %f\n",(*(results+i)).index,(*(results+i)).value);
235        printf("\n");
236      }
237
238      free(results);
239    }
240
241    void main(int argc,char **argv)
242    {
243      char *unknowns,*models;
244      char s[MAX_STRING_LENGTH+1];
245      Dictionary unknownDict, modelDict;
246      int selection;
247      char *crPointer;
248      BOOLEAN done = FALSE;
249      BOOLEAN batch;
250      char *words;
251
252      if (argc != 3 && argc != 4) {
253        printf("Usage:\n");
254        printf("  %s <unknowns> <alphabet> [<batch wordlist>]\n",argv[0]);
255        printf("  If the batch file is not specified, the program runs\n");
256        printf("  in interactive mode.\n");
257        exit(-1);
258      }
259
260      unknowns = argv[1];
261      models = argv[2];
262      if (argc == 4) {
263        batch = TRUE;
264        words = argv[3];
265      } else
266        batch = FALSE;
267
268      unknownDict = ReadDictionary(unknowns);
269      modelDict = ReadDictionary(models);
270
271      if (batch) {
272        FILE *fp;
```

Section C                          APPENDIX / Page 73

```
273      if ((fp = fopen(words,"r")) = = NULL)
274        DoError("l2Norm: can't open input file %s.\n",words);
275      while (!done) {
276       fgets(s,MAX_STRING_LENGTH,fp);
277       if ((s[0] = = '\0') || (s[0] = = '\n'))
278           done = TRUE;
279       else {
280           crPointer = strchr(s,'\n');
281           if (crPointer != NULL)
282             *crPointer = '\0';
283           printf("%s: ",s);
284           L2CompareDictToString(unknownDict,s,modelDict,TRUE);
285       }
286      }
287     }
288     else {
289      while (!done) {
290       printf("Enter a word to search for: ");
291       fgets(s,MAX_STRING_LENGTH,stdin);
292       if ((s[0] = = '\0') || (s[0] = = '\n'))
293           done = TRUE;
294       else {
295           crPointer = strchr(s,'\n');
296           if (crPointer != NULL)
297             *crPointer = '\0';
298           printf("Comparing shape %s to the image\n",s);
299           L2CompareDictToString(unknownDict,s,modelDict,FALSE);
300       }
301      }
302     }
303    }
304
```

Section C

APPENDIX / Page 74

Jun 18 17:00 1991 l2Norm2.c

```c
1    #include <stdio.h>
2    #include <values.h>
3    #include <string.h>
4    #include "boolean.h"
5    #include "types.h"
6    #include "error.h"
7    #include "dict.h"
8
9    #define MAX_STRING_LENGTH 30
10   #define MAX_SIGNAL_LENGTH 300
11   #define MAX_SHIFT 10
12
13   #define MIN(a,b) ((a)<(b)?(a):(b))
14   #define MAX(a,b) ((a)>(b)?(a):(b))
15
16   typedef struct {
17    int numberOfSymbols;
18    int signalLength;
19    float *costs;
20   } *CorrelationSet,CorrelationSetBody;
21
22   CorrelationSet NewCorrelationSet(int numberOfSymbols,int signalLength)
23   {
24    CorrelationSet temp;
25    if ((temp = (CorrelationSet)calloc(1,sizeof(CorrelationSetBody)))==NULL)
26     DoError("NewCorrelationSet: cannot allocate space.\n",NULL);
27    temp->numberOfSymbols = numberOfSymbols;
28    temp->signalLength = signalLength;
29    if ((temp->costs = (float *)calloc(numberOfSymbols*signalLength,sizeof(float)))==NULL)
30     DoError("NewCorrelationSet: cannot allocate space.\n",NULL);
31    return temp;
32   }
33
34   #ifdef foo
35   float CorrelationValue(CorrelationSet c,int symbol,int offset)
36   {
37    return *(c->costs+symbol*c->signalLength+offset);
38   }
39
40   void SetCorrelationValue(CorrelationSet c,int symbol,int offset,float value)
41   {
42    *(c->costs+symbol*c->signalLength+offset) = value;
43   }
44   #endif
45   #define CorrelationValue(c,s,o) (*((c)->costs+(s)*(c)->signalLength+(o)))
46   #define SetCorrelationValue(c,s,o,v) (*((c)->costs+(s)*(c)->signalLength+(o))=(v))
47
48   int CorrelationSetSize(CorrelationSet c)
49   {
50    return c->numberOfSymbols;
51   }
52
```

Section C

APPENDIX / Page 75

```
53      int CorrelationSetWidth(CorrelationSet c)
54      {
55        return c->signalLength;
56      }
57
58      void PrintCorrelation(CorrelationSet c,int character)
59      {
60        int i;
61
62        for (i=0;i<c->signalLength;++i) {
63          printf("%d:%6.2f\n",i,*(c->costs+character*c->signalLength+i));
64        }
65        printf("\n");
66      }
67
68      float L2Norm(OutlinePair signal, int startOffset,
69                 OutlinePair model)
70      {
71        float *top1,*top2,*bottom1,*bottom2;
72        int i,overlap;
73        float sum;
74        float temp;
75
76        if ((startOffset < 0) ||
77          (startOffset + model->numberOfLegs > signal->numberOfLegs))
78          DoError("L2Norm: the model must overlap the signal.\n",NULL);
79
80        top1 = signal->top+startOffset;
81        top2 = model->top;
82        bottom1 = signal->bottom+startOffset;
83        bottom2 = model->bottom;
84
85        overlap = signal->numberOfLegs - startOffset;
86        if (overlap > model->numberOfLegs)
87          overlap = model->numberOfLegs;
88
89        for (i=0,sum=0;i<overlap;++i) {
90          temp = *top1++ - *top2++;
91          sum += temp * temp;
92          temp = *bottom1++ - *bottom2++;
93          sum += temp * temp;
94        }
95
96        return sum;
97      }
98
99      CorrelationSet PreProcessSignalWithChars(OutlinePair signal,Dictionary charDict)
100     {
101       CorrelationSet cSet;
102       int thisChar,offset;
103       OutlinePair charSignal;
104
105       cSet = NewCorrelationSet(charDict->numberOfEntries,signal->numberOfLegs);
106
107       for (thisChar = 0; thisChar < charDict->numberOfEntries; ++thisChar) {
```

```
108       charSignal = *(charDict->outlines+thisChar);
109       for (offset = 0; offset < signal->numberOfLegs-charSignal->numberOfLegs+1;
          ++offset)
110         SetCorrelationValue(cSet,thisChar,offset,L2Norm(signal,offset,charSignal));
111     }
112     return cSet;
113   }
114
115   CorrelationSet *PreProcessDictionaryWithChars(Dictionary signalDict,Dictionary charDict)
116   {
117     CorrelationSet *correlationSets;
118     int thisWord;
119
120     correlationSets = (CorrelationSet
          *)calloc(signalDict->numberOfEntries,sizeof(CorrelationSet));
121     if (correlationSets == NULL)
122       DoError("PreProcessDicitonary: cannot allocate space.\n",NULL);
123     for (thisWord = 0; thisWord < signalDict->numberOfEntries; ++thisWord) {
124       *(correlationSets+thisWord) =
          PreProcessSignalWithChars(*(signalDict->outlines+thisWord),charDict);
125       printf("%d ",thisWord);
126     }
127     return correlationSets;
128   }
129
130   CorrelationSet PreProcessSignalWithBlanks(OutlinePair signal)
131   {
132     CorrelationSet cSet;
133     int blankWidth,offset;
134     int numberOfLegs = signal->numberOfLegs;
135
136     cSet = NewCorrelationSet(MAX_SHIFT,numberOfLegs);
137
138     for (offset = 0; offset < numberOfLegs ; ++offset) {
139       SetCorrelationValue(cSet,0,offset,0);
140     }
141     for (offset = 0; offset < numberOfLegs ; ++offset) {
142       float top,bottom;
143       top = *(signal->top+offset);
144       bottom = *(signal->bottom+offset);
145       SetCorrelationValue(cSet,1,offset,top*top+bottom*bottom);
146     }
147     for (blankWidth = 2; blankWidth < MAX_SHIFT; ++blankWidth) {
148       for (offset = 0; offset < numberOfLegs-blankWidth+1 ; ++offset) {
149         float top,bottom,temp;
150         top = *(signal->top+offset+blankWidth-1);
151         bottom = *(signal->bottom+offset+blankWidth-1);
152         temp = top*top+bottom*bottom+CorrelationValue(cSet,blankWidth-1,offset);
153         SetCorrelationValue(cSet,blankWidth,offset,temp);
154       }
155     }
156     return cSet;
157   }
158
159   CorrelationSet *PreProcessDictionaryWithBlanks(Dictionary signalDict)
```

```
160     {
161       CorrelationSet *correlations;
162       int thisWord;
163
164       correlations = (CorrelationSet
          *)calloc(signalDict->numberOfEntries,sizeof(CorrelationSet));
165
166       for (thisWord = 0; thisWord < signalDict->numberOfEntries; ++thisWord) {
167         *(correlations+thisWord) =
          PreProcessSignalWithBlanks(*(signalDict->outlines+thisWord));
168         printf("%d ",thisWord);
169       }
170       return correlations;
171     }
172
173     int LookupShapeIndex(char c, Dictionary models)
174     {
175     /* dictionary file has the following order:
176       ABCDEFGHIJKLMNOPQRSTUVWXYZ
177       abcdefghijklmnopqrstuvwxyz
178.      0123456789
179       ,.
180     */
181       int shapeIndex;
182       if ((c>='a'&&c<='z'))
183         shapeIndex = c-'a';
184       else if (c == ',')
185         shapeIndex = 26;
186       else if (c == '.')
187         shapeIndex = 27;
188       else
189         DoError("LookupShape: have no shape one of the characters.\n",NULL);
190       return shapeIndex;
191     }
192
193
194     float L2CompareWithString(int signalIndex,
195                     char *string,
196                     CorrelationSet charCorrelations,
197                     CorrelationSet blankCorrelations,
198                     Dictionary signalDict,
199                     Dictionary models)
200     {
201     /* Allocate space for dynamic programming array. */
202     /* For now, be a space hog. */
203       float costMatrix[MAX_SIGNAL_LENGTH][MAX_STRING_LENGTH];
204       int pathMatrix[MAX_SIGNAL_LENGTH][MAX_STRING_LENGTH];
205       char *charCursor;
206       OutlinePair modelShapes[MAX_STRING_LENGTH];
207       int modelIndices[MAX_STRING_LENGTH];
208       int numberOfChars;
209
210       int letterIndex, startOffset;
211       int left,right;
212       int searchLeft,searchRight,rightEdge;
```

Section C

APPENDIX / Page 78

```
213      float minValue;
214      float temp;
215      int i,oldLeft,oldRight,minIndex;
216      int signalLength;
217
218      signalLength = (*(signalDict->outlines+signalIndex))->numberOfLegs;
219
220      /* Make sure input string is not too long. */
221       numberOfChars = strlen(string);
222       if (numberOfChars > = MAX_STRING_LENGTH)
223         DoError("L2CompareWithString: string is too long.\n",NULL);
224
225      /* Make sure signal is not too long. */
226       if (signalLength > = MAX_SIGNAL_LENGTH)
227         DoError("L2CompareWithString: signal is too long.\n",NULL);
228
229      /* Lookup the indices of the signals corresponding to the characters in the string. */
230       charCursor = string;
231       for (i=0;i<numberOfChars; + + i) {
232         modelIndices[i] = LookupShapeIndex(*charCursor+ +,models);
233         modelShapes[i] = *(models->outlines+modelIndices[i]);
234       }
235
236      /* Since the cost matrix is larger than the region containing valid
237       * alignments, first fill in the array with large costs. Later, some
238       * of these will be overwritten. */
239      /* WARNING: does MAXFLOAT + smallFloat = = MAXFLOAT or does it roll? */
240       {
241        float *cursor;
242        cursor = &(costMatrix[0][0]);
243        for (i=0;i<MAX_SIGNAL_LENGTH*MAX_STRING_LENGTH; + +i)
244          *cursor+ + = MAXFLOAT;
245       }
246
247      /* Fill in leftmost column */
248       left = 0;
249       right = MIN(MAX_SHIFT,signalLength-modelShapes[0]->numberOfLegs);
250       for (startOffset=left;startOffset<right; + +startOffset)
251         costMatrix[startOffset][0] = CorrelationValue(blankCorrelations,startOffset,startOffset)
                 +
252                  CorrelationValue(charCorrelations,modelIndices[0],startOffset);
253
254      /* Now do the rest of the columns */
255       for (letterIndex = 1; letterIndex < numberOfChars; + +letterIndex) {
256         oldLeft = left;
257         oldRight = right;
258         left + = modelShapes[letterIndex-1]->numberOfLegs;
259      /* If string of characters is too long for this signal, abort by returning a large cost. */
260         if (left> =signalLength)
261           return MAXFLOAT;
262         right + = modelShapes[letterIndex-1]->numberOfLegs + MAX_SHIFT;
263         right = MIN(right,signalLength-modelShapes[letterIndex]->numberOfLegs+ 1);
264
265         for (startOffset=left;startOffset<right; + +startOffset) {
266           temp = CorrelationValue(charCorrelations,modelIndices[letterIndex],startOffset);
```

Section C

APPENDIX / Page 79

```
267
268      /* This could be made quite a bit faster since for each start offset,
269       * we just add an element to the set we are minimizing over. */
270
271         searchLeft = startOffset-modelShapes[letterIndex-1]->numberOfLegs-MAX_SHIFT;
272         searchLeft = MAX(searchLeft,oldLeft);
273         rightEdge = searchLeft+modelShapes[letterIndex-1]->numberOfLegs;
274         searchRight = startOffset-modelShapes[letterIndex-1]->numberOfLegs;
275         searchRight = MIN(searchRight,oldRight);
276
277         minIndex = searchLeft;
278         minValue = costMatrix[searchLeft][letterIndex-1] +
279             CorrelationValue(blankCorrelations,startOffset-rightEdge,rightEdge);
280
281         for (i=searchLeft;i<searchRight;++i,++rightEdge) {
282            float temp;
283            temp = costMatrix[i][letterIndex-1] +
284            CorrelationValue(blankCorrelations,startOffset-rightEdge,rightEdge);
285            if (temp < minValue) {
286              minIndex = i;
287              minValue = temp;
288            }
289         }
290
291         costMatrix[startOffset][letterIndex] = minValue+temp;
292         pathMatrix[startOffset][letterIndex] = minIndex;
293       } /* for startOffset */
294      } /* for letterIndex */
295
296
297      /* fill in the costs for blanks at the end of the word */
298        rightEdge = left+modelShapes[letterIndex-1]->numberOfLegs;
299        for (startOffset=left;startOffset<right;++startOffset,++rightEdge) {
300         if (rightEdge+MAX_SHIFT >= signalLength) {
301           costMatrix[startOffset][letterIndex-1] +=
302              CorrelationValue(blankCorrelations,signalLength-1-rightEdge,rightEdge);
303         }
304         else {
305          /* this chain of letters does not span the word */
306          costMatrix[startOffset][letterIndex-1] = MAXFLOAT;
307         }
308        }
309
310      /* keep minIndex for debugging pruposes */
311       minIndex = left;
312       minValue = costMatrix[left][letterIndex-1];
313       for (i=left;i<right;++i) {
314         float temp;
315         temp = costMatrix[i][letterIndex-1];
316         if (temp < minValue) {
317           minIndex = i;
318           minValue = temp;
319         }
320       }
321
```

Section C

APPENDIX / Page 80

```
322      return minValue;
323    }
324
325    void PrintPath(int *pm, int width, int height, int index)
326    {
327     int i;
328     for (i=width-1;i>=0;--i) {
329      printf("%d ",index);
330      index = *(pm+index*width+i);
331     }
332     printf("\n");
333    }
334
335    void PrintMatrix(float *m,int width, int height)
336    {
337     int i;
338     int j;
339     for (i=0;i<height;++i) {
340      printf("%d: ",i);
341      for (j=0;j<width;++j)
342       printf("%6.2e ",*m++);
343      printf("\n");
344     }
345    }
346
347    typedef struct CTuple {
348     int index;
349     float value;
350    } CompareTuple;
351
352    int TupleLessThan(CompareTuple *t1, CompareTuple *t2)
353    {
354     return t1->value > t2->value;
355    }
356
357    void L2CompareDictToString(char *string,
358                    CorrelationSet *charCorrelations,
359                    CorrelationSet *blankCorrelations,
360                    Dictionary signalDict,
361                    Dictionary modelDict,
362                    BOOLEAN isBatch)
363    {
364     CompareTuple *results;
365     int i;
366
367     if ((results = (CompareTuple *)calloc(signalDict->numberOfEntries,
368                      sizeof(CompareTuple))) ==
369      NULL)
370      DoError("L2CompareDictToString: cannot allocate space.\n",NULL);
371
372     for (i=0;i<signalDict->numberOfEntries;++i) {
373      (*(results+i)).index = i;
374      (*(results+i)).value = L2CompareWithString(i,string,
375                           *(charCorrelations+i),
376                           *(blankCorrelations+i),
```

Section C

APPENDIX / Page 81

```
377                                signalDict,
378                                modelDict);
379    }
380
381    qsort(results,
382         signalDict->numberOfEntries,
383         sizeof(CompareTuple),
384         TupleLessThan);
385
386    if (isBatch) {
387     printf("%d(%f)\n",(*results).index,(*results).value);
388    }
389    else {
390     printf("\n");
391     for (i=0;(i<5)&&(i<signalDict->numberOfEntries;++i)
392      printf("%d: %f\n",(*(results+i)).index,(*(results+i)).value);
393     printf("\n");
394    }
395
396    free(results);
397   }
398
399   void PrintDictStats(Dictionary dict)
400   {
401    int i,sum=0;
402    printf("Dictionary has %d entries.\n",dict->numberOfEntries);
403    for (i=0;i<dict->numberOfEntries;++i)
404     sum += (*(dict->outlines+i))->numberOfLegs;
405    printf("The total length of the shape contours is %d pixels.\n",sum);
406   }
407
408   void main(int argc,char **argv)
409   {
410    char *unknowns,*models;
411    char s[MAX_STRING_LENGTH+1];
412    Dictionary unknownDict, modelDict;
413    int selection;
414    char *crPointer;
415    BOOLEAN done = FALSE;
416    BOOLEAN batch;
417    char *words;
418    CorrelationSet *charCorrelations;
419    CorrelationSet *blankCorrelations;
420
421    if (argc != 3 && argc != 4) {
422     printf("Usage:\n");
423     printf("  %s <unknowns> <alphabet> [<batch wordlist>]\n",argv[0]);
424     printf("  If the batch file is not specified, the program runs\n");
425     printf("  in interactive mode.\n");
426     exit(-1);
427    }
428
429    unknowns = argv[1];
430    models = argv[2];
431    if (argc == 4) {
```

Section C                                                              APPENDIX / Page 82

```
432        batch = TRUE;
433        words = argv[3];
434      } else
435        batch = FALSE;
436
437      unknownDict = ReadDictionary(unknowns);
438      modelDict = ReadDictionary(models);
439
440      PrintDictStats(unknownDict);
441      printf("Preprocessing...\n");
442      charCorrelations = PreProcessDictionaryWithChars(unknownDict,modelDict);
443      blankCorrelations = PreProcessDictionaryWithBlanks(unknownDict);
444      printf("done.\n");
445
446      if (batch) {
447        FILE *fp;
448        if ((fp = fopen(words,"r"))==NULL)
449          DoError("l2Norm: can't open input file %s.\n",words);
450        while (!done) {
451          fgets(s,MAX_STRING_LENGTH,fp);
452          if ((s[0] == '\0') || (s[0] == '\n'))
453             done = TRUE;
454          else {
455             crPointer = strchr(s,'\n');
456             if (crPointer != NULL)
457               *crPointer = '\0';
458             printf("%s: ",s);
459
              L2CompareDictToString(s,charCorrelations,blankCorrelations,unknownDict,modelDic
              t,TRUE);
460          }
461        }
462      }
463      else {
464        while (!done) {
465          printf("Enter a word to search for: ");
466          fgets(s,MAX_STRING_LENGTH,stdin);
467          if ((s[0] == '\0') || (s[0] == '\n'))
468             done = TRUE;
469          else {
470             crPointer = strchr(s,'\n');
471             if (crPointer != NULL)
472               *crPointer = '\0';
473             printf("Comparing shape %s to the image\n",s);
474
              L2CompareDictToString(s,charCorrelations,blankCorrelations,unknownDict,modelDic
              t,FALSE);
475          }
476        }
477      }
478    }
479
```

Jan 15 21:32 1991 match.c

```
1       /*
2        * match.c
3        * align 2 sequences
4        *
5        * run as: match seq1 seq2
6        *
7        */
8
9       /*
10       * TO DO: 1) don't compute over parts of array outside of constraints
11       *        2) distance score for top and bottom paths
12       */
13
14      #include <stdio.h>
15      #include <math.h>
16
17      #include "boolean.h"
18      #include "types.h"
19      #include "error.h"
20      #include "pict.h"
21      #include "dict.h"
22      #include "diff.h"
23      #include "diff2.h"
24      #include "match.h"
25
26      #ifndef MAXLINE
27      #define MAXLINE 256
28      #endif
29
30      #ifndef MAXNAME
31      #define MAXNAME 128
32      #endif
33
34      #ifndef TRUE
35      #define TRUE 1
36      #endif
37
38      #ifndef FALSE
39      #define FALSE 0
40      #endif
41
42      int matchcntr = 1; /* used for writing out set number of matches */
43
44      /*
45      void
46      main(argc,argv)
47      int argc;
48      char *argv[];
49      {
50      */
51       /*
52        * read in multiple parameter files, write out selected fields as shorts
```

Section C

APPENDIX / Page 84

```
53      */
54      /*
55       int i,j;
56       int seqlength;
57       float matchvecs();
58
59       float test[MAXSEQLENGTH];
60       float ref[MAXSEQLENGTH];
61      */
62      /*
63       * read in args
64       */
65      /*
66       debug = FALSE;
67
68       for (;argc > 1 && (argv[1][0] == '-'); argc--, argv++)
69         {
70          switch (argv[1][1])
71              {
72              case 'd':
73                debug = TRUE;
74                break;
75              case 'h':
76                horweight = (float)atoi(&argv[1][2]);
77                break;
78              case 'v':
79                verweight = (float)atoi(&argv[1][2]);
80                break;
81              case 'x':
82                diagweight = (float)atoi(&argv[1][2]);
83                break;
84              default:
85                printf ("match: unknown switch %s.\n", argv[1]);
86                exit (1);
87              }
88         }
89
90       if (argc != 1)
91         {
92          printf ("Usage: match [-b<begsamp> -d(debug) -e<endsamp>\n");
93          printf ("argc: %d\n", argc);
94          exit (1);
95         }
96      */
97      /* debugging */
98      /* for (i = 0; i < 5; i++)
99        test[i] = (float)i;
100       for (i = 5; i < 10; i++)
101        test[i] = (float)(.5 * (i - 4) + 5);
102       for (i = 0; i < 5; i++)
103        ref[i] = 1.5 * i;
104       matchvecs(test, 10, ref, 5);
105
106      }
107      */
```

```
108
109     /*
110     float DPDiffPair(OutlinePair one, OutlinePair two)
111     {
112      if (one = = two){
113       printf("matches\n");
114       return(0.0);
115      }
116      else {
117       printf("no match\n");
118       return(1.0);
119      }
120     }
121     */
122
123     float DPDiffPair(OutlinePair one, OutlinePair two)
124       /*
125        * question, should top and bottom distance be forced to be computed together?
126        * use another distance score to check how far off the two are?
127        */
128
129     {
130      float topscore;
131      float bottomscore;
132
133      if (debug) printf("top: ");
134      topscore = matchvecs(one->top, one->numberOfLegs,
135                    two->top, two->numberOfLegs);
136      if (debug) printf(" bottom: ");
137      bottomscore = matchvecs(one->bottom, one->numberOfLegs,
138                    two->bottom, two->numberOfLegs);
139      return (topscore + bottomscore);
140     }
141
142     float matchvecs(float *Vec1, int lenVec1, float *Vec2, int lenVec2)
143        /*
144         * Computes the best path between one and two.
145         * Allows 2/1 expansion/compression
146         */
147     {
148      float dist, mindist, hor, vert, diag;
149      float bestscore;
150      int i1, i2;
151      int xdir, ydir;
152
153      elt *array[MAXSEQLENGTH][MAXSEQLENGTH];
154      elt *aelt;
155
156      /* initialize array */
157
158      for (i1 = 0; i1 < lenVec1; i1++) {
159       for (i2 = 0; i2 < lenVec2; i2++) {
160        array[i1][i2] = (elt *) malloc(sizeof (elt));
161        if (array[i1][i2] = = NULL) {
162           fprintf(stderr,
```

Section C

APPENDIX / Page 86

```
163                "Sorry, not enough space to malloc array elts in pl_matchvecs\n BYE!");
164           exit(1);
165        }
166     }
167   }
168
169   /*
170    * compute match
171    */
172   /* initialize */
173   aelt = array[0][0];
174   aelt->cost = sq_distance(Vec1[0], Vec2[0]);
175   aelt->xptr = 0;
176   aelt->yptr = 0;
177   /* bottom row */
178   i2 = 0;
179   for (i1 = 1; i1 < lenVec1; i1++) {
180     dist = sq_distance(Vec1[i1], Vec2[i2]);
181     aelt = array[i1][i2];
182     aelt->cost = array[i1 - 1][i2]->cost + horweight * dist;
183     aelt->xptr = -1;
184     aelt->yptr = 0;
185   }
186   /* left column */
187   i1 = 0;
188   for (i2 = 1; i2 < lenVec2; i2++) {
189     dist = sq_distance(Vec1[i1], Vec2[i2]);
190     aelt = array[i1][i2];
191     aelt->cost = array[i1][i2 - 1]->cost + verweight * dist;
192     aelt->xptr = 0;
193     aelt->yptr = -1;
194   }
195   /* middle */
196   for (i1 = 1; i1 < lenVec1; i1++) {
197     for (i2 = 1; i2 < lenVec2; i2++) {
198       dist = sq_distance(Vec1[i1], Vec2[i2]);
199       hor = array[i1 - 1][i2]->cost + horweight * dist;
200       xdir = -1;
201       ydir = 0;
202       mindist = hor;
203       vert = array[i1][i2 - 1]->cost + verweight * dist;
204       if (vert < mindist) {
205           xdir = 0;
206           ydir = -1;
207           mindist = vert;
208       }
209       diag = array[i1 - 1][i2 - 1]->cost + diagweight * dist;
210       if (diag < mindist) {
211           xdir = -1;
212           ydir = -1;
213           mindist = diag;
214       }
215       aelt = array[i1][i2];
216       aelt -> cost = mindist;
217       aelt -> xptr = xdir;
```

```
218        aelt->yptr = ydir;
219      }
220    }
221
222    bestscore = best_score(array, lenVec1, lenVec2);
223  #ifdef foo
224    if (debug) {
225      print_best_path(array, lenVec1, lenVec2);
226  /*  print_array_costs(array, lenVec1, lenVec2);
227      print_array_dirs(array, lenVec1, lenVec2);
228  */
229      printf("best score: %f\n", bestscore);
230    }
231  #endif
232
233    for (i1 = 0; i1 < lenVec1; i1++) {
234      for (i2 = 0; i2 < lenVec2; i2++) {
235        free(array[i1][i2]);
236      }
237    }
238
239    return(bestscore);
240  }
241
242  float
243  sq_distance(float x1, float x2)
244  {
245    float dist;
246    float epsilon = .001;
247
248    /*
249     * quantization makes many values identical, use of epsilon encourages shortest path
250     */
251
252    dist = x1 - x2;
253    dist *= dist;
254    dist += epsilon;
255    return(dist);
256  }
257
258  /*
259  float parallel_distance(OutlinePair one, OutlinePair two, int ptr1, int ptr2)
260  {
261    float topdist, bottomdist;
262
263    topdist = one->top[ptr1] - two->top[ptr2];
264    topdist *= topdist;
265
266    bottomdist = one->bottom[ptr1] - two->bottom[ptr2];
267    bottomdist *= bottomdist;
268
269    return(topdist + bottomdist);
270  }
271  */
272
```

Section C

APPENDIX / Page 88

```
273     float
274     best_score (elt *array[][MAXSEQLENGTH], int lenVec1, int lenVec2)
275     {
276       /* assume all of Vec1 and Vec2 are used, so just take value at end */
277
278       return(array[lenVec1 - 1][lenVec2 - 1]->cost);
279     }
280
281     /*
282      * *********************
283      * debugging functions
284      */
285     #ifdef foo
286     void
287     print_best_path(elt *array[][MAXSEQLENGTH], int lenVec1, int lenVec2)
288     {
289       char path[MAXNAME];
290       int x, y;
291       elt *aelt;
292       FILE *ofp;
293
294       x = lenVec1 - 1;
295       y = lenVec2 - 1;
296
297       sprintf(path, "/net/piglet/piglet/speech/fchen/pics/paths/p%d.txt", FileCountY);
298
299       ofp = fopen (path, "a");
300       if(ofp == NULL)
301         printf("Cannot open output file %s.\n", path);
302
303     /* fprintf(ofp, " %3s %3s %6s\n", "x", "y", "cost");
304      */
305       while (x > 0 || y > 0) {
306         aelt = array[x][y];
307         fprintf(ofp, " %3d %3d %6.2f\n", x, y, aelt->cost);
308         x += aelt->xptr;
309         y += aelt->yptr;
310       }
311     /* fprintf(ofp, " \"match %d\n\n", matchcntr++);
312      */
313       fprintf(ofp, " \"match %d %d\n\n", FileCountX, FileCountY);
314       fclose(ofp);
315     }
316     #endif
317     static float sqr(float x)
318     {
319       return x*x;
320     }
321
322     void print_best_path(elt *array[][MAXSEQLENGTH], int lenVec1, int lenVec2,
323                          char *outFileName)
324     {
325       int x, y;
326       elt *aelt;
327       FILE *outFile;
```

Section C                                         APPENDIX / Page 89

```
328     float dist = 0;
329
330     x = lenVec1 - 1;
331     y = lenVec2 - 1;
332
333     if ((outFile = (FILE *)fopen(outFileName,"w"))= =NULL)
334       DoError("single: Cannot open output file %s.\n", outFileName);
335
336     while (x > 0 || y > 0) {
337       aelt = array[x][y];
338       fprintf(outFile, " %3d %3d %6.2f\n", x, y, aelt->cost);
339       dist + = sqrt(sqr(aelt->xptr)+sqr(aelt->yptr));
340       x + = aelt->xptr;
341       y + = aelt->yptr;
342     }
343     fclose(outFile);
344     printf("distance = %f\n",dist);
345   }
346
347
348   void
349   print_array_costs(elt *array[][MAXSEQLENGTH], int lenVec1, int lenVec2)
350   {
351
352    int x, y;
353
354    for (y = 0; y < lenVec2; y++){
355     for (x = 0; x < lenVec1; x++){
356       printf("%7.2f ", array[x][y]->cost);
357     }
358     printf("\n");
359    }
360   }
361
362   void
363   print_array_dirs(elt *array[][MAXSEQLENGTH], int lenVec1, int lenVec2)
364   {
365
366    int x, y;
367
368    for (y = 0; y < lenVec2; y++){
369     for (x = 0; x < lenVec1; x++){
370       printf("%2d:%2d  ", array[x][y]->xptr, array[x][y]->yptr);
371     }
372     printf("\n");
373    }
374   }
```

Section C

Jul 7 14:28 1991 matchparallel.c

```
1       /*
2        * matchparallel.c
3        * align 2 sequences
4        *
5        * dependent on match.c
6        */
7
8       /*
9        * TO DO: 1) don't compute over parts of array outside of constraints
10       *
11       */
12
13      #include <stdio.h>
14      #include <math.h>
15      #include "boolean.h"
16      #include "types.h"
17      #include "error.h"
18      #include "pict.h"
19      #include "dict.h"
20      #include "diff.h"
21      #include "diff2.h"
22      #include "match.h"
23      #include "matchparallel.h"
24
25      #ifndef MAXLINE
26      #define MAXLINE 256
27      #endif
28
29      #ifndef MAXNAME
30      #define MAXNAME 128
31      #endif
32
33      #ifndef TRUE
34      #define TRUE 1
35      #endif
36
37      #ifndef FALSE
38      #define FALSE 0
39      #endif
40
41      #ifndef max
42      #define max(a,b) ((a) > (b) ? (a) : (b))
43      #endif
44
45      #ifndef min
46      #define min(a,b) ((a) < (b) ? (a) : (b))
47      #endif
48
49      /*
50       * *******************
51       * parallel match with full search
52       * *******************
```

```
53      */
54
55      float pl_DPDiffPair(OutlinePair one, OutlinePair two, char *pathFile)
56        /*
57         * question, should top and bottom distance be forced to be computed together?
58         * use another distance score to check how far off the two are?
59         */
60
61      {
62        float score;
63
64        score = pl_matchvecs(one->top, one->bottom, one->numberOfLegs,
65                    two->top, two->bottom, two->numberOfLegs,
66                      pathFile);
67        return (score);
68      }
69
70      float pl_matchvecs(float *Vec1t, float *Vec1b, int lenVec1,
71                  float *Vec2t, float *Vec2b, int lenVec2,
72                  char *pathFile)
73        /*
74         * Computes the best path between one and two.
75         * Allows 2/1 expansion/compression
76         */
77      {
78        float dist, mindist, hor, vert, diag;
79        float bestscore;
80        int i1, i2;
81        int xdir, ydir;
82
83        elt *array[MAXSEQLENGTH][MAXSEQLENGTH];
84        elt *aelt;
85
86        /* initialize array */
87
88        for (i1 = 0; i1 < lenVec1; i1++) {
89         for (i2 = 0; i2 < lenVec2; i2++) {
90          array[i1][i2] = (elt *) malloc(sizeof (elt));
91          if (array[i1][i2] == NULL) {
92              fprintf(stderr,
93                  "Sorry, not enough space to malloc array elts in pl_matchvecs\n BYE!");
94              exit(1);
95          }
96         }
97        }
98
99        /*
100        * compute match
101        */
102       /* initialize */
103       aelt = array[0][0];
104       aelt->cost = sq_distance(Vec1t[0], Vec2t[0]) + sq_distance(Vec1b[0], Vec2b[0]);
105       aelt->xptr = 0;
106       aelt->yptr = 0;
107       /* bottom row */
```

Section C

```
108         i2 = 0;
109         for (i1 = 1; i1 < lenVec1; i1++) {
110           dist = sq_distance(Vec1t[i1], Vec2t[i2]) + sq_distance(Vec1b[i1], Vec2b[i2]);
111           aelt = array[i1][i2];
112           aelt->cost = array[i1 - 1][i2]->cost + horweight * dist;
113           aelt->xptr = -1;
114           aelt->yptr = 0;
115         }
116         /* left column */
117         i1 = 0;
118         for (i2 = 1; i2 < lenVec2; i2++) {
119           dist = sq_distance(Vec1t[i1], Vec2t[i2]) + sq_distance(Vec1b[i1], Vec2b[i2]);
120           aelt = array[i1][i2];
121           aelt->cost = array[i1][i2 - 1]->cost + verweight * dist;
122           aelt->xptr = 0;
123           aelt->yptr = -1;
124         }
125         /* middle */
126         for (i1 = 1; i1 < lenVec1; i1++) {
127          for (i2 = 1; i2 < lenVec2; i2++) {
128           dist = sq_distance(Vec1t[i1], Vec2t[i2]) + sq_distance(Vec1b[i1], Vec2b[i2]);
129           hor = array[i1 - 1][i2]->cost + horweight * dist;
130           xdir = -1;
131           ydir = 0;
132           mindist = hor;
133           vert = array[i1][i2 - 1]->cost + verweight * dist;
134           if (vert < mindist) {
135               xdir = 0;
136               ydir = -1;
137               mindist = vert;
138           }
139           diag = array[i1 - 1][i2 - 1]->cost + diagweight * dist;
140           if (diag < mindist) {
141               xdir = -1;
142               ydir = -1;
143               mindist = diag;
144           }
145           aelt = array[i1][i2];
146           aelt-> cost = mindist;
147           aelt-> xptr = xdir;
148           aelt-> yptr = ydir;
149          }
150         }
151
152         bestscore = best_score(array, lenVec1, lenVec2);
153         if (pathFile)
154           print_best_path(array, lenVec1, lenVec2,pathFile);
155
156
157         for (i1 = 0; i1 < lenVec1; i1++) {
158          for (i2 = 0; i2 < lenVec2; i2++) {
159           free(array[i1][i2]);
160          }
161         }
162
```

Section C

APPENDIX / Page 93

```
163       return(bestscore);
164     }
165
166
167     /*
168      * *********************
169      * faster parallel match
170      * not optimal because warp is limited to swath of width "bw"
171      * *********************
172      */
173
174     float faster_pl_DPDiffPair(OutlinePair one, OutlinePair two, char *pathFile)
175       /*
176        * question, should top and bottom distance be forced to be computed together?
177        * use another distance score to check how far off the two are?
178        */
179
180     {
181       float score;
182
183       score = faster_pl_matchvecs(one->top, one->bottom, one->numberOfLegs,
184                       two->top, two->bottom, two->numberOfLegs,
185                       pathFile);
186       return (score);
187     }
188
189     float faster_pl_matchvecs(float *Vec1t, float *Vec1b, int lenVec1,
190                     float *Vec2t, float *Vec2b, int lenVec2,
191                     char *pathFile)
192       /*
193        * Computes the best path between one and two.
194        * Allows 2/1 expansion/compression only within a band
195        */
196     {
197       float dist, mindist, hor, vert, diag;
198       float bestscore;
199       float ratio;
200       int i1, i2;
201       int xdir, ydir;
202       int beg, end, center;
203       int b;             /* pointer to border */
204       int border;                /* width of border on right side of swath */
205
206       elt *array[MAXSEQLENGTH][MAXSEQLENGTH];
207       elt *aelt;
208
209       float infinity = 1.0e30;
210       int bw = 20;
211
212       ratio = (float)lenVec1/ (float)lenVec2;
213       border = (int) (ratio + .999999);
214     /* if (debug)
215         printf("ratio: %f\n", ratio);
216     */ /* initialize array */
217
```

Section C

APPENDIX / Page 94

```
218      for (i1 = 0; i1 < lenVec1; i1++) {
219       for (i2 = 0; i2 < lenVec2; i2++) {
220        array[i1][i2] = (elt *) malloc(sizeof (elt));
221        if (array[i1][i2] == NULL) {
222            fprintf(stderr,
223                "Sorry, not enough space to malloc array elts in pl_matchvecs\n BYE!");
224            exit(1);
225        }
226       }
227      }
228
229      /*
230       * compute match
231       */
232      /* initialize */
233      aelt = array[0][0];
234      aelt->cost = sq_distance(Vec1t[0], Vec2t[0]) + sq_distance(Vec1b[0], Vec2b[0]);
235      aelt->xptr = 0;
236      aelt->yptr = 0;
237      /* bottom row */
238      i2 = 0;
239      end = bw + border + 1;
240      for (i1 = 1; i1 < end; i1++) {
241       dist = sq_distance(Vec1t[i1], Vec2t[i2]) + sq_distance(Vec1b[i1], Vec2b[i2]);
242       aelt = array[i1][i2];
243       aelt->cost = array[i1 - 1][i2]->cost + horweight * dist;
244       aelt->xptr = -1;
245       aelt->yptr = 0;
246      }
247      /*
248       * swath
249       *
250       * set the elt before beg and at end to infinity, then the compute distances normally
251       * for the row
252       */
253      for (i2 = 1; i2 < lenVec2; i2++) {
254       center = i2 * ratio;
255       beg = max(1, center - bw);
256       end = min(lenVec1, center + bw + 1);
257      /*   if (debug)
258         printf("center: %d, beg: %d, end: %d\n", center, beg, end);
259      */  /* beg */
260       aelt = array[beg - 1][i2];
261       aelt->xptr = 0;
262       aelt->yptr = -1;
263       if (beg == 1) {
264        dist = sq_distance(Vec1t[0], Vec2t[i2]) + sq_distance(Vec1b[0], Vec2b[i2]);
265        aelt->cost = array[0][i2 - 1]->cost + verweight * dist;
266       }
267       else {
268        aelt->cost = infinity;
269       }
270       /* end */
271      /*   if (end < lenVec1) {
272      */
```

Section C

APPENDIX / Page 95

```
273       for (b = end; b < min(end+border,lenVec1); b++) {
274   /*      if (debug)
275               printf("b: %d ", b);
276   */    aelt = array[b][i2];
277         aelt->cost = infinity;
278         aelt->xptr = -1;
279         aelt->yptr = 0;
280       }
281       for (i1 = beg; i1 < end; i1++) {
282         dist = sq_distance(Vec1t[i1], Vec2t[i2]) + sq_distance(Vec1b[i1], Vec2b[i2]);
283         hor = array[i1 - 1][i2]->cost + horweight * dist;
284         xdir = -1;
285         ydir = 0;
286         mindist = hor;
287         vert = array[i1][i2 - 1]->cost + verweight * dist;
288         if (vert < mindist) {
289             xdir = 0;
290             ydir = -1;
291             mindist = vert;
292         }
293         diag = array[i1 - 1][i2 - 1]->cost + diagweight * dist;
294         if (diag < mindist) {
295             xdir = -1;
296             ydir = -1;
297             mindist = diag;
298         }
299         aelt = array[i1][i2];
300         aelt -> cost = mindist;
301         aelt -> xptr = xdir;
302         aelt -> yptr = ydir;
303       }
304     }
305
306     bestscore = best_score(array, lenVec1, lenVec2);
307     if (pathFile)
308       print_best_path(array, lenVec1, lenVec2,pathFile);
309
310     for (i1 = 0; i1 < lenVec1; i1++) {
311      for (i2 = 0; i2 < lenVec2; i2++) {
312       free(array[i1][i2]);
313      }
314     }
315
316     return(bestscore);
317   }
318
319
320   /*
321    *********************
322    * fastest parallel match
323    * warp limited to swath bw, plus no backtracking
324    *********************
325    */
326
327   float simple_pl_DPDiffPair(OutlinePair one, OutlinePair two)
```

Section C

APPENDIX / Page 96

```
328      /*
329       * question, should top and bottom distance be forced to be computed together?
330       * use another distance score to check how far off the two are?
331       */
332
333      {
334       float score;
335
336       score = simple_pl_matchvecs(one->top, one->bottom, one->numberOfLegs,
337                       two->top, two->bottom, two->numberOfLegs);
338       return (score);
339      }
340
341      void PrintArrayRow(float *array,int width)
342      {
343       int i;
344       for (i=0;i<width;++i)
345         printf("%2.2f ",*array++);
346       printf("\n");
347      }
348
349      void PrintArray(float *array,int height,int width,int signalWidth)
350      {
351       int i;
352       for (i=0;i<height;++i) {
353         printf("%d: ",i);
354         PrintArrayRow(array+i*width,signalWidth);
355       }
356      }
357
358      float simple_pl_matchvecs(float *Vec1t, float *Vec1b, int lenVec1, float *Vec2t, float
         *Vec2b, int lenVec2)
359       /*
360        * Computes the best path between one and two within a band.
361        * Allows 2/1 expansion/compression only within a band.
362        */
363      {
364       float dist, mindist, hor, vert, diag;
365       float bestscore;
366       float ratio;
367       int i1, i2;
368       int xdir, ydir;
369       int beg, end, center;
370       int b;              /* pointer to border */
371       int border;            /* width of border on right side of swath */
372
373       float array[MAXSEQLENGTH][MAXSEQLENGTH];
374
375       float infinity = 1.0e30;
376       int bw = 20;
377
378       ratio = (float)lenVec1/ (float)lenVec2;
379       border = (int) (ratio + .999999);
380      /* if (debug)
381         printf("ratio: %f\n", ratio);
```

```
382     */ /* initialize array */
383
384
385     /*
386      * compute match
387      */
388     /* initialize */
389     array[0][0] = sq_distance(Vec1t[0], Vec2t[0]) + sq_distance(Vec1b[0], Vec2b[0]);
390
391     /* bottom row */
392     i2 = 0;
393     end = bw + border + 1;
394     for (i1 = 1; i1 < end; i1++) {
395       dist = sq_distance(Vec1t[i1], Vec2t[i2]) + sq_distance(Vec1b[i1], Vec2b[i2]);
396       array[i1][i2] = array[i1 - 1][i2] + horweight * dist;
397     }
398     /*
399      * swath
400      *
401      * set the elt before beg and at end to infinity, then the compute distances normally
402      * for the row
403      */
404     for (i2 = 1; i2 < lenVec2; i2++) {
405       center = i2 * ratio;
406       beg = max(1, center - bw);
407       end = min(lenVec1, center + bw + 1);
408     /*  if (debug)
409         printf("center: %d, beg: %d, end: %d\n", center, beg, end);
410     */  /* beg */
411       if (beg == 1) {
412         dist = sq_distance(Vec1t[0], Vec2t[i2]) + sq_distance(Vec1b[0], Vec2b[i2]);
413         array[beg - 1][i2] = array[0][i2 - 1] + verweight * dist;
414       }
415       else {
416         array[beg - 1][i2] = infinity;
417       }
418       /* end */
419       for (b = end; b < min(end+border,lenVec1); b++) {
420     /*    if (debug)
421           printf("b: %d ", b);
422     */
423         array[b][i2] = infinity;
424       }
425       for (i1 = beg; i1 < end; i1++) {
426         dist = sq_distance(Vec1t[i1], Vec2t[i2]) + sq_distance(Vec1b[i1], Vec2b[i2]);
427         hor = array[i1 - 1][i2] + horweight * dist;
428         mindist = hor;
429         vert = array[i1][i2 - 1] + verweight * dist;
430         if (vert < mindist) {
431             mindist = vert;
432         }
433         diag = array[i1 - 1][i2 - 1] + diagweight * dist;
434         if (diag < mindist) {
435             mindist = diag;
436         }
```

Section C

APPENDIX / Page 98

```
437         array[i1][i2] = mindist;
438       }
439     }
440
441     bestscore = array[lenVec1 - 1][lenVec2 - 1];
442     if (debug) {
443       printf("best score: %f\n", bestscore);
444     }
445
446     return(bestscore);
447   }
```

Jul 24 17:16 1991 newL2.c

```
1       #include <stdio.h>
2       #include <math.h>
3       #include "boolean.h"
4       #include "types.h"
5       #include "error.h"
6       #include "dict.h"
7
8       #define NORMAL_LENGTH (100.0)
9       #define MAX_SLOPE (2.0)
10      #define BIG_NUM (10.0e20)
11
12      void ResampleOutlinePair(OutlinePair a,float newToOldFactor)
13      /* Resample an outline pair using linear interpolation. */
14      {
15       int newWidth,oldWidth,i;
16       int oldLeft,oldRight;
17       float oldCenter;
18       float *newX,*newTop,*newBottom;
19       float *xCursor,*topCursor,*bottomCursor;
20
21       oldWidth = a->numberOfLegs;
22       newWidth = irint(newToOldFactor*oldWidth);
23
24       newX = (float *)calloc(newWidth,sizeof(float));
25       newTop = (float *)calloc(newWidth,sizeof(float));
26       newBottom = (float *)calloc(newWidth,sizeof(float));
27       if ((newX==NULL)||(newTop==NULL)||(newBottom==NULL))
28        DoError("ResampleOutlinePair: cannot allocate space.\n",NULL);
29
30       xCursor = newX;
31       topCursor = newTop;
32       bottomCursor = newBottom;
33
34       for (i=0;i<newWidth;++i) {
35        oldCenter = i/(float)newWidth*(float)oldWidth;
36        oldLeft = irint(floor(oldCenter));
37        oldRight = irint(ceil(oldCenter));
38        if (oldLeft==oldRight) {
39         *xCursor++ = *(a->x+oldLeft);
40         *topCursor++ = *(a->top+oldLeft);
41         *bottomCursor++ = *(a->bottom+oldLeft);
42        }
43        else {
44         float slope;
45         slope = *(a->x+oldRight)-*(a->x+oldLeft);
46         *xCursor++ = *(a->x+oldLeft) + (oldCenter-oldLeft)*slope;
47         slope = *(a->top+oldRight)-*(a->top+oldLeft);
48         *topCursor++ = *(a->top+oldLeft) + (oldCenter-oldLeft)*slope;
49         slope = *(a->bottom+oldRight)-*(a->bottom+oldLeft);
50         *bottomCursor++ = *(a->bottom+oldLeft) + (oldCenter-oldLeft)*slope;
51        }
52       }
```

Section C

```
53
54        free(a->x);
55        free(a->top);
56        free(a->bottom);
57
58        a->x = newX;
59        a->top = newTop;
60        a->bottom = newBottom;
61        a->numberOfLegs = newWidth;
62      }
63
64      float L2Norm(OutlinePair signal, int startOffset,
65                OutlinePair model,float topToBottom)
66      {
67       float *top1,*top2,*bottom1,*bottom2;
68       int i,overlap;
69       float sum;
70       float temp;
71
72       if ((startOffset < 0) ||
73         (startOffset + model->numberOfLegs > signal->numberOfLegs))
74        DoError("L2Norm: the model must overlap the signal.\n",NULL);
75
76       top1 = signal->top+startOffset;
77       top2 = model->top;
78       bottom1 = signal->bottom+startOffset;
79       bottom2 = model->bottom;
80
81       overlap = signal->numberOfLegs - startOffset;
82       if (overlap > model->numberOfLegs)
83         overlap = model->numberOfLegs;
84
85       for (i=0,sum=0;i<overlap;++i) {
86        temp = *top1++ - *top2++;
87        sum += temp * temp * topToBottom;
88        temp = *bottom1++ - *bottom2++;
89        sum += temp * temp;
90       }
91
92       return sum;
93      }
94
95      float L2Compare(OutlinePair o1,OutlinePair o2,float topToBottom)
96      {
97       float slope = (float)o1->width/(float)o2->width;
98       if ((slope>MAX_SLOPE)||(1/slope>MAX_SLOPE))
99         return BIG_NUM;
100      if (o1->numberOfLegs != NORMAL_LENGTH)
101        ResampleOutlinePair(o1,NORMAL_LENGTH/o1->numberOfLegs);
102      if (o2->numberOfLegs != NORMAL_LENGTH)
103        ResampleOutlinePair(o2,NORMAL_LENGTH/o2->numberOfLegs);
104      return L2Norm(o1,0,o2,topToBottom);
105     }
106
```

APPENDIX / Page 100

Aug 14 20:54 1991 newMatch.c

```
1       #include <stdio.h>
2       #include "mylib.h"
3       #include "misc.h"
4       #include "types.h"
5       #include "dict.h"
6       #include "newMatch.h"
7
8       #define MAX_SIGNAL_LENGTH (800)
9       #define MAX_SLOPE (2.0)
10      #define BIG_NUM (10e20)
11
12      typedef enum {NONE,LEFT,DOWN,DOWNLEFT,D1L1,D2L1,D1L2} Direction;
13
14      extern double sqrt(double);
15      extern double cos(double);
16      extern double atan(double);
17      extern int irint(double);
18
19      /* Assumes that a represents the model and b represents the unknown.
20       * Weights places where the model is lower than the unknown more than
21       * cases where the model is higher than the unknown.  The idea here is
22       * that valleys can be filled in by bleeding together, but that noise
23       * can rarely make a contour be too tall for extended periods.
24       */
25      float hillToValley = 1.0;
26      inline float SquareDifference(float a,float b)
27      {
28        float temp = a-b;
29        if (temp<0)
30          return temp*temp;
31        else
32          return temp*temp*hillToValley*hillToValley;
33      /*  return (a-b)*(a-b); */
34      }
35
36      inline float FMax(float a,float b)
37      {
38        if (a>b)
39          return a;
40        else
41          return b;
42      }
43
44      inline float FMin(float a,float b)
45      {
46        if (a<b)
47          return a;
48        else
49          return b;
50      }
51
52      inline int IMax(int a,int b)
```

Section C

APPENDIX / Page 102

```
53      {
54        if (a>b)
55          return a;
56        else
57          return b;
58      }
59
60      inline int IMin(int a,int b)
61      {
62        if (a<b)
63          return a;
64        else
65          return b;
66      }
67
68      float NewMatch(float *a1,float *a2,int aLength,float *b1,float *b2,int bLength,
69              float centerWeight,BOOLEAN lengthNormalize,int normalBandWidth,
70              float topToBottom)
71      {
72        float costs0[MAX_SIGNAL_LENGTH + 1];
73        float costs1[MAX_SIGNAL_LENGTH + 1];
74        int i,j,start,end,bandWidth,shift;
75        int realStart,realEnd,center,oldEnd;
76        float slope,angle;
77        float *a1c,*a2c,*cd,*cl,*cdl,*dc;
78        float oldCost,b1v,b2v,returnVal;
79
80        if (aLength>MAX_SIGNAL_LENGTH||bLength>MAX_SIGNAL_LENGTH)
81          DoError("NewMatch: maximum signal length exceeded.\n",NULL);
82
83        slope = (float)aLength/(float)bLength;
84
85        if ((slope>MAX_SLOPE)||(1/slope>MAX_SLOPE)) {
86          return BIG_NUM;
87        }
88        angle = atan(slope);
89        bandWidth = irint(normalBandWidth/cos(angle));
90        center = 0;
91        realStart = center-bandWidth/2;
92        realEnd = realStart+bandWidth;
93        end = FMin(realEnd,aLength);
94
95        a1c = a1; /* a1 cursor */
96        a2c = a2; /* a2 cursor */
97        b1v = *b1; /* b1 value */
98        b2v = *b2; /* b2 value */
99        dc = costs0;
100       *dc++ = BIG_NUM;
101       oldCost = *dc++ =
      SquareDifference(*a1c++,b1v)*topToBottom+SquareDifference(*a2c++,b2v);
102
103       for (j=1;j<end;++j)
104         oldCost = *dc++ =
      oldCost+SquareDifference(*a1c++,b1v)*topToBottom+SquareDifference(*a2c++,b2v);
105
```

Section C

```
106     for (i=1;i<bLength;++i){
107       /* Compute new center of band */
108       center = irint(slope*i);
109       realStart = center-bandWidth/2;
110       realEnd = realStart+bandWidth;
111       start = FMax(realStart,0);
112       oldEnd = end;
113       end = FMin(realEnd,aLength);
114       shift = end-oldEnd;
115
116       /* put large numbers where bands don't overlap */
117       for (j=0;j<shift;++j)
118         *dc++ = BIG_NUM;
119
120       a1c = a1+start;  /* a1 cursor */
121       a2c = a2+start;  /* a2 cursor */
122       b1v = *(b1+i);   /* b1 value */
123       b2v = *(b2+i);   /* b2 value */
124       if (i&1) {
125         cd = costs1+start-1+1;  /* cursor down ??? What about -1??? */
126         cdl = costs0+start-1+1; /* cursor down left */
127         cl = costs0+start+1;    /* cursor left */
128         dc = costs1+start+1;    /* destination cursor */
129       }
130       else {
131         cd = costs0+start-1+1;  /* cursor down */
132         cdl = costs1+start-1+1; /* cursor down left */
133         cl = costs1+start+1;    /* cursor left */
134         dc = costs0+start+1;    /* destination cursor */
135       }
136       *cd = BIG_NUM;
137       for (j=start;j<end;++j){
138         float down,left,downLeft,rest;
139         down = *cd++ + rest;
140         left = *cl++ + rest;
141         downLeft = *cdl++ + rest*centerWeight;
142         rest = SquareDifference(*a1c++,b1v)*topToBottom+
143             SquareDifference(*a2c++,b2v);
144         *dc++ = FMin(FMin(down,left),downLeft);
145       }
146     }
147
148     i--;
149     if (i&1)
150       dc = costs1+aLength-1+1;
151     else
152       dc = costs0+aLength-1+1;
153     returnVal = *dc;
154
155     if (lengthNormalize)
156       return returnVal/sqrt(aLength*aLength+bLength*bLength);
157     else
158       return returnVal;
159   }
160
```

Section C

APPENDIX / Page 104

```
161
162     float SepMatch(float *a1,int aLength,float *b1,int bLength,
163             float centerWeight,BOOLEAN lengthNormalize,int normalBandWidth)
164     {
165      float costs0[MAX_SIGNAL_LENGTH+1];
166      float costs1[MAX_SIGNAL_LENGTH+1];
167      int i,j,start,end,bandWidth,shift;
168      int realStart,realEnd,center,oldEnd;
169      float slope,angle;
170      float *a1c,*cd,*cl,*cdl,*dc;
171      float oldCost,b1v,returnVal;
172
173      if (aLength>MAX_SIGNAL_LENGTH||bLength>MAX_SIGNAL_LENGTH)
174        DoError("NewMatch: maximum signal length exceeded.\n",NULL);
175
176      slope = (float)aLength/(float)bLength;
177
178      if ((slope>MAX_SLOPE)||(1/slope>MAX_SLOPE)) {
179        return BIG_NUM;
180      }
181      angle = atan(slope);
182      bandWidth = irint(normalBandWidth/cos(angle));
183      center = 0;
184      realStart = center-bandWidth/2;
185      realEnd = realStart+bandWidth;
186      end = FMin(realEnd,aLength);
187
188      a1c = a1; /* a1 cursor */
189      b1v = *b1; /* b1 value */
190      dc = costs0;
191      *dc++ = BIG_NUM;
192      oldCost = *dc++ = SquareDifference(*a1c++,b1v);
193
194      for (j=1;j<end;++j)
195        oldCost = *dc++ = oldCost+SquareDifference(*a1c++,b1v);
196
197      for (i=1;i<bLength;++i) {
198        /* Compute new center of band */
199        center = irint(slope*i);
200        realStart = center-bandWidth/2;
201        realEnd = realStart+bandWidth;
202        start = FMax(realStart,0);
203        oldEnd = end;
204        end = FMin(realEnd,aLength);
205        shift = end-oldEnd;
206
207        /* put large numbers where bands don't overlap */
208        for (j=0;j<shift;++j)
209          *dc++ = BIG_NUM;
210
211        a1c = a1+start; /* a1 cursor */
212        b1v = *(b1+i); /* b1 value */
213        if (i&1) {
214          cd = costs1+start-1+1; /* cursor down ??? What about -1??? */
215          cdl = costs0+start-1+1; /* cursor down left */
```

Section C

APPENDIX / Page 105

```
216        cl = costs0+start+1; /* cursor left */
217        dc = costs1+start+1; /* destination cursor */
218      }
219      else {
220        cd = costs0+start-1+1; /* cursor down */
221        cdl = costs1+start-1+1; /* cursor down left */
222        cl = costs1+start+1; /* cursor left */
223        dc = costs0+start+1; /* destination cursor */
224      }
225      *cd = BIG_NUM;
226      for (j=start;j<end;++j) {
227        float down,left,downLeft,rest;
228        down = *cd++ + rest;
229        left = *cl++ + rest;
230        downLeft = *cdl++ + rest*centerWeight;
231        rest = SquareDifference(*a1c++,b1v);
232        *dc++ = FMin(FMin(down,left),downLeft);
233      }
234    }
235
236    i--;
237    if (i&1)
238      dc = costs1+aLength-1+1;
239    else
240      dc = costs0+aLength-1+1;
241    returnVal = *dc;
242
243    if (lengthNormalize)
244      return returnVal/sqrt(aLength*aLength+bLength*bLength);
245    else
246      return returnVal;
247  }
248
249  #define WIDTH (800)
250  #define H_MARGIN (20)
251  #define V_MARGIN (40)
252  #define H_SPACING (20)
253  #define V_SPACING (100) /* Must be greater than 2*X_HEIGHT */
254  #define X_HEIGHT (17)
255  void DrawVLine(Picture pict,int x,int yt,int yb)
256  {
257    int i;
258    for (i=yt;i<yb;++i)
259      WritePixel(pict,x,i,1);
260  }
261
262  void DrawOutline(Picture pict,int numberOfLegs,float *tops,float *bottoms,int x,int y)
263  {
264    int i,top,bottom;
265    for (i=0;i<numberOfLegs;++i) {
266      top = irint(-*(tops+i)*X_HEIGHT);
267      bottom = irint(*(bottoms+i)*X_HEIGHT+X_HEIGHT);
268      DrawVLine(pict,i+x,top+y,bottom+y);
269    }
270  }
```

Section C

APPENDIX / Page 106

```
271
272     void PrintPath(float *a1,float *a2,int aLength,float *b1,float *b2,int bLength,
273                 Direction path[MAX_SIGNAL_LENGTH][MAX_SIGNAL_LENGTH],int i,
274                 float returnVal,
275                 FILE *pathFP)
276     {
277      int x,y,j;
278      int length = 0;
279      int index = 0;
280      float newTop1[MAX_SIGNAL_LENGTH],newBottom1[MAX_SIGNAL_LENGTH];
281      float newTop2[MAX_SIGNAL_LENGTH],newBottom2[MAX_SIGNAL_LENGTH];
282
283      y = i;
284      x = aLength-1;
285      while (path[y][x]!=NONE) {
286       switch (path[y][x]) {
287       case DOWN:
288        x--;
289        break;
290       case LEFT:
291        y--;
292        break;
293       case D1L1:
294       case DOWNLEFT:
295        x--;
296        y--;
297        break;
298       case D2L1:
299        x-=2;
300        y--;
301        break;
302       case D1L2:
303        x--;
304        y-=2;
305        break;
306       default:
307        DoError("NewMatchAndPath: Internal error - bad case.\n",NULL);
308       }
309       ++length;
310      }
311
312      y = i;
313      x = aLength-1;
314      while (path[y][x]!=NONE) {
315       if (index>=MAX_SIGNAL_LENGTH)
316        DoError("NewMatchAddPath: warped signal is too long.\n",NULL);
317       newTop1[length-index] = a1[x];
318       newBottom1[length-index] = a2[x];
319       newTop2[length-index] = b1[y];
320       newBottom2[length-index] = b2[y];
321       switch (path[y][x]) {
322       case DOWN:
323        x--;
324        break;
325       case LEFT:
```

Section C  APPENDIX / Page 107

```
326        y--;
327        break;
328      case D1L1:
329      case DOWNLEFT:
330        x--;
331        y--;
332        break;
333      case D2L1:
334        x-=2;
335        y--;
336        break;
337      case D1L2:
338        x--;
339        y-=2;
340        break;
341      default:
342        DoError("NewMatchAndPath: Internal error - bad case.\n",NULL);
343      }
344      ++index;
345    }
346    if (index>=MAX_SIGNAL_LENGTH)
347      DoError("NewMatchAddPath: warped signal is too long.\n",NULL);
348    newTop1[length-index] = a1[x];
349    newBottom1[length-index] = a2[x];
350    newTop2[length-index] = b1[y];
351    newBottom2[length-index] = b2[y];
352    ++index;
353
354    for (j=0;j<index;++j)
355      fprintf(pathFP,"%d %f\n",j,newTop1[j]);
356    fprintf(pathFP,"\"top1\n\n");
357
358    for (j=0;j<index;++j)
359      fprintf(pathFP,"%d %f\n",j,newTop2[j]);
360    fprintf(pathFP,"\"top2\n\n");
361
362    for (j=0;j<index;++j)
363      fprintf(pathFP,"%d %f\n",j,-newBottom1[j]);
364    fprintf(pathFP,"\"bottom1\n\n");
365
366    for (j=0;j<index;++j)
367      fprintf(pathFP,"%d %f\n",j,-newBottom2[j]);
368    fprintf(pathFP,"\"bottom2\n\n");
369
370    {
371      Picture pict;
372      pict = new_pict(IMax(index,IMax(aLength,bLength))*2+H_SPACING+H_MARGIN*2,V_MARGIN*2+2*V_SPACING,1);
373      DrawOutline(pict,aLength,a1,a2,H_MARGIN,V_MARGIN);
374      DrawOutline(pict,bLength,b1,b2,H_MARGIN+aLength+H_SPACING,V_MARGIN);
375
376      DrawOutline(pict,index,newTop1,newBottom1,H_MARGIN,V_MARGIN+V_SPACING);
```

Section C

APPENDIX / Page 108

```
377
      DrawOutline(pict,index,newTop2,newBottom2,H_MARGIN+index+H_SPACING,V_MARGI
      N+V_SPACING);
378     DrawOutline(pict,index,newTop2,newBottom2,H_MARGIN,V_MARGIN+V_SPACING*2);
379     write_pict("out.pict",pict);
380    }
381
382   {
383    float checksum;
384    fprintf(pathFP,"%d %f\n",0,checksum);
385    for (j=0,checksum=0;j<index;++j) {
386     checksum+=SquareDifference(newTop1[j],newTop2[j])+
387       SquareDifference(newBottom1[j],newBottom2[j]);
388     fprintf(pathFP,"%d %f\n",j,checksum);
389    }
390    printf("checksum, score = %6.2f, %6.2f\n",checksum,returnVal);
391   }
392  }
393
394
395
396  float NewMatchAndPath(float *a1,float *a2,int aLength,float *b1,float *b2,int bLength,
397            float centerWeight,BOOLEAN lengthNormalize,int normalBandWidth,
398            float topToBottom,FILE *pathFP)
399  {
400   Direction path[MAX_SIGNAL_LENGTH][MAX_SIGNAL_LENGTH],*pc;
401   int x,y;
402   float costs0[MAX_SIGNAL_LENGTH+1];
403   float costs1[MAX_SIGNAL_LENGTH+1];
404   int i,j,start,end,bandWidth,shift;
405   int realStart,realEnd,center,oldEnd;
406   float slope,angle;
407   float *a1c,*a2c,*cd,*cl,*cdl,*dc;
408   float oldCost,b1v,b2v,returnVal;
409
410   if (aLength>MAX_SIGNAL_LENGTH||bLength>MAX_SIGNAL_LENGTH)
411    DoError("NewMatch: maximum signal length exceeded.\n",NULL);
412
413   slope = (float)aLength/(float)bLength;
414
415   if ((slope>MAX_SLOPE)||(1/slope>MAX_SLOPE)) {
416    return BIG_NUM;
417   }
418   angle = atan(slope);
419   bandWidth = irint(normalBandWidth/cos(angle));
420   center = 0;
421   realStart = center-bandWidth/2;
422   realEnd = realStart+bandWidth;
423   end = FMin(realEnd,aLength);
424
425   a1c = a1; /* a1 cursor */
426   a2c = a2; /* a2 cursor */
427   b1v = *b1; /* b1 value */
428   b2v = *b2; /* b2 value */
```

```
429      dc = costs0;
430      pc = &(path[0][0]);
431      *dc++ = BIG_NUM;
432      oldCost = *dc++ =
         SquareDifference(*a1c++,b1v)*topToBottom+SquareDifference(*a2c++,b2v);
433      *pc++ = NONE;
434
435      for (j=1;j<end;++j) {
436        oldCost = *dc++ =
         oldCost+SquareDifference(*a1c++,b1v)*topToBottom+SquareDifference(*a2c++,b2v);
437        *pc++ = DOWN;
438      }
439
440      #ifdef foo
441       printf("%6d ",0);
442       for (j=0;j<end;++j)
443         printf("%6.2f ",costs0[j+1]);
444      #endif
445
446      for (i=1;i<bLength;++i) {
447        /* Compute new center of band */
448        center = irint(slope*i);
449        realStart = center-bandWidth/2;
450        realEnd = realStart+bandWidth;
451        start = FMax(realStart,0);
452        oldEnd = end;
453        end = FMin(realEnd,aLength);
454        shift = end-oldEnd;
455
456        /* put large numbers where bands don't overlap */
457        for (j=0;j<shift;++j) {
458      /*    printf("%6.2f ",BIG_NUM); */
459          *dc++ = BIG_NUM;
460        }
461      /*   printf("\n%6d ",i); */
462
463        a1c = a1+start; /* a1 cursor */
464        a2c = a2+start; /* a2 cursor */
465        b1v = *(b1+i); /* b1 value */
466        b2v = *(b2+i); /* b2 value */
467        pc = &(path[i][start]);
468        if (i&1) {
469          cd = costs1+start-1+1; /* cursor down ??? What about -1??? */
470          cdl = costs0+start-1+1; /* cursor down left */
471          cl = costs0+start+1; /* cursor left */
472          dc = costs1+start+1; /* destination cursor */
473        }
474        else {
475          cd = costs0+start-1+1; /* cursor down */
476          cdl = costs1+start-1+1; /* cursor down left */
477          cl = costs1+start+1; /* cursor left */
478          dc = costs0+start+1; /* destination cursor */
479        }
480        *cd = BIG_NUM;
481        for (j=start;j<end;++j) {
```

Section C

APPENDIX / Page 110

```
482      float down,left,downLeft,rest;
483      rest = SquareDifference(*a1c++,b1v)*topToBottom +
         SquareDifference(*a2c++,b2v);
484      down = *cd++ + rest;
485      left = *cl++ + rest;
486      downLeft = *cdl++ + rest*centerWeight;
487
488      if (down < left)
489          if (down < downLeft) {
490  /*         printf("%6.2f ",down); */
491              *dc++ = down;
492              *pc++ = DOWN;
493          }
494          else {
495  /*         printf("%6.2f ",downLeft); */
496              *dc++ = downLeft;
497              *pc++ = DOWNLEFT;
498          }
499      else
500          if (downLeft < left) {
501  /*         printf("%6.2f ",downLeft); */
502              *dc++ = downLeft;
503              *pc++ = DOWNLEFT;
504          }
505          else {
506  /*         printf("%6.2f ",left); */
507              *dc++ = left;
508              *pc++ = LEFT;
509          }
510    }
511    }
512
513    i--;
514    if (i&1)
515      dc = costs1+aLength-1+1;
516    else
517      dc = costs0+aLength-1+1;
518    returnVal = *dc;
519
520  #ifdef foo
521    if (!doPath) {
522      y = i;
523      x = aLength-1;
524      while (path[y][x]!=NONE) {
525       switch (path[y][x]) {
526       case DOWN:
527           x--;
528           break;
529       case LEFT:
530           y--;
531           break;
532       case DOWNLEFT:
533           x--;
534           y--;
535           break;
```

Section C  APPENDIX / Page 111

```
536        default:
537            DoError("NewMatchAndPath: Internal error - bad case.\n",NULL);
538        }
539        fprintf(pathFP,"%d %d\n",x,y);
540      }
541      fprintf(pathFP,"%d %d\n",x,y);
542    }
543    else {}
544    #endif
545    PrintPath(a1,a2,aLength,b1,b2,bLength,path,i,returnVal,pathFP);
546
547    if (lengthNormalize)
548      return returnVal/sqrt(aLength*aLength+bLength*bLength);
549    else
550      return returnVal;
551  }

554  float SlopeCMatch(float *a1,float *a2,int aLength,float *b1,float *b2,int bLength,
555              float centerWeight,BOOLEAN lengthNormalize,float topToBottom)
556  {
557    float costs0[MAX_SIGNAL_LENGTH+2];
558    float costs1[MAX_SIGNAL_LENGTH+2];
559    float costs2[MAX_SIGNAL_LENGTH+2];
560    float slope,minVal;
561    int i,j;
562    int bottom,top;
563    float *cd1l1,*cd2l1,*cd1l2;
564    float *a1c,*a2c,*cd,*cl,*cdl,*dc;
565    float b1v,b2v,returnVal;
566
567    /* printf("sc:\n"); */
568
569    if (aLength>MAX_SIGNAL_LENGTH||bLength>MAX_SIGNAL_LENGTH)
570      DoError("SlopeCMatch: maximum signal length exceeded.\n",NULL);
571
572    slope = (float)aLength/(float)bLength;
573    if ((slope>MAX_SLOPE)||(1/slope>MAX_SLOPE)) {
574      return BIG_NUM;
575    }
576
577    for (i=0;i<aLength+2;++i) {
578      costs2[i] = BIG_NUM;
579      costs1[i] = BIG_NUM;
580      costs0[i] = BIG_NUM;
581    }
582
583    costs0[2] = SquareDifference(*a1,*b1)*topToBottom+SquareDifference(*a2,*b2);
584
585    for (i=1;i<bLength;++i) {
586      bottom = IMax(i/2,2*i+aLength-2*bLength);
587      top = IMin(2*i,i/2+aLength-bLength/2)+1;
588
589      a1c = a1+bottom; /* a1 cursor */
590      a2c = a2+bottom; /* a2 cursor */
```

Section C

APPENDIX / Page 112

```
591        b1v = *(b1+i); /* b1 value */
592        b2v = *(b2+i); /* b2 value */
593
594        switch (i%3) {
595        case 0:
596         dc = costs0+bottom-2+2;
597         cd2l1 = costs2+bottom-2+2;
598         cd1l2 = costs1+bottom-1+2;
599         cd1l1 = costs2+bottom-1+2;
600         break;
601        case 1:
602         dc = costs1+bottom-2+2;
603         cd2l1 = costs0+bottom-2+2;
604         cd1l2 = costs2+bottom-1+2;
605         cd1l1 = costs0+bottom-1+2;
606         break;
607        case 2:
608         dc = costs2+bottom-2+2;
609         cd2l1 = costs1+bottom-2+2;
610         cd1l2 = costs0+bottom-1+2;
611         cd1l1 = costs1+bottom-1+2;
612         break;
613        }
614        *dc++ = BIG_NUM;
615        *dc++ = BIG_NUM;
616        for (j=bottom;j<top; ++j) {
617         float d2l1,d1l2,d1l1,rest;
618         rest = SquareDifference(*a1c++,b1v)*topToBottom+
619             SquareDifference(*a2c++,b2v);
620         d1l1 = *cd1l1++ + rest*centerWeight;
621         d1l2 = *cd1l2++ + rest;
622         d2l1 = *cd2l1++ + rest;
623
624         *dc++ = FMin(FMin(d1l1,d2l1),d1l2);
625        }
626
627        switch (i%3) {
628        case 0:
629         dc = costs0;
630         break;
631        case 1:
632         dc = costs1;
633         break;
634        case 2:
635         dc = costs2;
636         break;
637        }
638
639        #ifdef foo
640         minVal = BIG_NUM;
641         printf("%6d: ",i);
642         for (j=0;j<aLength+2; ++j) {
643         if (*dc <= minVal)
644             minVal = *dc;
645         if (*dc++ >= BIG_NUM)
```

Section C

APPENDIX / Page 113

```
646            printf(" ");
647       else
648            printf("*");
649      }
650      printf("   %6.2f\n",minVal);
651 #endif
652     }
653
654     --i;
655     switch (i%3) {
656     case 0:
657      dc = costs0;
658      break;
659     case 1:
660      dc = costs1;
661      break;
662     case 2:
663      dc = costs2;
664      break;
665     }
666     returnVal = *(dc+aLength-1+2);
667
668     if (lengthNormalize)
669      return returnVal/sqrt(aLength*aLength+bLength*bLength);
670     else
671      return returnVal;
672    }
673
674
675    float SepSlopeCMatch(float *a1,int aLength,float *b1,int bLength,
676                 float centerWeight,BOOLEAN lengthNormalize)
677    {
678     float costs0[MAX_SIGNAL_LENGTH+2];
679     float costs1[MAX_SIGNAL_LENGTH+2];
680     float costs2[MAX_SIGNAL_LENGTH+2];
681     float slope,minVal;
682     int i,j;
683     int bottom,top;
684     float *cd1l1,*cd2l1,*cd1l2;
685     float *a1c,*cd,*cl,*cdl,*dc;
686     float b1v,returnVal;
687
688     if (aLength>MAX_SIGNAL_LENGTH||bLength>MAX_SIGNAL_LENGTH)
689      DoError("SlopeCMatch: maximum signal length exceeded.\n",NULL);
690
691     slope = (float)aLength/(float)bLength;
692     if ((slope>MAX_SLOPE)||(1/slope>MAX_SLOPE)) {
693      return BIG_NUM;
694     }
695
696     for (i=0;i<aLength+2;++i) {
697      costs2[i] = BIG_NUM;
698      costs1[i] = BIG_NUM;
699      costs0[i] = BIG_NUM;
700     }
```

Section C

```
701
702      costs0[2] = SquareDifference(*a1,*b1);
703
704      for (i=1;i<bLength;++i) {
705        bottom = IMax(i/2,2*i+aLength-2*bLength);
706        top = IMin(2*i,i/2+aLength-bLength/2)+1;
707
708        a1c = a1+bottom; /* a1 cursor */
709        b1v = *(b1+i); /* b1 value */
710
711        switch (i%3) {
712        case 0:
713          dc = costs0+bottom-2+2;
714          cd2l1 = costs2+bottom-2+2;
715          cd1l2 = costs1+bottom-1+2;
716          cd1l1 = costs2+bottom-1+2;
717          break;
718        case 1:
719          dc = costs1+bottom-2+2;
720          cd2l1 = costs0+bottom-2+2;
721          cd1l2 = costs2+bottom-1+2;
722          cd1l1 = costs0+bottom-1+2;
723          break;
724        case 2:
725          dc = costs2+bottom-2+2;
726          cd2l1 = costs1+bottom-2+2;
727          cd1l2 = costs0+bottom-1+2;
728          cd1l1 = costs1+bottom-1+2;
729          break;
730        }
731        *dc++ = BIG_NUM;
732        *dc++ = BIG_NUM;
733        for (j=bottom;j<top;++j) {
734          float d2l1,d1l2,d1l1,rest;
735          rest = SquareDifference(*a1c++,b1v);
736          d1l1 = *cd1l1++ + rest*centerWeight;
737          d1l2 = *cd1l2++ + rest;
738          d2l1 = *cd2l1++ + rest;
739
740          *dc++ = FMin(FMin(d1l1,d2l1),d1l2);
741        }
742
743        switch (i%3) {
744        case 0:
745          dc = costs0;
746          break;
747        case 1:
748          dc = costs1;
749          break;
750        case 2:
751          dc = costs2;
752          break;
753        }
754      }
755
```

```
756      --i;
757      switch (i%3) {
758      case 0:
759        dc = costs0;
760        break;
761      case 1:
762        dc = costs1;
763        break;
764      case 2:
765        dc = costs2;
766        break;
767      }
768      returnVal = *(dc+aLength-1+2);
769
770      if (lengthNormalize)
771        return returnVal/sqrt(aLength*aLength+bLength*bLength);
772      else
773        return returnVal;
774    }
775
776
777    float SlopeCMatchAndPath(float *a1,float *a2,int aLength,float *b1,float *b2,int bLength,
778                  float centerWeight,BOOLEAN lengthNormalize,float topToBottom,
779                  FILE *pathFP)
780    {
781      Direction path[MAX_SIGNAL_LENGTH][MAX_SIGNAL_LENGTH],*pc;
782      float costs0[MAX_SIGNAL_LENGTH+2];
783      float costs1[MAX_SIGNAL_LENGTH+2];
784      float costs2[MAX_SIGNAL_LENGTH+2];
785      float slope,minVal;
786      int i,j;
787      int bottom,top;
788      float *cd1l1,*cd2l1,*cd1l2;
789      float *a1c,*a2c,*cd,*cl,*cdl,*dc;
790      float b1v,b2v,returnVal;
791
792      /* printf("sc:\n"); */
793
794      if (aLength>MAX_SIGNAL_LENGTH||bLength>MAX_SIGNAL_LENGTH)
795        DoError("SlopeCMatch: maximum signal length exceeded.\n",NULL);
796
797      slope = (float)aLength/(float)bLength;
798      if ((slope>MAX_SLOPE)||(1/slope>MAX_SLOPE)) {
799        return BIG_NUM;
800      }
801
802      for (i=0;i<aLength+2;++i) {
803        costs2[i] = BIG_NUM;
804        costs1[i] = BIG_NUM;
805        costs0[i] = BIG_NUM;
806      }
807
808      pc = &(path[0][0]);
809      *pc++ = NONE;
810      costs0[2] = SquareDifference(*a1,*b1)*topToBottom+SquareDifference(*a2,*b2);
```

Section C

APPENDIX / Page 116

```
811
812        for (i=1;i<bLength;++i) {
813         bottom = IMax(i/2,2*i+aLength-2*bLength);
814         top = IMin(2*i,i/2+aLength-bLength/2)+1;
815
816         a1c = a1+bottom;  /* a1 cursor */
817         a2c = a2+bottom;  /* a2 cursor */
818         b1v = *(b1+i); /* b1 value */
819         b2v = *(b2+i); /* b2 value */
820
821         switch (i%3) {
822         case 0:
823          dc = costs0+bottom-2+2;
824          cd2l1 = costs2+bottom-2+2;
825          cd1l2 = costs1+bottom-1+2;
826          cd1l1 = costs2+bottom-1+2;
827          break;
828         case 1:
829          dc = costs1+bottom-2+2;
830          cd2l1 = costs0+bottom-2+2;
831          cd1l2 = costs2+bottom-1+2;
832          cd1l1 = costs0+bottom-1+2;
833          break;
834         case 2:
835          dc = costs2+bottom-2+2;
836          cd2l1 = costs1+bottom-2+2;
837          cd1l2 = costs0+bottom-1+2;
838          cd1l1 = costs1+bottom-1+2;
839          break;
840         }
841         *dc++ = BIG_NUM;
842         *dc++ = BIG_NUM;
843         pc = &(path[i][bottom]);
844         for (j=bottom;j<top;++j) {
845          float d2l1,d1l2,d1l1,rest;
846
847          rest = SquareDifference(*a1c++,b1v)*topToBottom+
848              SquareDifference(*a2c++,b2v);
849          d1l1 = *cd1l1++ + rest*centerWeight;
850          d1l2 = *cd1l2++ + rest;
851          d2l1 = *cd2l1++ + rest;
852
853          if (d1l1<d1l2)
854              if (d1l1<d2l1) {
855                *dc++ = d1l1;
856                *pc++ = D1L1;
857              }
858              else {
859                *dc++ = d2l1;
860                *pc++ = D2L1;
861              }
862          else
863              if (d1l2<d2l1) {
864                *dc++ = d1l2;
865                *pc++ = D1L2;
```

```
866            }
867            else {
868              *dc++ = d2l1;
869              *pc++ = D2L1;
870            }
871        }
872
873        switch (i%3) {
874        case 0:
875          dc = costs0;
876          break;
877        case 1:
878          dc = costs1;
879          break;
880        case 2:
881          dc = costs2;
882          break;
883        }
884        minVal = BIG_NUM;
885        printf("%6d: ",i);
886        for (j=0;j<aLength+2;++j) {
887          if (*dc <= minVal)
888              minVal = *dc;
889          if (*dc++ >= BIG_NUM)
890              printf(" ");
891          else
892              printf("*");
893        }
894        printf("    %6.2f\n",minVal);
895    }
896
897    --i;
898    switch (i%3) {
899    case 0:
900      dc = costs0;
901      break;
902    case 1:
903      dc = costs1;
904      break;
905    case 2:
906      dc = costs2;
907      break;
908    }
909    returnVal = *(dc+aLength-1+2);
910
911    PrintPath(a1,a2,aLength,b1,b2,bLength,path,i,returnVal,pathFP);
912
913    if (lengthNormalize)
914      return returnVal/sqrt(aLength*aLength+bLength*bLength);
915    else
916      return returnVal;
917  }
918
```

Section C

Aug 2 02:29 1991 recogDesc.c

```
1       #include <stdio.h>
2       #include "mylib.h"
3       #include "types.h"
4       #include "dict.h"
5       #include "diff.h"
6
7       #define BIG_NUM (10e10)
8       #define MAX_WORDS (100)
9       #define MAX_FONTS (10)
10
11      extern double sqrt(double);
12
13      float CompareNumericDescriptors(float *a,float *b,int length)
14      {
15       int i;
16       float sum;
17       for (i=0,sum=0;i<length; ++i) {
18        sum += (*a-*b)*(*a-*b);
19        ++a;
20        ++b;
21       }
22       return sqrt(sum);
23      }
24
25      float *ComputeNumericDescriptor(int modelIndex,Dictionary models,
26                             Dictionary *fonts,int numberOfFonts,int numberOfWords,
27                             DiffDescriptor dd,
28                             float *sd,float *avg)
29      {
30       float *d;
31       int i,j;
32       float temp;
33       float sumxx[MAX_WORDS];
34       float sdev[MAX_WORDS];
35       float sumsdev,sumscore;
36
37       if ((d = (float *)calloc(numberOfWords,sizeof(float))) == NULL)
38        DoError("ComputeNumericDescriptor: cannot allocate space.\n",NULL);
39       for (j=0;j<numberOfWords; ++j)
40        sumxx[j]=0;
41       for (i=0;i<numberOfFonts; ++i)
42        for (j=0;j<numberOfWords; ++j) {
43         temp=DiffPair(*(models->outlines+modelIndex),*(fonts[i]->outlines+j),dd);
44         if (temp < BIG_NUM) {
45             d[j]+=temp;
46             sumxx[j]+=temp*temp;
47         }
48        }
49
50       if (numberOfFonts > 1) {
51        float sum,minsdev,maxsdev;
52        for (j=0;j<numberOfWords; ++j)
```

Section C

APPENDIX / Page 119

```
53      sdev[j] = sqrt((numberOfFonts*sumxx[j]-d[j]*d[j])/numberOfFonts/(numberOfFonts-1));
54      for (j=0,sumsdev=0,sumscore=0;j<numberOfWords;++j) {
55       sumsdev += sdev[j];
56       sumscore += d[j];
57      }
58      *sd = sumsdev/numberOfWords;
59      *avg = sumscore/numberOfWords;
60     }
61
62     for (j=0;j<numberOfWords;++j)
63      d[j]/=numberOfFonts;
64
65     return d;
66    }
67
68    typedef struct {
69     float score;
70     int x;
71     int y;
72    } *CompareTuple,CompareTupleBody;
73
74    int TupleLessThan(CompareTuple *x,CompareTuple *y)
75    {
76     if ((*x)->score == (*y)->score)
77      return 0;
78     else if ((*x)->score < (*y)->score)
79      return -1;
80     else
81      return 1;
82    }
83
84
85    void DoDescriptors(Dictionary models,char *modelName,char **wordNames,
86                int numberOfFonts,Dictionary *fonts,char **fontNames,
87                int numberOfWords,DiffDescriptor dd)
88    {
89     float *descriptors[MAX_WORDS];
90     int classes[MAX_WORDS][MAX_WORDS];
91     float sdev[MAX_WORDS],avg[MAX_WORDS];
92     CompareTupleBody tuples[MAX_WORDS*MAX_WORDS];
93     CompareTuple scores[MAX_WORDS*MAX_WORDS];
94     int i,x,y,j;
95     int count;
96    /* float threshold = 0.22; */
97     float threshold = 0.42;
98
99     for (i=0;i<numberOfWords;++i) {
100      descriptors[i] =
        ComputeNumericDescriptor(i,models,fonts,numberOfFonts,numberOfWords,dd,
101                         sdev+i,avg+i);
102      fprintf(stdout,"%s: %6.4f %6.4f\n",wordNames[i],avg[i],sdev[i]);
103     }
104     fprintf(stdout,"\n\n");
105
106     for (y=0;y<numberOfWords;++y)
```

Section C

```
107      for (x=0;x<numberOfWords;++x)
108        classes[y][x] =
           (CompareNumericDescriptors(descriptors[y],descriptors[x],numberOfWords)
109                < threshold);
110
111
112    #ifdef foo
113     for (y=0,i=0;y<numberOfWords;++y)
114      for (x=0;x<y;++x) {
115       CompareTuple temp;
116    /*
117        temp = (CompareTuple)calloc(1,sizeof(CompareTupleBody));
118        if (temp==NULL)
119            DoError(": cannot allocate space.\n",NULL);
120    */
121        temp = tuples+i;
122        temp->score =
           CompareNumericDescriptors(descriptors[y],descriptors[x],numberOfWords);
123        temp->x = x;
124        temp->y = y;
125        scores[i] = temp;
126        ++i;
127       }
128       qsort(scores,i,sizeof(CompareTuple),TupleLessThan);
129
130       for (j=0;j<i;++j)
131        fprintf(stdout,"(%s,%s):
           %f\n",wordNames[scores[j]->y],wordNames[scores[j]->x],scores[j]->score);
132    #endif
133
134       fprintf(stdout,"\n\n");
135       for (i=0;i<numberOfWords;++i) {
136        CompareTuple temp;
137        float *thisDesc;
138        float junk;
139        thisDesc =
           ComputeNumericDescriptor(i,models,&models,1,numberOfWords,dd,&junk,&junk);
140        for (j=0;j<numberOfWords;++j) {
141         temp = tuples+j;
142         temp->score = CompareNumericDescriptors(thisDesc,descriptors[j],numberOfWords);
143         temp->y = i;
144         temp->x = j;
145         scores[j] = temp;
146        }
147        qsort(scores,numberOfWords,sizeof(CompareTuple),TupleLessThan);
148
149        fprintf(stdout,"%s: ",wordNames[i]);
150        for (j=0;j<5&&j<numberOfWords;++j) {
151         fprintf(stdout,"%s ",wordNames[scores[j]->x]);
152         if (scores[j]->x == i)
153             break;
154        }
155        if (scores[j]->x==i)
156         fprintf(stdout,"\n");
157        else {
```

```
158        for (;j<numberOfWords;++j)
159          if (scores[j]->x==i)
160            break;
161        fprintf(stdout," (%d more)\n",j-5);
162      }
163
164      fprintf(stdout," ");
165      count = 0;
166      for (j=0;j<numberOfWords;++j)
167        if (classes[scores[0]->x][j]) {
168          fprintf(stdout,"%s ",wordNames[j]);
169          ++count;
170          if (count > 5)
171            break;
172        }
173      if (j<numberOfWords) {
174        for (count=0;j<numberOfWords;++j)
175          if (classes[scores[0]->x][j])
176            ++count;
177        fprintf(stdout," (% more)\n",count);
178      }
179      else
180        fprintf(stdout,"\n");
181
182      free(thisDesc);
183    }
184  }
185
186  void main(int argc,char **argv)
187  {
188    char *listFile;
189    Dictionary models;
190    char *modelName;
191    int numberOfFonts;
192    Dictionary fonts[MAX_FONTS];
193    char *fontNames[MAX_FONTS];
194    char *wordNames[MAX_WORDS];
195    int numberOfWords;
196    float centerWeight;
197    int normalBandWidth;
198    BOOLEAN
    lengthNormalize,useL2,slopeConstrain,warp,topToBottomOption,hillToValleyOption;
199    BOOLEAN separate;
200    float topToBottom,hillToValleyLocal;
201    FILE *listfp;
202    int i,x,y;
203    DiffDescriptorBody dd;
204
205    centerWeight = 1.0;
206    normalBandWidth = 20;
207    topToBottom = 1.0;
208    hillToValleyLocal = 1.0;
209    DefArg("%s","listFile",&listFile);
210    DefOption("-L2","-L2",&useL2);
211    DefOption("-slopeConstrain %f","-slopeConstrain <center weight>",
```

Section C

```
212             &slopeConstrain,&centerWeight);
213         DefOption("-warp %f %d","-warp <center weight> <band width>",
214             &warp,&centerWeight,&normalBandWidth);
215         DefOption("-separate","-separate",&separate);
216         DefOption("-normalize","-normalize",&lengthNormalize);
217         DefOption("-topToBottom %f","-topToBottom
                 <ratio>",&topToBottomOption,&topToBottom);
218         DefOption("-hillToValley %f","-hillToValley
                 <ratio>",&hillToValleyOption,&hillToValleyLocal);
219         ScanArgs(argc,argv);
220
221         if ((listfp = fopen(listFile,"r"))==NULL)
222             DoError("Error opening file %s.\n",listFile);
223
224         /* Read in the number of words in each dictionary */
225         numberOfWords = ReadInt(listfp);
226         if (numberOfWords > MAX_WORDS)
227             DoError("%s: too many words.\n",argv[0]);
228
229         /* Read in the words */
230         for (i=0;i<numberOfWords;++i) {
231             wordNames[i] = ReadString(listfp);
232         }
233
234         /* Read in the model dictionary */
235         modelName = ReadString(listfp);
236         models = ReadDictionary(modelName);
237
238         /* Read in the number of dictionaries */
239         numberOfFonts = ReadInt(listfp);
240         if (numberOfFonts > MAX_FONTS)
241             DoError("%s: too many dictionaries.\n",argv[0]);
242
243         /* Read in the dictionaries and their names */
244         for (i=0;i<numberOfFonts;++i) {
245             fontNames[i] = ReadString(listfp);
246             fonts[i] = ReadDictionary(fontNames[i]);
247         }
248
249         /* Check to see that all dictionaries have the same number of shapes as the specified number
               of words. */
250         for (i=1;i<numberOfFonts;++i)
251             if (fonts[i]->numberOfEntries < numberOfWords)
252                 DoError("Dictionary %s has too few entries.\n",fontNames[i]);
253         if (models->numberOfEntries < numberOfWords)
254             DoError("Model dictionary has too few of entries.\n",NULL);
255
256
257         if (useL2) {
258             fprintf(stdout,"Using L2 on length normalized shapes.\n");
259             dd.diffType = L2;
260         }
261         else if (slopeConstrain) {
262             fprintf(stdout,"Using dynamic time warping with slope contrained to [0.5,2].\n");
263             dd.diffType = CONSTRAINED;
```

Section C    APPENDIX / Page 123

```
264       dd.separate = separate;
265       if (separate)
266         fprintf(stdout,"Top and bottom warped separately.\n");
267       else
268         fprintf(stdout,"Top and bottom warped together.\n");
269     }
270     else {
271       fprintf(stdout,"Using dynamic time warping with bandwidth %d.\n",normalBandWidth);
272       dd.diffType = WARP;
273       dd.bandWidth = normalBandWidth;
274       dd.separate = separate;
275       if (separate)
276         fprintf(stdout,"Top and bottom warped separately.\n");
277       else
278         fprintf(stdout,"Top and bottom warped together.\n");
279     }
280     if (!useL2) {
281       fprintf(stdout,"Center weight = %f.\n",centerWeight);
282       dd.centerWeight = centerWeight;
283       if (lengthNormalize) {
284         dd.lengthNormalize = TRUE;
285         fprintf(stdout,"Scores normalized by signal length.\n");
286       }
287       else
288         dd.lengthNormalize = FALSE;
289     }
290     dd.hillToValley = hillToValleyLocal;
291     dd.topToBottom = topToBottom;
292     dd.pathFP = NULL;
293
294     fprintf(stdout,"Words:\n");
295     for (i=0;i<numberOfWords;++i)
296       fprintf(stdout,"%d: %s\n",i,wordNames[i]);
297     fprintf(stdout,"\n");
298     fprintf(stdout,"Model font is %s.\n",modelName);
299     fprintf(stdout,"Fonts:\n");
300     for (i=0;i<numberOfFonts;++i)
301       fprintf(stdout,"%d: %s\n",i,fontNames[i]);
302     fprintf(stdout,"\n");
303
304
        DoDescriptors(models,modelName,wordNames,numberOfFonts,fonts,fontNames,numberOfWords,&dd);
305   }
```

Section C

APPENDIX / Page 124

Jun 18 16:20 1991 resample.c

```
1       #include <stdio.h>
2       #include <values.h>
3       #include <string.h>
4       #include <floatingpoint.h>
5       #include "boolean.h"
6       #include "types.h"
7       #include "error.h"
8       #include "dict.h"
9
10      void Resample(OutlinePair signal,float factor)
11      {
12       int i,count;
13       float pivot;
14       float delFactor;
15       float *oldTop,*newTop;
16       float *oldBottom,*newBottom;
17       float *topSPtr,*topDPtr;
18       float *bottomSPtr,*bottomDPtr;
19
20       delFactor = 1.0 - factor;
21       for (i=0,count=0,pivot=0.0;i<signal->numberOfLegs;++i) {
22        if (pivot>=1.0) {
23          pivot -= 1.0;
24          pivot += delFactor;
25        }
26        else {
27          pivot += delFactor;
28          ++count;
29        }
30       }
31
32       newTop = (float *)calloc(count,sizeof(float));
33       newBottom = (float *)calloc(count,sizeof(float));
34       if ((newTop==NULL)||(newBottom==NULL))
35         DoError("Resample: cannot allocate space.\n",NULL);
36
37       oldTop = signal->top;
38       oldBottom = signal->bottom;
39
40       topSPtr = signal->top;
41       bottomSPtr = signal->bottom;
42       topDPtr = newTop;
43       bottomDPtr = newBottom;
44       for (i=0,pivot=0.0;i<signal->numberOfLegs;++i) {
45        if (pivot>=1.0) {
46          pivot -= 1.0;
47          pivot += delFactor;
48          ++topSPtr;
49          ++bottomSPtr;
50        }
51        else {
52          pivot += delFactor;
```

Section C                    APPENDIX / Page 125

```
53          *topDPtr++ = *topSPtr++;
54          *bottomDPtr++ = *bottomSPtr++;
55        }
56      }
57
58      signal->top = newTop;
59      signal->bottom = newBottom;
60      signal->numberOfLegs = count;
61
62      free(oldTop);
63      free(oldBottom);
64    }
65
66    void main(int argc,char **argv)
67    {
68      char *inFile,*outFile;
69      float factor;
70      int i;
71      Dictionary dict;
72
73      if (argc != 4) {
74        fprintf(stderr,"Usage:\n");
75        fprintf(stderr," %s <input file> <output file> <compression factor>\n",argv[0]);
76        fprintf(stderr,"Compresses shapes horizontally.\n");
77        exit(-1);
78      }
79
80      if ((factor >= 1.0)||(factor<0.0))
81        DoError("%s: factor must be between 0 and 1.\n",argv[0]);
82
83      inFile = argv[1];
84      outFile = argv[2];
85      factor = atof(argv[3]);
86
87      dict = ReadDictionary(inFile);
88
89      for (i=0;i<dict->numberOfEntries;++i)
90        Resample(*(dict->outlines+i),factor);
91
92      WriteDictionary(dict,outFile);
93    }
```

Section C

APPENDIX / Page 126

Jul 31 16:48 1991 sepMatch.c

```
1       #include <stdio.h>
2       #include "mylib.h"
3       #include "misc.h"
4
5       #define MAX_SIGNAL_LENGTH (800)
6       #define MAX_SLOPE (2.0)
7       #define BIG_NUM (10e20)
8
9       typedef enum {NONE,LEFT,DOWN,DOWNLEFT,D1L1,D2L1,D1L2} Direction;
10
11      extern double sqrt(double);
12      extern double cos(double);
13      extern double atan(double);
14      extern int irint(double);
15
16      /* Assumes that a represents the model and b represents the unknown.
17       * Weights places where the model is lower than the unknown more than
18       * cases where the model is higher than the unknown.  The idea here is
19       * that valleys can be filled in by bleeding together, but that noise
20       * can rarely make a contour be too tall for extended periods.
21       */
22      float hillToValley = 1.0;
23      inline float SquareDifference(float a,float b)
24      {
25       float temp = a-b;
26       if (temp<0)
27        return temp*temp;
28       else
29        return temp*temp*hillToValley*hillToValley;
30      /* return (a-b)*(a-b); */
31      }
32
33      inline float FMax(float a,float b)
34      {
35       if (a>b)
36        return a;
37       else
38        return b;
39      }
40
41      inline float FMin(float a,float b)
42      {
43       if (a<b)
44        return a;
45       else
46        return b;
47      }
48
49      inline int IMax(int a,int b)
50      {
51       if (a>b)
52        return a;
```

Section C

```
53        else
54          return b;
55      }
56
57      inline int IMin(int a,int b)
58      {
59        if (a<b)
60          return a;
61        else
62          return b;
63      }
64
65      float NewMatch(float *a1,float *a2,int aLength,float *b1,float *b2,int bLength,
66                  float centerWeight,BOOLEAN lengthNormalize,int normalBandWidth,
67                  float topToBottom)
68      {
69        float costs0[MAX_SIGNAL_LENGTH+1];
70        float costs1[MAX_SIGNAL_LENGTH+1];
71        int i,j,start,end,bandWidth,shift;
72        int realStart,realEnd,center,oldEnd;
73        float slope,angle;
74        float *a1c,*a2c,*cd,*cl,*cdl,*dc;
75        float oldCost,b1v,b2v,returnVal;
76
77        if (aLength>MAX_SIGNAL_LENGTH||bLength>MAX_SIGNAL_LENGTH)
78          DoError("NewMatch: maximum signal length exceeded.\n",NULL);
79
80        slope = (float)aLength/(float)bLength;
81
82        if ((slope>MAX_SLOPE)||(1/slope>MAX_SLOPE)) {
83          return BIG_NUM;
84        }
85        angle = atan(slope);
86        bandWidth = irint(normalBandWidth/cos(angle));
87        center = 0;
88        realStart = center-bandWidth/2;
89        realEnd = realStart+bandWidth;
90        end = FMin(realEnd,aLength);
91
92        a1c = a1; /* a1 cursor */
93        a2c = a2; /* a2 cursor */
94        b1v = *b1; /* b1 value */
95        b2v = *b2; /* b2 value */
96        dc = costs0;
97        *dc++ = BIG_NUM;
98        oldCost = *dc++ =
      SquareDifference(*a1c++,b1v)*topToBottom+SquareDifference(*a2c++,b2v);
99
100       for (j=1;j<end;++j)
101         oldCost = *dc++ =
      oldCost+SquareDifference(*a1c++,b1v)*topToBottom+SquareDifference(*a2c++,b2v);
102
103       for (i=1;i<bLength;++i) {
104         /* Compute new center of band */
105         center = irint(slope*i);
```

Section C

APPENDIX / Page 128

```
106      realStart = center-bandWidth/2;
107      realEnd = realStart+bandWidth;
108      start = FMax(realStart,0);
109      oldEnd = end;
110      end = FMin(realEnd,aLength);
111      shift = end-oldEnd;
112
113      /* put large numbers where bands don't overlap */
114      for (j=0;j<shift;++j)
115        *dc++ = BIG_NUM;
116
117      a1c = a1+start; /* a1 cursor */
118      a2c = a2+start; /* a2 cursor */
119      b1v = *(b1+i); /* b1 value */
120      b2v = *(b2+i); /* b2 value */
121      if (i&1) {
122        cd = costs1+start-1+1; /* cursor down ??? What about -1??? */
123        cdl = costs0+start-1+1; /* cursor down left */
124        cl = costs0+start+1; /* cursor left */
125        dc = costs1+start+1; /* destination cursor */
126      }
127      else {
128        cd = costs0+start-1+1; /* cursor down */
129        cdl = costs1+start-1+1; /* cursor down left */
130        cl = costs1+start+1; /* cursor left */
131        dc = costs0+start+1; /* destination cursor */
132      }
133      *cd = BIG_NUM;
134      for (j=start;j<end;++j) {
135        float down,left,downLeft,rest;
136        down = *cd++ + rest;
137        left = *cl++ + rest;
138        downLeft = *cdl++ + rest*centerWeight;
139        rest = SquareDifference(*a1c++,b1v)*topToBottom+
140            SquareDifference(*a2c++,b2v);
141        *dc++ = FMin(FMin(down,left),downLeft);
142      }
143    }
144
145    i--;
146    if (i&1)
147      dc = costs1+aLength-1+1;
148    else
149      dc = costs0+aLength-1+1;
150    returnVal = *dc;
151
152    if (lengthNormalize)
153      return returnVal/sqrt(aLength*aLength+bLength*bLength);
154    else
155      return returnVal;
156  }
157
158
159  void PrintPath(float *a1,float *a2,int aLength,float *b1,float *b2,int bLength,
160        Direction path[MAX_SIGNAL_LENGTH][MAX_SIGNAL_LENGTH],int i,
```

Section C

APPENDIX / Page 129

```
161             float returnVal,
162             FILE *pathFP)
163     {
164       int x,y,j;
165       int length = 0;
166       int index = 0;
167       float newTop1[MAX_SIGNAL_LENGTH],newBottom1[MAX_SIGNAL_LENGTH];
168       float newTop2[MAX_SIGNAL_LENGTH],newBottom2[MAX_SIGNAL_LENGTH];
169
170       y = i;
171       x = aLength-1;
172       while (path[y][x]!=NONE) {
173       switch (path[y][x]) {
174       case DOWN:
175         x--;
176         break;
177       case LEFT:
178         y--;
179         break;
180       case D1L1:
181       case DOWNLEFT:
182         x--;
183         y--;
184         break;
185       case D2L1:
186         x-=2;
187         y--;
188         break;
189       case D1L2:
190         x--;
191         y-=2;
192         break;
193       default:
194         DoError("NewMatchAndPath: Internal error - bad case.\n",NULL);
195       }
196       ++length;
197       }
198
199       y = i;
200       x = aLength-1;
201       while (path[y][x]!=NONE) {
202       if (index>=MAX_SIGNAL_LENGTH)
203         DoError("NewMatchAddPath: warped signal is too long.\n",NULL);
204       newTop1[length-index] = a1[x];
205       newBottom1[length-index] = a2[x];
206       newTop2[length-index] = b1[y];
207       newBottom2[length-index] = b2[y];
208       switch (path[y][x]) {
209       case DOWN:
210         x--;
211         break;
212       case LEFT:
213         y--;
214         break;
215       case D1L1:
```

Section C

```
216       case DOWNLEFT:
217         x--;
218         y--;
219         break;
220       case D2L1:
221         x-=2;
222         y--;
223         break;
224       case D1L2:
225         x--;
226         y-=2;
227         break;
228       default:
229         DoError("NewMatchAndPath: Internal error - bad case.\n",NULL);
230       }
231       ++index;
232     }
233     if (index>=MAX_SIGNAL_LENGTH)
234       DoError("NewMatchAddPath: warped signal is too long.\n",NULL);
235     newTop1[length-index] = a1[x];
236     newBottom1[length-index] = a2[x];
237     newTop2[length-index] = b1[y];
238     newBottom2[length-index] = b2[y];
239     ++index;
240
241     for (j=0;j<index;++j)
242       fprintf(pathFP,"%d %f\n",j,newTop1[j]);
243     fprintf(pathFP,"\"top1\n\n");
244
245     for (j=0;j<index;++j)
246       fprintf(pathFP,"%d %f\n",j,newTop2[j]);
247     fprintf(pathFP,"\"top2\n\n");
248
249     for (j=0;j<index;++j)
250       fprintf(pathFP,"%d %f\n",j,-newBottom1[j]);
251     fprintf(pathFP,"\"bottom1\n\n");
252
253     for (j=0;j<index;++j)
254       fprintf(pathFP,"%d %f\n",j,-newBottom2[j]);
255     fprintf(pathFP,"\"bottom2\n\n");
256
257     {
258      float checksum;
259      fprintf(pathFP,"%d %f\n",0,checksum);
260      for (j=0,checksum=0;j<index;++j) {
261       checksum+=SquareDifference(newTop1[j],newTop2[j])+
262          SquareDifference(newBottom1[j],newBottom2[j]);
263       fprintf(pathFP,"%d %f\n",j,checksum);
264      }
265      printf("checksum, score = %6.2f, %6.2f\n",checksum,returnVal);
266     }
267   }
268
269
270
```

Section C

```
271    float NewMatchAndPath(float *a1,float *a2,int aLength,float *b1,float *b2,int bLength,
272                          float centerWeight,BOOLEAN lengthNormalize,int normalBandWidth,
273                          float topToBottom,FILE *pathFP)
274    {
275     Direction path[MAX_SIGNAL_LENGTH][MAX_SIGNAL_LENGTH],*pc;
276     int x,y;
277     float costs0[MAX_SIGNAL_LENGTH + 1];
278     float costs1[MAX_SIGNAL_LENGTH + 1];
279     int i,j,start,end,bandWidth,shift;
280     int realStart,realEnd,center,oldEnd;
281     float slope,angle;
282     float *a1c,*a2c,*cd,*cl,*cdl,*dc;
283     float oldCost,b1v,b2v,returnVal;

285     if (aLength>MAX_SIGNAL_LENGTH||bLength>MAX_SIGNAL_LENGTH)
286       DoError("NewMatch: maximum signal length exceeded.\n",NULL);

288     slope = (float)aLength/(float)bLength;

290     if ((slope>MAX_SLOPE)||(1/slope>MAX_SLOPE)) {
291      return BIG_NUM;
292     }
293     angle = atan(slope);
294     bandWidth = irint(normalBandWidth/cos(angle));
295     center = 0;
296     realStart = center-bandWidth/2;
297     realEnd = realStart+bandWidth;
298     end = FMin(realEnd,aLength);

300     a1c = a1; /* a1 cursor */
301     a2c = a2; /* a2 cursor */
302     b1v = *b1; /* b1 value */
303     b2v = *b2; /* b2 value */
304     dc = costs0;
305     pc = &(path[0][0]);
306     *dc++ = BIG_NUM;
307     oldCost = *dc++ =
        SquareDifference(*a1c++,b1v)*topToBottom+SquareDifference(*a2c++,b2v);
308     *pc++ = NONE;

310     for (j=1;j<end;++j) {
311      oldCost = *dc++ =
        oldCost+SquareDifference(*a1c++,b1v)*topToBottom+SquareDifference(*a2c++,b2v);
312      *pc++ = DOWN;
313     }

315    #ifdef foo
316     printf("%6d ",0);
317     for (j=0;j<end;++j)
318       printf("%6.2f ",costs0[j+1]);
319    #endif 321     for (i=1;i<bLength;++i) {
322      /* Compute new center of band */
323      center = irint(slope*i);
```

Section C

APPENDIX / Page 132

```
324      realStart = center-bandWidth/2;
325      realEnd = realStart+bandWidth;
326      start = FMax(realStart,0);
327      oldEnd = end;
328      end = FMin(realEnd,aLength);
329      shift = end-oldEnd;
330
331      /* put large numbers where bands don't overlap */
332      for (j=0;j<shift;++j) {
333   /*    printf("%6.2f ",BIG_NUM); */
334        *dc++ = BIG_NUM;
335      }
336   /*  printf("\n%6d ",i); */
337
338      a1c = a1+start; /* a1 cursor */
339      a2c = a2+start; /* a2 cursor */
340      b1v = *(b1+i); /* b1 value */
341      b2v = *(b2+i); /* b2 value */
342      pc = &(path[i][start]);
343      if (i&1) {
344        cd = costs1+start-1+1; /* cursor down ??? What about -1??? */
345        cdl = costs0+start-1+1; /* cursor down left */
346        cl = costs0+start+1; /* cursor left */
347        dc = costs1+start+1; /* destination cursor */
348      }
349      else {
350        cd = costs0+start-1+1; /* cursor down */
351        cdl = costs1+start-1+1; /* cursor down left */
352        cl = costs1+start+1; /* cursor left */
353        dc = costs0+start+1; /* destination cursor */
354      }
355      *cd = BIG_NUM;
356      for (j=start;j<end;++j) {
357        float down,left,downLeft,rest;
358        rest = SquareDifference(*a1c++,b1v)*topToBottom +
      SquareDifference(*a2c++,b2v);
359        down = *cd++ + rest;
360        left = *cl++ + rest;
361        downLeft = *cdl++ + rest*centerWeight;
362
363        if (down < left)
364          if (down < downLeft) {
365   /*       printf("%6.2f ",down); */
366            *dc++ = down;
367            *pc++ = DOWN;
368          }
369          else {
370   /*       printf("%6.2f ",downLeft); */
371            *dc++ = downLeft;
372            *pc++ = DOWNLEFT;
373          }
374        else
375          if (downLeft < left) {
376   /*       printf("%6.2f ",downLeft); */
377            *dc++ = downLeft;
```

Section C
APPENDIX / Page 133

```
378              *pc++ = DOWNLEFT;
379            }
380            else {
381  /*         printf("%6.2f ",left); */
382              *dc++ = left;
383              *pc++ = LEFT;
384            }
385        }
386      }

388      i--;
389      if (i&1)
390        dc = costs1+aLength-1+1;
391      else
392        dc = costs0+aLength-1+1;
393      returnVal = *dc;

395  #ifdef foo
396      if (!doPath) {
397       y = i;
398       x = aLength-1;
399       while (path[y][x]!=NONE) {
400        switch (path[y][x]) {
401        case DOWN:
402            x--;
403            break;
404        case LEFT:
405            y--;
406            break;
407        case DOWNLEFT:
408            x--;
409            y--;
410            break;
411        default:
412            DoError("NewMatchAndPath: Internal error - bad case.\n",NULL);
413        }
414        fprintf(pathFP,"%d %d\n",x,y);
415       }
416       fprintf(pathFP,"%d %d\n",x,y);
417      }
418      else {}
419  #endif
420      PrintPath(a1,a2,aLength,b1,b2,bLength,path,i,returnVal,pathFP);

422      if (lengthNormalize)
423        return returnVal/sqrt(aLength*aLength+bLength*bLength);
424      else
425        return returnVal;
426  }

429  float SlopeCMatch(float *a1,float *a2,int aLength,float *b1,float *b2,int bLength,
430               float centerWeight,BOOLEAN lengthNormalize,float topToBottom)
431  {
432    float costs0[MAX_SIGNAL_LENGTH+2];
```

Section C

APPENDIX / Page 134

```
433      float costs1[MAX_SIGNAL_LENGTH+2];
434      float costs2[MAX_SIGNAL_LENGTH+2];
435      float slope,minVal;
436      int i,j;
437      int bottom,top;
438      float *cd1l1,*cd2l1,*cd1l2;
439      float *a1c,*a2c,*cd,*cl,*cdl,*dc;
440      float b1v,b2v,returnVal;
441
442      /* printf("sc:\n"); */
443
444      if (aLength>MAX_SIGNAL_LENGTH||bLength>MAX_SIGNAL_LENGTH)
445        DoError("SlopeCMatch: maximum signal length exceeded.\n",NULL);
446
447      slope = (float)aLength/(float)bLength;
448      if ((slope>MAX_SLOPE)||(1/slope>MAX_SLOPE)) {
449        return BIG_NUM;
450      }
451
452      for (i=0;i<aLength+2;++i) {
453        costs2[i] = BIG_NUM;
454        costs1[i] = BIG_NUM;
455        costs0[i] = BIG_NUM;
456      }
457
458      costs0[2] = SquareDifference(*a1,*b1)*topToBottom+SquareDifference(*a2,*b2);
459
460      for (i=1;i<bLength;++i) {
461        bottom = IMax(i/2,2*i+aLength-2*bLength);
462        top = IMin(2*i,i/2+aLength-bLength/2)+1;
463
464        a1c = a1+bottom; /* a1 cursor */
465        a2c = a2+bottom; /* a2 cursor */
466        b1v = *(b1+i); /* b1 value */
467        b2v = *(b2+i); /* b2 value */
468
469        switch (i%3) {
470        case 0:
471          dc = costs0+bottom-2+2;
472          cd2l1 = costs2+bottom-2+2;
473          cd1l2 = costs1+bottom-1+2;
474          cd1l1 = costs2+bottom-1+2;
475          break;
476        case 1:
477          dc = costs1+bottom-2+2;
478          cd2l1 = costs0+bottom-2+2;
479          cd1l2 = costs2+bottom-1+2;
480          cd1l1 = costs0+bottom-1+2;
481          break;
482        case 2:
483          dc = costs2+bottom-2+2;
484          cd2l1 = costs1+bottom-2+2;
485          cd1l2 = costs0+bottom-1+2;
486          cd1l1 = costs1+bottom-1+2;
487          break;
```

```
488        }
489        *dc++ = BIG_NUM;
490        *dc++ = BIG_NUM;
491        for (j=bottom;j<top;++j) {
492          float d2l1,d1l2,d1l1,rest;
493          rest = SquareDifference(*a1c++,b1v)*topToBottom+
494              SquareDifference(*a2c++,b2v);
495          d1l1 = *cd1l1++ + rest*centerWeight;
496          d1l2 = *cd1l2++ + rest;
497          d2l1 = *cd2l1++ + rest;
498
499          *dc++ = FMin(FMin(d1l1,d2l1),d1l2);
500        }
501
502        switch (i%3) {
503        case 0:
504          dc = costs0;
505          break;
506        case 1:
507          dc = costs1;
508          break;
509        case 2:
510          dc = costs2;
511          break;
512        }
513
514   #ifdef foo
515        minVal = BIG_NUM;
516        printf("%6d: ",i);
517        for (j=0;j<aLength+2;++j) {
518          if (*dc <= minVal)
519              minVal = *dc;
520          if (*dc++ >= BIG_NUM)
521              printf(" ");
522          else
523              printf("*");
524        }
525        printf("   %6.2f\n",minVal);
526   #endif
527      }
528
529      --i;
530      switch (i%3) {
531      case 0:
532        dc = costs0;
533        break;
534      case 1:
535        dc = costs1;
536        break;
537      case 2:
538        dc = costs2;
539        break;
540      }
541      returnVal = *(dc+aLength-1+2);
542
```

Section C

APPENDIX / Page 136

```
543       if (lengthNormalize)
544         return returnVal/sqrt(aLength*aLength+bLength*bLength);
545       else
546         return returnVal;
547     }
548
549
550     float SlopeCMatchAndPath(float *a1,float *a2,int aLength,float *b1,float *b2,int bLength,
551                   float centerWeight,BOOLEAN lengthNormalize,float topToBottom,
552                   FILE *pathFP)
553     {
554       Direction path[MAX_SIGNAL_LENGTH][MAX_SIGNAL_LENGTH],*pc;
555       float costs0[MAX_SIGNAL_LENGTH+2];
556       float costs1[MAX_SIGNAL_LENGTH+2];
557       float costs2[MAX_SIGNAL_LENGTH+2];
558       float slope,minVal;
559       int i,j;
560       int bottom,top;
561       float *cd1l1,*cd2l1,*cd1l2;
562       float *a1c,*a2c,*cd,*cl,*cdl,*dc;
563       float b1v,b2v,returnVal;
564
565       /* printf("sc:\n"); */
566
567       if (aLength>MAX_SIGNAL_LENGTH||bLength>MAX_SIGNAL_LENGTH)
568         DoError("SlopeCMatch: maximum signal length exceeded.\n",NULL);
569
570       slope = (float)aLength/(float)bLength;
571       if ((slope>MAX_SLOPE)||(1/slope>MAX_SLOPE)) {
572         return BIG_NUM;
573       }
574
575       for (i=0;i<aLength+2;++i) {
576         costs2[i] = BIG_NUM;
577         costs1[i] = BIG_NUM;
578         costs0[i] = BIG_NUM;
579       }
580
581       pc = &(path[0][0]);
582       *pc++ = NONE;
583       costs0[2] = SquareDifference(*a1,*b1)*topToBottom+SquareDifference(*a2,*b2);
584
585       for (i=1;i<bLength;++i) {
586         bottom = IMax(i/2,2*i+aLength-2*bLength);
587         top = IMin(2*i,i/2+aLength-bLength/2)+1;
588
589         a1c = a1+bottom; /* a1 cursor */
590         a2c = a2+bottom; /* a2 cursor */
591         b1v = *(b1+i); /* b1 value */
592         b2v = *(b2+i); /* b2 value */
593
594         switch (i%3) {
595         case 0:
596           dc = costs0+bottom-2+2;
597           cd2l1 = costs2+bottom-2+2;
```

Section C

```
598        cd1l2 = costs1+bottom-1+2;
599        cd1l1 = costs2+bottom-1+2;
600        break;
601      case 1:
602        dc = costs1+bottom-2+2;
603        cd2l1 = costs0+bottom-2+2;
604        cd1l2 = costs2+bottom-1+2;
605        cd1l1 = costs0+bottom-1+2;
606        break;
607      case 2:
608        dc = costs2+bottom-2+2;
609        cd2l1 = costs1+bottom-2+2;
610        cd1l2 = costs0+bottom-1+2;
611        cd1l1 = costs1+bottom-1+2;
612        break;
613      }
614      *dc++ = BIG_NUM;
615      *dc++ = BIG_NUM;
616      pc = &(path[i][bottom]);
617      for (j=bottom;j<top;++j) {
618       float d2l1,d1l2,d1l1,rest;
619
620       rest = SquareDifference(*a1c++,b1v)*topToBottom+
621           SquareDifference(*a2c++,b2v);
622       d1l1 = *cd1l1++ + rest*centerWeight;
623       d1l2 = *cd1l2++ + rest;
624       d2l1 = *cd2l1++ + rest;
625
626       if (d1l1<d1l2)
627          if (d1l1<d2l1) {
628            *dc++ = d1l1;
629            *pc++ = D1L1;
630          }
631          else {
632            *dc++ = d2l1;
633            *pc++ = D2L1;
634          }
635       else
636          if (d1l2<d2l1) {
637            *dc++ = d1l2;
638            *pc++ = D1L2;
639          }
640          else {
641            *dc++ = d2l1;
642            *pc++ = D2L1;
643          }
644      }
645
646      switch (i%3) {
647      case 0:
648       dc = costs0;
649       break;
650      case 1:
651       dc = costs1;
652       break;
```

Section C                                                                APPENDIX / Page 138

```
653     case 2:
654       dc = costs2;
655       break;
656     }
657     minVal = BIG_NUM;
658     printf("%6d: ",i);
659     for (j=0;j<aLength+2;++j) {
660       if (*dc <= minVal)
661          minVal = *dc;
662       if (*dc++ >= BIG_NUM)
663          printf(" ");
664       else
665          printf("*");
666     }
667     printf("   %6.2f\n",minVal);
668    }
669
670    --i;
671    switch (i%3) {
672    case 0:
673      dc = costs0;
674      break;
675    case 1:
676      dc = costs1;
677      break;
678    case 2:
679      dc = costs2;
680      break;
681    }
682    returnVal = *(dc+aLength-1+2);
683
684    PrintPath(a1,a2,aLength,b1,b2,bLength,path,i,returnVal,pathFP);
685
686    if (lengthNormalize)
687      return returnVal/sqrt(aLength*aLength+bLength*bLength);
688    else
689      return returnVal;
690   }
691
```

Jul 31 17:14 1991 single.c

```c
1      #include <stdio.h>
2      #include "mylib.h"
3      #include "types.h"
4      #include "dict.h"
5      #include "diff.h"
6      #include "match.h"
7      #include "matchparallel.h"
8
9      main(argc, argv)
10     int argc;
11     char *argv[];
12     {
13       char *dictFile1,*dictFile2,*outFile;
14       int shape1,shape2;
15       Dictionary dict1,dict2;
16       float score;
17       char *matchType;
18       float centerWeight,normalBandWidth,topToBottom,hillToValleyLocal;
19       DiffDescriptorBody dd;
20       FILE *pathFP;
21       BOOLEAN
       useL2,slopeConstrain,warp,lengthNormalize,topToBottomOption,hillToValleyOption;
22       BOOLEAN separate;
23
24       centerWeight = 1.0;
25       normalBandWidth = 20;
26       topToBottom = 1.0;
27       hillToValleyLocal = 1.0;
28       DefArg("%s %d %s %d %s","dict1 shape1 dict2 shape2 outfile",&dictFile1,&shape1,
29             &dictFile2,&shape2,&outFile);
30       DefOption("-L2","-L2",&useL2);
31       DefOption("-slopeConstrain %f","-slopeConstrain <center weight>",
32             &slopeConstrain,&centerWeight);
33       DefOption("-warp %f %f","-warp <center weight> <band width>",
34             &warp,&centerWeight,&normalBandWidth);
35       DefOption("-separate","-separate",&separate);
36       DefOption("-normalize","-normalize",&lengthNormalize);
37       DefOption("-topToBottom %f","-topToBottom
       <ratio>",&topToBottomOption,&topToBottom);
38       DefOption("-hillToValley %f","-hillToValley
       <ratio>",&hillToValleyOption,&hillToValleyLocal);
39       ScanArgs(argc,argv);
40
41       dict1 = ReadDictionary(dictFile1);
42       dict2 = ReadDictionary(dictFile2);
43
44       if ((shape1 >= dict1->numberOfEntries) || (shape1 < 0) ||
45         (shape2 >= dict2->numberOfEntries) || (shape2 < 0))
46       DoError("%s: bad shape number.\n",argv[0]);
47
48       if ((pathFP=fopen(outFile,"w")) == NULL)
49       DoError("single: error opening output file %s.\n",outFile);
```

Section C                                                          APPENDIX / Page 140

```
50
51      if (useL2) {
52        fprintf(stdout,"Using L2 on length normalized shapes.\n");
53        dd.diffType = L2;
54      }
55      else if (slopeConstrain) {
56        fprintf(stdout,"Using dynamic time warping with slope contrained to [0.5,2].\n");
57        dd.diffType = CONSTRAINED;
58        dd.separate = separate;
59        if (separate)
60          fprintf(stdout,"Top and bottom warped separately.\n");
61        else
62          fprintf(stdout,"Top and bottom warped together.\n");
63      }
64      else {
65        fprintf(stdout,"Using dynamic time warping with bandwidth %d.\n",normalBandWidth);
66        dd.diffType = WARP;
67        dd.bandWidth = normalBandWidth;
68        dd.separate = separate;
69        if (separate)
70          fprintf(stdout,"Top and bottom warped separately.\n");
71        else
72          fprintf(stdout,"Top and bottom warped together.\n");
73      }
74      if (!useL2) {
75        fprintf(stdout,"Center weight = %f.\n",centerWeight);
76        dd.centerWeight = centerWeight;
77        if (lengthNormalize) {
78          dd.lengthNormalize = TRUE;
79          fprintf(stdout,"Scores normalized by signal length.\n");
80        }
81        else
82          dd.lengthNormalize = FALSE;
83      }
84      dd.hillToValley = hillToValleyLocal;
85      dd.topToBottom = topToBottom;
86      dd.pathFP = pathFP;
87      fprintf(stdout,"Top to bottom ratio = %6.2f.\n",topToBottom);
88      fprintf(stdout,"Hill to Valley ratio = %6.2f.\n",hillToValleyLocal);
89
90      score = DiffPair(*(dict1->outlines+shape1),
91                      *(dict2->outlines+shape2),
92                      &dd);
93
94      fclose(pathFP);
95
96      printf("Score = %f\n",score);
97    }
```

Section C    APPENDIX / Page 141

Jul 23 20:24 1991 slopeMatch.c

```
1      float SlopeConstrainedMatch(float *a1,float *a2,int aLength,
2                      float *b1,float *b2,int bLength,
3                      float maxSlope)
4      {
5       float costs[MAX_SIGNAL_LENGTH][MAX_SIGNAL_LENGTH];
6       char down[MAX_SIGNAL_LENGTH][MAX_SIGNAL_LENGTH];
7       char left[MAX_SIGNAL_LENGTH][MAX_SIGNAL_LENGTH];
8      }
```

Section C

APPENDIX / Page 142

Jul 12 14:36 1991 sortMatrix.c

```c
1     #include <stdio.h>
2     #include "error.h"
3     #include "pict.h"
4
5     #define MAX_ENTRIES 5000
6
7     typedef struct {
8      float score;
9      int x;
10     int y;
11    } *CompareTuple,CompareTupleBody;
12
13    int TupleLessThan(CompareTuple *x,CompareTuple *y)
14    {
15     if ((*x)->score == (*y)->score)
16       return 0;
17     else if ((*x)->score < (*y)->score)
18       return -1;
19     else
20       return 1;
21    }
22
23    void PrintTuple(CompareTuple a,FILE *fp)
24    {
25     fprintf(fp,"(%d,%d): %f\n",a->x,a->y,a->score);
26    }
27
28    void main(int argc,char **argv)
29    {
30     Picture pict;
31     int i,j;
32     int x,y;
33     char *infile;
34     CompareTuple scores[MAX_ENTRIES];
35
36     if (argc != 2)
37       DoError("Usage: %s infile.\n",argv[0]);
38     infile = argv[1];
39
40     pict = load_pict(infile);
41     if (pict->width*pict->height > MAX_ENTRIES)
42       DoError("%s: matrix has too manyt entries.\n",argv[0]);
43
44     for (y=0,i=0;y<pict->height;++y)
45      for (x=0;x<pict->width;++x) {
46       CompareTuple temp;
47       temp = (CompareTuple)calloc(1,sizeof(CompareTupleBody));
48       if (temp==NULL)
49          DoError("%s: cannot allocate space.\n",argv[0]);
50       temp->score = *((float *)(pict->data)+x+y*pict->width);
51       temp->x = x;
52       temp->y = y;
```

Section C

```
53        scores[i] = temp;
54          ++i;
55      }
56     qsort(scores,i,sizeof(CompareTuple),TupleLessThan);
57     for (j=0;j<i;++j)
58       PrintTuple(scores[j],stdout);
59    }
60
```

Section D

Aug 26 17:54 1991 Makefile

```
1    CCFLAGS = -g -c -I/net/piglet/piglet-1c/hopcroft/new/include
2
3    OFUNS = blobify.o orient.o lines.o newBaselines.o newMain.o types.o \
4    newBlobify.o boxes.o newContour.o numbers.o fontNorm.o \
5    dict.o
6
7    ALPHAOFUNS = orient.o lines.o baselines.o newMain.o types.o \
8    blobify.o boxes.o newContour.o numbers.o alphaNorm.o \
9    dict.o
10
11
12    SOURCES = Makefile baselines.c blobify.c boxes.c dict.c dmain.c getAll.c\
13    getOutline.c lines.c newContour.c newDiff2.c newMain.c\
14    numbers.c orient.c overlay.c fontNorm.c testFine.c types.c
15
16    EXTRNS = /net/piglet/piglet-1c/hopcroft/error/error.o\
17    /net/piglet/piglet-1c/hopcroft/new/pict/pict.o \
18    /net/piglet/piglet-1c/hopcroft/lists/lists.o
19
20    INCLUDE = /net/piglet/piglet-1c/hopcroft/new/include/
21    MISC = $(INCLUDE)misc.h
22    BOOLEAN = $(INCLUDE)boolean.h
23    LINES = $(INCLUDE)lines.h
24    LISTS = $(INCLUDE)lists.h
25    PICT = $(INCLUDE)pict.h
26    TYPES = $(INCLUDE)types.h
27    MYLIB = $(INCLUDE)mylib.h
28    ORIENT = $(INCLUDE)orient.h
29    BASELINES = $(INCLUDE)baselines.h
30    BLOBIFY = $(INCLUDE)blobify.h
31    BOXES = $(INCLUDE)boxes.h
32    CONTOUR = $(INCLUDE)newContour.h
33    DIFF = $(INCLUDE)diff.h
34    DICT = $(INCLUDE)dict.h
35    ERROR = $(INCLUDE)error.h
36    FONTNORM = $(INCLUDE)fontNorm.h
37
38    orient:     $(OFUNS)
39        gcc $(OFUNS) $(HOME)/new/lib/mylib.a /usr/lib/debug/malloc.o -lm -o $@
40
41    newBlobify: newBlobify.o
42        gcc newBlobify.o ../lib/mylib.a -lm -o $@
43
44    makeAlphabet:    $(ALPHAOFUNS)
45        gcc $(ALPHAOFUNS) /usr/lib/debug/malloc.o $(EXTRNS) -lm -o $@
46
47    overlay:    overlay.o
48        gcc overlay.o $(EXTRNS) -o $@
49
50    testFine:    testFine.o lines.o guassian.o types.o
51        gcc testFine.o lines.o guassian.o types.o $(EXTRNS) -lm -o $@
52
```

APPENDIX / Page 144

Section D                          APPENDIX / Page 145

```
53    boxes:      boxes.o lines.o types.o
54            gcc boxes.o lines.o types.o $(HOME)/new/lib/mylib.a -lm -o $@
55
56    getOutline: dict.o getOutline.o
57            gcc getOutline.o dict.o $(EXTRNS) -lm -o $@
58
59    getAll:     dict.o getAll.o
60            gcc getAll.o dict.o $(EXTRNS) -lm -o $@
61
62    maxFilter:  maxFilter.o
63            gcc maxFilter.o $(HOME)/new/lib/mylib.a -lm -o $@
64
65    myWc: myWc.o
66            gcc myWc.o $(EXTRNS) -o $@
67
68    printCode:  $(SOURCES)
69            /usr/5bin/pr -n3 $(SOURCES) | lpr -PWeeklyWorldNews
70
71    newBaselines.o:    newBaselines.c $(BOOLEAN) $(PICT) $(TYPES) $(LISTS) $(LINES)\
72    $(BASELINES)
73            gcc $(CCFLAGS) newBaselines.c
74
75    blobify.o:   blobify.c $(BOOLEAN) $(PICT) $(BLOBIFY)
76            gcc $(CCFLAGS) blobify.c
77
78    boxes.o:            boxes.c $(BOOLEAN) $(PICT) $(TYPES) $(BOXES)
79            gcc $(CCFLAGS) boxes.c
80
81    dict.o:             dict.c $(BOOLEAN) $(TYPES) $(ERROR) $(PICT) $(DICT)
82            gcc $(CCFLAGS) dict.c
83
84    dmain.o: dmain.c $(BOOLEAN) $(PICT) $(DIFF)
85            gcc $(CCFLAGS) dmain.c
86
87    getAll.o: getAll.c $(BOOLEAN) $(TYPES) $(PICT) $(DICT)
88            gcc $(CCFLAGS) getAll.c
89
90    getOutline.o: getOutline.c $(BOOLEAN) $(TYPES) $(PICT) $(DICT)
91            gcc $(CCFLAGS) getOutline.c
92
93    guassian.o:         guassian.c
94            gcc $(CCFLAGS) guassian.c
95
96    lines.o:    lines.c $(BOOLEAN) $(PICT) $(LINES)
97            gcc $(CCFLAGS) lines.c
98
99    maxFilter.o: maxFilter.c $(MYLIB)
100           gcc $(CCFLAGS) maxFilter.c
101
102   myWc.o:             myWc.c $(BOOLEAN) $(ERROR)
103           gcc $(CCFLAGS) myWc.c
104
105   newBlobify.o:      newBlobify.c $(MYLIB) $(BLOBIFY)
106           gcc $(CCFLAGS) newBlobify.c
107
```

Section D                                                   APPENDIX / Page 146

```
108    newContour.o:     newContour.c $(BOOLEAN) $(PICT) $(TYPES) $(LINES) \
109    $(LISTS) $(CONTOUR) $(FONTNORM)
110         gcc $(CCFLAGS) newContour.c
111
112    newDiff2.o: newDiff2.c $(BOOLEAN) $(TYPES) $(PICT) $(DIFF)
113         gcc $(CCFLAGS) newDiff2.c
114
115    newMain.o:       newMain.c $(BOOLEAN) $(PICT) $(LISTS) $(LINES) \
116    $(ORIENT) $(BASELINES) $(BLOBIFY) $(BOXES) $(CONTOUR) $(ORIENT)
117         gcc $(CCFLAGS) newMain.c
118
119    numbers.o:  numbers.c $(BOOLEAN) $(PICT) $(LINES)
120         gcc $(CCFLAGS) numbers.c
121
122    orient.o:    orient.c $(BOOLEAN) $(TYPES) $(PICT) $(ORIENT) $(LINES)
123         gcc $(CCFLAGS) orient.c
124
125    overlay.o:   overlay.c $(BOOLEAN) $(PICT)
126         gcc $(CCFLAGS) overlay.c
127
128    postproc.o: postproc.c $(BOOLEAN) $(TYPES) $(ERROR) $(PICT) $(DICT)
129         gcc $(CCFLAGS) postproc.c
130
131    alphaNorm.o: alphaNorm.c $(BOOLEAN) $(TYPES) $(ERROR) $(PICT) $(DICT) $(FONTNORM)
132         gcc $(CCFLAGS) alphaNorm.c
133
134    fontNorm.o: fontNorm.c $(BOOLEAN) $(TYPES) $(ERROR) $(PICT) $(DICT) $(FONTNORM)
135         gcc $(CCFLAGS) fontNorm.c
136
137    testFine.o:   testFine.c
138         gcc $(CCFLAGS) testFine.c
139
140    types.o:            types.c $(TYPES) $(ERROR)
141         gcc $(CCFLAGS) types.c
142
```

Aug 5 15:45 1991 alphaNorm.c

```
1       #include <stdio.h>
2       #include <math.h>
3       #include "boolean.h"
4       #include "types.h"
5       #include "error.h"
6       #include "pict.h"
7       #include "dict.h"
8       #include "fontNorm.h"
9
10      /* This file is just like fontNorm.c, but assumes that the input is data for an alphabet
        dictionary.
11       * This data is
12       *
13       * a-z
14       *
15       * A-Z
16       *
17       * 0-9
18       *
19       * |!@#$%^&*()+\-={}[];:/<>?
20       *
21       * ' ` " -
22       *
23       * _ ,.
24       *
25       * The x height will be measured from the x(23). The ascender height will be measured
26       * from the l(11).
27       */
28
29      #define X_HEIGHT_SHAPE 23
30      #define ASC_HEIGHT_SHAPE 11
31
32      extern double ceil(double);
33      extern int irint(double);
34
35
36      #define UP 0
37      #define DOWN 1
38      typedef int Direction;
39
40      extern Picture thePict;
41
42      void StoreRawOutlinePair(Dictionary dict, int dictEntry,
43                      Box box,int *bothX,int *topY, int *baseY,
44                      int numberOfLegs)
45      {
46       RawOutlinePair temp;
47       int i;
48       int *xCursor,*topCursor,*bottomCursor;
49
50       temp = (RawOutlinePair)calloc(1,sizeof(RawOutlinePairBody));
51       if (temp == NULL)
```

Section D

APPENDIX / Page 148

```
52       DoError("StoreRawOutlinePair: cannot allocate space\n",NULL);
53
54       temp->box = box;
55       temp->numberOfLegs = numberOfLegs;
56
57       temp->x = (int *)calloc(temp->numberOfLegs,sizeof(int));
58       temp->top = (int *)calloc(temp->numberOfLegs,sizeof(int));
59       temp->bottom = (int *)calloc(temp->numberOfLegs,sizeof(int));
60       if ((temp->x == NULL) ||
61         (temp->top == NULL) ||
62         (temp->bottom == NULL))
63       DoError("StoreRawOutlinePair: cannot allocate space\n",NULL);
64
65       xCursor = temp->x;
66       topCursor = temp->top;
67       bottomCursor = temp->bottom;
68
69       for (i=0;i<numberOfLegs;++i) {
70        *xCursor++ = *bothX++;
71        *topCursor++ = *topY++;
72        *bottomCursor++ = *baseY++;
73       }
74       *(dict->rawOutlines+dictEntry) = temp;
75       }
76
77       int RawOutlineWidth(RawOutlinePair a,int middleLine)
78       {
79        int i,numberOfLegs,right,left;
80        int *topCursor,*bottomCursor;
81        int topValue,bottomValue;
82
83        numberOfLegs = a->numberOfLegs;
84
85        topCursor = a->top;
86        bottomCursor = a->bottom;
87        for (i=0;i<numberOfLegs;++i) {
88         topValue = *topCursor++;
89         bottomValue = *bottomCursor++;
90
91         if (topValue != HIT_THE_BOX) {
92          topValue = middleLine - topValue;
93          if (topValue<0)
94             topValue = 0;
95         }
96         else
97          topValue = 0;
98
99         if (bottomValue != HIT_THE_BOX) {
100          bottomValue = bottomValue - middleLine;
101          if (bottomValue < 0)
102             bottomValue = 0;
103         }
104         else
105          bottomValue = 0;
106
```

Section D

```
107       if ((bottomValue != 0)||(topValue != 0))
108         break;
109     }
110     left = i;
111
112     topCursor = a->top+numberOfLegs-1;
113     bottomCursor = a->bottom+numberOfLegs-1;
114     for (i=numberOfLegs-1;i>=0;--i) {
115      topValue = *topCursor--;
116      bottomValue = *bottomCursor--;
117
118      if (topValue != HIT_THE_BOX) {
119        topValue = middleLine - topValue;
120        if (topValue<0)
121           topValue = 0;
122      }
123      else
124        topValue = 0;
125
126      if (bottomValue != HIT_THE_BOX) {
127        bottomValue = bottomValue - middleLine;
128        if (bottomValue < 0)
129           bottomValue = 0;
130      }
131      else bottomValue = 0;
132
133      if ((topValue != 0)||(bottomValue !=0))
134        break;
135     }
136     right = i+1;
137
138     return right-left;
139   }
140
141   void ResampleOutlinePair(OutlinePair a,float newToOldFactor)
142   /* Resample an outline pair using linear interpolation. */
143   {
144    int newWidth,oldWidth,i;
145    int oldLeft,oldRight;
146    float oldCenter;
147    float *newX,*newTop,*newBottom;
148    float *xCursor,*topCursor,*bottomCursor;
149
150    oldWidth = a->numberOfLegs;
151    newWidth = irint(newToOldFactor*oldWidth);
152
153    newX = (float *)calloc(newWidth,sizeof(float));
154    newTop = (float *)calloc(newWidth,sizeof(float));
155    newBottom = (float *)calloc(newWidth,sizeof(float));
156    if ((newX==NULL)||(newTop==NULL)||(newBottom==NULL))
157      DoError("ResampleOutlinePair: cannot allocate space.\n",NULL);
158
159    xCursor = newX;
160    topCursor = newTop;
161    bottomCursor = newBottom;
```

Section D

APPENDIX / Page 150

```
162
163        for (i=0;i<newWidth;++i) {
164          oldCenter = i/(float)newWidth*(float)oldWidth;
165          oldLeft = irint(floor(oldCenter));
166          oldRight = irint(ceil(oldCenter));
167          if (oldLeft==oldRight) {
168            *xCursor++ = *(a->x+oldLeft);
169            *topCursor++ = *(a->top+oldLeft);
170            *bottomCursor++ = *(a->bottom+oldLeft);
171          }
172          else {
173            float slope;
174            slope = *(a->x+oldRight)-*(a->x+oldLeft);
175            *xCursor++ = *(a->x+oldLeft) + (oldCenter-oldLeft)*slope;
176            slope = *(a->top+oldRight)-*(a->top+oldLeft);
177            *topCursor++ = *(a->top+oldLeft) + (oldCenter-oldLeft)*slope;
178            slope = *(a->bottom+oldRight)-*(a->bottom+oldLeft);
179            *bottomCursor++ = *(a->bottom+oldLeft) + (oldCenter-oldLeft)*slope;
180          }
181        }
182
183        free(a->x);
184        free(a->top);
185        free(a->bottom);
186
187        a->x = newX;
188        a->top = newTop;
189        a->bottom = newBottom;
190        a->numberOfLegs = newWidth;
191      }
192
193      void StoreOutlinePair(Dictionary dict, int dictEntry,
194                    int middleLine,int fontXHeight,
195                    int ascenderHeight)
196      /* This routine normalizes the raw outline pair stored in dict at dictEntry using the following
197       * operations:
198       * 1) For the top contour, shift so that the middle line is at y=0 and negate so that the
199       *    higher points are greater than 0. For the bottom, shift so that middle line is at y=0,
200       *    but don't flip. Thus, lower points have y coordinates greater than 0.
201       *    Consider points whose value is HIT_THE_BOX to be at y=0. These correspond to gaps
202       *    between the letters.
203       * 2) Compress top and bottom y coordinates by 1/fontXHeight so that the coordinates at the
204       *    distance of the fontXHeight have value 1. Note that 1 is an arbitrary number. It is
205       *    unlikely that a signal will have parts that are the x height above the center line
206       *    anyway.
207       *    FOR TOP CONTOUR,
208       *    IF HEIGHT IS GREATER THAN XHEIGHT, SCALE DIFFERENCE BY 1.5/ASCENDER_HEIGHT.
209       *    ELSE SCALE DIFFERENCE BY 1/XHEIGHT.
210       *    FOR BOTTOM CONTOUR,
211       *    SCALE BY 1.5/ASCENDER_HEIGHT.
212       * 3) Compress the x coordinates by the same factor as in step 2. Note that this does not
213       *    actually resample the contour. NOW DO THIS WITH RESAMPLE. USE SCALE FACTOR OF
214       *    20/XHEIGHT.
215       * 4) Remove left and right ends of the contour that have y values of zero. This is so the
```

Section D APPENDIX / Page 151

```
216      *   contour starts where the word starts, rather than at the edge of its bouding box.
217      * 5) Resample the contour to stretch by firstFontXwidth/fontxWidth. KILL THIS
         OPERATION.
218      */
219     {
220       RawOutlinePair raw;
221       OutlinePair temp;
222       int i,numberOfLegs;
223       int y;
224       int offset;

225       int *xSCursor,*topSCursor,*bottomSCursor;
226       float *xDCursor,*topDCursor,*bottomDCursor;
227       float *xCursor,*topCursor,*bottomCursor;
228       int left,right;
229       float foffset;
230
231       raw = *(dict->rawOutlines+dictEntry);
232
233       temp = (OutlinePair)calloc(1,sizeof(OutlinePairBody));
234       if (temp == NULL)
235         DoError("StoreOutlinePair: cannot allocate space\n",NULL);
236
237       temp->x = (float *)calloc(raw->numberOfLegs,sizeof(float));
238       temp->top = (float *)calloc(raw->numberOfLegs,sizeof(float));
239       temp->bottom = (float *)calloc(raw->numberOfLegs,sizeof(float));
240       if ((temp->x == NULL) ||
241          (temp->top == NULL) ||
242          (temp->bottom == NULL))
243         DoError("StoreOutlinePair: cannot allocate space\n",NULL);
244
245       temp->box = raw->box;
246       temp->blackoutHeight = 0;
247       temp->numberOfLegs = raw->numberOfLegs;
248       offset = temp->offset = *(raw->x);
249       temp->width = *(raw->x+raw->numberOfLegs-1) - temp->offset;
250
251       xDCursor = temp->x;
252       topDCursor = temp->top;
253       bottomDCursor = temp->bottom;
254       xSCursor = raw->x;
255       topSCursor = raw->top;
256       bottomSCursor = raw->bottom;
257
258       numberOfLegs = raw->numberOfLegs;
259       for (i=0;i<numberOfLegs;++i) {
260     /*   *xDCursor++ = (float)(*xSCursor++ - offset)/fontXHeight; */
261         if (*topSCursor==HIT_THE_BOX) {
262           y = 0;
263           topSCursor++;
264         }
265         else {
266           y = middleLine - *topSCursor++;
267           if (y<0)
268               y = 0;
```

Section D

```
269       }
270       if (y>fontXHeight/2)
271         *topDCursor++ = (float)y *1.5 / ascenderHeight;
272       else
273         *topDCursor++ = (float)y / fontXHeight;
274
275       if (*bottomSCursor= =HIT_THE_BOX) {
276         y = 0;
277         bottomSCursor++;
278       }
279       else {
280         y = *bottomSCursor++ - middleLine;
281         if (y<0)
282            y = 0;
283       }
284       if (y>fontXHeight/2)
285         *bottomDCursor++ = (float)y / fontXHeight;
286       else
287         *bottomDCursor++ = (float)y *1.5 / ascenderHeight;
288     }
289
290     /* Now try to remove parts of the contour on to the left and right of the
291      * word shape that are at height 0 */
292
293     /* Find left edge */
294     topDCursor = temp->top;
295     bottomDCursor = temp->bottom;
296     for (i=0;i<numberOfLegs;++i) {
297      if ((*topDCursor++ != 0)||(*bottomDCursor++!=0))
298         break;
299     }
300     left = i;
301
302     /* Find right edge */
303     topDCursor = temp->top+numberOfLegs-1;
304     bottomDCursor = temp->bottom+numberOfLegs-1;
305     for (i=numberOfLegs-1;i>=0;--i) {
306      if ((*topDCursor-- != 0)||(*bottomDCursor--!=0))
307         break;
308     }
309     right = i+1;
310
311     /* Clip the ends of the contour at left and right */
312     xDCursor = temp->x;
313     topDCursor = temp->top;
314     bottomDCursor = temp->bottom;
315     xCursor = temp->x+left;
316     topCursor = temp->top+left;
317     bottomCursor = temp->bottom+left;
318     foffset = *xSCursor;
319     for (i=left;i<right;++i) {
320       *xDCursor++ = *xCursor++ - foffset;
321       *topDCursor++ = *topCursor++;
322       *bottomDCursor++ = *bottomCursor++;
323     }
```

Section D

APPENDIX / Page 153

```
324       temp->numberOfLegs = right-left;
325
326       *(dict->outlines+dictEntry) = temp;
327       ResampleOutlinePair(*(dict->outlines+dictEntry),(float)20/(float)fontXHeight);
328     }
329
330     static int lineSpacing;
331     int OrderOutlinePair(OutlinePair *o1,OutlinePair *o2)
332     {
333      int yDistance;
334      int xDistance;
335      yDistance = (*o1)->box->pageY - (*o2)->box->pageY;
336      if (yDistance<lineSpacing && yDistance > -lineSpacing) {
337       xDistance = (*o1)->box->pageX - (*o2)->box->pageX;
338       return xDistance;
339      }
340      return yDistance;
341     }
342
343     void SortDictionary(Dictionary dict)
344     {
345      lineSpacing = 20;
346      qsort(dict->rawOutlines,dict->numberOfEntries,sizeof(RawOutlinePair),
347            OrderOutlinePair);
348     }
349
350     /* WARNING - assumes at least on entry is not equal to HIT_THE_BOX */
351     float MaxTopValue(RawOutlinePair o)
352     {
353      int i;
354      float maxValue;
355      maxValue = *(o->top);
356      for (i=0;i<o->numberOfLegs;++i)
357       if (*(o->top+i)>maxValue && (*o->top+i)!=HIT_THE_BOX)
358        maxValue = *(o->top+i);
359      return maxValue;
360     }
361
362     /* WARNING - assumes at least on entry is not equal to HIT_THE_BOX */
363     float MinTopValue(RawOutlinePair o)
364     {
365      int i;
366      float minValue;
367      minValue = *(o->top);
368      for (i=0;i<o->numberOfLegs;++i)
369       if (*(o->top+i)<minValue && (*o->top+i)!=HIT_THE_BOX)
370        minValue = *(o->top+i);
371      return minValue;
372     }
373
374     #define HIST_SIZE 100
375     void HistogramMax(int *data,int dataLength,int offset,int sign,int *histogram)
376     {
377      int i,bin;
378
```

Section D

```
379         if (sign>0) {
380          int maxValue;
381
382          maxValue = *data;
383          for (i=0;i<dataLength;++i)
384           if (data[i]!=HIT_THE_BOX) {
385              maxValue = data[i];
386              break;
387           }
388          for (;i<dataLength;++i)
389           if (data[i]!=HIT_THE_BOX && data[i]>maxValue)
390              maxValue = data[i];
391          if (maxValue != HIT_THE_BOX) {
392           bin = maxValue-offset;
393           if ((bin>=0)&&(bin<HIST_SIZE))
394              histogram[bin]++;
395          }
396         }
397         else {
398          int minValue;
399          minValue = *data;
400          for (i=0;i<dataLength;++i)
401           if (data[i]!=HIT_THE_BOX) {
402              minValue = data[i];
403              break;
404           }
405          for (;i<dataLength;++i)
406           if (data[i]!=HIT_THE_BOX && data[i]<minValue)
407              minValue = data[i];
408          if (minValue != HIT_THE_BOX) {
409           bin = minValue-offset;
410           if ((bin>=0)&&(bin<HIST_SIZE))
411              histogram[bin]++;
412          }
413         }
414        }
415
416        void Histogram(int *data,int dataLength, int offset, int *histogram)
417        {
418         int i,bin;
419
420         for (i=0;i<dataLength;++i) {
421          if (*data != HIT_THE_BOX) {
422           bin = *data-offset;
423           if ((bin>=0)&&(bin<HIST_SIZE))
424              histogram[bin]++;
425          }
426          data++;
427         }
428        }
429
430        int MaxBin(int *histogram)
431        {
432         int i;
433         int maxValue;
```

Section D  APPENDIX / Page 155

```
434       int maxIndex;
435
436       maxValue = histogram[0];
437       maxIndex = 0;
438       for (i=0;i<HIST_SIZE;++i)
439        if (histogram[i]>maxValue) {
440         maxValue = histogram[i];
441         maxIndex = i;
442        }
443       return maxIndex;
444      }
445
446      int MaxBinAbove(int *histogram,int line)
447      {
448       int i;
449       int maxValue;
450       int maxIndex;
451       int top,bottom;
452
453       for (i=0;i<HIST_SIZE;++i)
454        if (histogram[i] != 0)
455         break;
456
457       top = i;
458       bottom = (line+top)/2;
459
460       maxValue = histogram[top];
461       maxIndex = top;
462       for (i=top;i<=bottom;++i)
463        if (histogram[i]>maxValue) {
464         maxValue = histogram[i];
465         maxIndex = i;
466        }
467       return maxIndex;
468      }
469
470      void DrawTextLines(Picture thePict,Dictionary dict,int topLine,int bottomLine)
471      {
472       int maxLength;
473       int halfWidth;
474       int x,y;
475       float x2,x3,y2,y3;
476       float angle;
477
478       angle = (*(dict->rawOutlines))->box->angle;
479       maxLength = thePict->width+thePict->height;
480       halfWidth = thePict->width / 2;
481       x = topLine * -sin(angle) + halfWidth * cos(angle);
482       y = topLine * cos(angle) + halfWidth * sin(angle);
483       x2 = x+maxLength*cos(angle);
484       y2 = y+maxLength*sin(angle);
485       x3 = x-maxLength*cos(angle);
486       y3 = y-maxLength*sin(angle);
487       DrawLine(thePict,x,y,(int)x2,(int)y2,5);
488       DrawLine(thePict,x,y,(int)x3,(int)y3,5);
```

Section D

```
489
490        x = bottomLine * -sin(angle) + halfWidth * cos(angle);
491        y = bottomLine * cos(angle) + halfWidth * sin(angle);
492        x2 = x+maxLength*cos(angle);
493        y2 = y+maxLength*sin(angle);
494        x3 = x-maxLength*cos(angle);
495        y3 = y-maxLength*sin(angle);
496        DrawLine(thePict,x,y,(int)x2,(int)y2,5);
497        DrawLine(thePict,x,y,(int)x3,(int)y3,5);
498    }
499
500    void PageStatistics(Dictionary dict,char *fileName)
501    /* WARNING - this must be run before PostProcess since PostProcess changes the raw
502     * shape data. */
503    {
504      int index;
505      int temp;
506      int i,startIndex,firstY,minY,endIndex,shape;
507      int tops[HIST_SIZE];
508      int bottoms[HIST_SIZE];
509      int ascenders[HIST_SIZE];
510      int descenders[HIST_SIZE];
511      int middleLine,topLine,bottomLine,ascenderLine,descenderLine;
512      int ascenderHeight,descenderHeight,lineNumber;
513      int fontXHeight,fontXWidth,xIndex;
514      RawOutlinePair thisShape;
515      FILE *fp;
516      BOOLEAN haveFirstFontXWidth = FALSE;
517      int firstFontXWidth;
518
519      if ((fp=fopen(fileName,"w"))==NULL)
520        DoError("PageStatistics: error opening output file %s.\n",fileName);
521
522      SortDictionary(dict);
523
524      index = 0;
525      lineNumber = 0;
526      while (index < dict->numberOfEntries) {
527        startIndex = index;
528        firstY = (*(dict->rawOutlines+index))->box->pageY;
529        minY = firstY;
530        while ( (*(dict->rawOutlines+index))->box->pageY - firstY < 20 &&
531             (*(dict->rawOutlines+index))->box->pageY - firstY > -20) {
532          if ( minY > ( (*(dict->rawOutlines+index))->box->pageY ))
533              minY = (*(dict->rawOutlines+index))->box->pageY;
534          ++index;
535          if (index == dict->numberOfEntries)
536              break;
537        }
538        endIndex = index;
539
540
541        /* shapes from start index through endindex are all on */
542        /* the same text line */
543        /* minY has the top of the highest box on the line. */
```

Section D  APPENDIX / Page 157

```
544
545      /* Find the base and toplines by taking the mode of the heights of the
546       * valleys of the bottom contours and the peaks of the top contours */
547      for (i=0;i<HIST_SIZE;i++) {
548        bottoms[i]=0;
549      }
550
551      for (shape=startIndex;shape<endIndex; ++shape) {
552        thisShape = *(dict->rawOutlines+shape);
553        Histogram(thisShape->bottom,thisShape->numberOfLegs,minY,bottoms);
554      }
555      bottomLine = MaxBin(bottoms)+minY;
556      if (X_HEIGHT_SHAPE> =startIndex&&X_HEIGHT_SHAPE<endIndex) {
557        topLine = MinTopValue(*(dict->rawOutlines+X_HEIGHT_SHAPE));
558        fontXHeight = bottomLine - topLine;
559      }
560      if (ASC_HEIGHT_SHAPE> =startIndex&&ASC_HEIGHT_SHAPE<endIndex) {
561        ascenderLine = MinTopValue(*(dict->rawOutlines+ASC_HEIGHT_SHAPE));
562        ascenderHeight = bottomLine - ascenderLine;
563      }
564      middleLine = bottomLine-fontXHeight/2;
565      topLine = bottomLine-fontXHeight;
566
567      if (thePict)
568        DrawTextLines(thePict,dict,topLine,bottomLine);
569
570
571      fprintf(fp,"%d: %d %d %2.6f\n",lineNumber,fontXHeight,ascenderHeight,
572            (float)ascenderHeight/(float)fontXHeight);
573
574      for (shape=startIndex;shape<endIndex; ++shape)
575        StoreOutlinePair(dict,shape,middleLine,fontXHeight,ascenderHeight);
576
577      ++lineNumber;
578    } /* Do another line of text */
579    fclose(fp);
580  }
```

Section D

Aug 21 19:50 1991 baselines.c

```
1       #include <stdio.h>
2       #include <values.h>
3       #include <math.h>
4       #include "boolean.h"
5       #include "pict.h"
6       #include "types.h"
7       #include "lists.h"
8       #include "lines.h"
9       #include "baselines.h"
10
11      extern double sqrt(double);
12      extern int irint(double);
13
14      /*inline*/ int NewReadPixel(UCHAR *base,int width,float x,float y)
15      {
16       int xi;
17       int yi;
18       UCHAR mask;
19
20       xi = irint(x);
21       yi = irint(y);
22       mask = 0x80 >> (xi & 0x7);
23       return *(base+yi*width+(xi>>3)) & mask;
24      }
25
26      void NewCountLine1Bit(Picture pict,int x1,int y1,int x2,int y2,int *black,int *blackEdge)
27      {
28       float x,y;
29       float xinc,yinc;
30       float xupinc,yupinc;
31       float den;
32       int b,be;
33       int width,ucharWidth,height;
34       UCHAR *data;
35
36       width = pict->width;
37       ucharWidth = pict->uchar_width;
38       height = pict->height;
39       data = pict->data;
40
41       den = sqrt((y2-y1)*(y2-y1)+(x2-x1)*(x2-x1));
42       xinc = (x2-x1)/den;
43       yinc = (y2-y1)/den;
44       xupinc = -yinc;
45       yupinc = xinc;
46       x = x1;
47       y = y1;
48
49       b=0;
50       be=0;
51
52       while (x<width&&x>=0&&y<height&&y>=0) {
```

```
53      ++b;
54      if (NewReadPixel(data,ucharWidth,x,y)) {
55       if (!(NewReadPixel(data,ucharWidth,x+xupinc,y+yupinc) &&
56           NewReadPixel(data,ucharWidth,x-xupinc,y-yupinc)))

57         ++be;
58       }
59       x += xinc;
60       y += yinc;
61
62      }
63      *black = b;
64      *blackEdge = be;
65    }
66
67
68    #define MIN_BLACK 5
69    float NewCountLine(Picture pict,int x1,int y1,int x2,int y2)
70    {
71      int black,blackEdge;
72      black = 0;
73      blackEdge = 0;
74      NewCountLine1Bit(pict,x1,y1,x2,y2,&black,&blackEdge);
75      NewCountLine1Bit(pict,x1,y1,x1-(x2-x1),y1-(y2-y1),&black,&blackEdge);
76      if (black < MIN_BLACK)
77        return 0;
78      else
79        return (float)blackEdge/black;
80    }
81
82    static float x2offset;
83    static float y2offset;
84    static int projectIndex;
85    static float *projection;
86    static int *coordx;
87    static int *coordy;
88    BOOLEAN BaseLinePiston(Picture pict, int x, int y, BOOLEAN test, UCHAR color)
89    {
90      if (test) {
91    /*   if (!(projectIndex%10))
92         DrawLine(pict,x,y,(int)(x+x2offset),(int)(y+y2offset),0xff); */
93    /*   WritePixel(pict,x,y,0xff); */
94       projection[projectIndex] = NewCountLine(pict,x,y,(int)(x+x2offset),
95                                      (int)(y+y2offset));
96       coordx[projectIndex] = x;
97       coordy[projectIndex++] = y;
98       return test;
99      } else
100       return test;
101   }
102
103   static int lastX;
104   static int lastY;
105   BOOLEAN EndPointPiston(Picture pict, int x, int y, BOOLEAN test, UCHAR color)
106   {
```

Section D

APPENDIX / Page 160

```
107       if (test) {
108         lastX = x;
109         lastY = y;
110       }
111       return test;
112     }
113
114     void EndPoints(Picture pict,double angle,int *tx, int *ty,int *bx, int *by)
115     {
116       int xc,yc;
117       int maxLength;
118       float normal;
119       float x2,y2,x3,y3;
120
121       /* Make normal to text point in quadrants I and II */
122       /* Assume 0 <= angle < 2*M_PI */
123       normal = fmod(angle + M_PI/2,2*M_PI);
124       if (normal > M_PI)
125         normal -= M_PI;
126
127       xc = pict->width/2;
128       yc = pict->height/2;
129
130       maxLength = pict->width+pict->height;
131       x2 = xc+maxLength*cos(normal);      /* At bottom of picture */
132       y2 = yc+maxLength*sin(normal);
133       x3 = xc-maxLength*cos(normal);      /* At top of picture */
134       y3 = yc-maxLength*sin(normal);
135
136       LineEngine(pict,xc,yc,(int)x2,(int)y2,0,EndPointPiston);
137       *bx = lastX;
138       *by = lastY;
139       LineEngine(pict,xc,yc,(int)x3,(int)y3,0,EndPointPiston);
140       *tx = lastX;
141       *ty = lastY;
142     }
143
144     double distance(int x1,int y1,int x2,int y2)
145     {
146       return sqrt((double)((x1-x2)*(x1-x2)+(y1-y2)*(y1-y2)));
147     }
148
149     #define BASE_PERCENTILE 0.20
150     #define MIN_LINE_HEIGHT_FRACTION 0.50
151     List BaseLines(Picture pict,double angle,char *plotFile)
152     #ifdef foo
153     ,int *count,
154               int **returnCoordx, int **returnCoordy)
155     #endif
156     {
157       float *topProjection;
158       int *topCoordx,*topCoordy;
159       int *finalCoordx,*finalCoordy,*finalIndex;
160       int topIndex,bottomIndex;
161       int topCount,botCount,finalCount;
```

Section D  APPENDIX / Page 161

```
162      int maxLength;
163      int xc,yc;
164      float x2,y2,x3,y3;
165      float maxValue,lastValue;
166      int i,j;
167      float baseThresh;
168      int topX,topY,bottomX,bottomY;
169      BOOLEAN onTextLine;
170      List xList,yList,result;
171      double totalDistance,averageDistance;
172      FILE *outfile;
173
174      printf("angle = %3.3f\n",angle);
175
176      maxLength = pict->width+pict->height;
177
178      topProjection = (float *)calloc(maxLength,sizeof(float));
179      topCoordx = (int *)calloc(maxLength,sizeof(int));
180      topCoordy = (int *)calloc(maxLength,sizeof(int));
181      finalCoordx = (int *)calloc(maxLength,sizeof(int));
182      finalCoordy = (int *)calloc(maxLength,sizeof(int));
183      finalIndex = (int *)calloc(maxLength,sizeof(int));
184
185      if ((topProjection == NULL)||
186         (topCoordx == NULL)||
187         (topCoordy == NULL)||
188         (finalIndex == NULL) ||
189         (finalCoordx == NULL) ||
190         (finalCoordy == NULL)) {
191       printf("BaseLines: cannot allocate memory\n");
192       exit(-1);
193      }
194
195      EndPoints(pict,angle,&topX,&topY,&bottomX,&bottomY);
196
197      printf("Main Line: (%d,%d)-(%d,%d)\n",topX,topY,bottomX,bottomY);
198     /* DrawLine(pict,topX,topY,bottomX,bottomY,0xff); */
199
200      x2offset = maxLength*cos(angle);
201      y2offset = maxLength*sin(angle);
202      projectIndex = 0;
203      projection = topProjection;
204      coordx = topCoordx;
205      coordy = topCoordy;
206      LineEngine(pict,topX,topY,bottomX,bottomY,0,BaseLinePiston);
207      topCount = projectIndex;
208
209      maxValue = topProjection[0];
210      for (i=0;i<topCount;++i) {
211       if (topProjection[i]>maxValue)
212         maxValue = topProjection[i];
213      }
214
215      baseThresh = maxValue*BASE_PERCENTILE;
216      printf("baseThresh = %3.3f\n",baseThresh);
```

Section D

APPENDIX / Page 162

```
217
218      /* Plot the baseline contour if requested */
219      if (plotFile!=NULL) {
220       printf("Opening baselines plot file\n");
221       if ((outfile = fopen(plotFile,"w"))==NULL) {
222        printf("Error opening baseline plot file.\n");
223        exit(-1);
224       }
225       for (i=0;i<topCount;++i)
226        fprintf(outfile,"%d %f\n",i,topProjection[i]);
227       fprintf(outfile,"\"Projection\n\n");
228       fprintf(outfile,
229           "0 %f\n%d %f%\n\"Baseline Threshold\n",
230             baseThresh,topCount,baseThresh);
231      }
232
233      finalCount=0;
234      lastValue = topProjection[topCount-1];
235      onTextLine = FALSE;
236      for (i=1;i<topCount;++i) {
237       if (onTextLine) {
238        if (lastValue>baseThresh && topProjection[i]<=baseThresh) {
239            finalCoordx[finalCount] = topCoordx[i];
240            finalCoordy[finalCount] = topCoordy[i];
241         finalIndex[finalCount] = i;
242            finalCount++;
243            onTextLine = FALSE;
244        }
245       } else {
246        if (lastValue<=baseThresh && topProjection[i]>baseThresh) {
247            finalCoordx[finalCount] = topCoordx[i];
248            finalCoordy[finalCount] = topCoordy[i];
249         finalIndex[finalCount] = i;
250            finalCount++;
251            onTextLine = TRUE;
252        }
253       }
254
255       lastValue = topProjection[i];
256      }
257      if (finalCount&1)
258       --finalCount;          /* Only take an even number of lines */
259      for (totalDistance=0,i=0,j=0;i<finalCount;i+=2) {
260       topX = finalCoordx[i];
261       topY = finalCoordy[i];
262       bottomX = finalCoordx[i+1];
263       bottomY = finalCoordy[i+1];
264       totalDistance += distance(topX,topY,bottomX,bottomY);
265       j+=2;
266      }
267      averageDistance = totalDistance / (finalCount/2)*MIN_LINE_HEIGHT_FRACTION;
268      for (i=0,j=0;i<finalCount;i+=2) {
269       topX = finalCoordx[i];
270       topY = finalCoordy[i];
271       topIndex = finalIndex[i];
```

```
272         bottomX = finalCoordx[i+1];
273         bottomY = finalCoordy[i+1];
274         bottomIndex = finalIndex[i+1];
275         finalCoordx[j] = topX;
276         finalCoordy[j] = topY;
277         finalIndex[j] = topIndex;
278         finalCoordx[j+1] = bottomX;
279         finalCoordy[j+1] = bottomY;
280         finalIndex[j+1] = bottomIndex;
281         if (distance(topX,topY,bottomX,bottomY)>averageDistance)
282           j+=2;
283      }
284    #ifdef foo
285      *count = j;
286      *returnCoordx = finalCoordx;
287      *returnCoordy = finalCoordy;
288    #endif
289      result = nil;
290      for (i=j-1;i>=0;--i) {
291        push(MakePoint(finalCoordx[i],finalCoordy[i]),result);
292      }
293
294      if (plotFile != NULL) {
295       fprintf(outfile,"\n0 %f\n",-baseThresh);
296       for (i=0;i<j;i+=2) {
297           fprintf(outfile,"%d %f\n%d %f\n%d %f\n%d %f\n",
298                  finalIndex[i],-baseThresh,
299                  finalIndex[i],-2*baseThresh,
300                  finalIndex[i+1],-2*baseThresh,
301                  finalIndex[i+1],-baseThresh);
302       }
303       fprintf(outfile,"\"Baselines");
304       fclose(outfile);
305       printf("Done writing baseline plot file.\n");
306      }
307
308     return result;
309    }
310
311    void DrawBaseLines(Picture pict, List pointList, double angle)
312    #ifdef foo
313    int count,int *coordx,int *coordy,double angle)
314    #endif
315    {
316     int maxLength;
317     float x2,y2,x3,y3;
318     int x,y;
319     Point temp;
320     maxLength = pict->width+pict->height;
321     while (!endp(pointList)) {
322      temp = pop(pointList);
323      x = temp->x;
324      y = temp->y;
325      x2 = x+maxLength*cos(angle);
326      y2 = y+maxLength*sin(angle);
```

Section D

APPENDIX / Page 164

```
327     x3 = x-maxLength*cos(angle);
328     y3 = y-maxLength*sin(angle);
329     DrawLine(pict,x,y,(int)x2,(int)y2,0xff);
330     DrawLine(pict,x,y,(int)x3,(int)y3,0xff);
331   }
332 }
```

Section D

Jul 1 13:44 1991 blobify.c

```c
1     #include <stdio.h>
2     #include <math.h>
3     #include "boolean.h"
4     #include "pict.h"
5     #include "blobify.h"
6
7     static UCHAR bitmasks[] = {0x80,0x40,0x20,0x10,0x8,0x4,0x2,0x1};
8
9     Picture Blobify(Picture old,int half_mask_size,double threshold)
10    {
11     Picture new;
12     int x,y;
13     int tval;
14     int left,right,top,bottom;
15     int width;
16     int *counters;
17     int *countptr;
18     int mask_size;
19     UCHAR *xptr,*xyptr;
20     int *leftptr;
21     int *rightptr;
22     UCHAR *topptr;
23     UCHAR *bottomptr;
24     int uchar_width;
25    /* UCHAR bitmask;*/
26     int count;
27     int inside;
28     int thold;
29    /* Added the following for speedup hack 1/14/91 */
30     UCHAR bitMask;
31     UCHAR *newCursor;
32     UCHAR newValue;
33     UCHAR topPixels;
34     UCHAR bottomPixels;
35
36
37     mask_size = 2 * half_mask_size + 1;
38    /* uchar_width = ROUND8(old->width) >> 3; */
39     uchar_width = old->uchar_width;
40
41     left = half_mask_size;
42     right = old->width - half_mask_size - 1;
43
44     top = half_mask_size;
45     bottom = old->height - half_mask_size -1;
46
47
48     tval = floor(4*half_mask_size*half_mask_size*threshold);
49     new = new_pict(old->width,old->height,old->depth);
50
51     counters = (int *)calloc(old->width,sizeof(int));
52
```

Section D

APPENDIX / Page 166

```
53        width = old->width;
54        countptr = counters;
55      - xptr = old->data;
56        bitMask = 0x80;
57        for (x=0;x<width;++x) {
58      /*  bitmask = bitmasks[x%8]; */
59         xyptr = xptr;
60         for (count=0,y=0;y<mask_size;++y) {
61          if (*xyptr & bitMask)
62             ++count;
63          xyptr += uchar_width;
64         }
65         *(countptr++) = count;
66      /*  if (x%8 == 7)
67       *    ++xptr; */
68         if (bitMask == 0x01) {
69          bitMask = 0x80;
70          ++xptr;
71         }
72         else
73          bitMask = bitMask >> 1;
74        }
75
76        for (y=top;y<=bottom;++y) {
77         countptr = counters;
78         for (inside=0,x=0;x<mask_size;++x)
79          inside += *countptr++;
80
81         leftptr = counters;
82         rightptr = counters + mask_size;
83         newCursor = new->data+y*uchar_width+(left>>3);
84         bitMask = bitmasks[left%8];
85         newValue = 0;
86         for (x=left;x<=right;++x) {
87          if (inside>tval)
88             /* set pixel */
89             newValue |= bitMask;
90      /*     *(new->data+y*uchar_width+(x>>3)) |= bitmasks[x%8]; */
91          if (bitMask == 0x01) {
92             bitMask = 0x80;
93             *newCursor++ = newValue;
94             newValue = 0;
95          }
96          else
97             bitMask = bitMask >> 1;
98          inside += *rightptr++;
99          inside -= *leftptr++;
100        }
101        if (bitMask != 0x80) {
102         *newCursor = newValue;
103        }
104
105        topptr = old->data+(y-half_mask_size)*uchar_width;
106        bottomptr = topptr + mask_size*uchar_width;
107        countptr = counters;
```

```
108         bitMask = 0x01;
109         for (x=0;x<width;++x) {
110   /*    bitmask = bitmasks[x%8]; */
111           if (bitMask == 0x01) {
112             topPixels = *topptr++;
113             bottomPixels = *bottomptr++;
114             bitMask = 0x80;
115           }
116           else
117             bitMask = bitMask >> 1;
118           if (topPixels & bitMask) {
119             if (!(bottomPixels & bitMask))
120               --(*countptr);
121           }
122           else if (bottomPixels & bitMask)
123             ++(*countptr);
124
125           ++countptr;
126         }
127       }
128
129       return new;
130     }
131
132     #ifdef foo
133     void main(argc,argv)
134     int argc;
135     char **argv;
136     {
137       char *infile,*outfile;
138       Picture old,new;
139       int half_mask_size;
140       float threshold;
141
142       malloc_debug(2);
143
144       if (argc != 5) {
145         printf("Usage: %s infile outfile half_mask_size threshold\n",argv[0]);
146         exit(0);
147       }
148       infile = argv[1];
149       outfile = argv[2];
150       half_mask_size = atoi(argv[3]);
151       threshold = atof(argv[4]);
152
153       printf("Loading %s...",infile);
154       old = load_pict(infile);
155       new = components(old,half_mask_size,threshold);
156       write_pict(outfile,new);
157
158     }
159     #endif
160
```

Section D

Aug 26 18:10 1991 boxes.c

```
1       #include <stdio.h>
2       #include <values.h>
3       #include <math.h>
4       #include "boolean.h"
5       #include "pict.h"
6       #include "types.h"
7       #include "lists.h"
8
9       extern int irint(double);
10
11      #define MAX_QUEUE_SIZE 10000
12      #define BLACK 1
13      #define WHITE 0
14
15      #define ABS(a) ((a)<0?-(a):(a))
16
17      typedef Point PointArray;
18
19      typedef struct {
20       PointBody ulc,lrc;
21      } MinMaxBox;
22
23      typedef struct {
24       PointBody xwitness,ywitness;
25      } WitnessBox;
26
27      typedef struct {
28       PointArray data;
29       int first,last;
30       int size;
31      } QueueBody,*Queue;
32
33      Queue MakeQueue(size)
34      int size;
35      {
36       Queue q;
37       if ((q=(Queue)calloc(1,sizeof(QueueBody)))==NULL) {
38        printf("Cannot alloc space for queue body\n");
39        exit(0);
40       }
41       if ((q->data=(PointArray)calloc(size,sizeof(PointBody)))==NULL) {
42        printf("Cannot allocate space for queue array\n");
43        exit(0);
44       }
45       q->first=q->last=0;
46       q->size=size;
47       return q;
48      }
49
50      void InsertPoint(x,y,q)
51      int x,y;
52      Queue q;
```

Section D

```
53     {
54      q->data[q->last].x=x;
55      q->data[q->last].y=y;
56      q->last=(q->last+1)%q->size;
57      if (q->last==q->first) {
58       printf("Maximum q size exceeded\n");
59       exit(0);
60      }
61     }
62
63     void GetFirst(x,y,q)
64     int *x,*y;
65     Queue q;
66     {
67      if (q->first==q->last) {
68       printf("Error: tried top pop empty queue\n");
69       exit(0);
70      }
71      *x=q->data[q->first].x;
72      *y=q->data[q->first].y;
73      q->first=(q->first+1)%q->size;
74     }
75
76     BOOLEAN Empty(q)
77     Queue q;
78     {
79      return q->first==q->last;
80     }
81
82     void InsertBlackNeighbors(Picture pict,int x,int y,Queue queue)
83     {
84      if (ReadPixel(pict,x+1,y)) {
85       WritePixel(pict,x+1,y,WHITE);
86       InsertPoint(x+1,y,queue);
87      }
88      if (ReadPixel(pict,x-1,y)) {
89       WritePixel(pict,x-1,y,WHITE);
90       InsertPoint(x-1,y,queue);
91      }
92      if (ReadPixel(pict,x,y+1)) {
93       WritePixel(pict,x,y+1,WHITE);
94       InsertPoint(x,y+1,queue);
95      }
96      if (ReadPixel(pict,x,y-1)) {
97       WritePixel(pict,x,y-1,WHITE);
98       InsertPoint(x,y-1,queue);
99      }
100    }
101
102    void PointFromTheta(theta,x,y)
103    float theta;
104    float *x,*y;
105    {
106     *x = cos(theta);
107     *y = sin(theta);
```

Section D

APPENDIX / Page 170

```
108      }
109
110      void Normal(x,y,nx,ny)
111      float x,y;
112      float *nx,*ny;
113      {
114        *nx = -y;
115        *ny = x;
116      }
117
118      int DotFI(fx,fy,ix,iy)
119      float fx,fy;
120      int ix,iy;
121      {
122        return irint(fx*ix+fy*iy);
123      }
124
125      static float pox,poy,pnx,pny;
126
127      void MinMax(boundingBox,oldFrameBox,px,py)
128      MinMaxBox *boundingBox;
129      WitnessBox *oldFrameBox;
130      int px,py;
131      {
132      /* IGNORE THETA FOR THE TIME BEING */
133        if (boundingBox->lrc.x < DotFI(pox,poy,px,py)) {
134          boundingBox->lrc.x = DotFI(pox,poy,px,py);
135        }
136        if (boundingBox->lrc.y < DotFI(pnx,pny,px,py)) {
137          boundingBox->lrc.y = DotFI(pnx,pny,px,py);
138        }
139        if (boundingBox->ulc.x > DotFI(pox,poy,px,py)) {
140          boundingBox->ulc.x = DotFI(pox,poy,px,py);
141          oldFrameBox->xwitness.x = px;
142          oldFrameBox->xwitness.y = py;
143        }
144        if (boundingBox->ulc.y > DotFI(pnx,pny,px,py)) {
145          boundingBox->ulc.y = DotFI(pnx,pny,px,py);
146          oldFrameBox->ywitness.x = px;
147          oldFrameBox->ywitness.y = py;
148        }
149      }
150
151      /* Set the pixels on the border of the image to the color WHITE so that
152       * the paint routine need never worry about going off the edge of the
153       * image. */
154      void FramePicture(pict)
155      Picture pict;
156      {
157        int i;
158        for (i=0;i<pict->height;++i) {
159          WritePixel(pict,0,i,WHITE);
160          WritePixel(pict,pict->width-1,i,WHITE);
161        }
162        for (i=0;i<pict->width;++i) {
```

Section D    APPENDIX / Page 171

```
163        WritePixel(pict,i,0,WHITE);
164        WritePixel(pict,i,pict->height-1,WHITE);
165       }
166     }
167
168     /*
169      * Given as input a thresholded image, find the borders of the connected
170      * components. Assumes image is thresholded to 0 and 1.
171      */
172     void PaintComponent(pict,x,y,queue,boundingBox,oldFrameBox)
173     Picture pict;
174     int x,y;
175     Queue queue;
176     MinMaxBox *boundingBox;
177     WitnessBox *oldFrameBox;
178     {
179      boundingBox->ulc.x = boundingBox->lrc.x = DotFI(pox,poy,x,y);
180      boundingBox->ulc.y = boundingBox->lrc.y = DotFI(pnx,pny,x,y);
181      oldFrameBox->xwitness.x = oldFrameBox->ywitness.x = x;
182      oldFrameBox->xwitness.y = oldFrameBox->ywitness.y = y;
183
184      InsertPoint(x,y,queue);
185      WritePixel(pict,x,y,WHITE);
186     /* printf("Queue status: %s\n",(Empty(queue))?"empty":"not empty"); */
187      while (!Empty(queue)) {
188       GetFirst(&x,&y,queue);
189       MinMax(boundingBox,oldFrameBox,x,y);
190       InsertBlackNeighbors(pict,x,y,queue);
191      }
192     }
193
194     int iabs(int x)
195     {
196     if (x<0)
197       return -x;
198     else
199       return x;
200     }
201
202     BOOLEAN PointInBounds(Picture pict,int x,int y)
203     {
204      return x>=0 && x<pict->width && y>=0 && y<pict->height;
205     }
206
207
208     BOOLEAN BoxInBounds(Picture pict,int x, int y, int width, int height,
209                    double angle)
210     {
211      int rightX,rightY,downX,downY;
212      rightX = width*cos(angle);
213      rightY = width*sin(angle);
214      downX = height*cos(angle+M_PI/2);
215      downY = height*sin(angle+M_PI/2);
216      return (PointInBounds(pict,x,y) &&
217            PointInBounds(pict,x+rightX,y+rightY) &&
```

Section D

APPENDIX / Page 172

```
218                PointInBounds(pict,x+rightX+downX,y+rightY+downY) &&
219                PointInBounds(pict,x+downX,y+downY));
220      }
221
222      void GetCorner(WitnessBox *box,int *ulcx,int *ulcy)
223      {
224        double c2;
225        c2 = (-pny*(box->ywitness.x-box->xwitness.x) +
226             pnx*(box->ywitness.y-box->xwitness.y) ) /
227             (pox*pny - pnx*poy);
228        *ulcx = c2*pox+box->ywitness.x;
229        *ulcy = c2*poy+box->ywitness.y;
230      }
231
232      List FindBorders(Picture pict,double theta)
233      {
234        int x,y;
235        int ulcx,ulcy;
236        Queue queue;
237        MinMaxBox boundingBox;
238        WitnessBox oldFrameBox;
239        List boxList;
240        int width,height;
241
242        queue = MakeQueue(MAX_QUEUE_SIZE);
243
244        PointFromTheta(theta,&pox,&poy);
245        Normal(pox,poy,&pnx,&pny);
246
247        printf("Framing picture\n");
248        FramePicture(pict);         /* Put a "visited" color border
249                                     * around the image */
250        boxList = nil;
251        for (y=1;y<pict->height-1;++y)
252         for (x=1;x<pict->width-1;++x)
253          if (ReadPixel(pict,x,y)) {
254      /*    printf("Found component at (%d,%d)\n",x,y); */
255           PaintComponent(pict,x,y,queue,&boundingBox,&oldFrameBox);
256      /*    printf("Making box: %d %d %d %d\n",
257                oldFrameBox.ulc.x,
258                oldFrameBox.ulc.y,
259                oldFrameBox.lrc.x,
260                oldFrameBox.lrc.y);
261      */
262           GetCorner(&oldFrameBox,&ulcx,&ulcy);
263           width = boundingBox.lrc.x-boundingBox.ulc.x;
264           height = boundingBox.lrc.y-boundingBox.ulc.y;
265      /*   if (iabs(height)>10) */
266           if (BoxInBounds(pict,ulcx,ulcy,
267                   width,height,theta))
268            push(MakeBox(ulcx,ulcy,
269                   width,height,theta),
270                boxList);
271         }
272        printf("Found %d boxes completely on the page\n",ListLength(boxList));
```

Section D  APPENDIX / Page 173

```
273         return boxList;
274     }
275
276     void DrawBox(Picture pict,Box box)
277     {
278      int rightX,rightY,downX,downY;
279      rightX = box->width*cos(box->angle);
280      rightY = box->width*sin(box->angle);
281      downX = box->height*cos(box->angle+M_PI/2);
282      downY = box->height*sin(box->angle+M_PI/2);
283      /* printf("DrawBox: %d %d %d %d\n",box->x,box->y,box->width<,box->height); */
284      DrawLine(pict,box->x,box->y,box->x+rightX,box->y+rightY,0xff);
285      DrawLine(pict,box->x+rightX,box->y+rightY,
286           box->x+rightX+downX,box->y+rightY+downY,0xff);
287      DrawLine(pict,box->x+rightX+downX,box->y+rightY+downY,
288           box->x+downX,box->y+downY,0xff);
289      DrawLine(pict,box->x+downX,box->y+downY,box->x,box->y,0xff);
290     }
291
292     void DrawColorBox(Picture pict,Box box,int color)
293     {
294      int rightX,rightY,downX,downY;
295      rightX = box->width*cos(box->angle);
296      rightY = box->width*sin(box->angle);
297      downX = box->height*cos(box->angle+M_PI/2);
298      downY = box->height*sin(box->angle+M_PI/2);
299      /* printf("DrawBox: %d %d %d %d\n",box->x,box->y,box->width<,box->height); */
300      DrawLine(pict,box->x,box->y,box->x+rightX,box->y+rightY,color);
301      DrawLine(pict,box->x+rightX,box->y+rightY,
302           box->x+rightX+downX,box->y+rightY+downY,color);
303      DrawLine(pict,box->x+rightX+downX,box->y+rightY+downY,
304           box->x+downX,box->y+downY,color);
305      DrawLine(pict,box->x+downX,box->y+downY,box->x,box->y,color);
306     }
307
308
309     void DrawBoxList(Picture pict,List boxList)
310     {
311      while (!endp(boxList)) {
312       DrawBox(pict,(Box)pop(boxList));
313      }
314     }
315
316
317     #ifdef TRYMAIN
318     /* WARNING - be sure to replace the height check in FindBorders */
319     #endif
320     void main(argc,argv)
321     int argc;
322     char **argv;
323     {
324      char *infileName,*outfileName;
325      List boxList;
326      int width,height;
327      float theta;
```

Section D                                                       APPENDIX / Page 174

```
328     Picture pict,finalPict;
329     FILE *outfile;
330
331     if (argc != 4) {
332       printf("Usage: %s infile outfile page_orientation\n",argv[0]);
333       exit(0);
334     }
335     infileName = argv[1];
336     outfileName = argv[2];
337     theta = atof(argv[3]);
338
339     printf("Loading %s...",infileName);
340     pict = load_pict(infileName);
341
342     printf("\nFinding boxes.\n");
343
344     finalPict = new_pict(pict->width,pict->height,pict->depth);
345     /* CopyPicture(finalPict,pict); */
346     boxList = FindBorders(pict,theta);
347
348     DrawBoxList(finalPict,boxList);
349     write_pict(outfileName,finalPict);
350     }
```

Section D

Jan 16 15:52 1991 dict.c

```c
1     #include <stdio.h>
2     #include "boolean.h"
3     #include "types.h"
4     #include "error.h"
5     #include "pict.h"
6     #include "dict.h"
7
8     void WriteOutlinePair(OutlinePair o, FILE *fp)
9     {
10     fwrite(o->box,sizeof(BoxBody),1,fp);
11     fwrite(&(o->blackoutHeight),sizeof(float),1,fp);
12     fwrite(&(o->numberOfLegs),sizeof(int),1,fp);
13     fwrite(&(o->offset),sizeof(int),1,fp);
14     fwrite(&(o->width),sizeof(int),1,fp);
15
16     fwrite(o->x,sizeof(float),o->numberOfLegs,fp);
17     fwrite(o->top,sizeof(float),o->numberOfLegs,fp);
18     fwrite(o->bottom,sizeof(float),o->numberOfLegs,fp);
19     }
20
21     void WriteDictionary(Dictionary dict, char *filename)
22     {
23     FILE *fp;
24     int temp;
25     int i;
26     if ((fp=fopen(filename,"w"))==NULL)
27       DoError("WriteDictionary: Error opening output file.\n",NULL);
28     temp = 1234567;
29     fwrite(&temp,sizeof(int),1,fp);
30     fwrite(&(dict->numberOfEntries),sizeof(int),1,fp);
31
32     if (dict->infoString == NULL) {
33       temp = 0;
34       fwrite(&temp,sizeof(int),1,fp);
35     }
36     else{
37       temp = strlen(dict->infoString)+1;
38       fwrite(&temp,sizeof(int),1,fp);
39       fwrite(dict->infoString,sizeof(char),temp,fp);
40     }
41
42     for (i=0;i<dict->numberOfEntries;++i)
43       WriteOutlinePair(*(dict->outlines+i),fp);
44     fclose(fp);
45     }
46
47
48     /* Reads a Box from a binary stream. the type Box is defined in box.h */
49     Box ReadBox(FILE *fp)
50     {
51     Box temp;
52     temp = (Box)calloc(1,sizeof(BoxBody));
```

Section D

```
53      if (temp==NULL)
54          DoError("ReadBox: cannot allocate space\n",NULL);
55      if (fread(temp,sizeof(BoxBody),1,fp)!=1)
56          DoError("ReadBox: error reading bounding box\n",NULL);
57      return temp;
58  }
59
60  /* Reads an OutlinePair from a binary stream. The format of an OutlinePair
61   * follows:
62   *  BoxBody - shape bounding box
63   *  float   - blackout bar height
64   *  int     - number of legs in the contour
65   *  int     - x coordinate of left edge of contour
66   *  int     - width in pixels of edge contour
67   *  float[numberOfLegs] - x coordinates of contours
68   *  float[numberOfLegs] - y coordinates of top contour
69   *  float[numberOfLegs] - y coordinates of bototm contour
70   */
71  OutlinePair ReadOutlinePair(FILE *fp)
72  {
73    OutlinePair temp;
74    temp = (OutlinePair)calloc(1,sizeof(OutlinePairBody));
75    if (temp == NULL)
76        DoError("ReadOutlinePair: cannot allocate space\n",NULL);
77    temp->box = ReadBox(fp);
78
79    if (fread(&(temp->blackoutHeight),sizeof(float),1,fp)!=1)
80        DoError("ReadOutlinePair: error reading blackoutHeight\n",NULL);
81
82    if (fread(&(temp->numberOfLegs),sizeof(int),1,fp)!=1)
83        DoError("ReadOutlinePair: error reading length\n",NULL);
84
85    if (fread(&(temp->offset),sizeof(int),1,fp)!=1)
86        DoError("ReadOutlinePair: error reading offset\n",NULL);
87    if (fread(&(temp->width),sizeof(int),1,fp)!=1)
88        DoError("ReadOutlinePair: error reading width\n",NULL);
89
90    temp->x = (float *)calloc(temp->numberOfLegs,sizeof(float));
91    if (temp->x == NULL)
92        DoError("ReadOutlinePair: cannot allocate space\n",NULL);
93    if (fread(temp->x,
94            sizeof(float),temp->numberOfLegs,fp)!=temp->numberOfLegs)
95        DoError("ReadOutlinePair: error reading x coords\n",NULL);
96
97    temp->top = (float *)calloc(temp->numberOfLegs,sizeof(float));
98    if (temp->top == NULL)
99        DoError("ReadOutlinePair: cannot allocate space\n",NULL);
100   if (fread(temp->top,sizeof(float),
101           temp->numberOfLegs,fp)!=temp->numberOfLegs)
102       DoError("ReadOutlinePair: error reading topY coords\n",NULL);
103
104   temp->bottom = (float *)calloc(temp->numberOfLegs,sizeof(float));
105   if (temp->bottom == NULL)
106       DoError("ReadOutlinePair: cannot allocate space\n",NULL);
107   if (fread(temp->bottom,
```

Section D

```
108             sizeof(float),temp->numberOfLegs,fp)!=temp->numberOfLegs)
109        DoError("ReadOutlinePair: error reading bottomY coords\n",NULL);
110
111      return temp;
112    }
113
114    /* Create a new Dictionary structure with space allocated for the
115     * entries. */
116    Dictionary NewDict(int numberOfEntries)
117    {
118      Dictionary temp;
119      temp = (Dictionary)calloc(1,sizeof(DictionaryBody));
120      if (temp == NULL)
121        DoError("NewDict: cannot allocate space\n",NULL);
122      temp->numberOfEntries = numberOfEntries;
123      temp->infoString = NULL;
124      temp->rawOutlines = (RawOutlinePair *)calloc(numberOfEntries,
125                              sizeof(RawOutlinePair));
126      temp->outlines = (OutlinePair *)calloc(numberOfEntries,
127                              sizeof(OutlinePair));
128      if ((temp->outlines == NULL)||(temp->rawOutlines == NULL))
129        DoError("NewDict: cannot allocate space\n",NULL);
130      return temp;
131    }
132
133    /* Read a dictionary from a binary format file. The file organization
134     * follows:
135     *   int      - number of entries in the dictionary
136     *   OutlinePair[numberOfEntries] - outlines of each shape in the dictionary
137     * When a dictionary is read in, the shapes are sorted such that they fall
138     * in the order of words on textlines. */
139    Dictionary ReadDictionary(char *filename)
140    {
141      FILE *fp;
142      Dictionary dict;
143      int i;
144      int temp;
145      int infoStringLength;
146      int numberOfEntries;
147      int magicNumber;
148
149      if ((fp=fopen(filename,"r"))==NULL)
150        DoError("Error opening input file\n",NULL);
151
152      if (fread(&magicNumber,sizeof(int),1,fp)!=1)
153        DoError("Error reading dictionary\n",NULL);
154      if (magicNumber != 1234567)
155        DoError("ReadDictionary: input file %s is not a dictionary file.\n",
156            filename);
157
158      if (fread(&numberOfEntries,sizeof(int),1,fp)!=1)
159        DoError("Error reading dictionary\n",NULL);
160      dict = NewDict(numberOfEntries);
161
162      if (fread(&infoStringLength,sizeof(int),1,fp)!=1)
```

Section D                                                           APPENDIX / Page 178

```
163      DoError("Error reading dictionary\n",NULL);
164      if (infoStringLength) {
165       if ((dict->infoString = (char *)calloc(infoStringLength,sizeof(char))) = =
166           NULL)
167         DoError("ReadDictionary: cannot allocate space for info string.\n",NULL);
168       fread(dict->infoString,infoStringLength,sizeof(char),fp);
169       *(dict->infoString+infoStringLength-1) = '\0'; /* Set last char to 0 just in case */
170      }
171
172      for (i=0;i<numberOfEntries; ++i)
173       *(dict->outlines+i) = ReadOutlinePair(fp);
174      fclose(fp);
175      return dict;
176     }
177
178     char *ArgListToString(int argc, char **argv)
179     {
180      int i;
181      int totalLength;
182      char *theString;
183      char *destCursor,*srcCursor;
184
185      for (i=0,totalLength=0;i<argc; ++i)
186       totalLength += strlen(argv[i]) + 1;  /* Room for each arg and one space */
187      totalLength++;                /* Room for thee EOS character */
188
189      if ((theString = (char *)calloc(totalLength,sizeof(char))) = = NULL)
190       DoError("ArgListToString: cannot allocatee space.\n",NULL);
191
192      for (i=0,destCursor=theString;i<argc; ++i) {
193       srcCursor = argv[i];
194       while (*srcCursor != '\0')
195        *destCursor++ = *srcCursor++;
196       *destCursor++ = ' ';
197      }
198      *destCursor = '\0';
199
200      return theString;
201     }
```

Section D  APPENDIX / Page 179

Jan 11 17:06 1991 dmain.c

```
1      #include <stdio.h>
2      #include <math.h>
3      #include <values.h>
4      #include "boolean.h"
5      #include "types.h"
6      #include "pict.h"
7      #include "diff.h"
8
9
10     void main(int argc,char **argv)
11     {
12      Picture pict;
13      char *infile1,*infile2,*outfile;
14
15      if (argc != 4) {
16       printf("Usage:\n");
17       printf("  %s infile1 infile2 outfile\n",argv[0]);
18       exit(-1);
19      }
20
21      infile1 = argv[1];
22      infile2 = argv[2];
23      outfile = argv[3];
24      pict = CompareDictionaries(infile1,infile2);
25      WritePictureAsAscii(pict,outfile);
26     }
```

Section D

APPENDIX / Page 180

Jun 21 15:54 1991 fft.c

```
1    /* Copyright 1991 by Michael Hopcroft.
2     * Right is hearby granted to Xerox Corporation to make use of this
3     * code free of charge. */
4    #include <stdio.h>
5    #include <math.h>
6    #include "fft.h"
7
8    /* Applies bit reversal permutation matrix to array a. length must be a power
9     * of 2. */
10   void BitReverse(float *a, int n)
11   {
12     int i,j,k;
13     float temp;
14
15     j=1;
16     for (i=1;i<n;++i) {
17       if (i<j) {
18         temp = a[i-1];
19         a[i-1] = a[j-1];
20         a[j-1] = temp;
21       }
22       k=n/2;
23       while (k<j) {
24         j = j-k;
25         k = k/2;
26       }
27       j = j+k;
28     }
29   }
30
31   #define TWOPI (M_PI*2)
32
33   void fft(float *real,float *imag,int logn,int mode)
34   {
35     int n;
36     int j,top,i,id,bottom;
37     int stage,subpartLength;
38     float tempr,tempi,temp2r,temp2i,ar,ai,wr,wi,angle;
39
40     n = irint(exp2((double)logn));
41
42     for (stage=1, subpartLength = n;
43          stage<=logn;
44          ++stage, subpartLength/=2) {
45       angle = TWOPI/subpartLength;
46       ar = 1.0;
47       ai = 0.0;
48       if (mode == REVERSE) {
49         wr = cos(angle);
50         wi = sin(angle);
51       } else {
52         wr = cos(angle);
```

Section D

```
53        wi = -sin(angle);
54      }
55      for (j=0;j<subpartLength/2;++j) {    /* for each offset in a part */
56        for (top=j;top<n;top+=subpartLength) {  /* for each part */
57          bottom = top+subpartLength/2;
58          tempr = real[bottom];           /* temp = x[id] */
59          tempi = imag[bottom];
60          real[bottom] = real[top]-real[bottom]; /* x[id] = x[i] - x[id] */
61          imag[bottom] = imag[top]-imag[bottom];
62          temp2r = real[bottom]*ar-imag[bottom]*ai; /* temp2 = x[id]*a */
63          temp2i = real[bottom]*ai+imag[bottom]*ar;
64          real[bottom] = temp2r;          /* x[id] = temp2 */
65          imag[bottom] = temp2i;
66          real[top] += tempr;             /* x[i] +=temp */
67          imag[top] += tempi;
68        }
69        temp2r = ar*wr-ai*wi;         /* a *= w */
70        temp2i = ai*wr+ar*wi;
71        ar = temp2r;
72        ai = temp2i;
73      }
74    }
75    BitReverse(real,n);
76    BitReverse(imag,n);
77
78    #ifdef foo
79    if (mode == MAGNITUDE)
80      for (i=0;i<n;++i)
81        real[i] = sqrt(real[i]*real[i]+imag[i]*imag[i]);
82    #endif
83
84    if (mode == MAGNITUDE)
85      for (i=0;i<n;++i)
86        real[i] = sqrt(real[i]*real[i]+imag[i]*imag[i]);
87    }
88
89    #ifdef TRYMAIN
90    void main(int argc,char **argv)
91    {
92    #define POWER 8
93    #define LENGTH 256
94     float real[LENGTH];
95     float imag[LENGTH];
96     int i;
97    #ifdef foo
98     for (i=0;i<LENGTH;++i){
99       if (i<LENGTH/2)
100         real[i] = 1.0;
101      else
102        real[i] = 0.0;
103      imag[i] = 0.0;
104    }
105    #endif
106
107    for (i=0;i<LENGTH;++i) {
```

Section D

APPENDIX / Page 182

```
108        real[i] = sin(8*TWOPI*i/(LENGTH-1));
109        imag[i] = 0.0;
110      }
111      fft(real,imag,POWER,MAGNITUDE);
112      for (i=0;i<LENGTH; ++i)
113        printf("%d %f\n",i,real[i]);
114    }
115    #endif
116
```

Section D

Aug 15 21:19 1991 fontNorm.c

```
1       #include <stdio.h>
2       #include <math.h>
3       #include "boolean.h"
4       #include "types.h"
5       #include "error.h"
6       #include "pict.h"
7       #include "dict.h"
8       #include "fontNorm.h"
9
10
11      extern double ceil(double);
12      extern int irint(double);
13
14
15      #define UP 0
16      #define DOWN 1
17      typedef int Direction;
18
19      extern Picture thePict;
20
21      void StoreRawOutlinePair(Dictionary dict, int dictEntry,
22                       Box box,int *bothX,int *topY, int *baseY,
23                       int numberOfLegs)
24      {
25        RawOutlinePair temp;
26        int i;
27        int *xCursor,*topCursor,*bottomCursor;
28
29        temp = (RawOutlinePair)calloc(1,sizeof(RawOutlinePairBody));
30        if (temp == NULL)
31          DoError("StoreRawOutlinePair: cannot allocate space\n",NULL);
32
33        temp->box = box;
34        temp->numberOfLegs = numberOfLegs;
35
36        temp->x = (int *)calloc(temp->numberOfLegs,sizeof(int));
37        temp->top = (int *)calloc(temp->numberOfLegs,sizeof(int));
38        temp->bottom = (int *)calloc(temp->numberOfLegs,sizeof(int));
39        if ((temp->x == NULL) ||
40            (temp->top == NULL) ||
41            (temp->bottom == NULL))
42          DoError("StoreRawOutlinePair: cannot allocate space\n",NULL);
43
44        xCursor = temp->x;
45        topCursor = temp->top;
46        bottomCursor = temp->bottom;
47
48        for (i=0;i<numberOfLegs;++i) {
49          *xCursor++ = *bothX++;
50          *topCursor++ = *topY++;
51          *bottomCursor++ = *baseY++;
52        }
```

Section D

APPENDIX / Page 184

```
53      *(dict->rawOutlines+dictEntry) = temp;
54    }
55
56    int RawOutlineWidth(RawOutlinePair a,int middleLine)
57    {
58     int i,numberOfLegs,right,left;
59     int *topCursor,*bottomCursor;
60     int topValue,bottomValue;
61
62     numberOfLegs = a->numberOfLegs;
63
64     topCursor = a->top;
65     bottomCursor = a->bottom;
66     for (i=0;i<numberOfLegs;++i) {
67      topValue = *topCursor++;
68      bottomValue = *bottomCursor++;
69
70      if (topValue != HIT_THE_BOX) {
71       topValue = middleLine - topValue;
72       if (topValue<0)
73          topValue = 0;
74      }
75      else
76       topValue = 0;
77
78      if (bottomValue != HIT_THE_BOX) {
79       bottomValue = bottomValue - middleLine;
80       if (bottomValue < 0)
81          bottomValue = 0;
82      }
83      else
84       bottomValue = 0;
85
86      if ((bottomValue != 0)||(topValue != 0))
87       break;
88     }
89     left = i;
90
91     topCursor = a->top+numberOfLegs-1;
92     bottomCursor = a->bottom+numberOfLegs-1;
93     for (i=numberOfLegs-1;i>=0;--i) {
94      topValue = *topCursor--;
95      bottomValue = *bottomCursor--;
96
97      if (topValue != HIT_THE_BOX) {
98       topValue = middleLine - topValue;
99       if (topValue<0)
100         topValue = 0;
101     }
102     else
103      topValue = 0;
104
105     if (bottomValue != HIT_THE_BOX) {
106      bottomValue = bottomValue - middleLine;
107      if (bottomValue < 0)
```

```
108         bottomValue = 0;
109       }
110       else bottomValue = 0;
111
112       if ((topValue != 0)||(bottomValue !=0))
113         break;
114     }
115     right = i+1;
116
117     return right-left;
118   }
119
120   void ResampleOutlinePair(OutlinePair a,float newToOldFactor)
121   /* Resample an outline pair using linear interpolation. */
122   {
123     int newWidth,oldWidth,i;
124     int oldLeft,oldRight;
125     float oldCenter;
126     float *newX,*newTop,*newBottom;
127     float *xCursor,*topCursor,*bottomCursor;
128
129     oldWidth = a->numberOfLegs;
130     newWidth = irint(newToOldFactor*oldWidth);
131
132     newX = (float *)calloc(newWidth,sizeof(float));
133     newTop = (float *)calloc(newWidth,sizeof(float));
134     newBottom = (float *)calloc(newWidth,sizeof(float));
135     if ((newX==NULL)||(newTop==NULL)||(newBottom==NULL))
136       DoError("ResampleOutlinePair: cannot allocate space.\n",NULL);
137
138     xCursor = newX;
139     topCursor = newTop;
140     bottomCursor = newBottom;
141
142     for (i=0;i<newWidth;++i) {
143       oldCenter = i/(float)newWidth*(float)oldWidth;
144       oldLeft = irint(floor(oldCenter));
145       oldRight = irint(ceil(oldCenter));
146       if (oldLeft==oldRight) {
147         *xCursor++ = *(a->x+oldLeft);
148         *topCursor++ = *(a->top+oldLeft);
149         *bottomCursor++ = *(a->bottom+oldLeft);
150       }
151       else {
152         float slope;
153         slope = *(a->x+oldRight)-*(a->x+oldLeft);
154         *xCursor++ = *(a->x+oldLeft) + (oldCenter-oldLeft)*slope;
155         slope = *(a->top+oldRight)-*(a->top+oldLeft);
156         *topCursor++ = *(a->top+oldLeft) + (oldCenter-oldLeft)*slope;
157         slope = *(a->bottom+oldRight)-*(a->bottom+oldLeft);
158         *bottomCursor++ = *(a->bottom+oldLeft) + (oldCenter-oldLeft)*slope;
159       }
160     }
161
162     free(a->x);
```

Section D

```
163         free(a->top);
164         free(a->bottom);
165
166         a->x = newX;
167         a->top = newTop;
168         a->bottom = newBottom;
169         a->numberOfLegs = newWidth;
170       }
171
172       void StoreOutlinePair(Dictionary dict, int dictEntry,
173                       int middleLine,int fontXHeight,
174                       int ascenderHeight,NormalizationDescriptor *nd)
175       /* This routine normalizes the raw outline pair stored in dict at dictEntry using the following
176        * operations:
177        * 1) For the top contour, shift so that the middle line is at y=0 and negate so that the
178        *    higher points are greater than 0. For the bottom, shift so that middle line is at y=0,
179        *    but don't flip. Thus, lower points have y coordinates greater than 0.
180        *    Consider points whose value is HIT_THE_BOX to be at y=0. These correspond to gaps
181        *    between the letters.
182        * 2) Compress top and bottom y coordinates by 1/fontXHeight so that the coordinates at the
183        *    distance of the fontXHeight have value 1. Note that 1 is an arbitrary number. It is
184        *    unlikely that a signal will have parts that are the x height above the center line
185        *    anyway.
186        *    FOR TOP CONTOUR,
187        *    IF HEIGHT IS GREATER THAN XHEIGHT, SCALE DIFFERENCE BY 1.5/ASCENDER_HEIGHT.
188        *    ELSE SCALE DIFFERENCE BY 1/XHEIGHT.
189        *    FOR BOTTOM CONTOUR,
190        *    SCALE BY 1.5/ASCENDER_HEIGHT.
191        * 3) Compress the x coordinates by the same factor as in step 2. Note that this does not
192        *    actually resample the contour. NOW DO THIS WITH RESAMPLE. USE SCALE FACTOR OF
193        *    20/XHEIGHT.
194        * 4) Remove left and right ends of the contour that have y values of zero. This is so the
195        *    contour starts where the word starts, rather than at the edge of its bouding box.
196        * 5) Resample the contour to stretch by firstFontXwidth/fontxWidth. KILL THIS OPERATION.
197        */
198       {
199         RawOutlinePair raw;
200         OutlinePair temp;
201         int i,numberOfLegs;
202         int y;
203         int offset;
204         int *xSCursor,*topSCursor,*bottomSCursor;
205         float *xDCursor,*topDCursor,*bottomDCursor;
206         float *xCursor,*topCursor,*bottomCursor;
207         int left,right;
208         float foffset;
209         float ascenderFactor,xHeightFactor,widthFactor;
210
211         raw = *(dict->rawOutlines+dictEntry);
212
213         temp = (OutlinePair)calloc(1,sizeof(OutlinePairBody));
214         if (temp = = NULL)
215           DoError("StoreOutlinePair: cannot allocate space\n",NULL);
```

Section D

```
216
217     temp->x = (float *)calloc(raw->numberOfLegs,sizeof(float));
218     temp->top = (float *)calloc(raw->numberOfLegs,sizeof(float));
219     temp->bottom = (float *)calloc(raw->numberOfLegs,sizeof(float));
220     if ((temp->x == NULL) ||
221        (temp->top == NULL) ||
222        (temp->bottom == NULL))
223        DoError("StoreOutlinePair: cannot allocate space\n",NULL);
224
225     temp->box = raw->box;
226     temp->blackoutHeight = 0;
227     temp->numberOfLegs = raw->numberOfLegs;
228     offset = temp->offset = *(raw->x);
229     temp->width = *(raw->x+raw->numberOfLegs-1) - temp->offset;
230
231     xDCursor = temp->x;
232     topDCursor = temp->top;
233     bottomDCursor = temp->bottom;
234     xSCursor = raw->x;
235     topSCursor = raw->top;
236     bottomSCursor = raw->bottom;
237
238     ascenderFactor = 1.5/ascenderHeight;
239     xHeightFactor = 1.0/fontXHeight;
240     widthFactor = 20.0/fontXHeight;
241     if (nd->noXHeightNormalize) {
242       xHeightFactor = 1.0;
243       ascenderFactor = 1.0;
244     }
245     if (nd->noAscenderNormalize)
246       ascenderFactor = xHeightFactor;
247
248     numberOfLegs = raw->numberOfLegs;
249     for (i=0;i<numberOfLegs;++i) {
250      if (*topSCursor==HIT_THE_BOX) {
251        y = 0;
252        topSCursor++;
253      }
254      else {
255        y = middleLine - *topSCursor++;
256        if (y<0)
257           y = 0;
258      }
259      if (y>fontXHeight/2) {
260        float temp1 = (float)y * ascenderFactor;
261        float temp2 = (float)fontXHeight/2 * xHeightFactor;
262        if (temp1<temp2)
263           *topDCursor++ = temp2;
264        else
265           *topDCursor++ = temp1;
266  /*
267        *topDCursor++ = (float)y * ascenderFactor;
268  */
269      }
270      else
```

Section D

APPENDIX / Page 188

```
271          *topDCursor++ = (float)y * xHeightFactor;
272
273          if (*bottomSCursor==HIT_THE_BOX) {
274            y = 0;
275            bottomSCursor++;
276          }
277          else {
278            y = *bottomSCursor++ - middleLine;
279            if (y<0)
280                y = 0;
281          }
282          if (y<fontXHeight/2)
283            *bottomDCursor++ = (float)y * xHeightFactor;
284          else {
285            float temp1 = (float)y * ascenderFactor;
286            float temp2 = (float)fontXHeight/2 * xHeightFactor;
287            if (temp1<temp2)
288                *bottomDCursor++ = temp2;
289            else
290                *bottomDCursor++ = temp1;
291     /*     *bottomDCursor++ = (float)y * ascenderFactor; */
292          }
293        }
294
295        /* Now try to remove parts of the contour on to the left and right of the
296         * word shape that are at height 0 */
297
298        /* Find left edge */
299         topDCursor = temp->top;
300         bottomDCursor = temp->bottom;
301         for (i=0;i<numberOfLegs;++i) {
302          if ((*topDCursor++ != 0)||(*bottomDCursor++ !=0))
303            break;
304         }
305         left = i;
306
307        /* Find right edge */
308         topDCursor = temp->top+numberOfLegs-1;
309         bottomDCursor = temp->bottom+numberOfLegs-1;
310         for (i=numberOfLegs-1;i>=0;--i) {
311          if ((*topDCursor-- != 0)||(*bottomDCursor-- !=0))
312            break;
313         }
314         right = i+1;
315
316        /* Clip the ends of the contour at left and right */
317         xDCursor = temp->x;
318         topDCursor = temp->top;
319         bottomDCursor = temp->bottom;
320         xCursor = temp->x+left;
321         topCursor = temp->top+left;
322         bottomCursor = temp->bottom+left;
323         foffset = *xSCursor;
324         for (i=left;i<right;++i) {
325          *xDCursor++ = *xCursor++ - foffset;
```

Section D

APPENDIX / Page 189

```
326        *topDCursor++ = *topCursor++;
327        *bottomDCursor++ = *bottomCursor++;
328      }
329      temp->numberOfLegs = right-left;
330
331      *(dict->outlines+dictEntry) = temp;
332      ResampleOutlinePair(*(dict->outlines+dictEntry),widthFactor);
333    }
334
335    static int lineSpacing;
336    int OrderOutlinePair(OutlinePair *o1,OutlinePair *o2)
337    {
338     int yDistance;
339     int xDistance;
340     yDistance = (*o1)->box->pageY - (*o2)->box->pageY;
341     if (yDistance<lineSpacing && yDistance > -lineSpacing) {
342       xDistance = (*o1)->box->pageX - (*o2)->box->pageX;
343       return xDistance;
344     }
345     return yDistance;
346    }
347
348    void SortDictionary(Dictionary dict)
349    {
350     lineSpacing = 20;
351     qsort(dict->rawOutlines,dict->numberOfEntries,sizeof(RawOutlinePair),
352          OrderOutlinePair);
353    }
354
355    #define HIST_SIZE 100
356    void HistogramMax(int *data,int dataLength,int offset,int sign,int *histogram)
357    {
358     int i,bin;
359
360     if (sign>0) {
361      int maxValue;
362
363      maxValue = *data;
364      for (i=0;i<dataLength;++i)
365       if (data[i]!=HIT_THE_BOX) {
366           maxValue = data[i];
367           break;
368       }
369      for (;i<dataLength;++i)
370       if (data[i]!=HIT_THE_BOX && data[i]>maxValue)
371           maxValue = data[i];
372      if (maxValue != HIT_THE_BOX) {
373       bin = maxValue-offset;
374       if ((bin>=0)&&(bin<HIST_SIZE))
375           histogram[bin]++;
376      }
377     }
378     else {
379      int minValue;
380      minValue = *data;
```

Section D

```
381        for (i=0;i<dataLength;++i)
382         if (data[i]!=HIT_THE_BOX) {
383            minValue = data[i];
384            break;
385         }
386        for (;i<dataLength;++i)
387         if (data[i]!=HIT_THE_BOX && data[i]<minValue)
388            minValue = data[i];
389        if (minValue != HIT_THE_BOX) {
390         bin = minValue-offset;
391         if ((bin>=0)&&(bin<HIST_SIZE))
392            histogram[bin]++;
393        }
394       }
395      }
396
397      void Histogram(int *data,int dataLength, int offset, int *histogram)
398      {
399       int i,bin;
400
401       for (i=0;i<dataLength;++i) {
402        if (*data != HIT_THE_BOX) {
403         bin = *data-offset;
404         if ((bin>=0)&&(bin<HIST_SIZE))
405            histogram[bin]++;
406        }
407        data++;
408       }
409      }
410
411      int MaxBin(int *histogram)
412      {
413       int i;
414       int maxValue;
415       int maxIndex;
416
417       maxValue = histogram[0];
418       maxIndex = 0;
419       for (i=0;i<HIST_SIZE;++i)
420        if (histogram[i]>maxValue) {
421         maxValue = histogram[i];
422         maxIndex = i;
423        }
424       return maxIndex;
425      }
426
427      int MaxBinAbove(int *histogram,int line)
428      {
429       int i;
430       int maxValue;
431       int maxIndex;
432       int top,bottom;
433
434       for (i=0;i<HIST_SIZE;++i)
435        if (histogram[i] != 0)
```

Section D

```
436         break;
437
438      top = i;
439      bottom = (line+top)/2;
440
441      maxValue = histogram[top];
442      maxIndex = top;
443      for (i=top;i<=bottom; ++i)
444        if (histogram[i]>maxValue) {
445          maxValue = histogram[i];
446          maxIndex = i;
447        }
448      return maxIndex;
449     }
450
451    void DrawTextLines(Picture thePict,Dictionary dict,int topLine,int bottomLine)
452    {
453      int maxLength;
454      int halfWidth;
455      int x,y;
456      float x2,x3,y2,y3;
457      float angle;
458
459      angle = (*(dict->rawOutlines))->box->angle;
460      maxLength = thePict->width+thePict->height;
461      halfWidth = thePict->width / 2;
462      x = topLine * -sin(angle) + halfWidth * cos(angle);
463      y = topLine * cos(angle) + halfWidth * sin(angle);
464      x2 = x+maxLength*cos(angle);
465      y2 = y+maxLength*sin(angle);
466      x3 = x-maxLength*cos(angle);
467      y3 = y-maxLength*sin(angle);
468      DrawLine(thePict,x,y,(int)x2,(int)y2,5);
469      DrawLine(thePict,x,y,(int)x3,(int)y3,5);
470
471      x = bottomLine * -sin(angle) + halfWidth * cos(angle);
472      y = bottomLine * cos(angle) + halfWidth * sin(angle);
473      x2 = x+maxLength*cos(angle);
474      y2 = y+maxLength*sin(angle);
475      x3 = x-maxLength*cos(angle);
476      y3 = y-maxLength*sin(angle);
477      DrawLine(thePict,x,y,(int)x2,(int)y2,5);
478      DrawLine(thePict,x,y,(int)x3,(int)y3,5);
479    }
480
481    void PageStatistics(Dictionary dict,char *fileName,NormalizationDescriptor *nd)
482    /* WARNING - this must be run before PostProcess since PostProcess changes the raw
483     * shape data. */
484    {
485      int index;
486      int temp;
487      int i,startIndex,firstY,minY,endIndex,shape;
488      int tops[HIST_SIZE];
489      int bottoms[HIST_SIZE];
490      int ascenders[HIST_SIZE];
```

Section D

APPENDIX / Page 192

```
491      int descenders[HIST_SIZE];
492      int middleLine,topLine,bottomLine,ascenderLine,descenderLine;
493      int ascenderHeight,descenderHeight,lineNumber;
494      int fontXHeight,fontXWidth,xIndex;
495      RawOutlinePair thisShape;
496      FILE *fp;
497      BOOLEAN haveFirstFontXWidth = FALSE;
498      int firstFontXWidth;
499
500      if ((fp=fopen(fileName,"w"))==NULL)
501       DoError("PageStatistics: error opening output file %s.\n",fileName);
502
503      SortDictionary(dict);
504
505      index = 0;
506     #ifdef foo
507      malloc_verify();
508     #endif
509      lineNumber = 0;
510      while (index < dict->numberOfEntries) {
511       startIndex = index;
512       firstY = (*(dict->rawOutlines+index))->box->pageY;
513       minY = firstY;
514       while ( (*(dict->rawOutlines+index))->box->pageY - firstY < 20 &&
515              (*(dict->rawOutlines+index))->box->pageY - firstY > -20) {
516        if ( minY > ( (*(dict->rawOutlines+index))->box->pageY ))
517            minY = (*(dict->rawOutlines+index))->box->pageY;
518        ++index;
519        if (index == dict->numberOfEntries)
520            break;
521       }
522       endIndex = index;
523
524     #ifdef foo
525       malloc_verify();
526     #endif
527
528       /* shapes from start index through endindex are all on */
529       /* the same text line */
530       /* minY has the top of the highest box on the line. */
531
532       /* Find the base and toplines by taking the mode of the heights of the
533        * valleys of the bottom contours and the peaks of the top contours */
534       for (i=0;i<HIST_SIZE;i++) {
535        tops[i]=0;
536        bottoms[i]=0;
537        ascenders[i]=0;
538        descenders[i]=0;
539       }
540
541       for (shape=startIndex;shape<endIndex;++shape) {
542        thisShape = *(dict->rawOutlines+shape);
543        Histogram(thisShape->top,thisShape->numberOfLegs,minY,tops);
544        Histogram(thisShape->bottom,thisShape->numberOfLegs,minY,bottoms);
545
```

Section D                                          APPENDIX / Page 193

```
546      HistogramMax(thisShape->top,thisShape->numberOfLegs,minY,-1,ascenders);
547      HistogramMax(thisShape->bottom,thisShape->numberOfLegs,minY,1,descenders);
548      }
549      topLine = MaxBin(tops)+minY;
550      bottomLine = MaxBin(bottoms)+minY;
551      ascenderLine = MaxBin(ascenders)+minY;
552      descenderLine = MaxBin(descenders)+minY;
553
554      if (thePict)
555        DrawTextLines(thePict,dict,topLine,bottomLine);
556    #ifdef foo
557      malloc_verify();
558    #endif
559
560      middleLine = (bottomLine+topLine)/2;
561      fontXHeight = bottomLine-topLine;
562      ascenderHeight = bottomLine-ascenderLine;
563      if ((float)ascenderHeight/(float)fontXHeight < 1.1) {
564        fprintf(stderr,"Bad ascender height on line %d.\n",lineNumber);
565        ascenderLine = MaxBinAbove(ascenders,ascenderLine-minY)+minY;
566        ascenderHeight = bottomLine-ascenderLine;
567        fprintf(stderr,"New ascender height = %d.\nNew xheight = %d.\n",ascenderHeight,fontXHeight);
568      }
569
570      fprintf(fp,"%d: %d %d %2.6f\n",lineNumber,fontXHeight,ascenderHeight,
571          (float)ascenderHeight/(float)fontXHeight);
572
573    #ifdef foo
574      /* Assume that the first shape in the image is the letter x.
575       * Use this shape to compute the fontXWidth value. */
576      if (lineNumber==0)
577        fontXWidth = RawOutlineWidth(*(dict->rawOutlines),middleLine);
578    #endif
579
580      ++lineNumber;
581      if (fontXHeight < 0) {
582        fprintf(stderr,"PageStatistics: negative fontXHeight in line %d.\n",lineNumber);
583        fontXHeight *= -1;
584      }
585      for (shape=startIndex;shape<endIndex;++shape)
586        StoreOutlinePair(dict,shape,middleLine,fontXHeight,ascenderHeight,nd);
587    } /* Do another line of text */
588    fclose(fp);
589    }
```

Section D

APPENDIX / Page 194

Jan 12 17:35 1991 getAll.c

```c
1    #include <stdio.h>
2    #include <math.h>
3    #include <values.h>
4    #include "boolean.h"
5    #include "types.h"
6    #include "pict.h"
7    #include "dict.h"
8
9    #define MAX_STRING_LEN 256
10
11   void WriteShiftedAsciiOutline(FILE *fp, OutlinePair outline, float x, float y)
12   {
13    int i;
14    for (i=0;i<outline->numberOfLegs;++i)
15     fprintf(fp,"%f %f\n",i+x,*(outline->top+i)+y);
16    fprintf(fp,"\"top\n\n");
17
18    for (i=0;i<outline->numberOfLegs;++i)
19     fprintf(fp,"%f %f\n",i+x,y-(*(outline->bottom+i)));
20    fprintf(fp,"\"bottom\n\n");
21   }
22
23   void WriteOutlines(char *filename,Dictionary dict)
24   {
25    float maxWidth,maxHeight;
26    int i,j,count;
27    int width,height;
28    float x,y;
29    OutlinePair outline;
30    FILE *fp;
31    if ((fp = fopen(filename,"w"))==NULL) {
32     printf("Error opening %s.",filename);
33     exit(-1);
34    }
35
36    maxWidth = 0;
37    maxHeight = 0;
38    for (i=0;i<dict->numberOfEntries;++i) {
39     outline = *(dict->outlines+i);
40     if (outline->numberOfLegs > maxWidth)
41      maxWidth = outline->numberOfLegs;
42     for (j=0;j<outline->numberOfLegs;++j) {
43      if (*(outline->bottom+j)>maxHeight)
44         maxHeight = *(outline->bottom+j)>maxHeight;
45      if (*(outline->top+j)>maxHeight)
46         maxHeight = *(outline->bottom+j)>maxHeight;
47     }
48    };
49
50    printf("maxWidth,maxHeight = %f,%f\n",maxWidth,maxHeight);
51
52    width = irint(sqrt((double)(dict->numberOfEntries)));
```

Section D APPENDIX / Page 195

```
53      height = irint((double)(dict->numberOfEntries) / width);
54
55      printf("n,width,height = %d,%d,%d\n",dict->numberOfEntries,width,height);
56
57      for (i=0;i<height;++i)
58       for (j=0;j<width;++j) {
59        count = i*width+j;
60        if ((count < 16) && (count < dict->numberOfEntries)) {
61            x = j*maxWidth*1.5;
62         y = (height-i+1)*maxHeight*3;
63         printf("(%f,%f) ",x,y);
64            WriteShiftedAsciiOutline(fp,*(dict->outlines+count),x,y);
65        }
66       }
67      fclose(fp);
68     }
69
70
71     void main(int argc,char **argv)
72     {
73      char *infile,*outfile;
74      Dictionary dict;
75
76      if (argc != 3) {
77       printf("Usage:\n");
78       printf("  %s infile outfile\n",argv[0]);
79       exit(-1);
80      }
81
82      infile = argv[1];
83      outfile = argv[2];
84      dict = ReadDictionary(infile);
85
86      WriteOutlines(outfile,dict);
87
88      printf("\n");
89     }
90
91
```

Section D

Jul 8 14:25 1991 getOutline.c

```c
1    #include <stdio.h>
2    #include <math.h>
3    #include <values.h>
4    #include <strings.h>
5    #include "boolean.h"
6    #include "types.h"
7    #include "pict.h"
8    #include "dict.h"
9
10   extern char *strchr(char *s,int c);
11
12   #define MAX_STRING_LEN 256
13
14   void WriteAsciiOutline(char *filename, OutlinePair outline)
15   {
16     FILE *fp;
17     int i;
18     if ((fp = fopen(filename,"w")) == NULL) {
19       printf("Error opening %s.",filename);
20       exit(-1);
21     }
22     for (i=0;i<outline->numberOfLegs;++i)
23       fprintf(fp,"%d %f\n",i,*(outline->top+i));
24     fprintf(fp,"\"top\n\n");
25
26     for (i=0;i<outline->numberOfLegs;++i)
27       fprintf(fp,"%d %f\n",i,-(*(outline->bottom+i)));
28     fprintf(fp,"\"bottom\n\n");
29     fclose(fp);
30   }
31
32
33   void main(int argc,char **argv)
34   {
35     char *infile;
36     char s[MAX_STRING_LEN],outfile[MAX_STRING_LEN];
37     Dictionary dict;
38     int selection;
39     char *crPointer;
40     BOOLEAN done = FALSE;
41
42     if (argc != 2) {
43       printf("Usage:\n");
44       printf(" %s infile\n",argv[0]);
45       exit(-1);
46     }
47
48     infile = argv[1];
49     dict = ReadDictionary(infile);
50
51     while (!done) {
52       printf("Shape number [0..%d]: ",dict->numberOfEntries-1);
```

Section D  APPENDIX / Page 197

```
53      fgets(s,MAX_STRING_LEN,stdin);
54      if (sscanf(s,"%d",&selection) = = 1) {
55        if (selection<0 || selection > =dict->numberOfEntries)
56           printf("Shape numbers must be between 0 and %d, inclusive.\n",
57             dict->numberOfEntries-1);
58        else {
59           printf("Output file: ");
60           fgets(outfile,MAX_STRING_LEN,stdin);
61           crPointer = strchr(outfile,'\n');
62           if (crPointer != NULL)
63             *crPointer = '\0';
64           printf("Writing shape %d to file %s\n",selection,outfile);
65           WriteAsciiOutline(outfile,*(dict->outlines+selection));
66        }
67      }
68      else if ((s[0] = = '\0') || (s[0] = = '\n'))
69        done = TRUE;
70      else {
71        printf("Enter an integer to select a shape or a blank line\n");
72        printf("to quit.\n");
73      }
74     }
75   }
76
77
```

Section D

Jan 11 17:06 1991 guassian.c

```
1       #include <stdio.h>
2       #include <math.h>
3       #include <values.h>
4
5       float square(float x)
6       {
7         return x*x;
8       }
9
10      float gaussian(a, s, x)   /* return A*GAUSS(SIGMA, X) */
11      float a, s, x;
12      {
13        return (a*exp(-square(x/s)/2.0))/(s*sqrt(2.0*M_PI));
14      }
15
16      float *MakeMask(int halfMaskSize, float a)
17      {
18        int mask_size;
19        int x;
20        float s;
21        float *mask, sum;
22
23        mask_size = 2*halfMaskSize+1;
24        s = halfMaskSize/2;
25        mask = (float *) calloc(halfMaskSize+1, sizeof(float));
26        if (mask == NULL) {
27          printf("MakeMask: cannot allocate space\n");
28          exit(-1);
29        }
30
31        for (x = 0; x <= halfMaskSize; x++) {
32          mask[x] = gaussian(a, s, (float) x);
33  /*      printf("%e\n",mask[x]); */
34        }
35
36        for (sum = fabs(mask[0]), x = 1; x <= halfMaskSize; x++)
37          sum += 2.0*fabs(mask[x]);
38
39        for (x = 0; x <= halfMaskSize; x++)
40          mask[x] /= sum;
41
42        return mask;
43      }
44
45      void Guass1DFloat(float *data, int n, int halfMaskSize)
46      {
47        float a;
48        float *mask;
49        float *newData;
50        float *leftPtr,*rightPtr;
51        float sum;
52        int i,j,left,right;
```

Section D

```
53
54      a=1;
55
56      if (n < halfMaskSize*2+1)
57        return;
58
59      newData = (float *)calloc(n,sizeof(float));
60      if (newData == NULL) {
61        printf("Guass1DFloat: cannot allocate space\n");
62        exit(-1);
63      }
64
65      mask = MakeMask(halfMaskSize,a);
66
67      for (i=halfMaskSize;i<n-halfMaskSize;++i) {
68       sum = *(data+i) * mask[0];
69       leftPtr = rightPtr = data+i;
70       for (j=1;j<halfMaskSize;++j)
71        sum += mask[j] * (*(--leftPtr) + *(++rightPtr));
72       newData[i] = sum;
73      }
74
75      for (i=0;i<halfMaskSize;++i) {
76       sum = data[i]*mask[0];
77       left = i;
78       right = i;
79       for (j=1;j<halfMaskSize;++j) {
80         if (--left < 0)
81            left += n;
82         if (++right >= n)
83            right -= n;
84         sum += mask[j] * ( data[left] + data[right] );
85       }
86       newData[i] = sum;
87      }
88
89      for (i=n-halfMaskSize;i<n;++i) {
90       sum = data[i]*mask[0];
91       left = i;
92       right = i;
93       for (j=1;j<halfMaskSize;++j) {
94         if (--left < 0)
95            left += n;
96         if (++right >= n)
97            right -= n;
98         sum += mask[j] * ( data[left] + data[right] );
99       }
100      newData[i] = sum;
101     }
102
103     leftPtr = data;
104     rightPtr = newData;
105     for (i=0;i<n;++i)
106       *leftPtr++ = *rightPtr++;
107     free(newData);
```

Section D

108    }

Aug 23 19:21 1991 lines.c

```c
1       #include <stdio.h>
2       #include <values.h>
3       #include <math.h>
4       #include "boolean.h"
5       #include "pict.h"
6       #include "lines.h"
7
8       void LineEngine(Picture pict,
9                       int x1,
10                      int y1,
11                      int x2,
12                      int y2,
13                      UCHAR color,
14                      pistFunc PerPixel)
15      {
16        static int inside = 0;
17        int xinc,yinc;
18        int distance;
19        int left,right,top,bottom;
20
21        ++inside;
22        left = 0;
23        right = pict->width-1;
24        top = 0;
25        bottom = pict->height-1;
26        /* printf("Draw line: (%d,%d)-(%d,%d)\n",x1,y1,x2,y2); */
27        /* CASE VERTICAL */
28        yinc = y2 - y1;
29        xinc = x2 - x1;
30        if (xinc > 0) {
31         if (yinc > 0) {
32          /* Line goes up to the right */
33          if (yinc>xinc)
34              distance = -yinc;
35          else
36              distance = xinc;
37          while ((*PerPixel)(pict,x1,y1,
38                          ((x1 < x2) || (y1 < y2))&&(x1<=right)&&(y1<=bottom),
39                          color)) {
40            if (distance > 0) {
41            /* move right */
42            x1++;
43            distance -= yinc;
44            } else {
45            /* move up */
46            y1++;
47            distance += xinc;
48            }
49          }
50         } else {
51          if (-yinc>xinc)
52              distance = yinc;
```

Section D

```
53        else
54            distance = xinc;
55        while ((*PerPixel)(pict,x1,y1,
56                    ((x1 < x2) || (y1 > y2))&&(x1<=right)&&(y1>=top),
57                    color)) {
58            if (distance > 0) {
59            /* move right */
60            x1++;
61            distance += yinc;
62            } else {
63            /* move down */
64            y1--;
65            distance += xinc;
66            }
67        }
68        }
69    } else {
70        if (yinc > 0) {
71        /* Line goes up to the left */
72        if (yinc>-xinc)
73            distance = -yinc;
74        else
75            distance = -xinc;
76        while ((*PerPixel)(pict,x1,y1,
77                    ((x1 > x2) || (y1 < y2))&&(x1>=left)&&(y1<=bottom),
78                    color)) {
79            if (distance > 0) {
80            /* move left */
81            x1--;
82            distance -= yinc;
83            } else {
84            /* move up */
85            y1++;
86            distance -= xinc;
87            }
88        }
89        } else {
90        if (-yinc>-xinc)
91            distance = yinc;
92        else
93            distance = -xinc;
94        while ((*PerPixel)(pict,x1,y1,
95                    ((x1 > x2) || (y1 > y2))&&(x1>=left)&&(y1>=top),
96                    color)) {
97            if (distance > 0) {
98            /* move left */
99            x1--;
100           distance += yinc;
101           } else {
102           /* move down */
103           y1--;
104           distance -= xinc;
105           }
106       }
107       }
```

```
108        }
109        --inside;
110      }
111
112      BOOLEAN DrawPiston(Picture pict, int x, int y, BOOLEAN test, UCHAR color)
113      {
114       if (test)
115        WriteClippedPixel(pict,x,y,color);
116       return test;
117      }
118
119      static UCHAR bitmasks[] = { 0x80,0x40,0x20,0x10,0x8,0x4,0x2,0x1 };
120
121      void CountLine1Bit(Picture pict,
122                         int x1,
123                         int y1,
124                         int x2,
125                         int y2,
126                         int *totalSet,
127                         int *total)
128      {
129       static int inside = 0;
130       int xinc,yinc;
131       int distance;
132       int left,right,top,bottom;
133
134       int uchar_width;
135       UCHAR *cursor;
136       UCHAR mask;
137       int count = 0;
138       int pixels = 0;
139
140       ++inside;
141       left = 0;
142       right = pict->width-1;
143       top = 0;
144       bottom = pict->height-1;
145
146       if (pict->depth != 1)
147        DoError("CountLine1Bit: Only depth 1 is supported.\n",NULL);
148
149       uchar_width = pict->uchar_width;
150       cursor = pict->data+y1*uchar_width+(x1>>3);
151       mask = bitmasks[x1%8];
152
153       /* printf("Draw line: (%d,%d)-(%d,%d)\n",x1,y1,x2,y2); */
154       /* CASE VERTICAL */
155       yinc = y2 - y1;
156       xinc = x2 - x1;
157       if (xinc > 0) {
158        if (yinc > 0) {
159         /* Line goes up to the right */
160         if (yinc>xinc)
161            distance = -yinc;
162         else
```

Section D

```
163          distance = xinc;
164          while (((x1 < x2) || (y1 < y2))&&(x1<=right)&&(y1<=bottom)) {
165              if (*cursor & mask)
166                  ++count;
167              ++pixels;
168              if (distance > 0) {
169              /* move right */
170              if (mask == 0x1) {
171                  mask = 0x80;
172                  ++cursor;
173              }
174              else
175                  mask = mask >> 1;
176              x1++;
177              distance -= yinc;
178              } else {
179              /* move up */
180              cursor += uchar_width;
181              y1++;
182              distance += xinc;
183              }
184          }
185      } else {
186          if (-yinc>xinc)
187              distance = yinc;
188          else
189              distance = xinc;
190          while (((x1 < x2) || (y1 > y2))&&(x1<=right)&&(y1>=top)) {
191              if (*cursor & mask)
192                  ++count;
193              ++pixels;
194              if (distance > 0) {
195              /* move right */
196              if (mask == 0x1) {
197                  mask = 0x80;
198                  ++cursor;
199              }
200              else
201                  mask = mask >> 1;
202              x1++;
203              distance += yinc;
204              } else {
205              /* move down */
206              cursor -= uchar_width;
207              y1--;
208              distance += xinc;
209              }
210          }
211      }
212  } else {
213      if (yinc > 0) {
214      /* Line goes up to the left */
215      if (yinc>-xinc)
216          distance = -yinc;
217      else
```

```
218            distance = -xinc;
219          while (((x1 > x2) || (y1 < y2))&&(x1>=left)&&(y1<=bottom)) {
220            if (*cursor & mask)
221              ++count;
222            ++pixels;
223            if (distance > 0) {
224            /* move left */
225            if (mask == 0x80) {
226              mask = 0x1;
227              --cursor;
228            }
229            else
230              mask = mask << 1;
231            x1--;
232            distance -= yinc;
233          } else {
234            /* move up */
235            cursor += uchar_width;
236            y1++;
237            distance -= xinc;
238            }
239          }
240        } else {
241          if (-yinc>-xinc)
242              distance = yinc;
243          else
244              distance = -xinc;
245          while (((x1 > x2) || (y1 > y2))&&(x1>=left)&&(y1>=top)) {
246            if (*cursor & mask)
247              ++count;
248            ++pixels;
249            if (distance > 0) {
250            /* move left */
251            if (mask == 0x80) {
252              mask = 0x1;
253              --cursor;
254            }
255            else
256              mask = mask << 1;
257            x1--;
258            distance += yinc;
259          } else {
260            /* move down */
261            cursor -= uchar_width;
262            y1--;
263            distance -= xinc;
264            }
265          }
266        }
267      }
268      --inside;
269      *totalSet += count;
270      *total += pixels;
271    }
272
```

Section D

```
273    void DrawLine(Picture pict, int x1, int y1, int x2, int y2, UCHAR color)
274    {
275      LineEngine(pict,x1,y1,x2,y2,color,DrawPiston);
276    }
277
278    static int pixelCounter;
279    static int setCounter;
280    BOOLEAN CountPiston(Picture pict, int x, int y, BOOLEAN test, UCHAR color)
281    {
282      if (test) {
283        ++pixelCounter;
284        if (ReadPixel(pict,x,y))
285          ++setCounter;
286      }
287      return test;
288    }
289
290    #ifdef foo
291    float CountLine(Picture pict, int x1, int y1, int x2, int y2)
292    {
293      pixelCounter = 0;
294      setCounter = 0;
295      LineEngine(pict,x1,y1,x2,y2,0,CountPiston);
296      LineEngine(pict,x1,y1,x1-(x2-x1),y1-(y2-y1),0,CountPiston);
297      return (float)setCounter/pixelCounter;
298    }
299    #endif
300
301    float CountLine(Picture pict, int x1, int y1, int x2, int y2)
302    {
303      pixelCounter = 0;
304      setCounter = 0;
305      CountLine1Bit(pict,x1,y1,x2,y2,&setCounter,&pixelCounter);
306      CountLine1Bit(pict,x1,y1,x1-(x2-x1),y1-(y2-y1),&setCounter,&pixelCounter);
307      return (float)setCounter/pixelCounter;
308    }
309
310    static int startx;
311    static int starty;
312    static int endx;
313    static int endy;
314    BOOLEAN DistancePiston(Picture pict, int x, int y, BOOLEAN test, UCHAR color)
315    {
316      if (test) {
317        if (ReadPixel(pict,x,y)) {
318          if ((x==startx)&&(y==starty))
319            return test;
320          else {
321            endx = x;
322            endy = y;
323            return FALSE;
324          }
325        }
326      else
327        return test;
```

```
328       } else
329         return test;
330     }
331
332
333     int DistanceLine(Picture pict, int x1, int y1, int x2, int y2)
334     {
335       double dx,dy;
336       startx = x1;
337       starty = y1;
338       endx = x2;
339       endy = y2;
340       LineEngine(pict,x1,y1,x2,y2,0,DistancePiston);
341       dx = endx-x1;
342       dy = endy-y1;
343       return sqrt(dx*dx+dy*dy);
344     }
345
346
347     #ifdef TEST
348     void draw(pict)
349     Picture pict;
350     {
351       float angle;
352       float step;
353       float x1,y1,x2,y2;
354       float r1,r2;
355       int xc,yc;
356
357       xc = 320;
358       yc = 250;
359       r1 = 50;
360       r2 = 400;
361       step = M_PI*2/50;
362
363       for (angle = 0;angle < 2*M_PI; angle + = step) {
364         x1 = xc + r1*cos(angle);
365         y1 = yc + r1*sin(angle);
366         x2 = xc + r2*cos(angle);
367         y2 = yc + r2*sin(angle);
368         DrawLine(pict,(int)x1,(int)y1,(int)x2,(int)y2,0xff);
369         printf("%3.2f: %d %d\n",angle,
370             CountLine(pict,(int)x1,(int)y1,(int)x2,(int)y2),
371             DistanceLine(pict,(int)x1,(int)y1,(int)x2,(int)y2));
372       }
373     }
374
375     void main(argc,argv)
376     int argc;
377     char **argv;
378     {
379       char *outfile;
380       Picture pict;
381
382       if (argc != 2) {
```

Section D

APPENDIX / Page 208

```
383        printf("Usage: %s outfile\n",argv[0]);
384        exit(0);
385     }
386     outfile = argv[1];
387
388     pict = new_pict(640,500,1);
389
390     draw(pict);
391
392     write_pict(outfile,pict);
393     printf("done\n");
394  }
395  #endif
```

Aug 23 16:43 1991  maxFilter.c

```c
1     #include <stdio.h>
2     #include "mylib.h"
3
4     extern int irint(double);
5
6     #define MAX_SIGNAL_LENGTH (10000)
7     #define MIN_MODE (5) /* MIN_MODE must be less than MAX_HIST_SIZE */
8     #define MAX_HIST_SIZE (500)
9     #define MAX_PEAKS (100)
10    #define BASE_PERCENTILE (0.5)
11    float data[MAX_SIGNAL_LENGTH];
12    int newSignal[MAX_SIGNAL_LENGTH];
13
14    int MaxOnInterval(int start,int end)
15    {
16     int i;
17     float maxValue = data[start];
18     int maxIndex = start;
19     for (i=start;i<end; ++i)
20      if (data[i]>maxValue) {
21       maxValue = data[i];
22       maxIndex = i;
23      }
24     return maxIndex;
25    }
26
27    void main(int argc,char **argv)
28    {
29     char *infile,*outfile;
30     FILE *inFP,*outFP;
31     int signalLength;
32     float *cursor;
33     int foo;
34     int i;
35     int maskWidth = 10;
36     float maxValue;
37     int maxIndex,modeValue,modeIndex;
38     int h[MAX_HIST_SIZE];
39     int finalCount;
40     int finalIndex[MAX_PEAKS];
41     float baseThresh;
42     BOOLEAN upState;
43     float thisRatio,lastRatio;
44
45     DefArg("%s %s","infile outfile",&infile,&outfile);
46     ScanArgs(argc,argv);
47
48     if ((inFP=fopen(infile,"r"))==NULL)
49      DoError("Error opening file %s.\n",infile);
50
51     cursor = data;
52     while (fscanf(inFP,"%d %f\n",&foo,cursor++)==2)
```

Section D

```
53        if (cursor-data>MAX_SIGNAL_LENGTH)
54          DoError("Signal is too long.\n",NULL);
55        signalLength = cursor-data;
56
57        /* Compute the threhold for the black edge to black pixel ratio */
58        maxValue = data[0];
59        for (i=0;i<signalLength;++i) {
60         if (data[i]>maxValue)
61           maxValue = data[i];
62        }
63        baseThresh = maxValue*BASE_PERCENTILE;
64        printf("baseThresh = %3.3f\n",baseThresh);
65
66        /* Get the indices of the peaks taller than baseThresh */
67        finalCount = 0;
68        upState = TRUE;
69        for (i=0;i<signalLength;++i) {
70         thisRatio = data[i];
71         if (thisRatio < baseThresh)
72           thisRatio = 0;
73         if (upState) {
74          if (thisRatio < lastRatio) {
75              finalIndex[finalCount] = i;
76              finalCount++;
77              upState = FALSE;
78          }
79         }
80         else {
81          /* upState == FALSE */
82          if (thisRatio > lastRatio)
83              upState = TRUE;
84         }
85         lastRatio = thisRatio;
86         if (finalCount==MAX_PEAKS)
87           break;
88        }
89
90        /* Histogram the distances between adjacent peaks */
91        for (i=0;i<MAX_HIST_SIZE;h[i++]=0);
92        for (i=0;i<finalCount-1;++i) {
93         int d;
94         d = finalIndex[i+1]-finalIndex[i];
95         if (d<MAX_HIST_SIZE)
96           h[d]++;
97        }
98
99        /* Find the mode of the adjacent distances that is above MIN_MODE */
100       modeValue = h[MIN_MODE];
101       modeIndex = MIN_MODE;
102       for (i=MIN_MODE;i<MAX_HIST_SIZE;++i)
103        if (h[i]>modeValue) {
104          modeValue = h[i];
105          modeIndex = i;
106        }
107
```

Section D                    APPENDIX / Page 211

```
108    /* Set the mask width to half of the most common spacing of largest peaks */
109      maskWidth = irint(modeIndex*0.80);
110      printf("maskWidth = %d.\n",maskWidth);
111
112      for (i=0;i<signalLength;newSignal[i++]=0);
113      for (i=0;i<signalLength-maskWidth;++i)
114       newSignal[MaxOnInterval(i,i+maskWidth)]++;
115
116      if ((outFP=fopen(outfile,"w"))==NULL)
117       DoError("Error opening file %s.\n",NULL);
118      for (i=0;i<signalLength;++i)
119       fprintf(outFP,"%d %d\n",i,newSignal[i]);
120      fclose(outFP);
121    }
122
123
124
```

Section D

APPENDIX / Page 212

Jun 19 21:22 1991 myWc.c

```
1       #include <stdio.h>
2       #include "boolean.h"
3       #include "error.h"
4
5       typedef int State;
6       #define WHITE_SPACE 0
7       #define UNKNOWN_WORD 1
8       #define ASCENDER_WORD 2
9
10
11      #define MAX_STRING_LENGTH 200
12
13      BOOLEAN isWhite(char c)
14      {
15        return (c==' '||c=='\t'||c=='\0'||c=='\n');
16      }
17
18      BOOLEAN isAscender(char c)
19      {
20        return ((c=='b')||(c=='d')||(c=='f')||(c=='h')||(c=='i')||(c=='j')||(c=='k')||(c=='l')||
21          (c=='t')||((c>='A')&&(c<='Z'))||((c>='0')&&(c<='9'))||(c=='\'')||(c=='"'));
22      }
23
24      void main(int argc,char **argv)
25      {
26        char *filename;
27        FILE *fp;
28        char s[MAX_STRING_LENGTH+1];
29        char *ptr;
30        State state;
31        int wordsWithAscenders,wordsWithoutAscenders,words;
32
33        if (argc != 2) {
34          fprintf(stderr,"Usage:\n");
35          fprintf(stderr," %s <input file>\n");
36          exit(-1);
37        }
38
39        filename = argv[1];
40        if ((fp=fopen(filename,"r"))==NULL)
41          DoError("%s: cannot open input file.\n",filename);
42
43        wordsWithAscenders = 0;
44        wordsWithoutAscenders = 0;
45        words = 0;
46        fgets(s,MAX_STRING_LENGTH,fp);
47        while (!feof(fp)) {
48          ptr = s;
49          state = WHITE_SPACE;
50          while (*ptr != '\0') {
51            switch (state) {
52              case WHITE_SPACE:
```

Section D                    APPENDIX / Page 213

```
53              if (isWhite(*ptr))
54                ++ptr;
55              else
56                state = UNKNOWN_WORD;
57              break;
58            case UNKNOWN_WORD:
59              if (isWhite(*ptr)) {
60                ++wordsWithoutAscenders;
61                ++words;
62                state = WHITE_SPACE;
63              }
64              if (isAscender(*ptr)) {
65                ++wordsWithAscenders;
66                ++words;
67                ++ptr;
68                state = ASCENDER_WORD;
69              }
70              else
71                ++ptr;
72              break;
73            case ASCENDER_WORD:
74              if (isWhite(*ptr))
75                state = WHITE_SPACE;
76              ++ptr;
77              break;
78            default:
79              DoError("myWc: internal error - bad state.\n",NULL);
80         } /* switch */
81       } /* while (*ptr ... */
82       fgets(s,MAX_STRING_LENGTH,fp);
83     } /* while (!eof ... */
84     printf("words: %d\n",words);
85     printf("words with ascenders: %d\n",wordsWithAscenders);
86     printf("words without ascenders: %d\n",wordsWithoutAscenders);
87     printf("word ascender/descender ratio: %6.2f\n",
88         (float)wordsWithAscenders/(float)wordsWithoutAscenders);
89   }
```

Section D

APPENDIX / Page 214

Aug 23 18:12 1991 newBaselines.c

```
1       #include <stdio.h>
2       #include <values.h>
3       #include <math.h>
4       #include "boolean.h"
5       #include "pict.h"
6       #include "types.h"
7       #include "lists.h"
8       #include "lines.h"
9       #include "baselines.h"
10
11      extern double sqrt(double);
12      extern int irint(double);
13
14      /*inline*/ int NewReadPixel(UCHAR *base,int width,float x,float y)
15      {
16        int xi;
17        int yi;
18        UCHAR mask;
19
20        xi = irint(x);
21        yi = irint(y);
22        mask = 0x80 >> (xi & 0x7);
23        return *(base+yi*width+(xi>>3)) & mask;
24      }
25
26      void NewCountLine1Bit(Picture pict,int x1,int y1,int x2,int y2,int *black,int *blackEdge)
27      {
28        float x,y;
29        float xinc,yinc;
30        float xupinc,yupinc;
31        float den;
32        int b,be;
33        int width,ucharWidth,height;
34        UCHAR *data;
35
36        width = pict->width;
37        ucharWidth = pict->uchar_width;
38        height = pict->height;
39        data = pict->data;
40
41        den = sqrt((y2-y1)*(y2-y1)+(x2-x1)*(x2-x1));
42        xinc = (x2-x1)/den;
43        yinc = (y2-y1)/den;
44        xupinc = -yinc;
45        yupinc = xinc;
46        x = x1;
47        y = y1;
48
49        b=0;
50        be=0;
51
52        while (x<width&&x>=0&&y<height&&y>=0) {
```

Section D

```
53       ++b;
54       if (NewReadPixel(data,ucharWidth,x,y)) {
55         if (!(NewReadPixel(data,ucharWidth,x+xupinc,y+yupinc) &&
56               NewReadPixel(data,ucharWidth,x-xupinc,y-yupinc)))
57           ++be;
58       }
59       x += xinc;
60       y += yinc;
61
62     }
63     *black = b;
64     *blackEdge = be;
65   }
66
67
68   #define MIN_BLACK 5
69   void NewCountLine(Picture pict,int x1,int y1,int x2,int y2,int *black,int *blackEdge)
70   {
71     *black = 0;
72     *blackEdge = 0;
73     NewCountLine1Bit(pict,x1,y1,x2,y2,black,blackEdge);
74     NewCountLine1Bit(pict,x1,y1,x1-(x2-x1),y1-(y2-y1),black,blackEdge);
75   }
76
77   static float x2offset;
78   static float y2offset;
79   static int projectIndex;
80   static int *blackPixels;
81   static int *blackEdgePixels;
82   static int *coordx;
83   static int *coordy;
84   BOOLEAN BaseLinePiston(Picture pict, int x, int y, BOOLEAN test, UCHAR color)
85   {
86    if (test) {
87      NewCountLine(pict,x,y,(int)(x+x2offset),(int)(y+y2offset),
88                   blackPixels+projectIndex,blackEdgePixels+projectIndex);
89      coordx[projectIndex] = x;
90      coordy[projectIndex++] = y;
91      return test;
92    } else
93      return test;
94   }
95
96   static int lastX;
97   static int lastY;
98   BOOLEAN EndPointPiston(Picture pict, int x, int y, BOOLEAN test, UCHAR color)
99   {
100   if (test) {
101     lastX = x;
102     lastY = y;
103   }
104   return test;
105  }
106
107  void EndPoints(Picture pict,double angle,int *tx, int *ty,int *bx, int *by)
```

Section D

```
108     {
109       int xc,yc;
110       int maxLength;
111       float normal;
112       float x2,y2,x3,y3;
113
114       /* Make normal to text point in quadrants I and II */
115       /* Assume 0 <= angle < 2*M_PI */
116       normal = fmod(angle + M_PI/2,2*M_PI);
117       if (normal > M_PI)
118        normal -= M_PI;
119
120       xc = pict->width/2;
121       yc = pict->height/2;
122
123       maxLength = pict->width+pict->height;
124       x2 = xc+maxLength*cos(normal);        /* At bottom of picture */
125       y2 = yc+maxLength*sin(normal);
126       x3 = xc-maxLength*cos(normal);        /* At top of picture */
127       y3 = yc-maxLength*sin(normal);
128
129       LineEngine(pict,xc,yc,(int)x2,(int)y2,0,EndPointPiston);
130       *bx = lastX;
131       *by = lastY;
132       LineEngine(pict,xc,yc,(int)x3,(int)y3,0,EndPointPiston);
133       *tx = lastX;
134       *ty = lastY;
135     }
136
137     double distance(int x1,int y1,int x2,int y2)
138     {
139       return sqrt((double)((x1-x2)*(x1-x2)+(y1-y2)*(y1-y2)));
140     }
141
142     FILE *PlotBaselineContour(char *plotFile,int topCount,
143                              float *ratios,int *newSignal,
144                              float baseThresh)
145     {
146       FILE *outfile;
147       int i;
148
149       printf("Opening baselines plot file\n");
150       if ((outfile = fopen(plotFile,"w"))==NULL) {
151        printf("Error opening baseline plot file.\n");
152        exit(-1);
153       }
154       for (i=0;i<topCount;++i)
155        fprintf(outfile,"%d %f\n",i,ratios[i]/baseThresh*5);
156       fprintf(outfile,"\"Ratio\n\n");
157       for (i=0;i<topCount;++i)
158        fprintf(outfile,"%d %d\n",i,newSignal[i]);
159       fprintf(outfile,"\"Projection\n\n");
160       fprintf(outfile,
161              "0 %f\n%d %f%\n\"Baseline Threshold\n",
162              baseThresh,topCount,baseThresh);
```

Section D

```
163      return outfile;
164    }
165
166    int MaxOnInterval(float *data,int start,int end)
167    {
168     int i;
169     float maxValue = data[start];
170     int maxIndex = start;
171     for (i=start;i<end;++i)
172      if (data[i]>maxValue) {
173        maxValue = data[i];
174        maxIndex = i;
175      }
176     return maxIndex;
177    }
178
179    #define BASE_PERCENTILE 0.50
180    #define MIN_LINE_HEIGHT_FRACTION 0.50
181    #define MIN_MODE (5) /* MIN_MODE must be less than MAX_HIST_SIZE */
182    #define MAX_HIST_SIZE (500)
183    #define MAX_BASELINES (300)
184    List BaseLines(Picture pict,double angle,char *plotFile)
185    {
186     float *topProjection;
187     int *topCoordx,*topCoordy;
188     int *finalCoordx,*finalCoordy,*finalIndex;
189     int topIndex,bottomIndex;
190     int topCount,botCount,finalCount;
191     int maxLength;
192     int xc,yc;
193     float x2,y2,x3,y3;
194     float maxValue,lastValue;
195     int i,j;
196     float baseThresh;
197     int topX,topY,bottomX,bottomY;
198     BOOLEAN onTextLine;
199     List xList,yList,result;
200     double totalDistance,averageDistance;
201     FILE *outfile;
202     int inside;
203     BOOLEAN upState;
204     float ratio,lastRatio,thisRatio;
205     float *ratios;
206     int *newSignal;
207     int halfMaskWidth = 10; /* for computing ratios */
208     int maxIndex,modeValue,modeIndex;
209     int h[MAX_HIST_SIZE];
210     int maskWidth; /* for max filter */
211
212     printf("angle = %3.3f\n",angle);
213
214    /* The longest ling though the picture will be shorter than maxLength */
215     maxLength = pict->width+pict->height;
216
217    /* Allocate space for the page projection values */
```

Section D

APPENDIX / Page 218

```
218    blackPixels = (int *)calloc(maxLength,sizeof(int));
219    blackEdgePixels = (int *)calloc(maxLength,sizeof(int));
220    ratios = (float *)calloc(maxLength,sizeof(float));
221    newSignal = (int *)calloc(maxLength,sizeof(int));
222    topCoordx = (int *)calloc(maxLength,sizeof(int));
223    topCoordy = (int *)calloc(maxLength,sizeof(int));
224    finalCoordx = (int *)calloc(maxLength,sizeof(int));
225    finalCoordy = (int *)calloc(maxLength,sizeof(int));
226    finalIndex = (int *)calloc(maxLength,sizeof(int));
227
228    if ((blackPixels = = NULL)||
229       (blackEdgePixels = = NULL)||
230       (ratios = = NULL)||
231       (newSignal = = NULL)||
232       (topCoordx = = NULL)||
233       (topCoordy = = NULL)||
234       (finalIndex = = NULL) ||
235       (finalCoordx = = NULL) ||
236       (finalCoordy = = NULL)) {
237      printf("BaseLines: cannot allocate memory\n");
238      exit(-1);
239    }
240
241    /* Compute the endpoints of a line through the center of the picture in the direction
242     * perpendicular to the text lines. This line will be used as the reference frame for
243     * computing projections. */
244    EndPoints(pict,angle,&topX,&topY,&bottomX,&bottomY);
245
246    printf("Main Line: (%d,%d)-(%d,%d)\n",topX,topY,bottomX,bottomY);
247    /* DrawLine(pict,topX,topY,bottomX,bottomY,0xff); */
248
249    /* Compute the projection of the image at each point along the line.
250     * topProjection will have the number of black pixels on a line and
251     * ratios will have the fraction of black pixels on a line that are
252     * the ends of vertical extents. */
253    x2offset = maxLength*cos(angle);
254    y2offset = maxLength*sin(angle);
255    projectIndex = 0;
256    coordx = topCoordx;
257    coordy = topCoordy;
258    LineEngine(pict,topX,topY,bottomX,bottomY,0,BaseLinePiston);
259    topCount = projectIndex;
260
261    /* Compute the ratios plot */
262    for (i=0;i<halfMaskWidth;++i)
263      ratios[i] = 0;
264    for (i=topCount-halfMaskWidth;i<topCount;++i)
265      ratios[i] = 0;
266    for (i=0,inside=0;i<halfMaskWidth*2+1;++i)
267      inside += blackPixels[i];
268    for (i=halfMaskWidth;i<topCount-halfMaskWidth;++i) {
269      ratios[i] = (float)blackEdgePixels[i]/inside;
270      inside -= blackPixels[i-halfMaskWidth];
271      inside += blackPixels[i+halfMaskWidth];
272    }
```

Section D

```
273
274     /* Compute the threhold for the black edge to black pixel ratio */
275     maxValue = ratios[0];
276     for (i=0;i<topCount;++i) {
277       if (ratios[i]>maxValue)
278         maxValue = ratios[i];
279     }
280
281     baseThresh = maxValue*BASE_PERCENTILE;
282     printf("baseThresh = %3.3f\n",baseThresh);
283
284     /* Get the coordinates of the baselines and toplines by finding peaks in the
285      * ratios projection. */
286     finalCount = 0;
287     upState = TRUE;
288     for (i=0;i<topCount;++i) {
289       thisRatio = ratios[i];
290       if (thisRatio < baseThresh)
291         thisRatio = 0;
292       if (upState) {
293         if (thisRatio < lastRatio) {
294             finalIndex[finalCount] = i;
295             finalCount++;
296             upState = FALSE;
297         }
298       }
299       else {
300         /* upState == FALSE */
301         if (thisRatio > lastRatio)
302             upState = TRUE;
303       }
304       lastRatio = thisRatio;
305       if (finalCount == MAX_BASELINES) {
306         fprintf(stderr,"Warning: found too many baselines.\n");
307         fprintf(stderr,"Ignoring remaining baselines.\n");
308         break;
309       }
310     }
311
312     /* Histogram the distances between adjacent peaks */
313     for (i=0;i<MAX_HIST_SIZE;h[i++]=0);
314     for (i=0;i<finalCount-1;++i) {
315       int d;
316       d = finalIndex[i+1]-finalIndex[i];
317       if (d<MAX_HIST_SIZE)
318         h[d]++;
319     }
320
321     /* Find the mode of the adjacent distances that is above MIN_MODE */
322     modeValue = h[MIN_MODE];
323     modeIndex = MIN_MODE;
324     for (i=MIN_MODE;i<MAX_HIST_SIZE;++i)
325       if (h[i]>modeValue) {
326         modeValue = h[i];
327         modeIndex = i;
```

Section D

```
328       }
329
330       /* Set the mask width to half of the most common spacing of largest peaks */
331       maskWidth = irint(modeIndex*0.80);
332       printf("maskWidth = %d.\n",maskWidth);
333
334       for (i=0;i<topCount;newSignal[i++]=0);
335       for (i=0;i<topCount-maskWidth;++i)
336        newSignal[MaxOnInterval(ratios,i,i+maskWidth)]++;
337
338       /* Plot the baseline contour if requested */
339       if (plotFile!=NULL)
340        outfile = PlotBaselineContour(plotFile,topCount,ratios,newSignal,baseThresh);
341
342       /* Pick off the new peaks */
343       /* Compute the threhold for the black edge to black pixel ratio */
344       maxValue = newSignal[0];
345       for (i=0;i<topCount;++i) {
346        if (newSignal[i]>maxValue)
347         maxValue = newSignal[i];
348       }
349
350       baseThresh = maxValue*0.80;
351       printf("baseThresh = %3.3f\n",baseThresh);
352
353       /* Get the coordinates of the baselines and toplines by finding peaks in the
354        * ratios projection. */
355       finalCount = 0;
356       upState = TRUE;
357       for (i=0;i<topCount;++i) {
358        thisRatio = newSignal[i];
359        if (thisRatio < baseThresh)
360         thisRatio = 0;
361        if (upState) {
362         if (thisRatio < lastRatio) {
363             finalCoordx[finalCount] = topCoordx[i];
364             finalCoordy[finalCount] = topCoordy[i];
365             finalIndex[finalCount] = i;
366             finalCount++;
367             upState = FALSE;
368         }
369        }
370        else {
371         /* upState == FALSE */
372         if (thisRatio > lastRatio)
373             upState = TRUE;
374        }
375        lastRatio = thisRatio;
376        if (finalCount == MAX_BASELINES) {
377         fprintf(stderr,"Warning: found too many baselines.\n");
378         fprintf(stderr,"Ignoring remaining baselines.\n");
379         break;
380        }
381       }
382
```

```
383
384      /* -------------------------------------------------------------------------- */
385
386      if (finalCount&1)
387        --finalCount;              /* Only take an even number of lines */
388      for (totalDistance=0,i=0,j=0;i<finalCount;i+=2) {
389        topX = finalCoordx[i];
390        topY = finalCoordy[i];
391        bottomX = finalCoordx[i+1];
392        bottomY = finalCoordy[i+1];
393        totalDistance += distance(topX,topY,bottomX,bottomY);
394        j+=2;
395      }
396      averageDistance = totalDistance / (finalCount/2)*MIN_LINE_HEIGHT_FRACTION;
397      for (i=0,j=0;i<finalCount;i+=2) {
398        topX = finalCoordx[i];
399        topY = finalCoordy[i];
400        topIndex = finalIndex[i];
401        bottomX = finalCoordx[i+1];
402        bottomY = finalCoordy[i+1];
403        bottomIndex = finalIndex[i+1];
404        finalCoordx[j] = topX;
405        finalCoordy[j] = topY;
406        finalIndex[j] = topIndex;
407        finalCoordx[j+1] = bottomX;
408        finalCoordy[j+1] = bottomY;
409        finalIndex[j+1] = bottomIndex;
410        if (distance(topX,topY,bottomX,bottomY)>averageDistance)
411          j+=2;
412      }
413    #ifdef foo
414      *count = j;
415      *returnCoordx = finalCoordx;
416      *returnCoordy = finalCoordy;
417    #endif
418      result = nil;
419      for (i=j-1;i>=0;--i) {
420        push(MakePoint(finalCoordx[i],finalCoordy[i]),result);
421      }
422
423      if (plotFile != NULL) {
424        fprintf(outfile,"\n0 %f\n",-baseThresh);
425        for (i=0;i<j;i+=2) {
426          fprintf(outfile,"%d %f\n%d %f\n%d %f\n%d %f\n",
427                  finalIndex[i],-baseThresh,
428                  finalIndex[i],-2*baseThresh,
429                  finalIndex[i+1],-2*baseThresh,
430                  finalIndex[i+1],-baseThresh);
431        }
432        fprintf(outfile,"\"Baselines");
433        fclose(outfile);
434        printf("Done writing baseline plot file.\n");
435      }
436
437      return result;
```

Section D                                                    APPENDIX / Page 222

```
438     }
439
440     void DrawBaseLines(Picture pict, List pointList, double angle)
441     #ifdef foo
442     int count,int *coordx,int *coordy,double angle)
443     #endif
444     {
445      int maxLength;
446      float x2,y2,x3,y3;
447      int x,y;
448      Point temp;
449      maxLength = pict->width+pict->height;
450      while (!endp(pointList)) {
451       temp = pop(pointList);
452       x = temp->x;
453       y = temp->y;
454       x2 = x+maxLength*cos(angle);
455       y2 = y+maxLength*sin(angle);
456       x3 = x-maxLength*cos(angle);
457       y3 = y-maxLength*sin(angle);
458       DrawLine(pict,x,y,(int)x2,(int)y2,0xff);
459       DrawLine(pict,x,y,(int)x3,(int)y3,0xff);
460      }
461     }
```

Aug 25 19:48 1991 newBlobify.c

```
1       #include <stdio.h>
2       #include <math.h>
3       #include "mylib.h"
4       #include "blobify.h"
5
6
7       #define MAX_KERNAL_SIZE (40)
8
9       extern int irint(double);
10
11      static UCHAR bitmasks[] = {0x80,0x40,0x20,0x10,0x8,0x4,0x2,0x1};
12
13      UCHAR *address(Picture pict,float x,float y)
14      {
15        return pict->data+irint(y)*pict->uchar_width+(irint(x)>>3);
16      }
17
18      UCHAR mask(float x)
19      {
20        static masks[] = { 0x80,0x40,0x20,0x10,8,4,2,1};
21        return masks[irint(x)%8];
22      }
23
24      int X(float x)
25      {
26        return irint(x);
27      }
28
29      int Y(float y)
30      {
31        return irint(y);
32      }
33
34      Picture NewBlobify(Picture old,int halfMaskWidth,double threshold,double angle)
35      {
36        Picture new;
37
38        int index;
39        float x,y,xinc,yinc;
40        UCHAR *kernalPtr[MAX_KERNAL_SIZE],*kp[MAX_KERNAL_SIZE];
41        UCHAR kernalMask[MAX_KERNAL_SIZE],km[MAX_KERNAL_SIZE];
42        int kernalX[MAX_KERNAL_SIZE],kernalY[MAX_KERNAL_SIZE];
43        int kx[MAX_KERNAL_SIZE],ky[MAX_KERNAL_SIZE];
44        UCHAR kb[MAX_KERNAL_SIZE];
45        UCHAR *dest;
46        UCHAR dm;
47        int tval,i,j,k,inside;
48        int width,height,ucharWidth,maskWidth;
49
50        if (halfMaskWidth*2+1 > MAX_KERNAL_SIZE)
51          DoError("Blobify: mask is too large.\n",NULL);
52
```

Section D

```
53      tval = irint(threshold*(halfMaskWidth*2+1));
54
55      width = old->width;
56      height = old->height;
57      ucharWidth = old->uchar_width;
58
59      new = new_pict(width,height,1);
60
61      xinc = cos(angle);
62      yinc = sin(angle);
63      index = 0;
64      kernalPtr[index] = address(old,halfMaskWidth,halfMaskWidth);
65   /*
66      kernalX[index] = X(halfMaskWidth);
67      kernalY[index] = Y(halfMaskWidth);
68   */
69      kernalMask[index++] = mask(halfMaskWidth);
70      for (i=0,x=0,y=0;i<halfMaskWidth;++i) {
71       x+=xinc;
72       y+=yinc;
73       kernalPtr[index] = address(old,halfMaskWidth+x,halfMaskWidth+y);
74   /*
75       kernalX[index] = X(halfMaskWidth+x);
76       kernalY[index] = Y(halfMaskWidth+y);
77   */
78       kernalMask[index++] = mask(halfMaskWidth+x);
79       kernalPtr[index] = address(old,halfMaskWidth-x,halfMaskWidth-y);
80   /*
81       kernalX[index] = X(halfMaskWidth-x);
82       kernalY[index] = Y(halfMaskWidth-y);
83   */
84       kernalMask[index++] = mask(halfMaskWidth-x);
85      }
86
87      maskWidth = 2*halfMaskWidth+1;
88
89      for (j=0;j<height-maskWidth;++j) {
90       for (i=0;i<index;++i) {
91        kp[i] = kernalPtr[i]+j*ucharWidth;
92        km[i] = kernalMask[i];
93        kb[i] = *kp[i]++;
94   /*
95        kx[i] = kernalX[i];
96        ky[i] = kernalY[i]+j;
97   */
98       }
99       dest = new->data+(j+halfMaskWidth)*ucharWidth+(halfMaskWidth>>3);
100      dm = mask(halfMaskWidth);
101
102      for (k=0;k<width-maskWidth;++k) {
103       if (dm == 0) {
104        dm = 0x80;
105        dest++;
106       }
107       for (i=0,inside=0;i<index;++i) {
```

Section D                    APPENDIX / Page 225

```
108            if (km[i] = = 0) {
109              km[i] = 0x80;
110              kb[i] = *kp[i]+ +;
111              }
112   /*
113            printf("(%d,%d): %d - %x %x -> %x\n",kx[i],ky[i],kb[i]&km[i],kp[i]-1,km[i],kb[i]);
114            kx[i]+ +;
115   */
116            if (kb[i]&km[i])
117              + +inside;
118            km[i] > > = 1;
119          }
120   /*
121        printf("%d\n\n",inside);
122   */
123          if (inside > tval)
124            *dest |= dm;
125          dm > > = 1;
126        }
127
128      }
129
130      return new;
131
132    }
133
134    #ifdef TRYMAIN
135    void main(argc,argv)
136    int argc;
137    char **argv;
138    {
139     char *infile,*outfile;
140     Picture old,new;
141     int halfMaskSize;
142     float threshold;
143     float angle;
144
145     DefArg("%s %s %d %f %f","infile outfile halfMaskSize threshold angle",
146             &infile,&outfile,&halfMaskSize,&threshold,&angle);
147     ScanArgs(argc,argv);
148
149     printf("Loading %s...",infile);
150     old = load_pict(infile);
151     new = NewBlobify(old,halfMaskSize,threshold,angle);
152     write_pict(outfile,new);
153    }
154    #endif
```

Section D

Aug 15 06:41 1991 newContour.c

```
1       #include <stdio.h>
2       #include <values.h>
3       #include <math.h>
4       #include "boolean.h"
5       #include "types.h"
6       #include "pict.h"
7       #include "lines.h"
8       #include "lists.h"
9       #include "dict.h"
10      #include "diff.h"
11      #include "fontNorm.h"
12
13      extern Picture thePict; /* Picture used for annotated shapes */
14
15      /* The following are misc. definitionas and routines havine to do with
16       * vectors and coordinates. */
17
18      typedef struct {
19      double x;
20      double y;
21      } DPointBody,*DPoint;
22
23
24      static double Dot(DPoint a,DPoint b)
25      {
26      /* printf("Dot: (%lf,%lf)*(%lf,%lf) = %lf\n",a->x,a->y,b->x,b->y,a->x*b->x +
        a->y*b->y); */
27        return a->x*b->x + a->y*b->y;
28      }
29
30      static DPoint PolarToCartesian(double angle,double radius)
31      {
32       DPoint result = (DPoint)calloc(1,sizeof(DPointBody));
33       if (result == NULL)
34        DoError("Dot: cannot allocate space\n");
35       result->x = cos(angle);
36       result->y = sin(angle);
37       return result;
38      }
39
40      static DPoint Normal(DPoint a)
41      {
42       DPoint result = (DPoint)calloc(1,sizeof(DPointBody));
43       if (result == NULL)
44        DoError("Dot: cannot allocate space\n");
45       result->x = -a->y;
46       result->y = a->x;
47       return result;
48      }
49
50
51
```

```
52      /* This piston scans pict up and down from the top and bottom of the
53       * bounding box, looking for the highest and lowest pixels in the
54       * word. If thePict is not NULL, these pixels will be colored as 4
55       * in thePict. */
56      static int startX;
57      static int startY;
58      static double stopDistance;
59      static int lastY;
60      static BOOLEAN valid;
61      BOOLEAN TracePiston(Picture pict, int x, int y, BOOLEAN test, UCHAR color)
62      {
63       double distance;
64       if (test) {
65        distance = sqrt((double)(startX-x)*(startX-x) + (startY-y)*(startY-y));
66        if (distance<stopDistance) {
67      /*    lastY = stopDistance - distance; */
68          lastY = distance;
69
70          if (ReadPixel(pict,x,y)) {
71
72             if (thePict)
73               WritePixel(thePict,x,y,4);
74
75             valid = TRUE;
76             return FALSE;
77          } else {
78             valid = FALSE;
79             return test;
80          }
81        }
82        else {
83         if (thePict)
84           WritePixel(thePict,x,y,4);
85      #ifdef foo
86         lastY = distance; /**** Used to be 0 ****/
87      #endif
88         lastY = HIT_THE_BOX;
89         valid = FALSE;
90         return FALSE;
91        }
92       }
93       return test;
94      }
95
96
97      /* This piston moves from left to right across a bounding box, calling
98       * trace piston and saving its output in topY, baseY, and bothX. */
99      #define MAX_SHELL_LENGTH 400
100     static int numberOfLegs;
101     static int topY[MAX_SHELL_LENGTH];
102     static int baseY[MAX_SHELL_LENGTH];
103     static int bothX[MAX_SHELL_LENGTH];
104
105     static double leftDistance;
106     static DPoint lineVector;
```

Section D

```
107    static int downX;
108    static int downY;
109    static double boxTopDistance;
110    static double boxBaseDistance;
111    BOOLEAN ShellPiston(Picture pict, int x, int y, BOOLEAN test, UCHAR color)
112    {
113     int xDistance;
114     DPointBody thisPoint;
115     if (test) {
116      if (numberOfLegs >= MAX_SHELL_LENGTH)
117        return FALSE;
118      thisPoint.x = x;
119      thisPoint.y = y;
120      xDistance = Dot(&thisPoint,lineVector) - leftDistance;
121      stopDistance = boxTopDistance;
122      startX = x;
123      startY = y;
124      LineEngine(pict,x,y,x+downX,y+downY,0,TracePiston);
125      bothX[numberOfLegs] = xDistance;
126      if (valid)
127        topY[numberOfLegs] = lastY;
128      else
129        topY[numberOfLegs] = HIT_THE_BOX;
130
131      stopDistance = boxBaseDistance;
132      startX = x+downX;
133      startY = y+downY;
134      LineEngine(pict,x+downX,y+downY,x,y,0,TracePiston);
135      if (valid)
136        baseY[numberOfLegs] = lastY;
137      else
138        baseY[numberOfLegs] = HIT_THE_BOX;
139      numberOfLegs++;
140
141     }
142     return test;
143    }
144
145    /* This function, finds the upper and lower contours corresponding
146     * to a word within a bounding box. */
147    void MakeShell(Picture pict,Box box,
148             Dictionary dict, int dictEntry)
149    {
150     DPoint normalVector;
151     DPointBody temp;
152     double boxTop,boxBase;
153     int rightX,rightY;
154
155     lineVector = PolarToCartesian(box->angle,1);
156     normalVector = Normal(lineVector);
157     temp.x = box->x;
158     temp.y = box->y;
159     boxTop = Dot(&temp,normalVector);
160     box->pageY = irint(boxTop);
161     boxBase = boxTop + box->height;
```

```
162
163
164    /* CHANGE CHANGE CHANGE CHANGE CHANGE CHANGE CHANGE CHANGE CHANGE */
165      boxTopDistance = boxBase - boxTop;
166      boxBaseDistance = boxBase - boxTop;
167    /* CHANGE CHANGE CHANGE CHANGE CHANGE CHANGE CHANGE CHANGE CHANGE */
168
169      downX = box->height*cos(box->angle+M_PI/2);
170      downY = box->height*sin(box->angle+M_PI/2);
171
172      rightX = box->width*cos(box->angle);
173      rightY = box->width*sin(box->angle);
174
175      numberOfLegs = 0;
176      leftDistance = Dot(&temp,lineVector);
177      box->pageX = irint(leftDistance);
178    #ifdef foo
179      malloc_verify();
180    #endif
181      LineEngine(pict,box->x,box->y,
182             box->x+rightX,box->y+rightY,0,
183             ShellPiston);
184
185    /* CHANGE CHANGE CHANGE CHANGE CHANGE CHANGE CHANGE CHANGE CHANGE */
186      {
187       int i;
188       for (i=0;i<numberOfLegs;++i) {
189         if (*(topY+i)!=HIT_THE_BOX)
190            *(topY+i) += boxTop;
191         if (*(baseY+i)!=HIT_THE_BOX)
192            *(baseY+i) = boxBase - *(baseY+i);
193       }
194      }
195    /* CHANGE CHANGE CHANGE CHANGE CHANGE CHANGE CHANGE CHANGE CHANGE */
196
197    #ifdef foo
198      malloc_verify();
199    #endif
200      StoreRawOutlinePair(dict,dictEntry,box,bothX,topY,
201                baseY,numberOfLegs);
202    }
203
204    BOOLEAN OnABaseLine(Box box,List baseLinePoints)
205    {
206     DPoint lineVector,normalVector;
207     DPointBody temp;
208     double boxTop,boxBase,top,base;
209     Point topPoint, basePoint;
210
211     lineVector = PolarToCartesian(box->angle,1);
212     normalVector = Normal(lineVector);
213     temp.x = box->x;
214     temp.y = box->y;
215     boxTop = Dot(normalVector,&temp);
216     boxBase = boxTop+box->height;
```

Section D

APPENDIX / Page 230

```
217
218      while (!endp(baseLinePoints)) {
219       topPoint = pop(baseLinePoints);
220       basePoint = pop(baseLinePoints);
221       temp.x = topPoint->x;
222       temp.y = topPoint->y;
223       top = Dot(normalVector,&temp);
224       temp.x = basePoint->x;
225       temp.y = basePoint->y;
226       base = Dot(normalVector,&temp);
227
228       if ((boxTop> =top && boxTop <= base) ||  /* box top is between */
229          (boxBase> =top && boxBase <= base) ||  /* box bottom is between */
230          (top >= boxTop && top <= boxBase))   /* both lines inside box */
231        return TRUE;
232      }
233      return FALSE;
234     }
235
236     BOOLEAN BoxToShell(Picture pict,Box box,List baseLinePoints,
237                 Dictionary dict,int dictEntry)
238     {
239      Point topPoint,bottomPoint;
240
241      if (OnABaseLine(box,baseLinePoints)) {
242       MakeShell(pict,box,dict,dictEntry);
243       return TRUE;
244      }
245      else
246       return FALSE;
247     }
248
249     #define MAX_SHAPES 1000
250     void BarBoxList(Picture pict,List boxList,List baseLinePoints,
251                 char *filename,char *infoString, NormalizationDescriptor *nd)
252     {
253      Dictionary dict;
254      int count = 0;
255      long int location;
256
257      dict = NewDict(MAX_SHAPES);
258      dict->infoString = infoString;
259
260      while (!endp(boxList)) {
261     #ifdef foo
262       if (BoxToShell(pict,
263                 (Box)pop(boxList),
264                 baseLinePoints,
265                 dict,
266                 count))
267         ++count;
268     #endif
269     /* Change 8/8/91
270      * All boxes are stored in the dictionary.
271      * The post processing stage in newFontNorm.c will weed out boxes */
```

Section D                                APPENDIX / Page 231

```
272        MakeShell(pict,(Box)pop(boxList),dict,count);
273        ++count;
274     /* End of change 8/8/91 */
275       if (count> =MAX_SHAPES) {
276         printf("Maximum dictionary size exceeded.\n");
277         printf("Ignoring rest of shapes.\n");
278         break;
279       }
280     }
281     dict->numberOfEntries = count;
282     PageStatistics(dict,"statistics",nd);
283     /* PostProcess(dict); */
284     WriteDictionary(dict,filename);
285    }
286
```

Section D

Jan 11 17:07 1991 newDiff2.c

```c
1       #include <stdio.h>
2       #include "boolean.h"
3       #include "types.h"
4       #include "error.h"
5       #include "pict.h"
6       #include "dict.h"
7       #include "diff.h"
8
9       /* Given the names of two dictionary files, compute the squared difference
10       * between every pair of shapes in the cross product of the dictionaries.
11       * The result is a matrix printed to stdout. The width and height are
12       * followed by the matrix entries in row major order. The output is in
13       * ascii to facilitate reading by a Symbolics. */
14      Picture CompareDictionaries(char *file1,char *file2)
15      {
16        Dictionary dict1,dict2;
17        Picture pict;
18        int x,y;
19        dict1 = ReadDictionary(file1); /* height */
20        dict2 = ReadDictionary(file2); /* width */
21        pict = new_pict(dict2->numberOfEntries,
22                    dict1->numberOfEntries,
23                    32);
24        for (y=0;y<pict->height;++y)
25         for (x=0;x<pict->width;++x) {
26          printf("(%d,%d) ",y,x);
27          *((float *)(pict->data)+pict->width*y+x) =
28              DiffPair(*(dict1->outlines+y),
29                  *(dict2->outlines+x));
30         }
31        return pict;
32      }
33
34      void WritePictureAsAscii(Picture pict,char *filename)
35      {
36        FILE *fp;
37        int x,y;
38        int count=1;
39        if ((fp = fopen(filename,"w"))==NULL)
40          DoError("WritePictureAsAscii: error opening output file\n",NULL);
41        fprintf(fp,"%d\n%d\n",pict->width,pict->height);
42        for (y=0;y<pict->height;++y)
43         for (x=0;x<pict->width;++x) {
44          fprintf(fp,"%f ",*(((float *)pict->data)++));
45          if (!((count++)%5))
46              fprintf(fp,"\n");
47         }
48        fprintf(fp,"\n");
49        fclose(fp);
50      }
```

Aug 26 17:20 1991 newMain.c

```c
1       #include <stdio.h>
2       #include <values.h>
3       #include <math.h>
4       #include "misc.h"
5       #include "boolean.h"
6       #include "error.h"
7       #include "types.h"
8       #include "pict.h"
9       #include "lists.h"
10      #include "lines.h"
11      #include "orient.h"
12      #include "baselines.h"
13      #include "blobify.h"
14      #include "boxes.h"
15      #include "dict.h"
16      #include "diff.h"
17      #include "newContour.h"
18      #include "numbers.h"
19
20      #define TRY
21      #ifdef TRY
22      Picture thePict;
23      #endif
24
25      void DrawMiddleLines(Picture pict,List pointList, double angle)
26      {
27       int maxLength;
28       int xc,yc,xBot,xTop,yBot,yTop;
29       Point temp;
30       float x2,y2,x3,y3;
31       int i,len;
32       maxLength = pict->width+pict->height;
33       len = ListLength(pointList);
34       pop(pointList);
35       for (i=1;i<len-1;i+=2) {
36        temp = pop(pointList);
37        xTop = temp->x;
38        yTop = temp->y;
39        temp = pop(pointList);
40        xBot = temp->x;
41        yBot = temp->y;
42        xc = (xBot+xTop)/2;
43        yc = (yBot+yTop)/2;
44        x2 = xc+maxLength*cos(angle);
45        y2 = yc+maxLength*sin(angle);
46        x3 = xc-maxLength*cos(angle);
47        y3 = yc-maxLength*sin(angle);
48        DrawLine(pict,xc,yc,(int)x2,(int)y2,0);
49        DrawLine(pict,xc,yc,(int)x3,(int)y3,0);
50       }
51      }
52
```

Section D

APPENDIX / Page 234

```c
53      void DrawBoxList(Picture pict,List boxList)
54      {
55       while (!endp(boxList)) {
56        DrawBox(pict,(Box)pop(boxList));
57       }
58      }
59
60      void LabelShapes(Picture pict,Dictionary dict)
61      {
62       int i;
63       Box box;
64
65       for (i=0;i<dict->numberOfEntries;++i) {
66        box = (*(dict->outlines+i))->box;
67        DrawColorBox(pict,box,3);
68        DrawNumber(pict,box->x,box->y,2,(float)box->height/2,i);
69       }
70      }
71
72      double FixAngle(double angle)
73      {
74       if (angle > M_PI/2 && angle < 1.5*M_PI)
75        return angle-M_PI;
76       else
77        return angle;
78      }
79
80      int ScanIntArg(int argc,char **argv,int index)
81      {
82       if (index<argc)
83        return atoi(argv[index]);
84       else
85        DoError("Expected an integer argument\n",NULL);
86      }
87
88      float ScanFloatArg(int argc,char **argv,int index)
89      {
90       if (index<argc)
91        return atof(argv[index]);
92       else
93        DoError("Expected a floating point argument\n",NULL);
94      }
95
96      char *ScanStringArg(int argc,char **argv,int index)
97      {
98       if (index<argc)
99        return argv[index];
100      else
101       DoError("Expected a string argument\n",NULL);
102     }
103
104     void main(argc,argv)
105     int argc;
106     char **argv;
107     {
```

Section D   APPENDIX / Page 235

```
108     char *infile;
109     int coarseDirections,coarseSamples,fineDirections,fineSamples;
110     Picture pict,newPict,finalPict;
111     float coarseAngle,mediumAngle,fineAngle;
112     float coarseError,mediumError,fineError;
113     List baselines,boxList;
114     int maskWidth;
115     float blobThreshold;
116     int i;
117     char *shapesFile, *drawBaselinesFile;
118     char *drawBoxesFile,*plotFile,*plotOrientFile;
119     char *drawColorBoxesFile,*drawBlobsFile;
120     char *flag;
121     BOOLEAN doOrientation,doBaselines,doBoxes,doShapes,drawBaselines,drawBoxes;
122     BOOLEAN plotBaselines,plotOrientation,drawColorBoxes,drawBlobs;
123     BOOLEAN
        noXHeightNorm,noAscenderNorm,dontOrientation,doBlobThreshold,doMaskWidth;
124     NormalizationDescriptor nd;
125
126     DefArg("%s","infile",&infile);
127     DefOption("-orientation %f","-orientation (page orientation in radians)",
128             &dontOrientation,&fineAngle);
129     DefOption("-findOrientation","-findOrientation",&doOrientation);
130     DefOption("-plotOrientation %s","-plotOrientation (file top plot xgraph format image
        to)",
131             &plotOrientation,&plotOrientFile);
132     DefOption("-maskWidth %d","-maskWidth (integer half mask width)",
133             &doMaskWidth,&maskWidth);
134     DefOption("-blobThreshold %f","-blobThreshold (float on/off threshold)",
135             &doBlobThreshold,&blobThreshold);
136     DefOption("-drawBlobs %s","-drawBlobs (file to output image
        to)",&drawBlobs,&drawBlobsFile);
137     DefOption("-drawBaselines %s","-drawBaselines (file to output image
        to)",&drawBaselines,
138             &drawBaselinesFile);
139     DefOption("-plotBaselines %s","-plotBaselines (file to plot xgrapgh format baselines to)",
140             &plotBaselines,&plotFile);
141     DefOption("-drawBoxes %s","-drawBoxes (file to output image
        to)",&drawBoxes,&drawBoxesFile);
142     DefOption("-shapeFunctions %s","-shapeFunctions (file to output shape functions to)",
143             &doShapes,&shapesFile);
144     DefOption("-annotatedShapes %s","-annotatedShapes (file to output image to)",
145             &drawColorBoxes,&drawColorBoxesFile);
146     DefOption("-noAscenderNorm","-noAscenderNorm",&noAscenderNorm);
147     DefOption("-noXHeightNorm","-noXHeightNorm",&noXHeightNorm);
148
149     i = 2;
150     coarseDirections = 72;
151     coarseSamples = 400;
152     fineDirections = 40;
153     fineSamples = 10;
154     maskWidth = 3;
155     blobThreshold = 0.01;
156
157     ScanArgs(argc,argv);
```

Section D

```
158        if (dontOrientation)
159          doOrientation = FALSE;
160
161        nd.noXHeightNormalize = noXHeightNorm;
162        nd.noAscenderNormalize = noAscenderNorm;
163
164        printf("Loading %s...\n",infile);
165        pict = load_pict(infile);
166        if (pict->depth != 1)
167          DoError("error: only depth 1 is supported\n",NULL);
168
169        if (drawBaselines || drawBoxes)
170          finalPict = new_pict(pict->width,pict->height,pict->depth);
171
172        if (doOrientation) {
173        #define NUMBER_OF_ANGLES 180
174        #define SAMPLES_PER_ANGLE 10
175        #define BIN_ERROR 4
176          printf("Finding coarse orientation.\n");
177          coarseAngle = NewFine(pict,SAMPLES_PER_ANGLE,NUMBER_OF_ANGLES,
178                       0,M_PI,NULL);
179          coarseError = (M_PI-0)/NUMBER_OF_ANGLES;
180          printf("Coarse angle: %f(%f)\n",coarseAngle,coarseAngle/M_PI*180);
181          printf("Coarse error: %f(%f)\n",coarseError,coarseError/M_PI*180);
182
183          mediumAngle = NewFine(pict,SAMPLES_PER_ANGLE,NUMBER_OF_ANGLES,
184                       coarseAngle-BIN_ERROR*coarseError,
185                       coarseAngle+BIN_ERROR*coarseError,
186                       NULL);
187          mediumError = 2*BIN_ERROR*coarseError/NUMBER_OF_ANGLES;
188          printf("Medium angle: %f(%f)\n",mediumAngle,mediumAngle/M_PI*180);
189          printf("Medium error: %f(%f)\n",mediumError,mediumError/M_PI*180);
190
191
192          fineAngle = NewFine(pict,SAMPLES_PER_ANGLE,NUMBER_OF_ANGLES,
193                       mediumAngle-15*mediumError,mediumAngle+15*mediumError,
194                       plotOrientFile);
195          fineError = 30*mediumError/NUMBER_OF_ANGLES;
196          fineAngle = FixAngle(fineAngle);
197          printf("Fine angle: %f(%f)\n",fineAngle,fineAngle/M_PI*180);
198          printf("Fine error: %f(%f)\n",fineError,fineError/M_PI*180);
199        }
200
201        printf("Adjusted angle: %lf\n",fineAngle);
202
203        #ifdef foo
204        printf("Finding baselines\n");
205        baselines = BaseLines(pict,fineAngle,plotBaselines?plotFile:NULL);
206
207        if (drawBaselines) {
208          CopyPicture(finalPict,pict);
209          DrawBaseLines(finalPict,baselines,fineAngle);
210          write_pict(drawBaselinesFile,finalPict);
211        }
212
```

Section D

```
213    printf("Blobifying\n");
214    newPict = Blobify(pict,maskWidth,blobThreshold);
215    #endif
216    printf("NewBlobify\n");
217    /* newPict = NewBlobify(pict,maskWidth,blobThreshold,fineAngle); */
218    newPict = Blobify(pict,maskWidth,blobThreshold);
219    printf("Finding baselines\n");
220    baselines = BaseLines(newPict,fineAngle,plotBaselines?plotFile:NULL);
221    if (drawBaselines) {
222      CopyPicture(finalPict,pict);
223      DrawBaseLines(finalPict,baselines,fineAngle);
224      write_pict(drawBaselinesFile,finalPict);
225    }
226
227
228    DrawMiddleLines(newPict,baselines,fineAngle);
229    if (drawBlobs)
230      write_pict(drawBlobsFile,newPict);
231    printf("Finding boxes\n");
232    boxList = FindBorders(newPict,fineAngle);
233
234    if (drawBoxes) {
235      CopyPicture(finalPict,pict);
236      DrawBoxList(finalPict,boxList);
237      write_pict(drawBoxesFile,finalPict);
238    }
239
240    if (doShapes) {
241      ColorMap cmap;
242      int x,y;
243
244      if (drawColorBoxes) {
245        thePict = new_pict(pict->width,pict->height,8);
246        cmap = NewColorMap(6); /* black, white, and 16 colors */
247        WriteColorValue(cmap,0,0,128,0);    /* Olive */
248        WriteColorValue(cmap,1,0,0,0);      /* Black */
249        WriteColorValue(cmap,2,255,255,255); /* White */
250        WriteColorValue(cmap,3,0,0,255);    /* Blue */
251        WriteColorValue(cmap,4,255,255,80); /* Yellow */
252        WriteColorValue(cmap,5,128,0,0);    /* Blood */
253        thePict->cmap = cmap;
254        for (y=0;y<pict->height; ++y)
255           for (x=0;x<pict->width; ++x)
256             WritePixel(thePict,x,y,ReadPixel(pict,x,y)?0:1);
257      }
258      else
259        thePict = NULL; /* Important */
260
261      printf("Tracing outlines\n");
262      BarBoxList(pict,boxList,baselines,shapesFile,ArgListToString(argc,argv),&nd);
263
264      if (drawColorBoxes) {
265        Dictionary dict;
266
267        dict = ReadDictionary(shapesFile);
```

Section D                                                                                          APPENDIX / Page 2

```
268        LabelShapes(thePict,dict);
269        write_pict(drawColorBoxesFile,thePict);
270     }
271   }
272 }
```

Section D

Jan 11 17:07 1991 numbers.c

```
1       #include "stdio.h"
2       #include "boolean.h"
3       #include "pict.h"
4       #include "lines.h"
5
6       static float localScale;
7       static int localColor;
8       static int localX;
9       static int localY;
10      static Picture localPict;
11
12      void DrawSegment(float y1,float x1,float y2,float x2)
13      {
14       DrawLine(localPict,irint(localX+x1*localScale),
15              irint(localY+y1*localScale),
16              irint(localX+x2*localScale),
17              irint(localY+y2*localScale),localColor);
18      }
19
20      void Draw0(Picture pict, int x, int y, int color,float scale)
21      {
22       localPict = pict;
23       localScale = scale;
24       localColor = color;
25       localX = x;
26       localY = y;
27       DrawSegment(0,0,0,1);
28       DrawSegment(1,0,1,1);
29       DrawSegment(0,0,1,0);
30       DrawSegment(0,1,1,1);
31      }
32
33      void Draw1(Picture pict, int x, int y, int color,float scale)
34      {
35       localPict = pict;
36       localScale = scale;
37       localColor = color;
38       localX = x;
39       localY = y;
40       DrawSegment(0,0.5,1,.5);
41      }
42
43      void Draw2(Picture pict, int x, int y, int color,float scale)
44      {
45       localPict = pict;
46       localScale = scale;
47       localColor = color;
48       localX = x;
49       localY = y;
50       DrawSegment(0,0,0,1);
51       DrawSegment(0,1,.5,1);
52       DrawSegment(.5,1,.5,0);
```

Section D

APPENDIX / Page 240

```
53        DrawSegment(.5,0,1,0);
54        DrawSegment(1,0,1,1);
55      }
56
57      void Draw3(Picture pict, int x, int y, int color,float scale)
58      {
59       localPict = pict;
60       localScale = scale;
61       localColor = color;
62       localX = x;
63       localY = y;
64       DrawSegment(0,0,0,1);
65       DrawSegment(0,1,1,1);
66       DrawSegment(1,0,1,1);
67       DrawSegment(.5,0,.5,1);
68      }
69
70      void Draw4(Picture pict, int x, int y, int color,float scale)
71      {
72       localPict = pict;
73       localScale = scale;
74       localColor = color;
75       localX = x;
76       localY = y;
77       DrawSegment(0,0,.5,0);
78       DrawSegment(0,1,1,1);
79       DrawSegment(.5,0,.5,1);
80      }
81
82      void Draw5(Picture pict, int x, int y, int color,float scale)
83      {
84       localPict = pict;
85       localScale = scale;
86       localColor = color;
87       localX = x;
88       localY = y;
89       DrawSegment(0,0,0,1);
90       DrawSegment(0,0,.5,0);
91       DrawSegment(.5,1,.5,0);
92       DrawSegment(.5,1,1,1);
93       DrawSegment(1,0,1,1);
94      }
95
96      void Draw6(Picture pict, int x, int y, int color,float scale)
97      {
98       localPict = pict;
99       localScale = scale;
100      localColor = color;
101      localX = x;
102      localY = y;
103      DrawSegment(0,0,0,1);
104      DrawSegment(0,0,1,0);
105      DrawSegment(.5,1,.5,0);
106      DrawSegment(.5,1,1,1);
107      DrawSegment(1,0,1,1);
```

Section D

APPENDIX / Page 24

```
108        }
109
110        void Draw7(Picture pict, int x, int y, int color,float scale)
111        {
112         localPict = pict;
113         localScale = scale;
114         localColor = color;
115         localX = x;
116         localY = y;
117         DrawSegment(0,0,0,1);
118         DrawSegment(0,1,1,1);
119        }
120
121        void Draw8(Picture pict, int x, int y, int color,float scale)
122        {
123         localPict = pict;
124         localScale = scale;
125         localColor = color;
126         localX = x;
127         localY = y;
128         DrawSegment(0,0,0,1);
129         DrawSegment(0,0,1,0);
130         DrawSegment(1,0,1,1);
131         DrawSegment(.5,1,.5,0);
132         DrawSegment(0,1,1,1);
133        }
134
135        void Draw9(Picture pict, int x, int y, int color,float scale)
136        {
137         localPict = pict;
138         localScale = scale;
139         localColor = color;
140         localX = x;
141         localY = y;
142         DrawSegment(0,0,0,1);
143         DrawSegment(.5,0,.5,1);
144         DrawSegment(0,0,.5,0);
145         DrawSegment(0,1,1,1);
146        }
147
148        typedef void DrFct(Picture pict, int x, int y, int color, float scale);
149
150        DrFct *DrawFunctions[] = {Draw0,Draw1,Draw2,Draw3,Draw4,Draw5,Draw6,
151                        Draw7,Draw8,Draw9};
152
153        void DrawNumeral(Picture pict, int x, int y, int color, float scale, int n)
154        {
155         (*DrawFunctions[n])(pict,x,y,color,scale);
156        }
157
158        void DrawNumber(Picture pict, int x, int y, int color, float scale, int n)
159        {
160         char s[100];
161         char *ptr;
162
```

Section D

```
163      sprintf(s,"%d",n);
164      ptr = s;
165      while (*ptr != '\0') {
166       DrawNumeral(pict,x,y,color,scale,*ptr-'0');
167       x += irint(scale*1.5);
168       ptr++;
169      }
170     }
171
172     #ifdef TRYMAIN
173     main()
174     {
175      Picture pict;
176      pict = new_pict(400,200,1);
177      DrawNumber(pict,50,50,1,20,12345);
178      DrawNumber(pict,50,100,1,10,67890);
179      write_pict("junkfile.image",pict);
180     }
181     #endif
```

Section D

Jul 2 18:48 1991 orient.c

```c
1     #include <stdio.h>
2     #include <values.h>
3     #include <math.h>
4     #include "misc.h"
5     #include "boolean.h"
6     #include "pict.h"
7     #include "orient.h"
8     #include "lines.h"
9
10
11    #define ABS(x) (((x)<0)?-(x):(x))
12
13    extern long random();
14
15    int RandomCoordinate(int maxValue)
16    {
17      return (float)(random()&0xffff)*maxValue/0xffff;
18    }
19
20    void RandomEdgePixel(Picture pict,int *x, int *y)
21    {
22      while (TRUE) {
23        *x = RandomCoordinate(pict->width);
24        *y = RandomCoordinate(pict->height);
25        if (ReadPixel(pict,*x,*y))
26          if (!(ReadPixel(pict,*x+1,*y) &&
27               ReadPixel(pict,*x-1,*y) &&
28               ReadPixel(pict,*x,*y+1) &&
29               ReadPixel(pict,*x,*y-1) &&
30               ReadPixel(pict,*x+1,*y+1) &&
31               ReadPixel(pict,*x-1,*y-1) &&
32               ReadPixel(pict,*x+1,*y-1) &&
33               ReadPixel(pict,*x-1,*y+1)))
34            return;
35      }
36
37    }
38
39    /* #define SYMTHRESH 4 */
40    #define SYMTHRESH 0.17453278
41    BOOLEAN FindBestMin(float *distances, int coarseDirections, float step,
42                    float *orientation)
43    {
44      int i,j,minIndex,min2Index;
45      int orientationError;
46      float minValue,min2Value;
47      int maxBinError = irint(SYMTHRESH / step);
48
49      minIndex = 0;
50      minValue = distances[0];
51      for (i=0;i<coarseDirections;++i)
52        if (distances[i]<minValue) {
```

Section D

```
53              minValue = distances[i];
54              minIndex = i;
55            }
56         /* Now verify that there is another minima M_PI away */
57
58         min2Index = (minIndex+coarseDirections/4)%coarseDirections;
59         min2Value = distances[min2Index];
60         for (i=0,j=min2Index;i<coarseDirections/2;++i,j = (j+1)%coarseDirections)
61          if (distances[j]<min2Value) {
62            min2Value = distances[j];
63            min2Index = j;
64          }
65         orientationError = ABS((min2Index-minIndex)%coarseDirections) -
66          coarseDirections/2;
67         orientationError = ABS(orientationError);
68         if (orientationError<maxBinError) {
69          *orientation = minIndex*step;
70          return TRUE;
71         } else {
72          printf("Orientation error: %d %3.3f\n",orientationError,
73                 orientationError*step/M_PI/2*360);
74          printf("%3.3f:%3.3f %3.3f:%3.3f\n",minIndex*step,minValue,
75                 min2Index*step,min2Value);
76          return FALSE;
77         }
78        }
79
80        float Fine(Picture pict,int fineSamples, int fineDirections,
81                 int coarseDirections, float coarseAngle, char *plotFile)
82        {
83         float coarseError;
84         int x,y;
85         float x2,y2;
86         int i,j;
87         float *counters;
88         float step,angle;
89         float maxAngle;
90         float maxValue;
91         float maxLength;
92         FILE *outfile;
93
94         counters = (float *)calloc(fineDirections,sizeof(float));
95         if (counters = = NULL) {
96          printf("Fine: cannot allocate memory\n");
97          exit(-1);
98         }
99         /* coarseError = 2*(SYMTHRESH+1)*2*M_PI/coarseDirections; */
100        coarseError = 2*SYMTHRESH;
101        step = coarseError/fineDirections;
102        printf("fine: +/- %3.3f\n",fineDirections/2*step);
103
104        maxLength = sqrt((double)(pict->width*pict->width+
105                       pict->height*pict->height));
106        for (i=0;i<fineSamples;++i) {
107         RandomEdgePixel(pict,&x,&y);
```

Section D

APPENDIX / Page 245

```
108        angle = -fineDirections/2*step+coarseAngle;
109        for (j=0;j<fineDirections; ++j,angle+=step) {
110          x2 = x + maxLength*cos(angle);
111          y2 = y + maxLength*sin(angle);
112          counters[j] += CountLine(pict,x,y,(int)x2,(int)y2);
113        }
114      }
115
116      angle = -fineDirections/2*step+coarseAngle;
117      maxAngle = angle;
118      maxValue = counters[0];
119      for (i=0;i<fineDirections; ++i,angle += step) {
120    /*   printf("%3.3f: %3.3f\n",angle,counters[i]); */
121        if (counters[i]>maxValue) {
122          maxAngle = angle;
123          maxValue = counters[i];
124        }
125      }
126
127      /* Plot the orientation graph if requested */
128      angle = -fineDirections/2*step+coarseAngle;
129      if (angle < 0)
130        angle += 2*M_PI;
131      if (plotFile!=NULL) {
132        printf("Opening fine orientation plot file\n");
133        if ((outfile = fopen(plotFile,"a")) == NULL) {
134          printf("Error opening fine orientation plot file.\n");
135          exit(-1);
136        }
137        for (i=0;i<fineDirections; ++i, angle += step)
138          fprintf(outfile,"%f %f\n",fmod(angle,2*M_PI),counters[i]);
139        fprintf(outfile,"\"Fine Distances\n\n");
140        fclose(outfile);
141        printf("Done writing fine orientation plot file.\n");
142      }
143
144
145      return maxAngle;
146    }
147
148    float NewFine(Picture pict,int fineSamples, int fineDirections,
149               float angleStart,float angleEnd, char *plotFile)
150    {
151      int x,y;
152      float x2,y2;
153      int i,j;
154      float *counters;
155      float step,angle;
156      float maxAngle;
157      float maxValue;
158      float maxLength;
159      FILE *outfile;
160
161      counters = (float *)calloc(fineDirections,sizeof(float));
162      if (counters == NULL) {
```

Section D

```
163        printf("Fine: cannot allocate memory\n");
164        exit(-1);
165      }
166
167      step = ABS(angleEnd - angleStart)/fineDirections;
168
169      maxLength = sqrt((double)(pict->width*pict->width +
170                      pict->height*pict->height));
171      for (i=0;i<fineSamples;++i) {
172       RandomEdgePixel(pict,&x,&y);
173       angle = angleStart;
174       for (j=0;j<fineDirections;++j) {
175        angle = fmod(angle,2*M_PI);
176        x2 = x + maxLength*cos(angle);
177        y2 = y + maxLength*sin(angle);
178        counters[j] += CountLine(pict,x,y,(int)x2,(int)y2);
179        angle += step;
180       }
181      }
182
183      angle = angleStart;
184      maxAngle = angle;
185      maxValue = counters[0];
186      for (i=0;i<fineDirections;++i) {
187       angle = fmod(angle,2*M_PI);
188       if (counters[i]>maxValue) {
189        maxAngle = angle;
190        maxValue = counters[i];
191       }
192       angle += step;
193      }
194      printf("Orientation is at %f(%f)\n",maxAngle,maxAngle/2/M_PI*360);
195
196      /* Plot the orientation graph if requested */
197      if (plotFile) {
198       printf("Opening fine orientation plot file\n");
199       if ((outfile = fopen(plotFile,"w"))==NULL) {
200        printf("Error opening fine orientation plot file.\n");
201        exit(-1);
202       }
203       angle = angleStart;
204       for (i=0;i<fineDirections;++i) {
205        angle = fmod(angle,2*M_PI);
206        fprintf(outfile,"%f %f\n",angle,counters[i]);
207        angle += step;
208       }
209       fprintf(outfile,"\"Fine Distances\n\n");
210       fclose(outfile);
211       printf("Done writing fine orientation plot file.\n");
212      }
213      return maxAngle;
214     }
215
```

Section D  APPENDIX / Page 241

Jan 15 15:22 1991 overlay.c

```
1       #include <stdio.h>
2       #include <math.h>
3       #include "boolean.h"
4       #include "pict.h"
5
6       main(argc, argv)
7       int argc;
8       char *argv[];
9       {
10       char *inFile1,*inFile2,*outFile;
11       Picture pict1,pict2,finalPict;
12       ColorMap cmap;
13       int x,y;
14
15       if (argc != 4 )
16       {
17        printf("\nUsage: %s infile1 infile2 outfile\n\n",
18             argv[0]);
19        exit(0);
20       }
21
22       inFile1 = argv[1];    /* get args */
23       inFile2 = argv[2];
24       outFile = argv[3];
25
26       pict1 = load_pict(inFile1);
27       pict2 = load_pict(inFile2);
28       if ((pict1->depth != 1) || (pict2->depth != 1))
29        DoError("overlay: only depth 1 supported.\n",NULL);
30       if ((pict1->width != pict2->width)||(pict1->height != pict2->height))
31        DoError("overlay: images must be the same size\n",NULL);
32
33       finalPict = new_pict(pict1->width,pict1->height,8);
34       cmap = NewColorMap(3);
35       WriteColorValue(cmap,0,0,0,0);     /* Black */
36       WriteColorValue(cmap,1,0,128,0);   /* Olive */
37       WriteColorValue(cmap,2,0,255,0);   /* Green */
38       finalPict->cmap = cmap;
39
40       for (y=0;y<pict1->height; ++y)
41        for (x=0;x<pict1->width; ++x)
42         if (ReadPixel(pict1,x,y))
43             WritePixel(finalPict,x,y,2);
44         else if (ReadPixel(pict2,x,y))
45             WritePixel(finalPict,x,y,1);
46
47       write_pict(outFile,finalPict);
48       }
```

Section D

Jul 1 13:45 1991 pagestats.c

```c
1     #include <stdio.h>
2     #include <math.h>
3     #include "boolean.h"
4     #include "types.h"
5     #include "error.h"
6     #include "pict.h"
7     #include "dict.h"
8
9     #define UP 0
10    #define DOWN 1
11    typedef int Direction;
12
13    extern Picture thePict;
14
15    void StoreRawOutlinePair(Dictionary dict, int dictEntry,
16                    Box box,int *bothX,int *topY, int *baseY,
17                    int numberOfLegs)
18    {
19     RawOutlinePair temp;
20     int i;
21     int *xCursor,*topCursor,*bottomCursor;
22
23     temp = (RawOutlinePair)calloc(1,sizeof(RawOutlinePairBody));
24     if (temp == NULL)
25       DoError("StoreRawOutlinePair: cannot allocate space\n",NULL);
26
27     temp->box = box;
28     temp->numberOfLegs = numberOfLegs;
29
30     temp->x = (int *)calloc(temp->numberOfLegs,sizeof(int));
31     temp->top = (int *)calloc(temp->numberOfLegs,sizeof(int));
32     temp->bottom = (int *)calloc(temp->numberOfLegs,sizeof(int));
33     if ((temp->x == NULL) ||
34        (temp->top == NULL) ||
35        (temp->bottom == NULL))
36       DoError("StoreRawOutlinePair: cannot allocate space\n",NULL);
37
38     xCursor = temp->x;
39     topCursor = temp->top;
40     bottomCursor = temp->bottom;
41
42     for (i=0;i<numberOfLegs;++i) {
43       *xCursor++ = *bothX++;
44       *topCursor++ = *topY++;
45       *bottomCursor++ = *baseY++;
46     }
47     *(dict->rawOutlines+dictEntry) = temp;
48    }
49
50    void StoreOutlinePair(Dictionary dict, int dictEntry,
51                    int middleLine,int fontXHeight)
52    {
```

Section D  APPENDIX / Page 249

```
53      RawOutlinePair raw;
54      OutlinePair temp;
55      int i,numberOfLegs;
56      int y;
57      int offset;
58      int *xSCursor,*topSCursor,*bottomSCursor;
59      float *xDCursor,*topDCursor,*bottomDCursor;
60      float *xCursor,*topCursor,*bottomCursor;
61      int left,right;
62      float foffset;
63
64      raw = *(dict->rawOutlines+dictEntry);
65
66      temp = (OutlinePair)calloc(1,sizeof(OutlinePairBody));
67      if (temp == NULL)
68        DoError("StoreOutlinePair: cannot allocate space\n",NULL);
69
70      temp->x = (float *)calloc(raw->numberOfLegs,sizeof(float));
71      temp->top = (float *)calloc(raw->numberOfLegs,sizeof(float));
72      temp->bottom = (float *)calloc(raw->numberOfLegs,sizeof(float));
73      if ((temp->x == NULL) ||
74         (temp->top == NULL) ||
75         (temp->bottom == NULL))
76        DoError("StoreOutlinePair: cannot allocate space\n",NULL);
77
78      temp->box = raw->box;
79      temp->blackoutHeight = 0;
80      temp->numberOfLegs = raw->numberOfLegs;
81      offset = temp->offset = *(raw->x);
82      temp->width = *(raw->x+raw->numberOfLegs-1) - temp->offset;
83
84      xDCursor = temp->x;
85      topDCursor = temp->top;
86      bottomDCursor = temp->bottom;
87      xSCursor = raw->x;
88      topSCursor = raw->top;
89      bottomSCursor = raw->bottom;
90
91      numberOfLegs = raw->numberOfLegs;
92      for (i=0;i<numberOfLegs;++i) {
93       *xDCursor++ = (float)(*xSCursor++ - offset)/fontXHeight;
94       y = middleLine - *topSCursor++;
95       if (y<0)
96         y = 0;
97       *topDCursor++ = (float)y / fontXHeight;
98       y = *bottomSCursor++ - middleLine;
99       if (y<0)
100        y = 0;
101      *bottomDCursor++ = (float)y / fontXHeight;
102     }
103
104     /* Now try to remove parts of the contour on to the left and right of the
105      * word shape that are at height 0 */
106
107     topDCursor = temp->top;
```

```
108       bottomDCursor = temp->bottom;
109       for (i=0;i<numberOfLegs;++i) {
110        if ((*topDCursor++ != 0)||(*bottomDCursor++ !=0))
111         break;
112       }
113       left = i;
114
115       topDCursor = temp->top+numberOfLegs-1;
116       bottomDCursor = temp->bottom+numberOfLegs-1;
117       for (i=numberOfLegs-1;i>=0;--i) {
118        if ((*topDCursor-- != 0)||(*bottomDCursor-- !=0))
119         break;
120       }
121       right = i+1;
122
123       xDCursor = temp->x;
124       topDCursor = temp->top;
125       bottomDCursor = temp->bottom;
126       xCursor = temp->x+left;
127       topCursor = temp->top+left;
128       bottomCursor = temp->bottom+left;
129       foffset = *xSCursor;
130       for (i=left;i<right;++i) {
131        *xDCursor++ = *xCursor++ - foffset;
132        *topDCursor++ = *topCursor++;
133        *bottomDCursor++ = *bottomCursor++;
134       }
135       temp->numberOfLegs = right-left;
136
137       *(dict->outlines+dictEntry) = temp;
138      }
139
140      static int lineSpacing;
141      int OrderOutlinePair(OutlinePair *o1,OutlinePair *o2)
142      {
143       int yDistance;
144       int xDistance;
145       yDistance = (*o1)->box->pageY - (*o2)->box->pageY;
146       if (yDistance<lineSpacing && yDistance > -lineSpacing) {
147        xDistance = (*o1)->box->pageX - (*o2)->box->pageX;
148        return xDistance;
149       }
150       return yDistance;
151      }
152
153      void SortDictionary(Dictionary dict)
154      {
155       lineSpacing = 20;
156       qsort(dict->rawOutlines,dict->numberOfEntries,sizeof(RawOutlinePair),
157          OrderOutlinePair);
158      }
159
160      #define HIST_SIZE 100
161      void Histogram(int *data,int dataLength, int offset, int *histogram)
162      {
```

Section D

APPENDIX / Page 251

```
163      int i,bin;
164      for (i=0;i<dataLength;++i){
165       bin = *data-offset;
166       if ((bin>=0)&&(bin<HIST_SIZE))
167        histogram[bin]++;
168       data++;
169      }
170     }
171
172     void HistogramPeaks(int *data,int dataLength, int offset, int *histogram)
173     {
174      int i,bin;
175      Direction direction;
176
177      if (*(data+1) < *data)
178       direction = UP;
179      else {
180       bin = *data-offset;
181       if ((bin>=0)&&(bin<HIST_SIZE))
182        histogram[bin]++;
183       direction = DOWN;
184      }
185      ++data;
186
187      for (i=1;i<dataLength-1;++i){
188       if ((direction == UP) &&
189           (*data < *(data+1))){
190        /* *data is a peak */
191        bin = *data-offset;
192        if ((bin>=0)&&(bin<HIST_SIZE))
193            histogram[bin]++;
194        direction = DOWN;
195       }
196       else if ((direction == DOWN) &&
197            (*data > *(data+1))){
198        /* *data is a valley */
199        direction = UP;
200       }
201       ++data;
202      } /* for i */
203     }
204
205     void HistogramValleys(int *data,int dataLength, int offset, int *histogram)
206     {
207      int i,bin;
208      Direction direction;
209
210      if (*(data+1) > *data)
211       direction = UP;
212      else {
213       bin = *data-offset;
214       if ((bin>=0)&&(bin<HIST_SIZE))
215        histogram[bin]++;
216       direction = DOWN;
217      }
```

Section D

APPENDIX / Page 252

```
218       ++data;
219
220       for (i=1;i<dataLength-1;++i) {
221        if ((direction == UP) &&
222            (*data > *(data+1))) {
223         /* *data is a peak */
224         bin = *data-offset;
225         if ((bin>=0)&&(bin<HIST_SIZE))
226            histogram[bin]++;
227         direction = DOWN;
228        }
229        else if ((direction == DOWN) &&
230            (*data < *(data+1))) {
231         /* *data is a valley */
232         direction = UP;
233        }
234        ++data;
235       } /* for i */
236      }
237
238      int MaxBin(int *histogram)
239      {
240       int i;
241       int maxValue;
242       int maxIndex;
243
244       maxValue = histogram[0];
245       maxIndex = 0;
246       for (i=0;i<HIST_SIZE;++i)
247        if (histogram[i]>maxValue) {
248         maxValue = histogram[i];
249         maxIndex = i;
250        }
251       return maxIndex;
252      }
253
254      void PostProcess(Dictionary dict)
255      {
256       int index;
257       int temp;
258       int i,startIndex,firstY,minY,endIndex,shape;
259       int tops[HIST_SIZE];
260       int bottoms[HIST_SIZE];
261       int middleLine,topLine,bottomLine;
262       int fontXHeight;
263       RawOutlinePair thisShape;
264
265       SortDictionary(dict);
266
267       index = 0;
268      #ifdef foo
269       malloc_verify();
270      #endif
271       while (index < dict->numberOfEntries) {
272        startIndex = index;
```

Section D

APPENDIX / Page 253

```
273        firstY = (*(dict->rawOutlines+index))->box->pageY;
274        minY = firstY;
275        while ( (*(dict->rawOutlines+index))->box->pageY - firstY < 20 &&
276               (*(dict->rawOutlines+index))->box->pageY - firstY > -20) {
277          if ( minY > ( (*(dict->rawOutlines+index))->box->pageY ))
278             minY = (*(dict->rawOutlines+index))->box->pageY;
279          ++index;
280          if (index == dict->numberOfEntries)
281             break;
282        }
283        endIndex = index;
284
285   #ifdef foo
286        malloc_verify();
287   #endif
288
289        /* shapes from start index through endindex are all on */
290        /* the same text line */
291        /* minY has the top of the highest box on the line. */
292
293        /* Find the base and toplines by taking the mode of the heights of the
294         * valleys of the bottom contours and the peaks of the top contours */
295        for (i=0;i<HIST_SIZE;i++) {
296          tops[i]=0;
297          bottoms[i]=0;
298        }
299        for (shape=startIndex;shape<endIndex; ++shape) {
300          thisShape = *(dict->rawOutlines+shape);
301          Histogram(thisShape->top,thisShape->numberOfLegs,minY,tops);
302          Histogram(thisShape->bottom,thisShape->numberOfLegs,minY,bottoms);
303
304   #ifdef foo
305          HistogramPeaks(thisShape->top,thisShape->numberOfLegs,minY,tops);
306          HistogramValleys(thisShape->bottom,thisShape->numberOfLegs,minY,bottoms);
307   #endif
308        }
309        topLine = MaxBin(tops)+minY;
310        bottomLine = MaxBin(bottoms)+minY;
311
312        if (thePict) {
313          int maxLength;
314          int halfWidth;
315          int x,y;
316          float x2,x3,y2,y3;
317          float angle;
318
319          angle = (*(dict->rawOutlines))->box->angle;
320          maxLength = thePict->width+thePict->height;
321          halfWidth = thePict->width / 2;
322          x = topLine * -sin(angle) + halfWidth * cos(angle);
323          y = topLine * cos(angle) + halfWidth * sin(angle);
324          x2 = x+maxLength*cos(angle);
325          y2 = y+maxLength*sin(angle);
326          x3 = x-maxLength*cos(angle);
327          y3 = y-maxLength*sin(angle);
```

Section D                                             APPENDIX / Page 254

```
328         DrawLine(thePict,x,y,(int)x2,(int)y2,5);
329         DrawLine(thePict,x,y,(int)x3,(int)y3,5);
330
331         x = bottomLine * -sin(angle) + halfWidth * cos(angle);
332         y = bottomLine * cos(angle) + halfWidth * sin(angle);
333         x2 = x+maxLength*cos(angle);
334         y2 = y+maxLength*sin(angle);
335         x3 = x-maxLength*cos(angle);
336         y3 = y-maxLength*sin(angle);
337         DrawLine(thePict,x,y,(int)x2,(int)y2,5);
338         DrawLine(thePict,x,y,(int)x3,(int)y3,5);
339
340      }
341
342   #ifdef foo
343      malloc_verify();
344   #endif
345
346      middleLine = (bottomLine+topLine)/2;
347      fontXHeight = bottomLine-topLine;
348      /* Clip and normalize the contours */
349      for (shape=startIndex;shape<endIndex; ++shape)
350         StoreOutlinePair(dict,shape,middleLine,fontXHeight);
351   } /* Do another line of text */
352 }
```

Section D

Jul 1 13:46 1991 postproc.c

```
1       #include <stdio.h>
2       #include <math.h>
3       #include "boolean.h"
4       #include "types.h"
5       #include "error.h"
6       #include "pict.h"
7       #include "dict.h"
8
9       #define UP 0
10      #define DOWN 1
11      typedef int Direction;
12
13      extern Picture thePict;
14
15      void StoreRawOutlinePair(Dictionary dict, int dictEntry,
16                      Box box,int *bothX,int *topY, int *baseY,
17                      int numberOfLegs)
18      {
19       RawOutlinePair temp;
20       int i;
21       int *xCursor,*topCursor,*bottomCursor;
22
23       temp = (RawOutlinePair)calloc(1,sizeof(RawOutlinePairBody));
24       if (temp == NULL)
25        DoError("StoreRawOutlinePair: cannot allocate space\n",NULL);
26
27       temp->box = box;
28       temp->numberOfLegs = numberOfLegs;
29
30       temp->x = (int *)calloc(temp->numberOfLegs,sizeof(int));
31       temp->top = (int *)calloc(temp->numberOfLegs,sizeof(int));
32       temp->bottom = (int *)calloc(temp->numberOfLegs,sizeof(int));
33       if ((temp->x == NULL) ||
34         (temp->top == NULL) ||
35         (temp->bottom == NULL))
36        DoError("StoreRawOutlinePair: cannot allocate space\n",NULL);
37
38       xCursor = temp->x;
39       topCursor = temp->top;
40       bottomCursor = temp->bottom;
41
42       for (i=0;i<numberOfLegs;++i) {
43        *xCursor++ = *bothX++;
44        *topCursor++ = *topY++;
45        *bottomCursor++ = *baseY++;
46       }
47       *(dict->rawOutlines+dictEntry) = temp;
48      }
49
50      void StoreOutlinePair(Dictionary dict, int dictEntry,
51                      int middleLine,int fontXHeight)
52      {
```

Section D

```
53      RawOutlinePair raw;
54      OutlinePair temp;
55      int i,numberOfLegs;
56      int y;
57      int offset;
58      int *xSCursor,*topSCursor,*bottomSCursor;
59      float *xDCursor,*topDCursor,*bottomDCursor;
60      float *xCursor,*topCursor,*bottomCursor;
61      int left,right;
62      float foffset;
63
64      raw = *(dict->rawOutlines+dictEntry);
65
66      temp = (OutlinePair)calloc(1,sizeof(OutlinePairBody));
67      if (temp == NULL)
68        DoError("StoreOutlinePair: cannot allocate space\n",NULL);
69
70      temp->x = (float *)calloc(raw->numberOfLegs,sizeof(float));
71      temp->top = (float *)calloc(raw->numberOfLegs,sizeof(float));
72      temp->bottom = (float *)calloc(raw->numberOfLegs,sizeof(float));
73      if ((temp->x == NULL) ||
74         (temp->top == NULL) ||
75         (temp->bottom == NULL))
76        DoError("StoreOutlinePair: cannot allocate space\n",NULL);
77
78      temp->box = raw->box;
79      temp->blackoutHeight = 0;
80      temp->numberOfLegs = raw->numberOfLegs;
81      offset = temp->offset = *(raw->x);
82      temp->width = *(raw->x+raw->numberOfLegs-1) - temp->offset;
83
84      xDCursor = temp->x;
85      topDCursor = temp->top;
86      bottomDCursor = temp->bottom;
87      xSCursor = raw->x;
88      topSCursor = raw->top;
89      bottomSCursor = raw->bottom;
90
91      numberOfLegs = raw->numberOfLegs;
92      for (i=0;i<numberOfLegs;++i) {
93        *xDCursor++ = (float)(*xSCursor++ - offset)/fontXHeight;
94        y = middleLine - *topSCursor++;
95        if (y<0)
96          y = 0;
97        *topDCursor++ = (float)y / fontXHeight;
98        y = *bottomSCursor++ - middleLine;
99        if (y<0)
100         y = 0;
101       *bottomDCursor++ = (float)y / fontXHeight;
102     }
103
104     /* Now try to remove parts of the contour on to the left and right of the
105      * word shape that are at height 0 */
106
107     topDCursor = temp->top;
```

```
108      bottomDCursor = temp->bottom;
109      for (i=0;i<numberOfLegs;++i) {
110       if ((*topDCursor++ != 0)||(*bottomDCursor++ != 0))
111        break;
112      }
113      left = i;
114
115      topDCursor = temp->top+numberOfLegs-1;
116      bottomDCursor = temp->bottom+numberOfLegs-1;
117      for (i=numberOfLegs-1;i>=0;--i) {
118       if ((*topDCursor-- != 0)||(*bottomDCursor-- != 0))
119        break;
120      }
121      right = i+1;
122
123      xDCursor = temp->x;
124      topDCursor = temp->top;
125      bottomDCursor = temp->bottom;
126      xCursor = temp->x+left;
127      topCursor = temp->top+left;
128      bottomCursor = temp->bottom+left;
129      foffset = *xSCursor;
130      for (i=left;i<right;++i) {
131       *xDCursor++ = *xCursor++ - foffset;
132       *topDCursor++ = *topCursor++;
133       *bottomDCursor++ = *bottomCursor++;
134      }
135      temp->numberOfLegs = right-left;
136
137      *(dict->outlines+dictEntry) = temp;
138     }
139
140     static int lineSpacing;
141     int OrderOutlinePair(OutlinePair *o1,OutlinePair *o2)
142     {
143      int yDistance;
144      int xDistance;
145      yDistance = (*o1)->box->pageY - (*o2)->box->pageY;
146      if (yDistance<lineSpacing && yDistance > -lineSpacing) {
147       xDistance = (*o1)->box->pageX - (*o2)->box->pageX;
148       return xDistance;
149      }
150      return yDistance;
151     }
152
153     void SortDictionary(Dictionary dict)
154     {
155      lineSpacing = 20;
156      qsort(dict->rawOutlines,dict->numberOfEntries,sizeof(RawOutlinePair),
157           OrderOutlinePair);
158     }
159
160     #define HIST_SIZE 100
161     void HistogramMax(int *data,int dataLength,int offset,int sign,int *histogram)
162     {
```

Section D

APPENDIX / Page 258

```
163      int i,bin;
164
165      if (sign>0) {
166       int maxValue;
167       maxValue = *data;
168       for (i=0;i<dataLength;++i)
169        if (data[i]>maxValue)
170           maxValue = data[i];
171       bin = maxValue-offset;
172       if ((bin>=0)&&(bin<HIST_SIZE))
173         histogram[bin]++;
174      }
175      else {
176       int minValue;
177       minValue = *data;
178       for (i=0;i<dataLength;++i)
179        if (data[i]<minValue)
180           minValue = data[i];
181       bin = minValue-offset;
182       if ((bin>=0)&&(bin<HIST_SIZE))
183         histogram[bin]++;
184      }
185     }
186
187     void Histogram(int *data,int dataLength, int offset, int *histogram)
188     {
189      int i,bin;
190
191      for (i=0;i<dataLength;++i) {
192       bin = *data-offset;
193       if ((bin>=0)&&(bin<HIST_SIZE))
194         histogram[bin]++;
195       data++;
196      }
197     }
198
199     void HistogramPeaks(int *data,int dataLength, int offset, int *histogram)
200     {
201      int i,bin;
202      Direction direction;
203
204      if (*(data+1) < *data)
205       direction = UP;
206      else {
207       bin = *data-offset;
208       if ((bin>=0)&&(bin<HIST_SIZE))
209         histogram[bin]++;
210       direction = DOWN;
211      }
212      ++data;
213
214      for (i=1;i<dataLength-1;++i) {
215       if ((direction == UP) &&
216            (*data < *(data+1))) {
217        /* *data is a peak */
```

Section D APPENDIX / Page 259

```
218        bin = *data-offset;
219        if ((bin > =0)&&(bin<HIST_SIZE))
220          histogram[bin]+ +;
221        direction = DOWN;
222      }
223      else if ((direction = = DOWN) &&
224          (*data > *(data+1))) {
225        /* *data is a valley */
226        direction = UP;
227      }
228      + +data;
229    } /* for i */
230  }
231
232  void HistogramValleys(int *data,int dataLength, int offset, int *histogram)
233  {
234    int i,bin;
235    Direction direction;
236
237    if (*(data+1) > *data)
238      direction = UP;
239    else {
240      bin = *data-offset;
241      if ((bin > =0)&&(bin<HIST_SIZE))
242        histogram[bin]+ +;
243      direction = DOWN;
244    }
245    + +data;
246
247    for (i=1;i<dataLength-1;+ +i) {
248      if ((direction = = UP) &&
249          (*data > *(data+1))) {
250        /* *data is a peak */
251        bin = *data-offset;
252        if ((bin > =0)&&(bin<HIST_SIZE))
253          histogram[bin]+ +;
254        direction = DOWN;
255      }
256      else if ((direction = = DOWN) &&
257          (*data < *(data+1))) {
258        /* *data is a valley */
259        direction = UP;
260      }
261      + +data;
262    } /* for i */
263  }
264
265  int MaxBin(int *histogram)
266  {
267    int i;
268    int maxValue;
269    int maxIndex;
270
271    maxValue = histogram[0];
272    maxIndex = 0;
```

Section D

APPENDIX / Page 260

```
273      for (i=0;i<HIST_SIZE;++i)
274        if (histogram[i]>maxValue) {
275          maxValue = histogram[i];
276          maxIndex = i;
277        }
278      return maxIndex;
279    }
280
281    void PostProcess(Dictionary dict)
282    {
283      int index;
284      int temp;
285      int i,startIndex,firstY,minY,endIndex,shape;
286      int tops[HIST_SIZE];
287      int bottoms[HIST_SIZE];
288      int middleLine,topLine,bottomLine;
289      int fontXHeight;
290      RawOutlinePair thisShape;
291
292      SortDictionary(dict);
293
294      index = 0;
295    #ifdef foo
296      malloc_verify();
297    #endif
298      while (index < dict->numberOfEntries) {
299        startIndex = index;
300        firstY = (*(dict->rawOutlines+index))->box->pageY;
301        minY = firstY;
302        while ( (*(dict->rawOutlines+index))->box->pageY - firstY < 20 &&
303             (*(dict->rawOutlines+index))->box->pageY - firstY > -20) {
304          if ( minY > ( (*(dict->rawOutlines+index))->box->pageY ))
305             minY = (*(dict->rawOutlines+index))->box->pageY;
306          ++index;
307          if (index == dict->numberOfEntries)
308             break;
309        }
310        endIndex = index;
311
312    #ifdef foo
313       malloc_verify();
314    #endif
315
316      /* shapes from start index through endindex are all on */
317      /* the same text line */
318      /* minY has the top of the highest box on the line. */
319
320      /* Find the base and toplines by taking the mode of the heights of the
321       * valleys of the bottom contours and the peaks of the top contours */
322      for (i=0;i<HIST_SIZE;i++) {
323        tops[i]=0;
324        bottoms[i]=0;
325      }
326      for (shape=startIndex;shape<endIndex;++shape) {
327        thisShape = *(dict->rawOutlines+shape);
```

```
328         Histogram(thisShape->top,thisShape->numberOfLegs,minY,tops);
329         Histogram(thisShape->bottom,thisShape->numberOfLegs,minY,bottoms);
330
331     #ifdef foo
332         HistogramPeaks(thisShape->top,thisShape->numberOfLegs,minY,tops);
333         HistogramValleys(thisShape->bottom,thisShape->numberOfLegs,minY,bottoms);
334     #endif
335       }
336       topLine = MaxBin(tops)+minY;
337       bottomLine = MaxBin(bottoms)+minY;
338
339       if (thePict) {
340         int maxLength;
341         int halfWidth;
342         int x,y;
343         float x2,x3,y2,y3;
344         float angle;
345
346         angle = (*(dict->rawOutlines))->box->angle;
347         maxLength = thePict->width+thePict->height;
348         halfWidth = thePict->width / 2;
349         x = topLine * -sin(angle) + halfWidth * cos(angle);
350         y = topLine * cos(angle) + halfWidth * sin(angle);
351         x2 = x+maxLength*cos(angle);
352         y2 = y+maxLength*sin(angle);
353         x3 = x-maxLength*cos(angle);
354         y3 = y-maxLength*sin(angle);
355         DrawLine(thePict,x,y,(int)x2,(int)y2,5);
356         DrawLine(thePict,x,y,(int)x3,(int)y3,5);
357
358         x = bottomLine * -sin(angle) + halfWidth * cos(angle);
359         y = bottomLine * cos(angle) + halfWidth * sin(angle);
360         x2 = x+maxLength*cos(angle);
361         y2 = y+maxLength*sin(angle);
362         x3 = x-maxLength*cos(angle);
363         y3 = y-maxLength*sin(angle);
364         DrawLine(thePict,x,y,(int)x2,(int)y2,5);
365         DrawLine(thePict,x,y,(int)x3,(int)y3,5);
366
367       }
368
369     #ifdef foo
370       malloc_verify();
371     #endif
372
373       middleLine = (bottomLine+topLine)/2;
374       fontXHeight = bottomLine-topLine;
375       /* Clip and normalize the contours */
376       for (shape=startIndex;shape<endIndex;++shape)
377         StoreOutlinePair(dict,shape,middleLine,fontXHeight);
378       } /* Do another line of text */
379     }
380
381     void PageStatistics(Dictionary dict,char *fileName)
382     /* WARNING - this must be run before PostProcess since PostProcess changes the raw
```

Section D

APPENDIX / Page 262

```
383      * shape data. */
384      {
385        int index;
386        int temp;
387        int i,startIndex,firstY,minY,endIndex,shape;
388        int tops[HIST_SIZE];
389        int bottoms[HIST_SIZE];
390        int ascenders[HIST_SIZE];
391        int descenders[HIST_SIZE];
392        int middleLine,topLine,bottomLine,ascenderLine,descenderLine;
393        int ascenderHeight,descenderHeight,lineNumber;
394        int fontXHeight;
395        RawOutlinePair thisShape;
396        FILE *fp;
397
398        if ((fp=fopen(fileName,"w"))==NULL)
399          DoError("PageStatistics: error opening output file %s.\n",fileName);
400
401        SortDictionary(dict);
402
403        index = 0;
404      #ifdef foo
405        malloc_verify();
406      #endif
407        lineNumber = 0;
408        while (index < dict->numberOfEntries) {
409          startIndex = index;
410          firstY = (*(dict->rawOutlines+index))->box->pageY;
411          minY = firstY;
412          while ( (*(dict->rawOutlines+index))->box->pageY - firstY < 20 &&
413                (*(dict->rawOutlines+index))->box->pageY - firstY > -20) {
414            if ( minY > ( (*(dict->rawOutlines+index))->box->pageY ))
415              minY = (*(dict->rawOutlines+index))->box->pageY;
416            ++index;
417            if (index == dict->numberOfEntries)
418               break;
419          }
420          endIndex = index;
421
422      #ifdef foo
423          malloc_verify();
424      #endif
425
426          /* shapes from start index through endindex are all on */
427          /* the same text line */
428          /* minY has the top of the highest box on the line. */
429
430          /* Find the base and toplines by taking the mode of the heights of the
431           * valleys of the bottom contours and the peaks of the top contours */
432          for (i=0;i<HIST_SIZE;i++) {
433            tops[i]=0;
434            bottoms[i]=0;
435            ascenders[i]=0;
436            descenders[i]=0;
437          }
```

Section D APPENDIX / Page 263

```
438      for (shape=startIndex;shape<endIndex;++shape) {
439        thisShape = *(dict->rawOutlines+shape);
440        Histogram(thisShape->top,thisShape->numberOfLegs,minY,tops);
441        Histogram(thisShape->bottom,thisShape->numberOfLegs,minY,bottoms);
442
443        HistogramMax(thisShape->top,thisShape->numberOfLegs,minY,-1,ascenders);
444        HistogramMax(thisShape->bottom,thisShape->numberOfLegs,minY,1,descenders);
445      }
446      topLine = MaxBin(tops)+minY;
447      bottomLine = MaxBin(bottoms)+minY;
448      ascenderLine = MaxBin(ascenders)+minY;
449      descenderLine = MaxBin(descenders)+minY;
450
451    #ifdef foo
452      malloc_verify();
453    #endif
454
455      middleLine = (bottomLine+topLine)/2;
456      fontXHeight = bottomLine-topLine;
457
458      ascenderHeight = bottomLine-ascenderLine;
459      descenderHeight = descenderLine-bottomLine;
460      fprintf(fp,"%d: %d %d %d
         %2.6f\n",lineNumber,fontXHeight,ascenderHeight,descenderHeight,
461           (float)ascenderHeight/(float)fontXHeight);
462      ++lineNumber;
463     } /* Do another line of text */
464     fclose(fp);
465   }
```

Section D

Jul 10 13:17 1991 testFine.c

```
1       #include <stdio.h>
2       #include <math.h>
3       #include "boolean.h"
4       #include "pict.h"
5       #include "lines.h"
6
7       #define ABS(x) (((x)<0)?(-(x)):(x))
8
9       extern long random();
10
11      int RandomCoordinate(int maxValue)
12      {
13        return (float)(random()&0xffff)*maxValue/0xffff;
14      }
15
16      void RandomEdgePixel(Picture pict,int *x, int *y)
17      {
18        while (TRUE) {
19          *x = RandomCoordinate(pict->width);
20          *y = RandomCoordinate(pict->height);
21          if (ReadPixel(pict,*x,*y))
22            if (!(ReadPixel(pict,*x+1,*y) &&
23                 ReadPixel(pict,*x-1,*y) &&
24                 ReadPixel(pict,*x,*y+1) &&
25                 ReadPixel(pict,*x,*y-1) &&
26                 ReadPixel(pict,*x+1,*y+1) &&
27                 ReadPixel(pict,*x-1,*y-1) &&
28                 ReadPixel(pict,*x+1,*y-1) &&
29                 ReadPixel(pict,*x-1,*y+1)))
30              return;
31        }
32
33      }
34
35      float Fine(Picture pict,int fineSamples, int fineDirections,
36                 float angleStart,float angleEnd, char *plotFile)
37      {
38        int x,y;
39        float x2,y2;
40        int i,j;
41        float *counters;
42        float step,angle;
43        float maxAngle;
44        float maxValue;
45        float maxLength;
46        FILE *outfile;
47
48        counters = (float *)calloc(fineDirections,sizeof(float));
49        if (counters == NULL) {
50          printf("Fine: cannot allocate memory\n");
51          exit(-1);
52        }
```

Section D

APPENDIX / Page 265

```
53
54       step = ABS(angleEnd - angleStart)/fineDirections;
55
56       maxLength = sqrt((double)(pict->width*pict->width+
57                        pict->height*pict->height));
58       for (i=0;i<fineSamples;++i) {
59        RandomEdgePixel(pict,&x,&y);
60        angle = angleStart;
61        for (j=0;j<fineDirections;++j) {
62         angle = fmod(angle,2*M_PI);
63         x2 = x + maxLength*cos(angle);
64         y2 = y + maxLength*sin(angle);
65         counters[j] += CountLine(pict,x,y,(int)x2,(int)y2);
66         angle += step;
67        }
68       }
69
70       angle = angleStart;
71       maxAngle = angle;
72       maxValue = counters[0];
73       for (i=0;i<fineDirections;++i) {
74        angle = fmod(angle,2*M_PI);
75        if (counters[i]>maxValue) {
76         maxAngle = angle;
77         maxValue = counters[i];
78        }
79        angle += step;
80       }
81       printf("Orientation is at %f(%f)\n",maxAngle,maxAngle/2/M_PI*360);
82
83       /* Plot the orientation graph if requested */
84        printf("Opening fine orientation plot file\n");
85        if ((outfile = fopen(plotFile,"w"))==NULL) {
86         printf("Error opening fine orientation plot file.\n");
87         exit(-1);
88        }
89        angle = angleStart;
90        for (i=0;i<fineDirections;++i) {
91         angle = fmod(angle,2*M_PI);
92         fprintf(outfile,"%f %f\n",angle,counters[i]);
93         angle += step;
94        }
95        fprintf(outfile,"\"Fine Distances\n\n");
96        fclose(outfile);
97        printf("Done writing fine orientation plot file.\n");
98        return maxAngle;
99       }
100
101      main(argc, argv)
102      int argc;
103      char *argv[];
104      {
105       char *inFileName,*coarseOutFileName,*fineOutFileName,*fine2OutFileName;
106       int fineDirections,fineSamples;
107       float coarseAngle,fineAngle,fineAngle2;
```

Section D                                                          APPENDIX / Page 266

```
108     float firstSpacing,secondSpacing,thirdSpacing;
109     Picture pict;
110
111     if (argc != 7 )
112     {
113      printf("\nUsage: %s infile coarsePlotFile finePlotFile\n",argv[0]);
114      printf("     finerPlotFile #directions #samples\n\n");
115
116      exit(0);
117     }
118
119     inFileName = argv[1];    /* get args */
120     coarseOutFileName = argv[2];
121     fineOutFileName = argv[3];
122     fine2OutFileName = argv[4];
123     fineDirections = atoi(argv[5]);
124     fineSamples = atoi(argv[6]);
125
126     pict = load_pict(inFileName);
127     coarseAngle = Fine(pict,fineSamples,fineDirections,
128                 0,M_PI,coarseOutFileName);
129     firstSpacing = (M_PI-0)/fineDirections;
130     printf("Coarse angle: %f(%f)\n",coarseAngle,coarseAngle/M_PI*180);
131     printf("Coarse spacing: %f(%f)\n",firstSpacing,firstSpacing/M_PI*180);
132
133     fineAngle = Fine(pict,fineSamples,fineDirections,
134                 coarseAngle-4*firstSpacing,coarseAngle+4*firstSpacing,
135                 fineOutFileName);
136     secondSpacing = 8*firstSpacing/fineDirections;
137     printf("Fine angle: %f(%f)\n",fineAngle,fineAngle/M_PI*180);
138     printf("Fine spacing: %f(%f)\n",secondSpacing,secondSpacing/M_PI*180);
139
140     fineAngle2 = Fine(pict,fineSamples,fineDirections,
141                 fineAngle-15*secondSpacing,fineAngle+15*secondSpacing,
142                 fine2OutFileName);
143     thirdSpacing = 30*secondSpacing/fineDirections;
144     printf("Finer angle: %f(%f)\n",fineAngle2,fineAngle2/M_PI*180);
145     printf("Finer spacing: %f(%f)\n",thirdSpacing,thirdSpacing/M_PI*180);
146     }
147
```

Section D  APPENDIX / Page 267

Aug 15 06:32 1991 types.c

```
1    #include "stdio.h"
2    #include "mylib.h"
3    #include "types.h"
4    #include "error.h"
5
6    Box MakeBox(int x,int y,int width,int height,double angle)
7     {
8      Box temp;
9      temp = (Box)calloc(1,sizeof(BoxBody));
10     if (temp = = NULL)
11      DoError("MakeBox: out of memory\n",NULL);
12     temp->x = x;
13     temp->y = y;
14     temp->width = width;
15     temp->height = height;
16     temp->angle = angle;
17     return temp;
18    }
19
20   Point MakePoint(int x,int y)
21    {
22     Point temp;
23     temp = (Point)calloc(1,sizeof(PointBody));
24     if (temp = = NULL)
25      DoError("MakePoint: out of memory\n",NULL);
26     temp->x = x;
27     temp->y = y;
28     return temp;
29    }
30
31
32
```

We claim:

1. A method for electronically processing an electronic document image without first decoding the electronic document image, comprising:

segmenting the document image into word image units without decoding the document image;

deriving a word shape representation for each of a plurality of said word image units without decoding any characters making up the plurality of word image units, thereby deriving a plurality of said word shape representations;

comparing said word shape representations to at least one other word shape representation to identify significant word image units from amongst said plurality of word image units; and creating an abbreviated document image that is smaller than the electronic document image based on said identified significant word image units, said abbreviated document image including a plurality of said identified significant word image units.

2. The method of claim 1 wherein said step of comparing includes classifying said word image units according to frequency of occurrence based on comparing said word shape representations with each other.

3. The method of claim 1 wherein said step of comparing includes classifying said word image units according to location within the document image.

4. The method of claim 1 wherein said step of deriving a word shape representation includes utilization of at least one of an image unit shape dimension, font, typeface, number of ascender elements, number of descender elements, pixel density, pixel cross-sectional characteristic, the location of word image units with respect to neighboring word image units, vertical position, horizontal interimage unit spacing, and contour characteristic of said word image units.

5. The method of claim 1, wherein said comparing step includes comparing said word shape representations with each other.

6. The method of claim 1, wherein said comparing step includes comparing said word shape representations with at least one predetermined word shape representation.

7. The method of claim 1, wherein said comparing step includes comparing said word shape representations with at least one user-selected word shape representation.

8. A method of excerpting significant information from an undecoded document image without decoding the document image, comprising:

segmenting the document image into word image units without decoding the document image;

deriving a word shape representation for each of a plurality of said word image units without decoding any characters making up said plurality of word image units, thereby deriving a plurality of said word shape representations;

comparing said word shape representations to at least one other word shape representation to identify significant word image units from amongst said word image units; and outputting a plurality of said identified significant word image units for further processing.

9. The method of claim 8 wherein said step of outputting a plurality of identified significant image units comprises generating a document index based on said significant identified word image units.

10. The method of claim 8 wherein said step of outputting a plurality of identified significant image units comprises producing a speech synthesized output corresponding to said identified significant word image units.

11. The method of claim 8 wherein said step of outputting a plurality of identified significant word image units comprises producing said identified significant word image units in printed Braille format.

12. The method of claim 8 wherein said step of outputting said a plurality of identified significant word image units comprises generating a document summary from said identified significant word image units.

13. A method for electronically processing an undecoded document image containing word text, comprising:

segmenting the document image into word image units without decoding the document image;

deriving a word shape representation for each of a plurality of said word image units without decoding any characters making up said plurality of word image units, thereby deriving a plurality of said word shape representations;

comparing said word shape representations to at least one other word shape representation to identify significant word image units from amongst said plurality of word image units;

forming phrase image units based on a plurality of said identified significant word image units, said phrase image units each incorporating one of said identified significant word image units and adjacent word image units linked in reading order sequence; and outputting said phrase image units.

14. An apparatus for automatically summarizing the information content of an undecoded document image without decoding the document image, comprising:

means for segmenting the document image into word image units without decoding the document image;

means for deriving a word shape representation for each of a plurality of said word image units without decoding any characters making up said plurality of word image units, thereby deriving a plurality of said word shape representations;

means for comparing said word shape representations to at least one other word shade representation to identify significant word image units from amongst said plurality of word image units; and means for creating a supplemental document image based on said identified significant word image units.

15. The apparatus of claim 14 wherein said means for segmenting the document image, said means for deriving a word shape representation, said means for comparing, said means for creating a supplemental document image comprise a programmed digital computer.

16. The apparatus of claim 15 further comprising scanning means for scanning an original document to produce said document image, said scanning means being incorporated in a document copier machine which produces printed document copies; and means for controlling said document copier machine to produce a printed document copy of said supplemental document image.

17. The apparatus of claim 15 further comprising scanning means for scanning an original document to produce said document image, said scanning means being incorporated in a reading machine for the blind having means for communicating data to the user; and means for controlling said reading machine communication means to communicate the contents of said supplemental document image.

18. The apparatus of claim 17 wherein said communicating means comprises a printer for producing document copies in Braille format.

19. The apparatus of claim 17 wherein said communicating means comprises a speech synthesizer for producing synthesized speech output corresponding to said supplemental document image.

20. The apparatus of claim 17 wherein said reading machine includes operator responsive means for accessing the scanned document or a selected portion thereof corresponding to a supplemental document image following communication of the supplemental document image to the user.

* * * * *